US011567648B2

(12) United States Patent
Chaudhri et al.

(10) Patent No.: US 11,567,648 B2
(45) Date of Patent: Jan. 31, 2023

(54) DEVICE, METHOD, AND GRAPHICAL USER INTERFACE FOR MOVING A CURRENT POSITION IN CONTENT AT A VARIABLE SCRUBBING RATE

(71) Applicant: Apple Inc., Cupertino, CA (US)

(72) Inventors: Imran Chaudhri, San Francisco, CA (US); Elizabeth Caroline Furches Cranfill, San Francisco, CA (US); Michael J. Matas, Healdsburg, CA (US); Lucas C. Newman, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/917,659

(22) Filed: Jun. 30, 2020

(65) Prior Publication Data

US 2021/0011613 A1 Jan. 14, 2021

Related U.S. Application Data

(63) Continuation of application No. 12/566,673, filed on Sep. 25, 2009, now Pat. No. 10,705,701.
(Continued)

(51) Int. Cl.
*G06F 3/04847* (2022.01)
*G06F 3/0481* (2022.01)
(Continued)

(52) U.S. Cl.
CPC ........ *G06F 3/04847* (2013.01); *G06F 3/0481* (2013.01); *G06F 3/0488* (2013.01);
(Continued)

(58) Field of Classification Search
CPC ............... G06F 3/04847; G06F 3/0481; G06F 3/04855; G06F 3/0488; G06F 3/04883;
(Continued)

(56) References Cited

U.S. PATENT DOCUMENTS 4,837,798 A 6/1989 Cohen et al.
4,935,954 A 6/1990 Thompson et al.
(Continued)

FOREIGN PATENT DOCUMENTS

AU 2007100826 A4 9/2007
AU 2008100011 A4 2/2008
(Continued)

OTHER PUBLICATIONS

Corrected Notice of Allowance received for U.S. Appl. No. 15/910,263, dated Mar. 17, 2021, 3 pages.
(Continued)

*Primary Examiner* — Shen Shiau
(74) *Attorney, Agent, or Firm* — Dentons US LLP

(57) ABSTRACT

A method is performed by an electronic device with a display and a touch-sensitive surface. The method includes: displaying a progress icon that indicates a current position within a first piece of content; displaying a multi-purpose content navigation icon; while providing the first piece of content: detecting a first contact at a first location that corresponds to the multi-purpose content navigation icon; while continuing to detect the contact at the first location, moving the current position within the first piece of content at a predefined scrubbing rate; and, in response to detecting movement of the contact that includes a first component of movement in a direction that corresponds to movement on the display parallel to the first predefined direction, moving the current position within the first piece of content at a
(Continued)

variable scrubbing rate that varies monotonically as the first component of movement increases.

39 Claims, 101 Drawing Sheets

Related U.S. Application Data

(60) Provisional application No. 61/210,338, filed on Mar. 16, 2009.

(51) Int. Cl.

| | |
|---|---|
| ***G06F 3/04855*** | (2022.01) |
| ***G06F 3/04883*** | (2022.01) |
| ***G11B 27/10*** | (2006.01) |
| ***G11B 27/34*** | (2006.01) |
| ***G06F 3/0488*** | (2022.01) |
| *G06F 3/041* | (2006.01) |
| *G06F 1/16* | (2006.01) |

(52) U.S. Cl.
CPC ...... *G06F 3/04855* (2013.01); *G06F 3/04883* (2013.01); *G11B 27/105* (2013.01); *G11B 27/34* (2013.01); *G06F 1/1692* (2013.01); *G06F 3/041* (2013.01); *G06F 3/0416* (2013.01)

(58) Field of Classification Search
CPC ...... G06F 3/041; G06F 3/0416; G06F 1/1692; G06F 3/0412; G06F 3/04817
See application file for complete search history.

(56) References Cited

U.S. PATENT DOCUMENTS

| | | | |
|---|---|---|---|
| 4,972,462 | A | 11/1990 | Shibata |
| 5,003,577 | A | 3/1991 | Ertz et al. |
| 5,164,982 | A | 11/1992 | Davis |
| 5,202,961 | A | 4/1993 | Mills et al. |
| 5,283,818 | A | 2/1994 | Klausner et al. |
| 5,305,435 | A | 4/1994 | Bronson |
| 5,333,266 | A | 7/1994 | Boaz et al. |
| 5,347,295 | A | 9/1994 | Agulnick et al. |
| 5,347,628 | A | 9/1994 | Welch et al. |
| 5,390,236 | A | 2/1995 | Klausner et al. |
| 5,404,316 | A | 4/1995 | Klingler et al. |
| 5,453,725 | A | 9/1995 | You et al. |
| 5,463,725 | A | 10/1995 | Henckel et al. |
| 5,495,566 | A | 2/1996 | Kwatinetz |
| 5,510,808 | A | 4/1996 | Cina et al. |
| 5,513,342 | A | 4/1996 | Leong et al. |
| 5,519,828 | A | 5/1996 | Rayner |
| 5,521,841 | A | 5/1996 | Arman et al. |
| 5,524,140 | A | 6/1996 | Klausner et al. |
| 5,550,559 | A | 8/1996 | Isensee et al. |
| 5,557,724 | A | 9/1996 | Sampat et al. |
| 5,559,301 | A | 9/1996 | Bryan, Jr. et al. |
| 5,563,996 | A | 10/1996 | Tchao |
| 5,568,603 | A | 10/1996 | Chen et al. |
| 5,570,109 | A | 10/1996 | Jenson |
| 5,572,576 | A | 11/1996 | Klausner et al. |
| 5,611,060 | A | 3/1997 | Belfiore et al. |
| 5,614,940 | A | 3/1997 | Cobbley et al. |
| 5,657,434 | A | 8/1997 | Yamamoto et al. |
| 5,682,326 | A | 10/1997 | Klingler et al. |
| 5,684,970 | A | 11/1997 | Asuma et al. |
| 5,692,213 | A | 11/1997 | Harrison et al. |
| 5,726,687 | A | 3/1998 | Belfiore et al. |
| 5,732,184 | A | 3/1998 | Chao et al. |
| 5,745,096 | A | 4/1998 | Ludolph et al. |
| 5,745,716 | A | 4/1998 | Tchao et al. |
| 5,751,260 | A | 5/1998 | Nappi et al. |
| 5,754,174 | A | 5/1998 | Carpenter et al. |
| 5,758,180 | A | 5/1998 | Duffy et al. |
| 5,760,767 | A | 6/1998 | Shore et al. |
| 5,760,772 | A | 6/1998 | Austin |
| 5,778,053 | A | 7/1998 | Skarbo et al. |
| 5,793,366 | A | 8/1998 | Proehl et al. |
| 5,809,267 | A | 9/1998 | Moran et al. |
| 5,825,308 | A | 10/1998 | Rosenberg |
| 5,825,355 | A | 10/1998 | Palmer et al. |
| 5,835,923 | A | 11/1998 | Shibata et al. |
| 5,841,971 | A | 11/1998 | Longginou et al. |
| 5,844,547 | A | 12/1998 | Minakuchi et al. |
| 5,859,638 | A | 1/1999 | Coleman et al. |
| 5,864,868 | A | 1/1999 | Contois |
| 5,872,566 | A | 2/1999 | Bates et al. |
| 5,872,922 | A | 2/1999 | Hogan et al. |
| 5,873,108 | A | 2/1999 | Goyal et al. |
| 5,874,958 | A | 2/1999 | Ludolph |
| 5,880,411 | A | 3/1999 | Gillespie et al. |
| 5,880,725 | A | 3/1999 | Southgate |
| 5,880,733 | A | 3/1999 | Horvitz et al. |
| 5,892,507 | A | 4/1999 | Moorby et al. |
| 5,936,623 | A | 8/1999 | Amro |
| 5,936,625 | A | 8/1999 | Kahl et al. |
| 5,939,134 | A | 8/1999 | Mckean et al. |
| 5,943,052 | A | 8/1999 | Allen et al. |
| 5,963,623 | A | 10/1999 | Kim |
| 5,973,676 | A | 10/1999 | Kawakura |
| 5,999,173 | A | 12/1999 | Ubillos |
| 6,011,537 | A | 1/2000 | Slotznick |
| 6,018,372 | A | 1/2000 | Etheredge |
| 6,023,275 | A | 2/2000 | Horvitz et al. |
| 6,026,389 | A | 2/2000 | Nakajima et al. |
| 6,031,529 | A | 2/2000 | Migos et al. |
| 6,061,062 | A | 5/2000 | Venolia |
| 6,072,503 | A | 6/2000 | Tani et al. |
| 6,073,036 | A | 6/2000 | Heikkinen et al. |
| 6,081,256 | A | 6/2000 | Martin et al. |
| 6,115,037 | A | 9/2000 | Sumiyoshi et al. |
| 6,118,450 | A | 9/2000 | Proehl et al. |
| 6,166,736 | A | 12/2000 | Hugh |
| 6,204,840 | B1 | 3/2001 | Petelycky et al. |
| 6,208,342 | B1 | 3/2001 | Mugura et al. |
| 6,236,400 | B1 | 5/2001 | Guerrero |
| 6,262,724 | B1 | 7/2001 | Crow et al. |
| 6,278,443 | B1 | 8/2001 | Amro et al. |
| 6,308,187 | B1 | 10/2001 | Destefano |
| 6,310,613 | B1 | 10/2001 | Tanaka et al. |
| 6,317,784 | B1 | 11/2001 | Mackintosh et al. |
| 6,323,846 | B1 | 11/2001 | Westerman et al. |
| 6,323,883 | B1 | 11/2001 | Minoura et al. |
| 6,332,147 | B1 | 12/2001 | Moran et al. |
| 6,335,722 | B1 | 1/2002 | Tani et al. |
| 6,337,698 | B1 | 1/2002 | Keely et al. |
| 6,340,979 | B1 | 1/2002 | Beaton et al. |
| 6,342,902 | B1 | 1/2002 | Harradine et al. |
| 6,351,765 | B1 | 2/2002 | Pietropaolo et al. |
| 6,353,442 | B1 | 3/2002 | Masui |
| 6,362,837 | B1 | 3/2002 | Ginn |
| 6,363,395 | B1 | 3/2002 | Tanaka et al. |
| 6,366,296 | B1 | 4/2002 | Boreczky et al. |
| 6,369,835 | B1 | 4/2002 | Lin |
| 6,388,877 | B1 | 5/2002 | Canova et al. |
| 6,393,430 | B1 | 5/2002 | Van et al. |
| 6,430,574 | B1 | 8/2002 | Stead |
| 6,446,080 | B1 | 9/2002 | Van Ryzin et al. |
| 6,452,609 | B1 | 9/2002 | Katinsky et al. |
| 6,456,305 | B1 | 9/2002 | Qureshi et al. |
| 6,462,752 | B1 | 10/2002 | Ma et al. |
| 6,469,695 | B1 | 10/2002 | White |
| 6,477,117 | B1 | 11/2002 | Narayanaswami et al. |
| 6,489,951 | B1 | 12/2002 | Wong et al. |
| 6,504,934 | B1 | 1/2003 | Kasai et al. |
| 6,515,681 | B1 | 2/2003 | Knight |
| 6,538,665 | B2 | 3/2003 | Crow et al. |
| 6,542,171 | B1 | 4/2003 | Satou et al. |
| 6,544,295 | B1 | 4/2003 | Bodnar et al. |
| 6,556,222 | B1 | 4/2003 | Narayanaswami |
| 6,570,557 | B1 | 5/2003 | Westerman et al. |
| 6,577,330 | B1 | 6/2003 | Tsuda et al. |

(56) References Cited

U.S. PATENT DOCUMENTS 6,584,479 B2 6/2003 Chang et al.
6,587,127 B1 7/2003 Stojakovic et al.
6,600,936 B1 7/2003 Kärkkäinen et al.
6,677,932 B1 1/2004 Westerman
6,677,965 B1 1/2004 Ullmann et al.
6,687,664 B1 2/2004 Sussman et al.
6,690,365 B2 2/2004 Hinckley et al.
6,690,387 B2 2/2004 Zimmerman et al.
6,725,427 B2 4/2004 Freeman et al.
6,788,292 B1 9/2004 Nako et al.
6,833,848 B1 12/2004 Wolff et al.
6,834,371 B1 12/2004 Jensen et al.
6,850,256 B2 2/2005 Crow et al.
6,865,718 B2 3/2005 Montalcini
6,919,879 B2 7/2005 Griffin et al.
6,922,816 B1 7/2005 Amin et al.
6,954,899 B1 10/2005 Anderson
6,966,037 B2 11/2005 Fredriksson et al.
6,975,306 B2 12/2005 Hinckley et al.
7,007,239 B1 2/2006 Hawkins et al.
7,030,861 B1 4/2006 Westerman et al.
7,054,965 B2 5/2006 Bell et al.
7,081,905 B1 7/2006 Raghunath
7,082,163 B2 7/2006 Uenoyama et al.
7,091,964 B2 8/2006 Wong et al.
7,111,240 B2 9/2006 Crow et al.
7,152,210 B1 12/2006 Van Den Hoven et al.
7,173,637 B1 2/2007 Hinckley et al.
7,191,411 B2 3/2007 Moehrle
7,223,316 B2 5/2007 Murase
7,240,297 B1 7/2007 Anderson et al.
7,312,785 B2 12/2007 Tsuk et al.
7,312,790 B2 12/2007 Sato et al.
7,315,984 B2 1/2008 Crow et al.
7,318,196 B2 1/2008 Crow et al.
7,404,152 B2 7/2008 Zinn et al.
7,408,538 B2 8/2008 Hinckley et al.
7,411,575 B2 8/2008 Hill et al.
7,436,395 B2 10/2008 Chiu et al.
7,441,207 B2 10/2008 Filner et al.
7,458,025 B2 11/2008 Crow et al.
7,469,381 B2 12/2008 Ording
7,479,949 B2 1/2009 Jobs et al.
7,492,350 B2 2/2009 Fabre et al.
7,571,014 B1 8/2009 Lambourne et al.
7,581,186 B2 8/2009 Dowdy et al.
7,596,761 B2 9/2009 Lemay et al.
7,614,008 B2 11/2009 Ording
7,633,076 B2 12/2009 Huppi et al.
7,653,883 B2 1/2010 Hotelling et al.
7,656,393 B2 2/2010 King et al.
7,657,849 B2 2/2010 Chaudhri et al.
7,663,607 B2 2/2010 Hotelling et al.
7,694,231 B2 4/2010 Kocienda et al.
7,710,393 B2 5/2010 Tsuk et al.
7,750,893 B2 7/2010 Hashimoto et al.
7,768,501 B1 8/2010 Maddalozzo et al.
7,786,975 B2 8/2010 Ording et al.
7,822,443 B2 10/2010 Kim et al.
7,844,914 B2 11/2010 Andre et al.
7,922,096 B2 4/2011 Eilersen
7,957,762 B2 6/2011 Herz et al.
7,996,792 B2 8/2011 Anzures et al.
8,006,002 B2 8/2011 Kalayjian et al.
8,028,323 B2 9/2011 Weel
8,032,298 B2 10/2011 Han
8,146,019 B2 3/2012 Kim et al.
8,196,043 B2 6/2012 Crow et al.
8,217,906 B2 7/2012 Sinclair
8,239,784 B2 8/2012 Hotelling et al.
8,264,465 B2 9/2012 Grant et al.
8,279,180 B2 10/2012 Hotelling et al.
8,280,539 B2 10/2012 Jehan et al.
8,290,603 B1 10/2012 Lambourne
8,305,356 B1 * 11/2012 Jang .................... G06F 3/0485 715/833
8,381,135 B2 2/2013 Hotelling et al.
8,458,780 B1 6/2013 Takkallapally et al.
8,479,122 B2 7/2013 Hotelling et al.
8,531,427 B2 * 9/2013 Jang .................... G06F 3/04855 715/833
8,564,543 B2 10/2013 Chaudhri
8,572,513 B2 * 10/2013 Chaudhri ............ G06F 3/04883 715/863
8,587,528 B2 11/2013 Chaudhri
8,589,823 B2 11/2013 Lemay et al.
8,624,933 B2 1/2014 Leffert et al.
8,689,128 B2 * 4/2014 Chaudhri ............ G06F 3/04847 715/833
8,698,762 B2 4/2014 Wagner et al.
8,736,557 B2 5/2014 Chaudhri et al.
8,830,181 B1 9/2014 Clark et al.
8,839,155 B2 9/2014 Ording
8,860,674 B2 10/2014 Lee et al.
8,875,046 B2 10/2014 Jitkoff
8,943,410 B2 * 1/2015 Ubillos .................. G11B 27/34 715/838
8,984,431 B2 * 3/2015 Chaudhri .............. G06F 3/0481 715/786
8,984,436 B1 3/2015 Tseng et al.
9,042,556 B2 5/2015 Kallai et al.
9,084,003 B1 7/2015 Sanio et al.
9,112,849 B1 8/2015 Werkelin Ahlin et al.
9,134,902 B2 9/2015 Kang et al.
9,195,219 B2 11/2015 Hong et al.
9,202,509 B2 12/2015 Kallai et al.
9,244,584 B2 1/2016 Fino
9,247,363 B2 1/2016 Triplett et al.
9,251,787 B1 2/2016 Hart et al.
9,294,853 B1 3/2016 Dhaundiyal
9,319,782 B1 4/2016 Hilmes et al.
9,354,803 B2 5/2016 Ording et al.
9,374,607 B2 6/2016 Bates et al.
9,395,905 B2 7/2016 Wherry
D765,118 S 8/2016 Bachman et al.
9,431,021 B1 8/2016 Scalise et al.
9,436,374 B2 9/2016 Leffert et al.
9,450,812 B2 9/2016 Lee et al.
9,489,106 B2 11/2016 Chaudhri et al.
D773,510 S 12/2016 Foss et al.
9,519,413 B2 12/2016 Bates
D789,381 S 6/2017 Okumura et al.
9,727,749 B2 8/2017 Tzeng et al.
9,794,720 B1 10/2017 Kadri
9,798,443 B1 10/2017 Gray
9,898,250 B1 2/2018 Williams et al.
9,954,989 B2 4/2018 Zhou
10,129,044 B2 11/2018 Kangshang et al.
10,200,468 B2 2/2019 Leban et al.
10,284,980 B1 5/2019 Woo et al.
10,705,701 B2 * 7/2020 Pisula .................. G11B 27/105
10,732,819 B2 8/2020 Wang et al.
10,824,299 B2 11/2020 Bai
10,833,887 B2 11/2020 Wu
2001/0043514 A1 11/2001 Kita et al.
2001/0050687 A1 12/2001 Iida et al.
2002/0002039 A1 1/2002 Qureshey et al.
2002/0015024 A1 2/2002 Westerman et al.
2002/0030667 A1 3/2002 Hinckley et al.
2002/0054158 A1 5/2002 Asami
2002/0054164 A1 5/2002 Uemura
2002/0077082 A1 6/2002 Cruickshank
2002/0080151 A1 6/2002 Venolia
2002/0089545 A1 7/2002 Levi Montalcini
2002/0118169 A1 8/2002 Hinckley et al.
2002/0122066 A1 9/2002 Bates et al.
2002/0130891 A1 9/2002 Singer
2002/0135602 A1 9/2002 Davis et al.
2002/0137565 A1 9/2002 Blanco
2002/0143741 A1 10/2002 Laiho et al.
2002/0154173 A1 10/2002 Etgen et al.
2002/0186252 A1 12/2002 Himmel et al.
2002/0191028 A1 12/2002 Senechalle et al.

(56) References Cited

U.S. PATENT DOCUMENTS

| | | | |
|---|---|---|---|
| 2002/0191029 | A1 | 12/2002 | Gillespie et al. |
| 2002/0196238 | A1 | 12/2002 | Tsukada et al. |
| 2002/0198909 | A1 | 12/2002 | Huynh et al. |
| 2003/0008679 | A1 | 1/2003 | Iwata et al. |
| 2003/0026402 | A1 | 2/2003 | Clapper |
| 2003/0030673 | A1 | 2/2003 | Ho |
| 2003/0043174 | A1 | 3/2003 | Hinckley et al. |
| 2003/0052901 | A1 | 3/2003 | Fukuchi |
| 2003/0067908 | A1 | 4/2003 | Mattaway et al. |
| 2003/0076301 | A1 | 4/2003 | Tsuk et al. |
| 2003/0076306 | A1 | 4/2003 | Zadesky et al. |
| 2003/0095149 | A1 | 5/2003 | Fredriksson et al. |
| 2003/0122787 | A1 | 7/2003 | Zimmerman et al. |
| 2003/0128192 | A1 | 7/2003 | Van Os |
| 2003/0131317 | A1 | 7/2003 | Budka et al. |
| 2003/0226152 | A1 | 12/2003 | Billmaier et al. |
| 2003/0228863 | A1 | 12/2003 | Vander Veen et al. |
| 2004/0023643 | A1 | 2/2004 | Vander Veen et al. |
| 2004/0026605 | A1 | 2/2004 | Lee et al. |
| 2004/0027371 | A1 | 2/2004 | Jaeger |
| 2004/0032955 | A1 | 2/2004 | Hashimoto et al. |
| 2004/0055446 | A1 | 3/2004 | Robbin et al. |
| 2004/0056837 | A1 | 3/2004 | Koga et al. |
| 2004/0100479 | A1 | 5/2004 | Nakano et al. |
| 2004/0104896 | A1 | 6/2004 | Suraqui |
| 2004/0122683 | A1 | 6/2004 | Grossman et al. |
| 2004/0125088 | A1 | 7/2004 | Zimmerman et al. |
| 2004/0130581 | A1 | 7/2004 | Howard et al. |
| 2004/0139398 | A1 | 7/2004 | Testa et al. |
| 2004/0140956 | A1 | 7/2004 | Kushler et al. |
| 2004/0143796 | A1 | 7/2004 | Lerner et al. |
| 2004/0168118 | A1 | 8/2004 | Wong et al. |
| 2004/0189714 | A1 | 9/2004 | Fox et al. |
| 2004/0235520 | A1 | 11/2004 | Cadiz et al. |
| 2004/0237048 | A1 | 11/2004 | Tojo et al. |
| 2004/0250217 | A1 | 12/2004 | Tojo et al. |
| 2004/0252109 | A1 | 12/2004 | Trent, Jr. et al. |
| 2004/0261010 | A1 | 12/2004 | Matsuishi |
| 2004/0264916 | A1 | 12/2004 | Van et al. |
| 2004/0268400 | A1 | 12/2004 | Barde et al. |
| 2005/0012723 | A1 | 1/2005 | Pallakoff |
| 2005/0020317 | A1 | 1/2005 | Koyama |
| 2005/0021418 | A1 | 1/2005 | Marcus et al. |
| 2005/0024341 | A1 | 2/2005 | Gillespie et al. |
| 2005/0024345 | A1 | 2/2005 | Eastty et al. |
| 2005/0071437 | A1 | 3/2005 | Bear et al. |
| 2005/0071761 | A1 | 3/2005 | Kontio |
| 2005/0097468 | A1 | 5/2005 | Montalcini |
| 2005/0134578 | A1 | 6/2005 | Chambers et al. |
| 2005/0144568 | A1 | 6/2005 | Gruen et al. |
| 2005/0146534 | A1 | 7/2005 | Fong et al. |
| 2005/0160372 | A1 | 7/2005 | Gruen et al. |
| 2005/0162402 | A1 | 7/2005 | Watanachote |
| 2005/0177445 | A1 | 8/2005 | Church |
| 2005/0181774 | A1 | 8/2005 | Miyata |
| 2005/0190059 | A1 | 9/2005 | Wehrenberg |
| 2005/0192924 | A1 | 9/2005 | Drucker et al. |
| 2005/0210403 | A1 | 9/2005 | Satanek |
| 2005/0210412 | A1 | 9/2005 | Matthews et al. |
| 2005/0216839 | A1 | 9/2005 | Salvucci |
| 2005/0229112 | A1 | 10/2005 | Clay et al. |
| 2005/0240756 | A1 | 10/2005 | Mayer |
| 2005/0275628 | A1 | 12/2005 | Balakrishnan et al. |
| 2006/0001645 | A1 | 1/2006 | Drucker et al. |
| 2006/0001652 | A1 | 1/2006 | Chiu et al. |
| 2006/0007174 | A1 | 1/2006 | Shen |
| 2006/0010400 | A1 | 1/2006 | Dehlin et al. |
| 2006/0015819 | A1 | 1/2006 | Hawkins et al. |
| 2006/0017692 | A1 | 1/2006 | Wehrenberg et al. |
| 2006/0018446 | A1 | 1/2006 | Schmandt et al. |
| 2006/0020904 | A1 | 1/2006 | Aaltonen et al. |
| 2006/0026356 | A1 | 2/2006 | Okawa et al. |
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0036942 | A1 | 2/2006 | Carter |
| 2006/0038785 | A1 | 2/2006 | Hinckley et al. |
| 2006/0038796 | A1 | 2/2006 | Hinckley et al. |
| 2006/0050054 | A1 | 3/2006 | Liang et al. |
| 2006/0085751 | A1 | 4/2006 | O'Brien et al. |
| 2006/0085766 | A1 | 4/2006 | Dominowska et al. |
| 2006/0125799 | A1 | 6/2006 | Hillis et al. |
| 2006/0132460 | A1 | 6/2006 | Kolmykov-Zotov et al. |
| 2006/0132469 | A1 | 6/2006 | Lai et al. |
| 2006/0146074 | A1 | 7/2006 | Harrison |
| 2006/0148455 | A1 | 7/2006 | Kim |
| 2006/0161621 | A1 | 7/2006 | Rosenberg |
| 2006/0161846 | A1 | 7/2006 | Van Leeuwen |
| 2006/0161870 | A1 | 7/2006 | Hotelling et al. |
| 2006/0161871 | A1 | 7/2006 | Hotelling et al. |
| 2006/0176278 | A1 | 8/2006 | Mathews et al. |
| 2006/0178110 | A1 | 8/2006 | Nurminen et al. |
| 2006/0184901 | A1 | 8/2006 | Dietz |
| 2006/0197753 | A1 | 9/2006 | Hotelling |
| 2006/0227106 | A1 | 10/2006 | Hashimoto et al. |
| 2006/0234680 | A1 | 10/2006 | Doulton |
| 2006/0236262 | A1 | 10/2006 | Bathiche et al. |
| 2006/0239419 | A1 | 10/2006 | Joseph et al. |
| 2006/0246874 | A1 | 11/2006 | Sullivan |
| 2006/0253547 | A1 | 11/2006 | Wood et al. |
| 2006/0256090 | A1 | 11/2006 | Huppi |
| 2006/0258289 | A1 | 11/2006 | Dua |
| 2006/0265263 | A1 | 11/2006 | Burns |
| 2006/0268020 | A1 | 11/2006 | Han |
| 2006/0271864 | A1 | 11/2006 | Satterfield et al. |
| 2006/0271867 | A1 | 11/2006 | Wang et al. |
| 2006/0277504 | A1 | 12/2006 | Zinn |
| 2006/0279541 | A1 | 12/2006 | Kim et al. |
| 2006/0281449 | A1 | 12/2006 | Kun et al. |
| 2006/0286971 | A1 | 12/2006 | Maly et al. |
| 2006/0290666 | A1 | 12/2006 | Crohas |
| 2007/0002018 | A1 | 1/2007 | Mori |
| 2007/0011614 | A1 | 1/2007 | Crow et al. |
| 2007/0013671 | A1 | 1/2007 | Zadesky et al. |
| 2007/0027682 | A1 | 2/2007 | Bennett |
| 2007/0033295 | A1 | 2/2007 | Marriott |
| 2007/0038953 | A1 | 2/2007 | Keohane et al. |
| 2007/0053268 | A1 | 3/2007 | Crandall et al. |
| 2007/0070045 | A1 | 3/2007 | Sung et al. |
| 2007/0070066 | A1 | 3/2007 | Bakhash |
| 2007/0080936 | A1 | 4/2007 | Tsuk et al. |
| 2007/0085841 | A1 | 4/2007 | Tsuk et al. |
| 2007/0097090 | A1 | 5/2007 | Battles |
| 2007/0097093 | A1 | 5/2007 | Ohshita et al. |
| 2007/0113294 | A1 | 5/2007 | Field et al. |
| 2007/0124680 | A1 | 5/2007 | Robbin et al. |
| 2007/0126715 | A1 | 6/2007 | Funamoto |
| 2007/0129059 | A1 | 6/2007 | Nadarajah et al. |
| 2007/0132789 | A1 | 6/2007 | Ording et al. |
| 2007/0136679 | A1 | 6/2007 | Yang |
| 2007/0146337 | A1 | 6/2007 | Ording et al. |
| 2007/0150830 | A1 | 6/2007 | Ording et al. |
| 2007/0150842 | A1 | 6/2007 | Chaudhri et al. |
| 2007/0152979 | A1 | 7/2007 | Jobs et al. |
| 2007/0152980 | A1 | 7/2007 | Kocienda et al. |
| 2007/0157094 | A1 | 7/2007 | Lemay et al. |
| 2007/0168369 | A1 | 7/2007 | Bruns |
| 2007/0168413 | A1 | 7/2007 | Barletta et al. |
| 2007/0180375 | A1 | 8/2007 | Gittelman et al. |
| 2007/0192744 | A1 | 8/2007 | Reponen |
| 2007/0198111 | A1 | 8/2007 | Oetzel et al. |
| 2007/0220442 | A1 | 9/2007 | Bohan et al. |
| 2007/0220443 | A1 | 9/2007 | Cranfill et al. |
| 2007/0226645 | A1 | 9/2007 | Kongqiao et al. |
| 2008/0016468 | A1 | 1/2008 | Chambers et al. |
| 2008/0027637 | A1 | 1/2008 | Sakano |
| 2008/0033779 | A1 | 2/2008 | Coffman et al. |
| 2008/0034289 | A1 | 2/2008 | Doepke et al. |
| 2008/0036743 | A1 | 2/2008 | Westerman et al. |
| 2008/0037951 | A1 | 2/2008 | Cho et al. |
| 2008/0040692 | A1 | 2/2008 | Sunday et al. |
| 2008/0042984 | A1 | 2/2008 | Lim et al. |
| 2008/0055257 | A1 | 3/2008 | Peng |

(56) References Cited

U.S. PATENT DOCUMENTS

2008/0055264 A1 3/2008 Anzures et al.
2008/0056459 A1 3/2008 Vallier et al.
2008/0062141 A1 3/2008 Chaudhri
2008/0066016 A1 3/2008 Dowdy et al.
2008/0071810 A1 3/2008 Casto et al.
2008/0075368 A1 3/2008 Kuzmin
2008/0081558 A1 4/2008 Dunko et al.
2008/0082939 A1 4/2008 Nash et al.
2008/0084399 A1 4/2008 Chua et al.
2008/0084400 A1 4/2008 Rosenberg
2008/0091717 A1 4/2008 Garbow et al.
2008/0094367 A1 4/2008 Van De Ven et al.
2008/0109764 A1 5/2008 Linnamaki
2008/0122794 A1 5/2008 Koiso et al.
2008/0122796 A1 5/2008 Jobs et al.
2008/0126933 A1 5/2008 Gupta et al.
2008/0126935 A1 5/2008 Blomgren
2008/0155413 A1* 6/2008 Ubillos .............. G06F 3/04847 715/716
2008/0155417 A1 6/2008 Vallone et al.
2008/0155474 A1 6/2008 Duhig et al.
2008/0158170 A1 7/2008 Herz et al.
2008/0163127 A1 7/2008 Newell et al.
2008/0163131 A1 7/2008 Hirai et al.
2008/0163161 A1 7/2008 Shaburov et al.
2008/0165141 A1 7/2008 Christie
2008/0165151 A1 7/2008 Lemay et al.
2008/0165152 A1 7/2008 Forstall et al.
2008/0165153 A1 7/2008 Platzer et al.
2008/0168185 A1 7/2008 Robbin et al.
2008/0168384 A1 7/2008 Platzer et al.
2008/0168395 A1 7/2008 Ording et al.
2008/0168403 A1 7/2008 Westerman et al.
2008/0190266 A1 8/2008 Kim et al.
2008/0207176 A1 8/2008 Brackbill et al.
2008/0211785 A1 9/2008 Hotelling et al.
2008/0222546 A1 9/2008 Mudd et al.
2008/0225007 A1 9/2008 Nakadaira et al.
2008/0225013 A1 9/2008 Muylkens et al.
2008/0250319 A1 10/2008 Lee et al.
2008/0259040 A1 10/2008 Ording et al.
2008/0273712 A1 11/2008 Eichfeld et al.
2008/0273713 A1 11/2008 Hartung et al.
2008/0278455 A1 11/2008 Atkins et al.
2008/0285772 A1 11/2008 Haulick
2008/0320391 A1 12/2008 Lemay et al.
2009/0002335 A1 1/2009 Chaudhri
2009/0002396 A1 1/2009 Andrews et al.
2009/0006958 A1 1/2009 Pohjola et al.
2009/0007188 A1 1/2009 Omernick
2009/0058822 A1 3/2009 Chaudhri
2009/0075694 A1 3/2009 Kim et al.
2009/0077491 A1 3/2009 Kim
2009/0125571 A1 5/2009 Kiilerich et al.
2009/0128500 A1 5/2009 Sinclair
2009/0140991 A1 6/2009 Takasaki et al.
2009/0144623 A1 6/2009 Jung
2009/0158149 A1 6/2009 Ko
2009/0160804 A1 6/2009 Chang et al.
2009/0174667 A1 7/2009 Kocienda et al.
2009/0174677 A1* 7/2009 Gehani .............. G06F 3/04847 345/173
2009/0174680 A1 7/2009 Anzures et al.
2009/0177966 A1 7/2009 Chaudhri
2009/0178008 A1 7/2009 Herz et al.
2009/0198359 A1 8/2009 Chaudhri
2009/0199119 A1 8/2009 Park et al.
2009/0199130 A1 8/2009 Tsern et al.
2009/0204920 A1 8/2009 Beverley et al.
2009/0204929 A1 8/2009 Baurmann et al.
2009/0228792 A1 9/2009 Van Os et al.
2009/0304205 A1 12/2009 Hardacker et al.
2009/0307633 A1 12/2009 Haughay et al.
2009/0322695 A1 12/2009 Cho et al.
2010/0001967 A1 1/2010 Yoo
2010/0004031 A1 1/2010 Kim
2010/0005421 A1 1/2010 Yoshioka
2010/0013780 A1 1/2010 Ikeda et al.
2010/0013782 A1 1/2010 Liu et al.
2010/0042933 A1 2/2010 Ragusa
2010/0058228 A1 3/2010 Park
2010/0058253 A1 3/2010 Son
2010/0060586 A1 3/2010 Pisula et al.
2010/0070490 A1 3/2010 Amidon et al.
2010/0085379 A1 4/2010 Hishikawa et al.
2010/0088634 A1 4/2010 Tsuruta et al.
2010/0088639 A1 4/2010 Yach et al.
2010/0106647 A1 4/2010 Raman
2010/0122195 A1 5/2010 Hwang
2010/0125785 A1 5/2010 Moore et al.
2010/0134425 A1 6/2010 Storrusten
2010/0162181 A1 6/2010 Shiplacoff et al.
2010/0175018 A1 7/2010 Petschnigg et al.
2010/0178873 A1 7/2010 Lee et al.
2010/0229094 A1 9/2010 Nakajima et al.
2010/0231534 A1* 9/2010 Chaudhri ........... G06F 3/04855 345/173
2010/0231535 A1* 9/2010 Chaudhri ............. G06F 3/0481 345/173
2010/0231536 A1* 9/2010 Chaudhri ............. G06F 3/0481 345/173
2010/0231537 A1* 9/2010 Pisula ................ G06F 3/04855 345/173
2010/0235729 A1 9/2010 Kocienda et al.
2010/0251304 A1 9/2010 Donoghue et al.
2010/0257484 A1 10/2010 Nakamura et al.
2010/0259482 A1 10/2010 Ball
2010/0283743 A1 11/2010 Coddington
2010/0284389 A1 11/2010 Ramsay et al.
2010/0296678 A1 11/2010 Kuhn-Rahloff et al.
2010/0299639 A1 11/2010 Ramsay et al.
2010/0302172 A1 12/2010 Wilairat et al.
2010/0306657 A1 12/2010 Derbyshire et al.
2010/0321201 A1 12/2010 Huang et al.
2011/0050594 A1 3/2011 Kim et al.
2011/0074699 A1 3/2011 Marr et al.
2011/0131537 A1 6/2011 Cho et al.
2011/0159469 A1 6/2011 Hwang et al.
2011/0159927 A1 6/2011 Choi
2011/0163967 A1 7/2011 Chaudhri
2011/0163971 A1 7/2011 Wagner et al.
2011/0164042 A1 7/2011 Chaudhri
2011/0209099 A1 8/2011 Hinckley et al.
2011/0242002 A1 10/2011 Kaplan et al.
2011/0246942 A1 10/2011 Misawa
2011/0291971 A1 12/2011 Masaki et al.
2011/0302493 A1 12/2011 Runstedler et al.
2012/0004920 A1 1/2012 Kelly et al.
2012/0011437 A1 1/2012 James et al.
2012/0050185 A1 3/2012 Davydov et al.
2012/0084697 A1 4/2012 Reeves
2012/0089951 A1 4/2012 Cassidy
2012/0115608 A1 5/2012 Pfeifer et al.
2012/0131459 A1 5/2012 Ilama-Vaquero et al.
2012/0178431 A1 7/2012 Gold
2012/0197419 A1 8/2012 Dhruv et al.
2012/0210226 A1 8/2012 McCoy et al.
2012/0222092 A1 8/2012 Rabii
2012/0260169 A1 10/2012 Schwartz et al.
2012/0272145 A1 10/2012 Ryan et al.
2012/0272230 A1 10/2012 Lee
2012/0294118 A1 11/2012 Haulick et al.
2012/0304111 A1 11/2012 Queru et al.
2012/0311444 A1 12/2012 Chaudhri
2012/0324390 A1 12/2012 Tao et al.
2013/0002589 A1* 1/2013 Jang .................. G06F 3/04855 345/173
2013/0007617 A1 1/2013 Mackenzie et al.
2013/0022221 A1 1/2013 Kallai et al.
2013/0027289 A1 1/2013 Choi et al.
2013/0047084 A1 2/2013 Sanders et al.
2013/0051755 A1 2/2013 Brown et al.
2013/0053107 A1 2/2013 Kang et al.
2013/0055082 A1 2/2013 Fino et al.

(56) References Cited

U.S. PATENT DOCUMENTS

2013/0073584 A1 3/2013 Kuper et al.
2013/0080516 A1 3/2013 Bologh
2013/0080955 A1 3/2013 Reimann et al.
2013/0094666 A1 4/2013 Haaff et al.
2013/0094770 A1 4/2013 Lee et al.
2013/0111407 A1 5/2013 Mullen
2013/0138272 A1 5/2013 Louise-Babando et al.
2013/0159858 A1 6/2013 Joffray et al.
2013/0162411 A1 6/2013 Moses et al.
2013/0173794 A1 7/2013 Agerbak et al.
2013/0191220 A1 7/2013 Dent et al.
2013/0191454 A1 7/2013 Oliver et al.
2013/0194476 A1 8/2013 Shimosato
2013/0205375 A1 8/2013 Woxblom et al.
2013/0246522 A1 9/2013 Bilinski et al.
2013/0246916 A1 9/2013 Reimann et al.
2013/0322634 A1 12/2013 Bennett et al.
2013/0324081 A1 12/2013 Gargi et al.
2013/0329924 A1 12/2013 Fleizach et al.
2013/0339343 A1 12/2013 Hierons et al.
2013/0346859 A1 12/2013 Bates et al.
2013/0347022 A1 12/2013 Bates et al.
2014/0033035 A1 1/2014 Crow et al.
2014/0037107 A1 2/2014 Marino et al.
2014/0040742 A1 2/2014 Park et al.
2014/0047020 A1 2/2014 Matus et al.
2014/0049447 A1 2/2014 Choi
2014/0072282 A1* 3/2014 Cho ...................... G11B 20/10 386/282
2014/0075311 A1 3/2014 Boettcher et al.
2014/0139637 A1 5/2014 Mistry et al.
2014/0143737 A1 5/2014 Mistry et al.
2014/0157160 A1 6/2014 Cudak et al.
2014/0176298 A1 6/2014 Kumar et al.
2014/0181202 A1 6/2014 Gossaln
2014/0181654 A1 6/2014 Kumar et al.
2014/0207707 A1 7/2014 Na et al.
2014/0215413 A1* 7/2014 Calkins ................ G06F 3/0483 715/863
2014/0229835 A1* 8/2014 Ravine ............... H04L 65/4069 715/720
2014/0237361 A1 8/2014 Martin et al.
2014/0267002 A1 9/2014 Luna
2014/0267911 A1 9/2014 Grant et al.
2014/0270183 A1 9/2014 Luna
2014/0335789 A1 11/2014 Malamud et al.
2014/0363024 A1 12/2014 Apodaca
2014/0364056 A1 12/2014 Alsina et al.
2014/0365904 A1 12/2014 Kim et al.
2015/0020021 A1 1/2015 Leffert et al.
2015/0032812 A1 1/2015 Dudley
2015/0033361 A1 1/2015 Choi et al.
2015/0049591 A1 2/2015 Adams et al.
2015/0052222 A1 2/2015 Farrell et al.
2015/0058744 A1 2/2015 Dhlngra et al.
2015/0067803 A1 3/2015 Alduaiji
2015/0089359 A1 3/2015 Brisebois
2015/0113407 A1 4/2015 Hoffert et al.
2015/0113479 A1 4/2015 Ording
2015/0130737 A1 5/2015 Im et al.
2015/0138101 A1 5/2015 Park et al.
2015/0148927 A1 5/2015 Georges et al.
2015/0149599 A1 5/2015 Caunter et al.
2015/0160856 A1 6/2015 Jang et al.
2015/0189426 A1 7/2015 Pang
2015/0193130 A1 7/2015 Cho et al.
2015/0200715 A1 7/2015 Oiwa et al.
2015/0205511 A1 7/2015 Vinna et al.
2015/0205971 A1 7/2015 Sanio et al.
2015/0222615 A1 8/2015 Allain et al.
2015/0222680 A1 8/2015 Grover
2015/0223005 A1 8/2015 Hardman et al.
2015/0229650 A1 8/2015 Grigg et al.
2015/0229782 A1 8/2015 Zuidema et al.
2015/0242073 A1 8/2015 Munoz et al.
2015/0242597 A1 8/2015 Danciu
2015/0242611 A1 8/2015 Cotterill
2015/0242837 A1 8/2015 Yarbrough et al.
2015/0243163 A1 8/2015 Shoemake et al.
2015/0248268 A1 9/2015 Kumar et al.
2015/0253960 A1 9/2015 Lin et al.
2015/0261493 A1 9/2015 Lemmon et al.
2015/0277564 A1 10/2015 Saito
2015/0309768 A1 10/2015 Van Der Heide
2015/0312299 A1 10/2015 Chen et al.
2015/0355879 A1 12/2015 Beckhardt et al.
2015/0356278 A1 12/2015 Britt et al.
2015/0358043 A1 12/2015 Jeong et al.
2015/0378522 A1 12/2015 Butts et al.
2016/0004417 A1 1/2016 Bates
2016/0026429 A1 1/2016 Triplett
2016/0029146 A1 1/2016 Tembey et al.
2016/0048705 A1 2/2016 Yang
2016/0054710 A1 2/2016 Kim et al.
2016/0062487 A1 3/2016 Foss et al.
2016/0062567 A1 3/2016 Yang et al.
2016/0062589 A1 3/2016 Wan et al.
2016/0062606 A1 3/2016 Vega et al.
2016/0077734 A1 3/2016 Buxton et al.
2016/0088039 A1 3/2016 Millington et al.
2016/0092072 A1 3/2016 So et al.
2016/0127799 A1 5/2016 Alsina et al.
2016/0134942 A1 5/2016 Lo
2016/0150624 A1 5/2016 Meerbeek et al.
2016/0156687 A1 6/2016 Leung
2016/0156992 A1 6/2016 Kuper
2016/0183046 A1 6/2016 Kwon
2016/0202866 A1 7/2016 Zambetti
2016/0209939 A1 7/2016 Zambetti et al.
2016/0210983 A1 7/2016 Amada et al.
2016/0239167 A1 8/2016 Reimann et al.
2016/0246566 A1 8/2016 Fullerton et al.
2016/0253145 A1 9/2016 Lee et al.
2016/0274757 A1 9/2016 Ording et al.
2016/0291924 A1 10/2016 Bierbower et al.
2016/0295340 A1 10/2016 Baker et al.
2016/0299669 A1 10/2016 Bates et al.
2016/0336531 A1 11/2016 Yokoyama
2016/0342386 A1 11/2016 Kallai et al.
2016/0345039 A1 11/2016 Billmeyer
2016/0351191 A1 12/2016 Lehtiniemi et al.
2016/0360344 A1 12/2016 Shim et al.
2016/0366531 A1 12/2016 Popova
2016/0381476 A1 12/2016 Gossain et al.
2017/0010782 A1 1/2017 Chaudhri et al.
2017/0010794 A1 1/2017 Cho et al.
2017/0013562 A1 1/2017 Lim et al.
2017/0025124 A1 1/2017 Mixter et al.
2017/0031552 A1 2/2017 Lin
2017/0041727 A1 2/2017 Reimann
2017/0068402 A1 3/2017 Lochhead et al.
2017/0068507 A1 3/2017 Kim et al.
2017/0070346 A1 3/2017 Lombardi et al.
2017/0078294 A1 3/2017 Medvinsky
2017/0083285 A1 3/2017 Meyers et al.
2017/0083494 A1 3/2017 Yun et al.
2017/0092085 A1 3/2017 Agarwal
2017/0092270 A1 3/2017 Newendorp et al.
2017/0099270 A1 4/2017 Anson
2017/0115940 A1 4/2017 Byeon
2017/0127145 A1 5/2017 Rajapakse
2017/0134567 A1 5/2017 Jeon et al.
2017/0195772 A1 7/2017 Han et al.
2017/0235545 A1 8/2017 Millington et al.
2017/0242653 A1 8/2017 Lang et al.
2017/0357439 A1 12/2017 Lemay et al.
2017/0357477 A1 12/2017 Im et al.
2017/0363436 A1 12/2017 Eronen et al.
2018/0039916 A1 2/2018 Ravindra
2018/0040324 A1 2/2018 Wilberding
2018/0067712 A1 3/2018 Behzadi et al.
2018/0070187 A1 3/2018 Drinkwater et al.
2018/0329585 A1 11/2018 Carrigan et al.
2018/0329586 A1 11/2018 Sundstrom et al.

(56) References Cited

U.S. PATENT DOCUMENTS

| | | | |
|---|---|---|---|
| 2018/0335903 | A1 | 11/2018 | Coffman et al. |
| 2018/0337924 | A1 | 11/2018 | Graham et al. |
| 2018/0341448 | A1 | 11/2018 | Behzadi et al. |
| 2018/0351762 | A1 | 12/2018 | Iyengar et al. |
| 2019/0012069 | A1 | 1/2019 | Bates |
| 2019/0012073 | A1 | 1/2019 | Hwang |
| 2019/0012966 | A1 | 1/2019 | Shi |
| 2019/0056854 | A1 | 2/2019 | Azzolin et al. |
| 2019/0102145 | A1 | 4/2019 | Wilberding et al. |
| 2019/0163329 | A1 | 5/2019 | Yang et al. |
| 2019/0294406 | A1 | 9/2019 | Bierbower et al. |
| 2020/0104018 | A1 | 4/2020 | Coffman et al. |
| 2020/0201491 | A1 | 6/2020 | Coffman et al. |
| 2020/0201495 | A1 | 6/2020 | Coffman et al. |
| 2020/0218486 | A1 | 7/2020 | Behzadi et al. |
| 2020/0225817 | A1 | 7/2020 | Coffman et al. |
| 2020/0379711 | A1 | 12/2020 | Graham et al. |
| 2020/0379714 | A1 | 12/2020 | Graham et al. |
| 2020/0379716 | A1 | 12/2020 | Carrigan et al. |
| 2020/0379729 | A1 | 12/2020 | Graham et al. |
| 2020/0379730 | A1 | 12/2020 | Graham et al. |
| 2021/0011588 | A1 | 1/2021 | Coffman et al. |
| 2021/0181903 | A1 | 6/2021 | Carrigan et al. |
| 2021/0255816 | A1 | 8/2021 | Behzadi et al. |
| 2021/0255819 | A1 | 8/2021 | Graham et al. |
| 2021/0263702 | A1 | 8/2021 | Carrigan |
| 2021/0392223 | A1 | 12/2021 | Coffman et al. |
| 2022/0100367 | A1 | 3/2022 | Carrigan et al. |
| 2022/0137759 | A1 | 5/2022 | Yang et al. |
| 2022/0279063 | A1 | 9/2022 | Coffman et al. |
| 2022/0286549 | A1 | 9/2022 | Coffman et al. |
| 2022/0303383 | A1 | 9/2022 | Coffman et al. |
| 2022/0326817 | A1 | 10/2022 | Carrigan et al. |

FOREIGN PATENT DOCUMENTS

| | | | |
|---|---|---|---|
| AU | 2014100584 | A4 | 7/2014 |
| CN | 1274439 | A | 11/2000 |
| CN | 1475962 | A | 2/2004 |
| CN | 1613049 | A | 5/2005 |
| CN | 1673939 | A | 9/2005 |
| CN | 1797295 | A | 7/2006 |
| CN | 1863281 | A | 11/2006 |
| CN | 101315593 | A | 12/2008 |
| CN | 101359291 | A | 2/2009 |
| CN | 100530059 | C | 8/2009 |
| CN | 101625620 | A | 1/2010 |
| CN | 101976171 | A | 2/2011 |
| CN | 102281294 | A | 12/2011 |
| CN | 102301323 | A | 12/2011 |
| CN | 102508707 | A | 6/2012 |
| CN | 102740146 | A | 10/2012 |
| CN | 102750066 | A | 10/2012 |
| CN | 102902453 | A | 1/2013 |
| CN | 102905181 | A | 1/2013 |
| CN | 103069378 | A | 4/2013 |
| CN | 103260079 | A | 8/2013 |
| CN | 103593154 | A | 2/2014 |
| CN | 103793138 | A | 5/2014 |
| CN | 103870255 | A | 6/2014 |
| CN | 104106036 | A | 10/2014 |
| CN | 104166458 | A | 11/2014 |
| CN | 105549947 | A | 5/2016 |
| CN | 105794231 | A | 7/2016 |
| CN | 105940678 | A | 9/2016 |
| CN | 106030700 | A | 10/2016 |
| CN | 106062810 | A | 10/2016 |
| CN | 106383645 | A | 2/2017 |
| DE | 19621593 | A1 | 12/1997 |
| DE | 29824936 | U1 | 7/2003 |
| DE | 102004029203 | A1 | 12/2005 |
| EP | 0459174 | A2 | 12/1991 |
| EP | 0564247 | A1 | 10/1993 |
| EP | 0679005 | A1 | 10/1995 |
| EP | 0684543 | A1 | 11/1995 |
| EP | 0713187 | A2 | 5/1996 |
| EP | 0795811 | A1 | 9/1997 |
| EP | 0844555 | A2 | 5/1998 |
| EP | 0871177 | A2 | 10/1998 |
| EP | 0880091 | A2 | 11/1998 |
| EP | 0881563 | A2 | 12/1998 |
| EP | 0961199 | A1 | 12/1999 |
| EP | 0994409 | A2 | 4/2000 |
| EP | 1058181 | A1 | 12/2000 |
| EP | 1133119 | A2 | 9/2001 |
| EP | 1186987 | A2 | 3/2002 |
| EP | 1469374 | A1 | 10/2004 |
| EP | 1615109 | A2 | 1/2006 |
| EP | 1727032 | A2 | 11/2006 |
| EP | 1942401 | A1 | 7/2008 |
| EP | 2018032 | A1 | 1/2009 |
| EP | 2409214 | A1 | 1/2012 |
| EP | 2420925 | A2 | 2/2012 |
| EP | 2733579 | A2 | 5/2014 |
| EP | 2750062 | A2 | 7/2014 |
| EP | 2770673 | A1 | 8/2014 |
| EP | 3138300 | A1 | 3/2017 |
| GB | 2402105 | A | 12/2004 |
| JP | 8-147138 | A | 6/1996 |
| JP | 8-166783 | A | 6/1996 |
| JP | 9-97154 | A | 4/1997 |
| JP | 9-258947 | A | 10/1997 |
| JP | 10-198517 | A | 7/1998 |
| JP | 10-232757 | A | 9/1998 |
| JP | 11-272391 | A | 10/1999 |
| JP | 2000-101879 | A | 4/2000 |
| JP | 2000-105772 | A | 4/2000 |
| JP | 2000-163193 | A | 6/2000 |
| JP | 2000-231371 | A | 8/2000 |
| JP | 2000-284879 | A | 10/2000 |
| JP | 2001-202176 | A | 7/2001 |
| JP | 2001-306375 | A | 11/2001 |
| JP | 2002-82745 | A | 3/2002 |
| JP | 2002-288690 | A | 10/2002 |
| JP | 2003-43978 | A | 2/2003 |
| JP | 2003-52019 | A | 2/2003 |
| JP | 2003-62975 | A | 3/2003 |
| JP | 2003-264621 | A | 9/2003 |
| JP | 2003-330586 | A | 11/2003 |
| JP | 2003-330613 | A | 11/2003 |
| JP | 2004-38895 | A | 2/2004 |
| JP | 2004-192573 | A | 7/2004 |
| JP | 2004-348601 | A | 12/2004 |
| JP | 2005-44036 | A | 2/2005 |
| JP | 2005-507112 | A | 3/2005 |
| JP | 2005-124224 | A | 5/2005 |
| JP | 2005-190108 | A | 7/2005 |
| JP | 2006-166248 | A | 6/2006 |
| JP | 2006-295753 | A | 10/2006 |
| JP | 2008-26439 | A | 2/2008 |
| JP | 2009-17486 | A | 1/2009 |
| JP | 2013-98613 | A | 5/2013 |
| KR | 2002-0069952 | A | 9/2002 |
| KR | 2003-0030384 | A | 4/2003 |
| KR | 2003-0088374 | A | 11/2003 |
| KR | 10-2004-0015427 | A | 2/2004 |
| KR | 10-2004-0075062 | A | 8/2004 |
| KR | 10-2005-0072071 | A | 7/2005 |
| KR | 10-2007-0101893 | A | 10/2007 |
| KR | 10-2010-0036351 | A | 4/2010 |
| KR | 10-2015-0121177 | A | 10/2015 |
| TW | 201403363 | A | 1/2014 |
| WO | 1993/20640 | A1 | 10/1993 |
| WO | 1994/17469 | A1 | 8/1994 |
| WO | 1999/15982 | A1 | 4/1999 |
| WO | 1999/16181 | A1 | 4/1999 |
| WO | 2000/36496 | A1 | 6/2000 |
| WO | 2000/63766 | A1 | 10/2000 |
| WO | 2001/02949 | A1 | 1/2001 |
| WO | 2001/29702 | A2 | 4/2001 |
| WO | 03/036457 | A2 | 5/2003 |
| WO | 2003/062975 | A1 | 7/2003 |
| WO | 2003/062976 | A1 | 7/2003 |
| WO | 2004/111816 | A2 | 12/2004 |

(56) References Cited

FOREIGN PATENT DOCUMENTS

| | | | |
|---|---|---|---|
| WO | 2005/010725 | A2 | 2/2005 |
| WO | 2005/067511 | A2 | 7/2005 |
| WO | 2006/020304 | A2 | 2/2006 |
| WO | 2006/020305 | A2 | 2/2006 |
| WO | 2008/033853 | A2 | 3/2008 |
| WO | 2008/085742 | A2 | 7/2008 |
| WO | 2009/005563 | A1 | 1/2009 |
| WO | 2009/086599 | A1 | 7/2009 |
| WO | 2009/097592 | A1 | 8/2009 |
| WO | 2010/087988 | A1 | 8/2010 |
| WO | 2010/107661 | A1 | 9/2010 |
| WO | 2012/004288 | A1 | 1/2012 |
| WO | 2012/006494 | A1 | 1/2012 |
| WO | 2012/166352 | A1 | 12/2012 |
| WO | 2013/049346 | A1 | 4/2013 |
| WO | 2013/153405 | A2 | 10/2013 |
| WO | 2013/169846 | A1 | 11/2013 |
| WO | 2013/169875 | A2 | 11/2013 |
| WO | 2014/030320 | A1 | 2/2014 |
| WO | 2014/107469 | A2 | 7/2014 |
| WO | 2014/151089 | A1 | 9/2014 |
| WO | 2015/076930 | A1 | 5/2015 |
| WO | 2015/124831 | A1 | 8/2015 |
| WO | 2015/134692 | A1 | 9/2015 |
| WO | 2016/033400 | A1 | 3/2016 |
| WO | 2016/057117 | A1 | 4/2016 |
| WO | 2017/058442 | A1 | 4/2017 |

OTHER PUBLICATIONS

Corrected Notice of Allowance received for U.S. Appl. No. 15/910,263, dated Mar. 18, 2021, 3 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for U.S. Appl. No. 16/584,490, dated Mar. 26, 2021, 13 pages.
Office Action received for Danish Patent Application No. PA202070560, dated Mar. 10, 2021, 7 pages.
Corrected Notice of Allowance received for U.S. Appl. No. 16/836,571, dated Dec. 6, 2021, 5 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
Notice of Allowance received for Chinese Patent Application No. 202010125114.4, dated Nov. 24, 2021, 2 pages (1 page of English Translation and 1 page of Official Copy).
Notice of Allowance received for Korean Patent Application No. 10-2021-7035472, dated Nov. 23, 2021, 4 pages (2 pages of English Translation and 2 pages of Official Copy).
Summons to Attend Oral Proceedings received for European Patent Application 20158824.1, dated Dec. 7, 2021, 6 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated May 28, 2021, 3 pages.
Decision to Grant received for European Patent Application No. 18197589.7, dated Jun. 10, 2021, 2 pages.
Notice of Allowance received for U.S. Appl. No. 16/263,280, dated Jun. 8, 2021, 8 pages.
Notice of Allowance received for U.S. Appl. No. 16/888,775, dated Jun. 3, 2021, 11 pages.
Applicant-Initiated Interview Summary received for U.S. Appl. No. 16/263,280, dated Apr. 26, 2021, 2 pages.
Board Opinion received for Chinese Patent Application No. 201580046339.8, dated Mar. 19, 2021, 11 pages (3 pages of English Translation and 8 pages of Official Copy).
Notice of Allowance received for U.S. Appl. No. 16/702,968, dated Apr. 21, 2021, 20 pages.
Office Action received for Chinese Patent Application No. 201811539259.8, dated Sep. 3, 2020, 10 pages (6 pages of English Translation and 4 pages of Official Copy).
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Applicant-Initiated Interview Summary received for U.S. Appl. No. 16/922,675, dated Sep. 3, 2021, 2 pages.
Intention to Grant received for European Patent Application No. 19207753.5, dated Sep. 3, 2021, 8 pages.
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Applicant-Initiated Interview Summary received for U.S. Appl. No. 16/702,968, dated Sep. 28, 2020, 6 pages.
Final Office Action received for U.S. Appl. No. 16/803,849, dated Sep. 24, 2020, 29 pages.
Invitation to Pay Search Fees received for European Patent Application No. 18728002.9, dated Sep. 2, 2020, 8 pages.
Office Action received for Chinese Patent Application No. 202010125114.4, dated Aug. 21, 2020, 16 pages (8 pages of English Translation and 8 pages of Official Copy).
Office Action received for Australian Patent Application No. 2019268111, dated Oct. 27, 2020, 7 pages.
Applicant-Initiated Interview Summary received for U.S. Appl. No. 17/031,833, dated May 24, 2021, 6 pages.
Corrected Notice of Allowance received for U.S. Appl. No. 16/702,968, dated May 26, 2021, 4 pages.
Non-Final Office Action received for U.S. Appl. No. 16/803,849, dated May 14, 2021, 34 pages.
Office Action received for Chinese Patent Application No. 201911128105.4, dated Apr. 8, 2021, 10 pages (5 pages of English Translation and 5 pages of Official Copy).
Office Action received for European Patent Application No. 19207753.5, dated May 10, 2021, 4 pages.
Office Action received for European Patent Application No. 20158824.1, dated May 18, 2021, 10 pages.
Notice of Allowance received for U.S. Appl. No. 16/583,989, dated Apr. 1, 2021, 5 pages.
Office Action received for Chinese Patent Application No. 202010125114.4, dated Mar. 1, 2021, 15 pages (9 pages of English Translation and 6 pages of Official Copy).
Supplemental Notice of Allowance received for U.S. Appl. No. 16/584,490, dated Apr. 13, 2021, 2 pages.
Brief Communication Regarding Oral Proceedings received for European Patent Application No. 18197583.0, dated Feb. 18, 2021, 2 pages.
Corrected Notice of Allowance received for U.S. Appl. No. 15/910,263, dated Feb. 10, 2021, 3 pages.
Final Office Action received for U.S. Appl. No. 16/723,583, dated Feb. 5, 2021, 15 pages.
Notice of Allowance received for U.S. Appl. No. 15/910,263, dated Feb. 18, 2021, 3 pages.
Corrected Notice of Allowance received for U.S. Appl. No. 16/807,604, dated Oct. 22, 2021, 3 pages.
Decision to Grant received for Danish Patent Application No. PA202070560, dated Oct. 21, 2021, 2 pages.
Final Office Action received for U.S. Appl. No. 16/803,849, dated Nov. 2, 2021, 37 pages.
Office Action received for European Patent Application No. 18733381.0, dated Oct. 29, 2021, 9 pages.

(56) References Cited

OTHER PUBLICATIONS

Corrected Notice of Allowance received for U.S. Appl. No. 16/836,571, dated Nov. 4, 2021, 4 pages.
Corrected Notice of Allowance received for U.S. Appl. No. 16/807,604, dated Jul. 26, 2021, 3 pages.
Corrected Notice of Allowance received for U.S. Appl. No. 17/031,833, dated Aug. 2, 2021, 3 pages.
Intention to Grant received for European Patent Application No. 18197583.0, dated Jul. 23, 2021, 9 pages.
Notice of Allowance received for U.S. Appl. No. 16/888,775, dated Jul. 26, 2021, 5 pages.
Advisory Action received for U.S. Appl. No. 11/322,547, dated Aug. 22, 2008, 3 pages.
Advisory Action received for U.S. Appl. No. 12/566,673, dated Jun. 12, 2013, 3 pages.
Ahlberg et al., "The Alphaslider: A Compact and Rapid Selector", CHI '94 Proceedings of the SIGCHI Conference on Human Factors in Computing Systems, Apr. 24-28, 1994, pp. 365-371.
Al-Baker, Asri, "AquaCalendar, a Review by i-Symbian.Com", Online available at: http://www.i-symbian.com/forum/articles.php?action=viewarticle&artid=40, 2005, 11 pages.
Aliakseyeu et al., "Multi-flick: An Evaluation of Flick-Based Scrolling Techniques for Pen Interfaces", CHI 2008, Florence, Italy, Apr. 5-10, 2008, 10 pages.
Apitz et al., "CrossY: A Crossing-Based Drawing Application", UIST, vol. 6, No. 2, Santa Fe, New Mexico, Oct. 24-27, 2004, pp. 3-12.
Apple Computer, Inc., "Slider Programming Topics for Cocoa", Apple Computer, Inc., Oct. 3, 2006, 16 pages.
Arar, Yardena, "Microsoft Reveals Office 2003 Prices, Release", PC World, Available online at: http://www.pcworld.com/article/112077/microsoft_reveals_office_2003_prices_release.html, Aug. 19, 2003, 3 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Bederson, Benjamin B., "Fisheye Menus", Human-Computer Interaction Lab, Institute for Advanced Computer Studies, Computer Science Department, University of Maryland, College Park, ACM 2000, CHI Letters vol. 2, No. 2, 2000, pp. 217-225.
Coleman, David W., "Meridian Mail Voice Mail System Integrates Voice Processing and Personal Computing", Speech Technology, vol. 4, No. 2, Mar./Apr. 1988, pp. 84-87.
Communication Prior to Oral Proceedings received for European Patent Application No. 06846397.5, dated Apr. 18, 2018, 16 pages.
Concept Phones, "Apple Tablet", Concept Phones.com, Available online at http://www.concept-phones.com/?s=apple+tablet, Dec. 16, 2009, 21 pages.
Decision of Grant received for European Patent Application No. 07814635.4, dated Nov. 4, 2011, 2 pages.
Decision on Appeal received for U.S. Appl. No. 12/566,673, dated Dec. 18, 2019, 10 pages.
Decision to Grant received for European Patent Application No. 06846397.5, dated Jan. 24, 2019, 2 pages.
Decision to Grant received for European Patent Application No. 09162953.5, dated Aug. 1, 2019, 2 pages.
Decision to Grant received for European Patent Application No. 10176624.4, dated Jun. 22, 2017, 2 pages.
Decision to Grant received for European Patent Application No. 10712824.1, dated May 17, 2018, 3 pages.
ESATO Archive, "A Couple of My Mates, Meet JasJar and K-Jam (Many Pics)", Available online at: http://www.esato.eom/archive/t.php/t-106524, retrieved on Apr. 13, 2006, 90 pages.
European Search Report received for European Patent Application No. 10176624.4, dated Mar. 1, 2013, 7 pages.
Examiner's Answer to Appeal Brief received for U.S. Appl. No. 12/566,673, dated Nov. 17, 2017, 10 pages.
Extended European Search Report received for European Patent Application No. 09162953.5, dated Sep. 2, 2009, 6 pages.
Final Office Action received for U.S. Appl. No. 11/322,547, dated Jun. 9, 2008, 15 pages.
Final Office Action received for U.S. Appl. No. 11/322,547, dated May 28, 2010, 12 pages.
Final Office Action received for U.S. Appl. No. 12/566,638, dated Nov. 21, 2012, 16 pages.
Final Office Action received for U.S. Appl. No. 11/322,551, dated Jun. 15, 2009, 15 pages.
Final Office Action received for U.S. Appl. No. 11/322,551, dated Mar. 12, 2010, 17 pages.
Final Office Action received for U.S. Appl. No. 11/322,553, dated Aug. 5, 2008, 25 pages.
Final Office Action received for U.S. Appl. No. 11/968,064, dated Jan. 5, 2010, 20 pages.
Final Office Action received for U.S. Appl. No. 11/969,786 dated May 9, 2012, 39 pages.
Final Office Action received for U.S. Appl. No. 11/969,786, dated Jun. 15, 2011, 22 pages.
Final Office Action received for U.S. Appl. No. 12/566,669, dated Nov. 23, 2012, 29 pages.
Final Office Action received for U.S. Appl. No. 12/566,671, dated Dec. 20, 2012, 20 pages.
Final Office Action received for U.S. Appl. No. 12/566,673, dated Aug. 12, 2016, 28 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Final Office Action received for U.S. Appl. No. 12/788,279, dated Apr. 9, 2013, 15 pages.
Final Office Action received for U.S. Appl. No. 12/788,279, dated Jul. 10, 2014, 16 pages.
Final Office Action received for U.S. Appl. No. 12/891,705, dated Jun. 27, 2013, 12 pages.
Final Office Action received for U.S. Appl. No. 12/891,705, dated Oct. 23, 2014, 32 pages.
Final Office Action received for U.S. Appl. No. 15/167,532, dated Oct. 31, 2019, 26 pages.
Final Office Action received for U.S. Appl. No. 15/167,532, dated Sep. 19, 2019, 25 pages.
Gears, "Orange SPV C600 Review", Available online at: http://www.coolsmartphone.com/article569.html, retrieved on Apr. 14, 2006, 57 pages.
Gizmodo, "Hand-on Nook Review by Gizmodo: Great all-around ebook reader", e-bookvine ebookMag on Tumblr, Available online at: http://e-bookvine.tumblr.com/post/273014247/hand-on-nook-review-by-gizmodo-great-all-around-ebook, retrieved on Mar. 5, 2015, 3 pages.
Google, "Google Calendar Tour", Available online at: http://www.google.com/intl/en/googlecalendar/tour.html, retrieved on Jun. 3, 2008, 10 pages.
Google, "Google Calendar", Available online at: http://en.wikipedia.org/w/index.php?title=Google_Calendar&printable=yes, retrieved on May 3, 2015, 6 pages.
Gsmarena Team, "Sony Ericsson P990 Review: A Coveted Smartphone", Available online at: http://web.archive.org/web/20061227185520/http://www.gsmarena.com/sony_ericsson_P990-review-101p8.php, Aug. 4, 2006, 3 pages.
Haller, B.,"Circular Slider 1.3: A reusable Cocoa control", Stick Software, Available online at: http://www.sticksoftware.com/software/CircularSiider.html., Apr. 2002, 3 pages.
Haller, B., "SSCircularSlider", Stick Software, Available online at: http://www.sticksoftware.com/software/CircularSlider/doc.html, Aug. 29, 2002, 11 pages.
Handbook for Palm™ m500 Series Handhelds, User Manual, Available at: http://www.palm.com:80/us/support/handbooks/tungstent/tungstent_ug .pdf, 2002, 286 pages.
Handbook for Palm™ Tungsten™ T Handhelds, 2002, 290 pages.
Hinckley et al., "Quantitative Analysis of Scrolling Techniques", CHI 2002 Conf. on Human Factors in Computing Systems, CHI Letters, vol. 4, No. 1, 2002, pp. 65-72.

(56) References Cited

OTHER PUBLICATIONS

Hurst et al., "An Elastic Audio Slider for Interactive Speech Skimming", NordiCHI '04 Proceedings ofthe third Nordic conference on Human-computer interaction, Oct. 26-27, 2004, 4 pages.
Hurst et al., "Audio-Visual Data Skimming for E-Learning Applications", HCL 2005 Proceedings, vol. 2, Jul. 22-27, 2005, 4 pages.
Hurst et al., "Forward and Backward Speech Skimming with the Elastic Audio Slider", HCL 2005 Proceedings, Jul. 22-27, 2005, 16 pages.
Hurst et al., "Interactive Manipulation of Replay Speed While Listening to Speech Recordings", Multimedia '04 Proceedings of the 12th annual ACM International Conference on Multimedia, New York, Oct. 10-16, 2004, 4 pages.
ICal, Wikipedia, the Free Encyclopedia, Online available at: https://web.archive.org/web/20080224154325/http://en.wikipedia.org/wiki/ICal, Feb. 24, 2008, 3 pages.
ICalendar, Wikipedia, the Free Encyclopedia, Available online at http://en.wikipedia.org/wiki/ICalendar, retrieved on Feb. 4, 2008, 7 pages.
Intention to Grant received for European Patent Application No. 06846397.5, dated Sep. 5, 2018, 7 pages.
Intention to Grant received for European Patent Application No. 09162953.5, dated Mar. 19, 2019, 7 pages.
Intention to Grant received for European Patent Application No. 10176624.4, dated Feb. 9, 2017, 9 pages.
Intention to Grant received for European Patent Application No. 10712824.1, dated Jan. 5, 2018, 9 pages.
International Preliminary Report on Patentability received for PCT Patent Application No. PCT/US2006/061333, dated Jun. 24, 2008, 10 pages.
International Preliminary Report on Patentability received for PCT Patent Application No. PCT/US2006/061337, dated Jun. 11, 2008, 6 pages.
International Preliminary Report on Patentability received for PCT Patent Application No. PCT/US2006/061627, dated May 15, 2012, 6 pages.
International Preliminary Report on Patentability received for PCT Patent Application No. PCT/US2007/077443, dated Mar. 10, 2009, 6 pages.
International Preliminary Report on Patentability received for PCT Patent Application No. PCT/US2008/050083, dated Jul. 7, 2009, 7 pages.
International Preliminary Report on Patentability received for PCT Patent Application No. PCT/US2008/050423, dated Jul. 7, 2009, 11 pages.
International Preliminary Report on Patentability received for PCT Patent Application No. PCT/US2008/086538, dated Jul. 6, 2010, 12 pages.
International Preliminary Report on Patentability received for PCT Patent Application No. PCT/US2010/027088, dated Sep. 29, 2011, 7 pages.
International Preliminary Report on Patentability received for PCT Patent Application No. PCT/US2010/048443, dated Mar. 27, 2012, 5 pages.
International Preliminary Report on Patentability received for PCT Patent Application No. PCT/US2010/062319, dated Jul. 19, 2012, 11 pages.
International Search Report and Written Opinion received for PCT Patent Application No. PCT/US2006/061333, dated Nov. 22, 2007, 12 pages.
International Search Report and Written Opinion received for PCT Patent Application No. PCT/US2006/061337, dated Feb. 15, 2008, 7 pages.
International Search Report and Written Opinion received for PCT Patent Application No. PCT/US2006/061627, dated Apr. 26, 2007, 8 pages.
International Search Report and Written Opinion received for PCT Patent Application No. PCT/US2007/077443, dated Feb. 21, 2008, 8 pages.
International Search Report and Written Opinion received for PCT Patent Application No. PCT/US2008/050083, dated Jul. 4, 2008, 9 pages.
International Search Report and Written Opinion received for PCT Patent Application No. PCT/US2008/050423, dated Sep. 1, 2008, 15 pages.
International Search Report and Written Opinion received for PCT Patent Application No. PCT/US2008/086538, dated Jun. 2, 2009, 14 pages.
International Search Report and Written Opinion received for PCT Patent Application No. PCT/US2010/027088, dated Jun. 18, 2010, 8 pages.
International Search Report and Written Opinion received for PCT Patent Application No. PCT/US2010/048443, dated Nov. 15, 2010, 5 pages.
International Search Report and Written Opinion received for PCT Patent Application No. PCT/US2010/062319, dated May 11, 2011, 12 pages.
Invitation to Pay Additional Fees received for PCT Patent Application No. PCT/US2008/050423, dated Jun. 23, 2008, 11 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, 17 pages.
Kazez Ben, "iCal Events", available at <http://www.benkazez.com/icalevents.php>, retrieved on Mar. 17, 2008, 2 pages.
Masui et al., "Elastic Graphical Interfaces for Precise Data Manipulation", ACM Conference on Human Factors in Computing Systems (CHI '95), Conference Companion, Apr. 1995, pp. 143-144.
Microsoft Corporation, "Microsoft Office Word 2003 (SP2)", Microsoft Corporation, SP3 as of 2005, pages MSWord2003 Figures 1-5, 1983-2003, 5 pages.
Microsoft Outlook 2003 Basic Guide, Available online at: http://it.med.miami.edu/documents/outlook_2003_guide.pdf, Aug. 15, 2005, 32 pages.
Microsoft Word 2000, Microsoft Corporation, 2000, 5 pages.
Microsoft, "Microsoft Outlook Calendar", Available online at: http://emedia.leeward.hawaii.edu/teachtech/documents/Personal_Manage/MSOutlook_Cal.pdf, May 3, 2012, 9 pages.
Miller, Dana, "PersonalJava Application Environment", Online available at: http://java.sun.com/products/personaljava/touchable/, Jun. 8, 1999, 12 pages.
Minutes of Oral Proceedings received for European Patent Application No. 06846397.5, dated Aug. 31, 2018, 12 pages.
Myers Brada, "Shortcutter for Palm", The Pittsburgh Pebbles PDA Project, Online available at http://www.cs.cmu.edu/~pebbles/v5/shortcutter/palm/index.html, 10 pages.
Nextwindow, "NextWindow's Multi-Touch Overview", v1.2, 2007, pp. 1-7.
Non-Final Office Action received for U.S. Appl. No. 12/788,279, dated Feb. 12, 2014, 16 pages.
Non-Final Office Action received for U.S. Appl. No. 11/322,547, dated Aug. 6, 2009, 10 pages.
Non-Final Office Action received for U.S. Appl. No. 11/322,547, dated Feb. 5, 2009, 11 pages.
Non-Final Office Action received for U.S. Appl. No. 11/322,547, dated Oct. 30, 2007, 16 pages.
Non-Final Office Action received for U.S. Appl. No. 11/322,551, dated Dec. 18, 2008, 15 pages.
Non-Final Office Action received for U.S. Appl. No. 11/322,551, dated Sep. 22, 2009, 17 pages.
Non-Final Office Action received for U.S. Appl. No. 11/322,553, dated Apr. 5, 2010, 18 pages.
Non-Final Office Action received for U.S. Appl. No. 11/322,553, dated Dec. 26, 2008, 26 pages.
Non-Final Office Action received for U.S. Appl. No. 11/322,553, dated Feb. 5, 2008, 11 pages.
Non-Final Office Action received for U.S. Appl. No. 11/322,553, dated Jun. 15, 2007, 16 pages.
Non-Final Office Action received for U.S. Appl. No. 11/322,553, dated Jun. 17, 2009, 27 pages.

(56) References Cited

OTHER PUBLICATIONS

Non-Final Office Action received for U.S. Appl. No. 11/770,720, dated Jan. 4, 2011, 11 pages.
Non-Final Office Action received for U.S. Appl. No. 11/968,064, dated May 15, 2009, 17 pages.
Non-Final Office Action received for U.S. Appl. No. 11/969,786, dated Dec. 8, 2011, 21 pages.
Non-Final Office Action received for U.S. Appl. No. 11/969,786, dated Feb. 11, 2011, 27 pages.
Non-Final Office Action received for U.S. Appl. No. 12/240,974, dated Oct. 5, 2011, 36 pages.
Non-Final Office Action received for U.S. Appl. No. 12/566,638, dated Oct. 2, 2013, 21 pages.
Non-Final Office Action received for U.S. Appl. No. 12/566,638, dated May 7, 2012, 15 pages.
Non-Final Office Action received for U.S. Appl. No. 12/566,638, dated Sep. 23, 2011, 16 pages.
Non-Final Office Action received for U.S. Appl. No. 12/566,669, dated Apr. 17, 2014, 27 pages.
Non-Final Office Action received for U.S. Appl. No. 12/566,669, dated Jun. 19, 2012, 30 pages.
Non-Final Office Action received for U.S. Appl. No. 12/566,671, dated May 23, 2012, 21 pages.
Non-Final Office Action received for U.S. Appl. No. 12/566,672, dated Nov. 8, 2012, 11 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.
Non-Final Office Action received for U.S. Appl. No. 12/566,673, dated Sep. 13, 2013, 18 pages.
Non-Final Office Action received for U.S. Appl. No. 12/567,717, dated Oct. 22, 2012, 11 pages.
Non-Final Office Action received for U.S. Appl. No. 12/788,279, dated Sep. 27, 2012, 19 pages.
Non-Final Office Action received for U.S. Appl. No. 12/891,705, dated Jun. 4, 2015, 33 pages.
Non-Final Office Action received for U.S. Appl. No. 12/891,705, dated Mar. 13, 2013, 11 pages.
Non-Final Office Action received for U.S. Appl. No. 12/891,705, dated Mar. 31, 2014, 23 pages.
Non-Final Office Action received for U.S. Appl. No. 14/483,721, dated Apr. 18, 2016, 20 pages.
Non-Final Office Action received for U.S. Appl. No. 15/167,532, dated Mar. 7, 2019, 18 pages.
Non-Final Office Action received for U.S. Appl. No. 14/149,727, dated Jan. 22, 2016, 8 pages.
Non-Final Office Action received for U.S. Appl. No. 12/566,673, dated Dec. 16, 2015, 23 pages.
Northern Telecom, "Meridian Mail PC User Guide", 1988, 17 pages.
Notice of Acceptance received for Australian Patent Application No. 2006321681, dated Sep. 14, 2010, 1 page.
Notice of Allowance received for Australian Patent Application No. 2015201237, dated Mar. 2, 2017, 3 pages.
Notice of Allowance received for Japanese Patent Application No. 2014-148065, dated Jan. 12, 2016, 6 pages.
Notice of Allowance received for Japanese Patent Application No. 2016-017400, dated Dec. 16, 2016, 3 pages.
Notice of Allowance received for Korean Patent Application No. 10-2012-7020511, dated Dec. 23, 2015, 3 pages.
Notice of allowance received for Korean Patent Application No. 10-2013-7028489, dated Jan. 25, 2016, 5 pages.
Notice of Allowance received for Korean Patent Application No. 10-2016-7025395, dated Oct. 26, 2016, 5 pages.
Notice of Allowance received for U.S. Appl. No. 11/322,547, dated Aug. 6, 2010, 11 pages.
Notice of Allowance received for U.S. Appl. No. 11/322,551, dated Jul. 21, 2010, 7 pages.
Notice of Allowance received for U.S. Appl. No. 11/770,720, dated May 20, 2011, 8 pages.
Notice of Allowance received for U.S. Appl. No. 12/240,974, dated Dec. 11, 2012, 2 pages.
Notice of Allowance received for U.S. Appl. No. 12/240,974, dated May 3, 2012, 12 pages.
Notice of Allowance received for U.S. Appl. No. 12/240,974, dated Oct. 19, 2012, 12 pages.
Notice of Allowance received for U.S. Appl. No. 12/566,638, dated May 7, 2014, 8 pages.
Notice of Allowance received for U.S. Appl. No. 12/566,669, dated Nov. 6, 2014, 12 pages.
Notice of Allowance received for U.S. Appl. No. 12/566,671, dated Apr. 12, 2013, 11 pages.
Notice of Allowance received for U.S. Appl. No. 12/566,671, dated Dec. 18, 2013, 11 pages.
Notice of Allowance received for U.S. Appl. No. 12/566,672, dated Jun. 24, 2013, 8 pages.
Notice of Allowance received for U.S. Appl. No. 12/566,672, dated Mar. 1, 2013, 7 pages.
Notice of Allowance received for U.S. Appl. No. 12/566,673, dated Feb. 26, 2020, 7 pages.
Notice of Allowance received for U.S. Appl. No. 12/567,717, dated Aug. 28, 2013, 10 pages.
Notice of Allowance received for U.S. Appl. No. 12/567,717, dated May 2, 2013, 17 pages.
Notice of Allowance received for U.S. Appl. No. 12/891,705, dated Feb. 3, 2016, 6 pages.
Notice of Allowance received for U.S. Appl. No. 14/149,727, dated Apr. 29, 2016, 7 pages.
Notice of Allowance received for U.S. Appl. No. 14/149,727, dated Aug. 4, 2016, 4 pages.
Office Action received European Patent Application No. 06846477.5, dated Apr. 21, 2009, 6 pages.
Office Action received for Australian patent application No. 2006321681, dated Dec. 23, 2009, 2 pages.
Office Action received for Australian patent application No. 2006321681, dated Sep. 1, 2009, 2 pages.
Office Action Received for Australian Patent Application No. 2007292473, dated Feb. 17, 2010, 1 page.
Office Action received for Australian Patent Application No. 2010339638, dated Jun. 14, 2013, 4 pages.
Office Action received for Australian Patent Application No. 2010339638, dated Jun. 26, 2014, 4 pages.
Office Action received for Australian Patent Application No. 2015201237, dated Mar. 4, 2016, 3 pages.
Office Action received for Canadian Patent Application No. 2,661,856, dated Feb. 6, 2013, 2 pages.
Office Action Received for Canadian Patent Application No. 2,661,856, dated Feb. 6, 2012, 2 pages.
Office Action received for Chinese Application No. 200680052778.0, dated Aug. 11, 2010, 9 pages.
Office Action Received for Chinese Patent Application No. 200680052109.3, dated Jan. 10, 2012, 17 pages.
Office Action received for Chinese Patent Application No. 200680052109.3, dated Jan. 8, 2010, 6 pages.
Office Action Received for Chinese Patent Application No. 200680052109.3, dated May 5, 2011, 9 pages.
Office Action Received for Chinese Patent Application No. 200680052109.3, dated Nov. 9, 2010, 8 pages.
Office Action received for Chinese Patent Application No. 200680052778.0, dated Jan. 8, 2010, 19 pages.
Office Action Received for Chinese Patent Application No. 200780040362.1, dated Jul. 21, 2011, 19 pages.
Office Action Received for Chinese Patent Application No. 200780040362.1, dated Oct. 25, 2010, 18 pages.
Office Action Received for Chinese Patent Application No. 201010292415.2, dated Apr. 23, 2012, 9 pages.
Office Action Received for Chinese Patent Application No. 201010292415.2, dated Mar. 4, 2013, 12 pages.
Office Action Received for Chinese Patent Application No. 201010292415.2, dated Oct. 31, 2013, 8 pages.

(56) References Cited

OTHER PUBLICATIONS

Office Action Received for Chinese Patent Application No. 201010516160.3, dated May 6, 2011, 10 pages.
Office Action received for Chinese Patent Application No. 201080063737.8, dated Apr. 18, 2014, 16 pages.
Office Action received for Chinese Patent Application No. 201080063737.8, dated Dec. 11, 2014, 9 pages.
Office Action received for Chinese Patent Application No. 201080063737.8, dated Jul. 23, 2015, 9 pages.
Office Action received for Chinese Patent Application No. 201080063737.8, dated Mar. 29, 2016, 11 pages.
Office Action received for Chinese Patent Application No. 201080063737.8, dated Oct. 20, 2016, 8 pages.
Office Action Received for European Patent Application No. 06846397.5, dated Aug. 15, 2013, 6 pages.
Office Action received for European Patent Application No. 06846397.5, dated Jan. 28, 2009, 5 pages.
Office Action received for European Patent Application No. 06846397.5, dated Jun. 20, 2016, 7 pages.
Office Action Received for European Patent Application No. 06846397.5, dated Oct. 27, 2015, 6 pages.
Office Action Received for European Patent Application No. 07814635.4, dated Feb. 24, 2010, 4 pages.
Office Action received for European Patent Application No. 07814635.4, dated Jun. 30, 2009, 3 pages.
Office Action Received for European Patent Application No. 09162953.5, dated Aug. 15, 2013, 5 pages.
Office Action received for European Patent Application No. 09162953.5, dated Jan. 27, 2010, 6 pages.
Office Action received for European Patent Application No. 09162953.5, dated Jun. 20, 2016, 7 pages.
Office Action Received for European Patent Application No. 09162953.5, dated Oct. 27, 2015, 6 pages.
Office Action Received for European Patent Application No. 10176624.4, dated Apr. 23, 2015, 6 pages.
Office Action received for European Patent Application No. 10712824.1, dated Jun. 23, 2014, 7 pages.
Office Action received for European Patent Application No. 10799261.2 dated Feb. 13, 2014, 10 pages.
Office Action received for European Patent Application No. 10799261.2 dated Mar. 27, 2017, 31 pages.
Office Action received for European Patent Application No. 10712824.1, dated Mar. 1, 2016, 11 pages.
Office Action Received for German Patent Application No. 112006003309.3, dated Apr. 6, 2011, 5 pages.
Office Action received for German Patent Application No. 112006003309.3, dated Sep. 8, 2009, 8 pages.
Office Action received for German Patent Application No. 112006003505.3, dated Oct. 14, 2009, 9 pages.
Office Action Received for German Patent Application No. 112006004220.3, dated Apr. 6, 2011, 5 pages.
Office Action Received for German Patent Application No. 112007002090.3, dated Jun. 7, 2010, 8 pages.
Office Action Received for Japanese Patent Application No. 2009-527504, dated Feb. 12, 2013, 3 pages.
Office Action Received for Japanese Patent Application No. 2009-527504, dated Jun. 6, 2011, 4 pages.
Office Action Received for Japanese Patent Application No. 2012-500842, dated Jun. 18, 2013, 5 pages.
Office Action received for Japanese Patent Application No. 2014-148065, dated Sep. 7, 2015, 5 pages.
Office Action received for Korean Application No. 10-2008-7016570, dated May 31, 2010, 5 pages.
Office Action received for Korean Patent Application No. 10-2008-7017977, dated May 31, 2010, 7 pages.
Office Action Received for Korean Patent Application No. 10-2009-7007062, dated Feb. 15, 2011, 3 pages.
Office Action Received for Korean Patent Application No. 10-2009-7011991, dated Jan. 5, 2011, Jan. 5, 2011, 6 pages.
Office Action Received for Korean Patent Application No. 10-2011-7024312, dated Apr. 26, 2013, 4 pages.
Office Action received for Korean Patent Application No. 10-2012-7020511, dated Feb. 25, 2015, 4 pages.
Office Action received for Korean Patent Application No. 10-2012-7020511, dated Jul. 28, 2014, 7 pages.
Office Action Received for Korean Patent Application No. 10-2012-7020511, dated Oct. 8, 2013, 4 pages.
Office Action received for Korean Patent Application No. 10-2013-7028487, dated Feb. 18, 2016, 8 pages.
Office Action Received for Korean Patent Application No. 10-2013-7028487, dated Jun. 5, 2015, 9 pages.
Office Action received for Korean Patent Application No. 10-2013-7028487, dated Jun. 13, 2016, 6 pages.
Office Action received for Korean Patent Application No. 10-2013-7028489, dated Jun. 4, 2015, 4 pages.
Potala Software, "My Time!", Available online at: http://web.archive.org/web/20060615204517/potalasoftware.com/Products/MyTime/Default.aspx, Jun. 15, 2006, 2 pages.
Potala Software, "Potala Telly", Available online at: http://web.archive.org/web/20051019000340/www.potalasoftware.com/telly.asgx, Oct. 19, 2005, pp. 1-6.
Ramos et al., "Zliding: Fluid Zooming and Sliding for High Precision Parameter Manipulation", Proceedings of the 18th annual ACM Symposium on User Interface Software and Technology, Oct. 23-27, 2005, pp. 143-152.
Rekimoto Jun, "SmartSkin: An Infrastructure for Freehand Manipulation on Interactive Surfaces", Proceedings of the SIGCHI conference on Human Factors in Computing Systems, CHI 2002, vol. 4, No. 1, Apr. 20-25, 2002, pp. 113-120.
Roth et al., "Bezel Swipe: Conflict-Free Scrolling and Multiple Selection on Mobile Touch Screen Devices", Proceedings of the 27th International conference on Human Factors in Computing Systems, Boston, MA, CHI 2009, Apr. 4-9, 2009, pp. 1523-1526.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Proceedings of the SID, vol. 26, No. 1, 1985, 4 pages.
Schmandt et al., "Phone Slave: A Graphical Telecommunications Interface", Society for Information Display, International Symposium Digest of Technical Papers, San Francisco, Jun. 1984, 4 pages.
Shizuki et al., "Laser Pointer Interaction Techniques using Peripheral Areas of Screens", AVI'06, May 23-26, 2006, 4 pages.
Smith, Russ, "Sygic. Mobile Contacts v1.0", Available online at: http://www.pocketnow.com/index.php?a=portaldetail&id=467, Sep. 2, 2004, 13 pages.
Summons to Attend Oral Proceedings received for European Patent Application No. 10176624.4, dated Jun. 2, 2016, 5 pages.
Summons to Attend Oral proceedings received for European Patent Application No. 06846397.5, dated Oct. 25, 2017, 14 pages.
Summons to Attend Oral Proceedings received for European Patent Application No. 07814635.4, dated Nov. 24, 2010, 1 page.
Summons to Attend Oral Proceedings received for European Patent Application No. 10799261.2, dated Jul. 12, 2016, 12 pages.
Tidwell, Jenifer, "Animated Transition", Designing Interfaces, Patterns for effective Interaction Design, First Edition, Nov. 2005, 4 pages.
Wikipedia, "Aqua (user interface)", Wikipedia, the free encyclopedia, Available Online at: http://en.wikipedia.org/wiki/Aqua_(user_interface), Nov. 18, 2009, 8 pages.
Advisory Action received for U.S. Appl. No. 10/308,315, dated Jul. 10, 2006, 3 pages.
Advisory Action received for U.S. Appl. No. 12/395,537, dated Apr. 26, 2012, 4 pages.
Advisory Action received for U.S. Appl. No. 15/730,610, dated Oct. 24, 2019, 5 pages.
Appeal Brief received for U.S. Appl. No. 11/522,167 dated Nov. 23, 2010, 65 pages.
Apple, "Iphone User Guide", iPhone first generation, Available at: http://pocketpccentral.net/iphone/products/1 g_iphone.htm, Jun. 29, 2007, 124 pages.

(56) References Cited

OTHER PUBLICATIONS

Applicant Initiated Interview Summary received for U.S. Appl. No. 16/702,968, dated Jul. 1, 2020, 5 pages.
Applicant-Initiated Interview Summary received for U.S. Appl. No. 16/807,604, dated Jul. 24, 2020, 5 pages.
Bove, Tony, "iPod & iTunes For Dummies", Wiley Publishing, Inc., 6th Edition, 2008, pp. 143-182.
Butler, Travis, "Portable MP3: The Nomad Jukebox", Available at http://tidbits.com/article/6261, Jan. 8, 2001, 4 pages.
Call Me "Samsung R3 højttaler giver dig en lækker 360 graders lydoplevelse—med WiFi og Bluetooth | Call me", 0:24 / 3:22, Available Online at: https://www.youtube.com/watch?v=4Uv_sOhrlro, Sep. 22, 2016, 3 pages.
Corrected Notice of Allowance received for U.S. Appl. No. 14/830,629, dated Feb. 13, 2019, 3 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for European Patent Application No. 12181537.7, dated Mar. 3, 2016, 2 pages.
Decision to Grant received for Japanese Patent Application No. 2014-017726, dated Dec. 7, 2015, 6 pages (3 pages of English Translation and 3 pages of Official Copy).
Decision to Refuse received for European Patent Application No. 07842262.3, dated Dec. 21, 2018, 8 pages.
Decision to Refuse received for European Patent Application No. 10177096.4, dated Feb. 13, 2019, 4 pages.
Detroitborg, "Apple Music: Walkthrough", YouTube Video, online available at: https://www.youtube.com/watch?v=NLgjodiAtbQ, Jun. 30, 2015, 1 page.
"Digital Video Editor", IBM Technical Disclosure Bulletin, vol. 35, No. 2, Jul. 1, 1992, 6 pages.
Enright, Andrew Coulter, "Dissatisfaction Sows Innovation", Available at <http://web.archive.org/web/20051225123312/http://thetreehouseandthecave.blogspot.com/2004/12/dissatisfaction-sows-innovation.html>, Dec. 29, 2004, 6 pages.
Enright, Andrew Coulter, "Meet Cover Flow", Available online at <http://web.archive.org/web/20060111073239/thetreehouseandthecave.blogspot.com/2005/08/meet-coverflow.html>, Aug. 13, 2005, 2 pages.
Enright, Andrew Coulter, "Visual Browsing on an iBook DS", Available online at <http://web.archive.org/web/20060111175609/thetreehouseandthecave.blogspot.com/2004/12/visual-browsing-on-i book-ds.html>, Dec. 29, 2004, 2 pages.
Examiner's Answer to Appeal Brief received for U.S. Appl. No. 11/522,167 dated Feb. 15, 2011, 13 pages.
Extended European Search Report (includes Partial European Search Report and European Search Opinion) received for European Patent Application No. 12181537.7, dated Mar. 27, 2014, 7 pages.
Extended European Search Report (includes Partial European Search Report and European Search Opinion) received for European Patent Application No. 13184872.3, dated Dec. 5, 2013, 9 pages.
Extended European Search Report for European Application No. 10177099.8, dated Oct. 18, 2010, 7 pages.
Extended European Search Report received for European Patent Application No. 10177096.4, dated Oct. 18, 2010, 9 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 19207753.5, dated Dec. 18, 2019, 9 pages.
Final Office Action received for U.S. Appl. No. 09/293,507, dated Apr. 24, 2002, 12 pages.
Final Office Action received for U.S. Appl. No. 09/293,507, dated Feb. 14, 2001, 10 pages.
Final Office Action received for U.S. Appl. No. 10/308,315, dated Apr. 6, 2005, 10 pages.
Final Office Action received for U.S. Appl. No. 10/308,315, dated Mar. 9, 2006, 10 pages.
Final Office Action received for U.S. Appl. No. 10/308,315, dated Mar. 23, 2007, 12 pages.
Final Office Action received for U.S. Appl. No. 11/459,591, dated Jan. 13, 2009, 11 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/767,409, dated Jul. 17, 2012, 24 pages.
Final Office Action received for U.S. Appl. No. 11/767,409, dated Mar. 16, 2011, 16 pages.
Final Office Action received for U.S. Appl. No. 11/983,059, dated Jun. 6, 2011, 11 pages.
Final Office Action received for U.S. Appl. No. 12/215,651, dated Jul. 6, 2012, 27 pages.
Final Office Action received for U.S. Appl. No. 12/395,537, dated Feb. 3, 2012, 15 pages.
Final Office Action received for U.S. Appl. No. 12/395,537, dated Jun. 29, 2015, 17 pages.
Final Office Action received for U.S. Appl. No. 12/395,537, dated Nov. 14, 2013, 2013, 22 pages.
Final Office Action received for U.S. Appl. No. 12/395,541, dated Dec. 28, 2011, 16 pages.
Final Office Action received for U.S. Appl. No. 13/333,890, dated Feb. 13, 2014, 19 pages.
Final Office Action received for U.S. Appl. No. 13/333,890, dated Oct. 2, 2015, 21 pages.
Final Office Action received for U.S. Appl. No. 13/333,900, dated Dec. 19, 2014, 15 pages.
Final Office Action received for U.S. Appl. No. 13/333,900, dated Nov. 7, 2013, 14 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 14/045,544, dated May 6, 2016, 26 pages.
Final Office Action received for U.S. Appl. No. 14/830,629, dated Apr. 16, 2018, 27 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Non-Final Office Action received in U.S. Appl. No. 12/547,401, dated Feb. 11, 2013, 13 pages.
Final Office Action received in U.S. Appl. No. 12/547,401, dated Jun. 28, 2010, 19 pages.
Google "Google Home Help, Listen to music", Datasheet [online], Available Online at: https://web.archive.org/web/20170326051235/https:/support.google.com/googlehome/answer/7030379?hl=en&ref_topic=7030084, Mar. 26, 2017, 3 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 pages.

(56) References Cited

OTHER PUBLICATIONS

Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant Received for European Patent Application No. 12181537.7, dated Sep. 22, 2015, 7 pages.
Intention to Grant received for European Patent Application No. 13184872.3, dated Feb. 11, 2019, 7 pages.
International Preliminary Report on Patentability received for PCT Patent Application No. PCT/US00/010441, dated Feb. 14, 2001, 3 pages.
International Preliminary Report on Patentability received for PCT Patent Application No. PCT/US2006/062714, dated Jul. 8, 2008, 6 pages.
International Preliminary Report on Patentability received for PCT Patent Application No. PCT/US2007/078180, dated Mar. 17, 2009, 6 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Search Report and Written Opinion received for PCT Patent Application No. PCT/USOO/10441, dated Jul. 11, 2000, 2 pages.
International Search Report and Written Opinion received for PCT Patent Application No. PCT/US2007/078180, dated Mar. 3, 2008, 8 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
Invitation to Pay Additional Fees received for PCT Patent Application No. PCT/US2018/032904, dated Jul. 31, 2018, 18 pages.
Invitation to Pay Additional Fees received for PCT Patent Application No. PCT/US2018/032158, dated Sep. 10, 2018, 16 pages.
Jarvie, "Alexa plays me music", Available online at: https://www.youtube.com/watch?v=bR2ZC8Sy8YQ, Feb. 23, 2015, 1 page.
Kim et al., "An Energy Efficient Transmission Scheme for Real-Time Data in Wireless Sensor Networks", Sensors, vol. 15, May 20, 2015, 25 pages.
Minutes of the Oral Proceedings received for European Patent Application No. 00923491.5, dated May 11, 2011, 69 pages.
Non-Final Office Action received for U.S. Appl. No. 12/395,537, dated Dec. 14, 2015, 18 pages.
Non-Final Office Action received for U.S. Appl. No. 09/293,507, dated Aug. 1, 2001, 13 pages.
Non-Final Office Action received for U.S. Appl. No. 09/293,507, dated Jun. 22, 2000, 11 pages.
Non-Final Office Action received for U.S. Appl. No. 09/293,508, dated Jun. 30, 2000, 10 pages.
Non-Final Office Action received for U.S. Appl. No. 10/308,315, dated Aug. 8, 2005, 12 pages.
Non-Final Office Action received for U.S. Appl. No. 10/374,013, dated Feb. 1, 2007, 8 pages.
Non-Final Office Action received for U.S. Appl. No. 11/459,591, dated Jul. 29, 2008, 15 pages.
Non-Final Office Action received for U.S. Appl. No. 11/521,740, dated Dec. 27, 2007, 8 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/767,409, dated Aug. 29, 2011, 18 pages.
Non-Final Office Action received for U.S. Appl. No. 11/767,409, dated Feb. 9, 2012, 20 pages.
Non-Final Office Action received for U.S. Appl. No. 11/767,409, dated Nov. 23, 2010, 12 pages.
Non-Final Office Action received for U.S. Appl. No. 11/983,059, dated Dec. 30, 2010, 11 pages.
Non-Final Office Action received for U.S. Appl. No. 12/215,651, dated Aug. 15, 2013, 2013, 27 pages.
Non-Final Office Action received for U.S. Appl. No. 12/215,651, dated Feb. 2, 2012, 18 pages.
Non-Final Office Action received for U.S. Appl. No. 12/395,537, dated Aug. 15, 2011, 17 pages.
Non-Final Office Action received for U.S. Appl. No. 12/395,537, dated Jan. 5, 2015, 20 pages.
Non-Final Office Action received for U.S. Appl. No. 12/395,537, dated Jul. 8, 2013, 22 pages.
Non-Final Office Action received for U.S. Appl. No. 12/395,541, dated Jul. 26, 2011, 15 pages.
Non-Final Office Action received for U.S. Appl. No. 12/395,541, dated Mar. 14, 2013, 23 pages.
Non-Final Office Action received for U.S. Appl. No. 13/333,890, dated Aug. 30, 2013, 20 pages.
Non-Final Office Action received for U.S. Appl. No. 13/333,890, dated Jun. 5, 2015, 20 pages.
Non-Final Office Action received for U.S. Appl. No. 13/333,890, dated May 1, 2013, 26 pages.
Non-Final Office Action received for U.S. Appl. No. 13/333,900, dated Mar. 19, 2013, 17 pages.
Non-Final Office Action received for U.S. Appl. No. 13/333,900, dated May 23, 2014, 19 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 pages.
Non-Final Office Action received for U.S. Appl. No. 14/045,544, dated Oct. 6, 2015, 20 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 15/274,963, dated Mar. 13, 2018, 23 pages.
Non-Final Office Action received for U.S. Appl. No. 15/730,610, dated Apr. 15, 2020, 36 pages.
Non-Final Office Action received for U.S. Appl. No. 15/730,610, dated Feb. 1, 2019, 22 pages.
Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.

(56) References Cited

OTHER PUBLICATIONS

Non-Final Office Action received for U.S. Appl. No. 16/702,968, dated Apr. 8, 2020, 20 pages.
Non-Final Office Action received for U.S. Appl. No. 16/803,849, dated Jul. 13, 2020, 23 pages.
Non-Final Office Action received for U.S. Appl. No. 16/807,604, dated Jun. 2, 2020, 28 pages.
Non-Final Office Action received for U.S. Appl. No. 10/308,315, dated Jul. 28, 2004, 10 pages.
Non-Final Office Action received in U.S. Appl. No. 12/547,401, dated Jan. 8, 2010, 12 pages.
Notice of Acceptance received for Australian Patent Application No. 2018223051, dated Oct. 30, 2018, 3 pages.
Notice of Acceptance received for Australian Patent Application No. 2018236872, dated Jul. 9, 2019, 3 pages.
Notice of Allowance and Search Report received for Taiwanese Patent Application No. 104128687, dated Jun. 7, 2016, 4 pages (1 page of English Translation and 3 pages of Official copy).
Notice of Allowance Received for Canadian Patent Application No. 2,661,200, dated Aug. 20, 2014, 1 page.
Notice of Allowance received for Canadian Patent Application No. 2,882,403, dated Oct. 31, 2018, 1 page.
Notice of Allowance received for Chinese Patent Application No. 201210308569.5, dated May 31, 2016, 4 pages (2 pages of English Translation and 2 pages of Official Copy).
Notice of Allowance received for Chinese Patent Application No. 201410449822.8, dated Mar. 5, 2019, 2 pages (1 page of English Translation and 1 page of Official Copy.
Notice of Allowance received for Chinese Patent Application No. 201880001436.9, dated May 8, 2020, 3 pages (2 pages of English Translation and 1 page of Official Copy).
Notice of Allowance received for Danish Patent Application No. PA201770408, dated Feb. 8, 2019, 2 pages.
Notice of Allowance received for Japanese Patent Application No. 2016-001259, dated Jul. 27, 2018, 4 pages (1 page of English Translation and 3 pages of Official Copy).
Notice of Allowance received for U.S. Appl. No. 09/293,507, dated Jul. 25, 2002, 6 pages.
Notice of Allowance received for U.S. Appl. No. 09/293,508, dated Feb. 13, 2001, 5 pages.
Notice of Allowance received for U.S. Appl. No. 10/308,315, dated Aug. 27, 2007, 6 pages.
Notice of Allowance received for U.S. Appl. No. 10/374,013, dated Aug. 27, 2007, 6 pages.
Notice of Allowance received for U.S. Appl. No. 10/374,445, dated May 5, 2006, 7 pages.
Notice of Allowance received for U.S. Appl. No. 10/374,831, dated Sep. 10, 2004, 8 pages.
Notice of Allowance received for U.S. Appl. No. 11/459,591, dated May 21, 2009, 9 pages.
Notice of Allowance received for U.S. Appl. No. 11/521,740, dated Jul. 24, 2008, 7 pages.
Notice of Allowance received for U.S. Appl. No. 11/767,409, dated Jun. 12, 2013, 14 pages.
Notice of Allowance received for U.S. Appl. No. 11/983,059, dated Feb. 10, 2012, 8 pages.
Notice of Allowance received for U.S. Appl. No. 12/215,651, dated Feb. 6, 2014, 5 pages.
Notice of Allowance received for U.S. Appl. No. 12/395,537 dated Jun. 29, 2016, 14 pages.
Notice of Allowance received for U.S. Appl. No. 12/395,541, dated Aug. 22, 2013, 8 pages.
Notice of Allowance received for U.S. Appl. No. 12/395,541, dated Sep. 12, 2013, 2 pages.
Notice of Allowance received for U.S. Appl. No. 12/547,401, dated Jul. 22, 2013, 8 pages.
Notice of Allowance received for U.S. Appl. No. 13/333,900, dated Apr. 13, 2015, 9 pages.
Notice of Allowance received for U.S. Appl. No. 13/333,900, dated Dec. 1, 2015, 2 pages.
Notice of Allowance received for U.S. Appl. No. 13/333,900, dated Sep. 15, 2015, 7 pages.
Notice of Allowance received for U.S. Appl. No. 14/830,629, dated Oct. 17, 2018, 8 pages.
Notice of Allowance received for U.S. Appl. No. 15/274,963, dated Jul. 6, 2018, 10 pages.
Notice of Non-Compliant Amendment received for U.S. Appl. No. 11/522,167 dated May 14, 2008, 4 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action Received for Canadian Patent Application No. 2,661,200, dated Jan. 3, 2013, 5 pages.
Office Action received for Canadian Patent Application No. 2,661,200, dated Jun. 9, 2010, 3 pages.
Office Action Received for Canadian Patent Application No. 2,661,200, dated Nov. 1, 2011, 4 pages.
Office Action received for Canadian Patent Application No. 2,661,200, dated Nov. 14, 2013, 2 pages.
Office Action received for Canadian Patent Application No. 2,882,403, dated Apr. 2, 2015, 5 pages.
Office Action received for Canadian Patent Application No. 2,882,403, dated Sep. 15, 2017, 5 pages.
Office Action received for Chinese Patent Application No. 201210308569.5, dated Nov. 19, 2014, 24 pages (8 pages of English Translation and 16 pages of Official Copy).
Office Action received for Chinese Patent Application No. 201210308569.5, dated Sep. 1, 2015, 39 pages (22 pages of English Translation and 17 pages of Official Copy).
Office Action received for Chinese Patent Application No. 201410449822.8, dated Dec. 2, 2016, 9 pages (5 pages of English Translation and 4 pages of Official Copy).
Office Action received for Chinese Patent Application No. 201410449822.8, dated May 4, 2018, 12 pages (5 pages of English Translation and 7 pages of Official copy).
Office Action received for Chinese Patent Application No. 201410449822.8, dated Nov. 20, 2018, 11 pages (4 pages of English Translation and 7 Pages of Official Copy).
Office Action received for Chinese Patent Application No. 201410449822.8, dated Sep. 30, 2017, 20 Pages (11 pages of English Translation and 9 pages of Official Copy).
Office Action received for Chinese Patent Application No. 201580046339.8, dated Feb. 26, 2019, 18 pages (6 pages of English Translation and 12 pages of Official Copy).
Office Action received for Chinese Patent Application No. 201580046339.8, dated Jun. 3, 2020, 19 pages (10 pages of English Translation and 9 pages of Official Copy).
Office Action received for Chinese Patent Application No. 201580046339.8, dated Oct. 31, 2019, 9 pages (3 pages of English Translation and 6 pages of Official Copy).
Office Action received for Chinese Patent Application No. 201811539259.8, dated Apr. 3, 2020, 10 pages (6 pages of English Translation and 4 pages of Official Copy).
Office Action received for Chinese Patent Application No. 201811539259.8, dated Sep. 18, 2019, 12 pages (6 pages of English Translation and 6 pages of Official Copy).
Office Action received for Chinese Patent Application No. 201811539260.0, dated Jun. 3, 2020, 8 pages (5 pages of English Translation and 3 pages of Official Copy).
Office Action received for Chinese Patent Application No. 201811539260.0, dated Oct. 8, 2019, 14 pages (7 pages of English Translation and 7 pages of Official Copy).
Office Action received for Chinese Patent Application No. 201880001436.9, dated Apr. 28, 2019, 19 pages (11 pages of English Translation and 8 pages of Official Copy).
Office Action received for Chinese Patent Application No. 201880001436.9, dated Nov. 6, 2019, 24 pages (15 pages of English Translation and 9 pages of Official Copy).

(56) References Cited

OTHER PUBLICATIONS

Office Action received for Chinese Patent Application No. 201910164962.3, dated Apr. 8, 2020, 25 pages (13 pages of English Translation and 12 pages of Official Copy).
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for European Patent Application No. 00923491.5, dated Jan. 11, 2010, 6 pages.
Office Action received for European Patent Application No. 00923491.5, dated Mar. 12, 2007, 9 pages.
Office Action received for European Patent Application No. 00923491.5, dated Sep. 11, 2007, 5 pages.
Office Action received for European Patent Application No. 07842262.3, dated Feb. 16, 2017, 6 pages.
Office Action received for European Patent Application No. 07842262.3, dated Sep. 8, 2011,5 pages.
Office Action received for European Patent Application No. 10177096.4, dated Feb. 20, 2012, 6 pages.
Office Action received for European Patent Application No. 10177096.4, dated Jul. 26, 2017, 8 pages.
Office Action received for European Patent Application No. 10177096.4, dated Jun. 7, 2018, 14 pages.
Office Action received for European Patent Application No. 10177096.4, dated Mar. 21, 2013, 9 pages.
Office Action received for European Patent Application No. 10177099.8, dated Feb. 20, 2012, 5 pages.
Office Action received for European Patent Application No. 13184872.3, dated May 18, 2018, 8 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action Received for Japanese Patent Application No. 2012-500842, dated Jan. 31, 2014, 5 pages (3 pages of English Translation and 2 pages of Official Copy).
Office Action received for Japanese Patent Application No. 2016-001259, dated Feb. 23, 2018, 11 pages (6 pages of English Translation and 5 pages of Official Copy).
Office Action received for Japanese Patent Application No. 2016-001259, dated Jan. 6, 2017, 6 pages (3 pages of English Translation and 3 pages of Official Copy).
Office Action received for Japanese Patent Application No. 2016-001259, dated Nov. 13, 2017, 10 Pages (5 pages of English Translation and 5 pages of Official Copy).
Office Action received for Japanese Patent Application No. 2018-119170, dated May 10, 2019, 8 pages (4 pages of English Translation and 4 pages of Official Copy).
"On-Line Definition for "Playback"", American Heritage Dictionary of the English Language, 4th Edition, 2000, 1 page.
Partial European Search Report received for European Patent Application No. 20158824.1, dated May 8, 2020, 14 pages.
Partial European Search Report received for European Patent Application No. 18197583.0, dated Jan. 14, 2019, 18 pages.
Sangeet007, "PartyShare—turn your Xperia into a jukebox", online available at: https://forum.xda-developers.com/crossdevice-dev/sony/app-partyshare-xperia-jukebox-t2877807, Sep. 15, 2014, 5 pages.
"Quick Time Movie Player Ver. 2.1.2.59", Current Time Indicator Dragging Operation, Ver. 2.1.2.59, 1996, 1 page.
"RealOne Player Version 2.0", Screen Dumps, 2002, 4 pages.
Restriction Requirement received for U.S. Appl. No. 10/374,013, dated Oct. 6, 2006, 4 pages.
Restriction Requirement received for U.S. Appl. No. 11/767,409, dated Sep. 21, 2010, 8 pages.
Restriction Requirement received for U.S. Appl. No. 12/215,651, dated Sep. 28, 2011, 11 pages.
Restriction Requirement received for U.S. Appl. No. 12/395,537, dated May 9, 2011, 6 pages.
Restriction Requirement received for U.S. Appl. No. 12/395,541, dated May 27, 2011, 6 pages.
FOX 11 Los Angeles "Review: Samsung Radiant R3 Wireless Speakers", Available Online at: <https://www.youtube.com/watch?v=ZBICVE1WdKE>, Jan. 19, 2016, 3 pages.
Samsung,"Samsung R3 Wireless 360° Smart Speaker (Black)", User Manual ver. 1.0 (English), User manual [online], Available Online at: https://www.samsung.com/uk/support/model/WAM3500/XU/, Dec. 16, 2016, 3 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.

(56) References Cited

OTHER PUBLICATIONS

Search Report and Opinion received for Danish Patent Application No. PA201870419, dated Sep. 10, 2018, 9 pages.
Search Report and Opinion received for Danish Patent Application No. PA201870598, dated Dec. 5, 2018, 8 pages.
Search Report received for Danish Patent Application No. PA201770404, dated Jun. 20, 2017, 8 pages.
Search Report received for Danish Patent Application No. PA201770409, dated Jun. 20, 2017, 9 pages.
Search Report received for European Patent Application No. 00923491.5, dated Jun. 2, 2006, 6 pages.
Search Report received for European Patent Application No. 00923491.5, dated Mar. 6, 2006, 4 pages.
Seifert Dan, "Google Home review: Home is where the smart is", The Verge, Available Online at: https://www.theverge.com/2016/11/3/13504658/google-home-review-speaker-assistant-amazon-echo-competitor, Nov. 3, 2016, 11 pages.
Smarttricks, "Top 3 Music Player for Android", Available online at: https://www.youtube.com/watch?v=He7RTn4CL34, Feb. 22, 2017, 4 pages.
Sonos,"Sonos Controller App for iPad Product Guide", Available online at: https://www.sonos.com/documents/productguides/en/iPadGuide_EN.pdf, Nov. 2014, 47 pages.
Summon to Attend Oral Proceeding received for European Patent Application No. 10177099.8 dated Mar. 20, 2013, 9 pages.
Summons to attend oral proceedings received for European Patent Application No. 00923491.5, dated Jan. 27, 2011, 10 pages.
Summons to Attend Oral Proceedings received for European Patent Application No. 07842262.3, dated Jun. 25, 2018, 9 pages.
Summons to attend Oral proceedings received for European Patent Application No. 18197589.7, dated Apr. 9, 2020, 7 pages.
Summons to Attend Oral Proceedings received for European Patent Application No. 10177096.4, dated Sep. 21, 2018, 12 pages.
Summons to Oral Proceedings received for German Patent Application No. 112007002143.8 dated Nov. 28, 2018, 13 pages (6 pages of English Translation and 7 pages of Official Copy).
"Windows Media Player for Windows XP version 8.0", 2001, 2 pages.
Woolsey, Amanda, "Apple Watch Tips—How to Add and Play Music", Available online at: https://www.youtube.com/watch?v=E0QEuqMaoi8, Apr. 26, 2015, 3 pages.
Applicant-Initiated Interview Summary received for U.S. Appl. No. 16/803,849, dated Oct. 12, 2021, 6 pages.
Corrected Notice of Allowance received for U.S. Appl. No. 16/807,604, dated Oct. 14, 2021, 3 pages.
Corrected Notice of Allowance received for U.S. Appl. No. 16/836,571, dated Oct. 12, 2021, 4 pages.
Search Report and Opinion received for Danish Patent Application No. PA202170320, dated Oct. 6, 2021, 9 pages.
"Customize Notifications and Content on Your Galaxy Phone's Lock Screen", Online Available at: https://www.samsung.com/us/support/answer/ANS00062636, Oct. 4, 2017, 5 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Intention to Grant received for Danish Patent Application No. PA202070560, dated Apr. 26, 2021, 2 pages.
Non-Final Office Action received for U.S. Appl. No. 16/922,675, dated May 4, 2021, 23 pages.
Notice of Allowance received for U.S. Appl. No. 16/807,604, dated Apr. 30, 2021, 25 pages.
"Smart Home App—What is the Widget", Online Available at: https://support.vivint.com/s/article/Vivint-Smart-Home-App-What-is-the-Widget, Jan. 26, 2019, 4 pages.
Stroud Forrest, "Screen Lock Meaning & Definition", Online Available at: https://www.webopedia.com/definitions/screen-lock, Jan. 30, 2014, 3 pages.
Board Opinion received for Chinese Patent Application No. 201910164962.3, dated Sep. 16, 2021, 16 pages (6 pages of English Translation and 10 pages of Official Copy).
Corrected Notice of Allowance received for U.S. Appl. No. 16/807,604, dated Oct. 4, 2021, 5 pages.
Notice of Allowance received for U.S. Appl. No. 16/263,280, dated Sep. 17, 2021, 8 pages.
Notice of Allowance received for U.S. Appl. No. 16/922,675, dated Sep. 27, 2021, 10 pages.
Corrected Notice of Allowance received for U.S. Appl. No. 16/263,280, dated Aug. 5, 2021,4 pages.
Office Action received for Australian Patent Application No. 2021204454, dated Aug. 9, 2021, 7 pages.
Final Office Action received for U.S. Appl. No. 17/031,833, dated Jan. 26, 2021, 17 pages.
Intention to Grant received for European Patent Application No. 18197589.7, dated Jan. 21, 2021, 8 pages.
Office Action received for Chinese Patent Application No. 201911128105.4, dated Jan. 4, 2021, 14 pages (7 pages of English Translation and 7 pages of Official Copy).
Notice of Allowance received for U.S. Appl. No. 15/910,263, dated Jan. 22, 2021,33 pages.
Notice of Allowance received for U.S. Appl. No. 16/922,675, dated Jan. 21, 2021,7 pages.
Applicant-Initiated Interview Summary received for U.S. Appl. No. 15/910,263, dated Nov. 18, 2020, 6 pages.
Applicant-Initiated Interview Summary received for U.S. Appl. No. 16/263,280, dated Nov. 25, 2020, 3 pages.
Office Action received for Chinese Patent Application No. 201580046339.8, dated Oct. 19, 2020, 12 pages (4 pages of English Translation and 8 pages of Official Copy).
Office Action received for Chinese Patent Application No. 201811539260.0, dated Nov. 4, 2020, 9 pages (5 pages of English Translation and 4 pages of Official Copy).
Office Action received for European Patent Application No. 19207753.5, dated Nov. 12, 2020, 5 pages.
Advisory Action received for U.S. Appl. No. 16/583,989, dated Sep. 22, 2020, 5 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/584,490, dated Jul. 28, 2020, 4 pages.
Applicant-Initiated Interview Summary received for U.S. Appl. No. 16/584,490, dated Jan. 31, 2020, 4 pages.
Applicant-Initiated Interview Summary received for U.S. Appl. No. 16/922,675, dated Nov. 2, 2020, 3 pages.
Corrected Notice of Allowance received for U.S. Appl. No. 15/730,610, dated Nov. 27, 2020, 3 pages.
Final Office Action received for U.S. Appl. No. 16/583,989, dated Jul. 10, 2020, 23 pages.
Final Office Action received for U.S. Appl. No. 16/584,490, dated May 1, 2020, 48 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.

(56) References Cited

OTHER PUBLICATIONS

Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
NBC News, "NBC News—YouTube Democratic Debate (full)", Online available at: https://www.youtube.com/watch?v=ti2Nokoq1J4, Jan. 17, 2016, 1 page.
Non-Final Office Action received for U.S. Appl. No. 16/583,989, dated Jan. 24, 2020, 20 pages.
Non-Final Office Action received for U.S. Appl. No. 16/584,490, dated Dec. 10, 2019, 27 pages.
Non-Final Office Action received for U.S. Appl. No. 16/723,583, dated Aug. 13, 2020, 13 pages.
Non-Final Office Action received for U.S. Appl. No. 16/922,675, dated Aug. 13, 2020, 17 pages.
Non-Final Office Action received for U.S. Appl. No. 17/031,833, dated Dec. 7, 2020, 13 pages.
Notice of Allowance received for U.S. Appl. No. 16/584,490, dated Aug. 27, 2020, 13 pages.
Result of Consultation received for European Patent Application No. 18197589.7, dated Dec. 1, 2020, 9 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at https://content.abt.com/documents/90234/SM-R810NZDAXAR-use.pdf, Aug. 24, 2018, 102 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Corrected Notice of Allowance received for U.S. Appl. No. 16/836,571, dated Nov. 18, 2021, 3 pages.
Extended European Search Report received for European Patent Application No. 21197457.1, dated Nov. 15, 2021, 8 pages.
Non-Final received for U.S. Appl. No. 17/461,103, dated Nov. 22, 2021, 15 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Applicant-Initiated Interview Summary received for U.S. Appl. No. 16/836,571, dated Jul. 7, 2021, 6 pages.
Board Decision received for Chinese Patent Application No. 201580046339.8, dated Jun. 22, 2021, 12 pages (1 page of English Translation and 11 pages of Official Copy).
Corrected Notice of Allowance received for U.S. Appl. No. 16/702,968, dated Jun. 28, 2021, 4 pages.
Corrected Notice of Allowance received for U.S. Appl. No. 16/807,604, dated Jun. 28, 2021, 3 pages.
Invitation to Pay Search Fees received for European Patent Application No. 18733381.0, dated Jun. 30, 2021, 4 pages.
Notice of Allowance received for U.S. Appl. No. 17/031,833, dated Jun. 25, 2021, 15 pages.
Office Action received for Chinese Patent Application No. 202010125114.4, dated Jun. 7, 2021, 7 pages (4 pages of English Translation and 3 pages of Official Copy).
Applicant-Initiated Interview Summary received for U.S. Appl. No. 15/730,610, dated Aug. 25, 2020, 6 pages.
Applicant-Initiated Interview Summary received for U.S. Appl. No. 16/803,849, dated Aug. 21, 2020, 5 pages.
Extended European Search Report received for European Patent Application No. 20158824.1, dated Aug. 10, 2020, 13 pages.
Final Office Action received for U.S. Appl. No. 16/807,604, dated Aug. 19, 2020, 35 pages.
Summons to Attend Oral Proceedings received for European Patent Application No. 18197583.0, dated Aug. 14, 2020, 12 pages.
Final Office Action received for U.S. Appl. No. 16/702,968, dated Jul. 27, 2020, 21 pages.
Non-Final Office Action received for U.S. Appl. No. 16/263,280, dated Jul. 27, 2020, 11 pages.
Crutnacker, "Amazon Echo Tips and Tricks: Playing Music Demonstration", Available Online at: https://www.youtube.com/watch?v=W_bqq2ynUII, Nov. 4, 2015, 1 page.
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Dec. 21, 2020, 5 pages.
Applicant-Initiated Interview Summary received for U.S. Appl. No. 16/807,604, dated Dec. 21, 2020, 7 pages.
Applicant-Initiated Interview Summary received for U.S. Appl. No. 16/922,675, dated Dec. 16, 2020, 3 pages.
Applicant-Initiated Interview Summary received for U.S. Appl. No. 17/031,833, dated Dec. 21, 2020, 5 pages.
Notice of Allowance received for U.S. Appl. No. 16/583,989, dated Dec. 24, 2020, 7 pages.
Office Action received for Danish Patent Application No. PA202070560, dated Dec. 11, 2020, 7 pages.
Office Action received for European Patent Application No. 18728002.9, dated Dec. 14, 2020, 15 pages.
Result of Consultation received for European Patent Application No. 18197589.7, dated Dec. 17, 2020, 6 pages.
Final Office Action received for U.S. Appl. No. 16/263,280, dated Mar. 4, 2021, 13 pages.
Minutes of the Oral Proceedings received for European Patent Application No. 18197583.0, dated Mar. 9, 2021, 6 pages.
Notice of Acceptance received for Australian Patent Application No. 2019268111, dated Feb. 18, 2021, 3 pages.
Office Action received for Chinese Patent Application No. 201910164962.3, dated Jan. 12, 2021, 14 pages (7 pages of English Translation and 7 pages of Official Copy).
Result of Consultation received for European Patent Application No. 18197583.0, dated Feb. 24, 2021, 3 pages.
Decision to Grant received for European Patent Application No. 18197583.0, dated Feb. 3, 2022, 3 pages.
Intention to Grant received for European Patent Application No. 19207753.5, dated Jan. 28, 2022, 8 pages.
Notice of Allowance received for U.S. Appl. No. 16/836,571, dated Feb. 14, 2022, 31 pages.
Notice of Allowance received for U.S. Appl. No. 16/922,675, dated Feb. 10, 2022, 8 pages.
Applicant-Initiated Interview Summary received for U.S. Appl. No. 17/168,069, dated Nov. 17, 2021, 2 pages.
Corrected Notice of Allowance received for U.S. Appl. No. 17/168,069, dated Feb. 9, 2022, 2 pages.
Corrected Notice of Allowance received for U.S. Appl. No. 17/461,103, dated Apr. 14, 2022, 2 pages.
International Search Report and Written Opinion received for PCT Patent Application No. PCT/US2021/048358, dated Feb. 24, 2022, 21 pages.
Invitation to Pay Additional Fees received for PCT Patent Application No. PCT/US2021/048358, dated Dec. 23, 2021, 14 pages.
Non-Final Office Action received for U.S. Appl. No. 17/168,069, dated Jul. 21, 2021, 17 pages.
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Office Action received for Australian Patent Application No. 2021203669, dated Apr. 5, 2022, 3 pages.
Supplemental Notice of Allowance received for U.S. Appl. No. 17/168,069, dated Apr. 20, 2022, 2 pages.
Supplemental Notice of Allowance received for U.S. Appl. No. 17/168,069, dated Feb. 2, 2022, 2 pages.

(56) References Cited

OTHER PUBLICATIONS

Office Action received for Australian Patent Application No. 2020282362, dated Nov. 25, 2021, 3 pages.
Corrected Notice of Allowance received for U.S. Appl. No. 17/461,103, dated May 10, 2022, 2 pages.
Notice of Allowance received for U.S. Appl. No. 16/803,849, dated May 17, 2022, 12 pages.
Office Action received for Danish Patent Application No. PA202170320, dated May 3, 2022, 3 pages.
Applicant-Initiated Interview Summary received for U.S. Appl. No. 16/803,849, dated Feb. 28, 2022, 9 pages.
Corrected Notice of Allowance received for U.S. Appl. No. 16/922,675, dated Mar. 4, 2022, 6 pages.
Non-Final Office Action received for U.S. Appl. No. 17/176,908, dated Feb. 24, 2022, 28 pages.
Notice of Acceptance received for Australian Patent Application No. 2021204454, dated Feb. 25, 2022, 3 pages.
Computeradv, "Sonos App Navigation & Menu on iPhone", Available online at: https://www.youtube.com/watch?v=Jhz9XvWQ204, Aug. 4, 2015, 1 page.
Howcast, "How to Create and Edit Playlists on iPhone", Youtube, Available online at: https://www.youtube.com/watch?v=YPOnKUvcso4, Mar. 13, 2014, 3 pages.
Noriega Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
Sandrahoutz, "How Do I Delete a Playlist from a Synced Ipod but Not Remove it From the Library in itunes", Apple Communities Website, Available online at: https://discussions.apple.com/thread/7503609, Mar. 23, 2016, 2 pages.
Sharepoint At Rackspace, "Sharepoint 2013: How to Edit a List or Library Using Quick Edit", Available online at: https://www.youtube.com/watch?v=foZXcFC1k80, Oct. 10, 2014, 1 page.
Supertunetv, "Ipod Nano 6G—Sync Selected Playlist iTunes", Youtube, Available online at: https://www.youtube.com/watch?v=xU 3rYRabt_l, Sep. 10, 2012, 3 pages.
Whitwam Ryan, "How to Sync and Play Music on Your Android Wear Watch", Available online at: https://www .greenbot.com/article/2997520/how-to-sync-and-play-music-on-your-android-wear-watch.html, Nov. 2, 2015, 4 pages.
Applicant-Initiated Interview Summary received for U.S. Appl. No. 17/461,103, dated Jan. 26, 2022, 6 pages.
Intention to Grant received for European Patent Application No. 18197583.0, dated Jan. 17, 2022, 9 pages.
Notice of Acceptance received for Australian Patent Application No. 2020282362, dated Jan. 4, 2022, 3 pages.
Notice of Allowance received for U.S. Appl. No. 16/888,775, dated Jan. 12, 2022, 5 pages.
Notice of Acceptance received for Australian Patent Application No. 2021203669, dated May 25, 2022, 3 pages.
Notice of Acceptance received for Australian Patent Application No. 2022202458, dated May 6, 2022, 3 pages.
Result of Consultation received for European Patent Application No. 20158824.1, dated May 17, 2022, 7 pages.
Corrected Notice of Allowance received for U.S. Appl. No. 16/836,571, dated Mar. 25, 2022, 2 pages.
Notice of Allowance received for Japanese Patent Application No. 2021-563716, dated Mar. 14, 2022, 4 pages (1 page of English Translation and 3 pages of Official Copy).
Notice of Allowance received for U.S. Appl. No. 17/461,103, dated Mar. 17, 2022, 10 pages.
Applicant Initiated Interview Summary received for U.S. Appl. No. 17/176,908, dated Jun. 14, 2022, 6 pages.
Brief Communication Regarding Oral Proceedings received for European Patent Application No. 20158824.1, mailed on May 30, 2022, 1 page.
Corrected Notice of Allowance received for U.S. Appl. No. 16/803,849, dated Jul. 7, 2022, 3 pages.
Corrected Notice of Allowance received for U.S. Appl. No. 16/803,849, dated Jun. 8, 2022, 3 pages.
Corrected Notice of Allowance received for U.S. Appl. No. 17/461,103, dated Aug. 3, 2022, 2 pages.
Decision to Grant received for European Patent Application No. 19207753.5, dated Jun. 2, 2022, 3 pages.
Intention to Grant received for Danish Patent Application No. PA202170320, dated Jul. 27, 2022, 2 pages.
Intention to Grant received for European Patent Application No. 20158824.1, dated Aug. 11, 2022, 10 pages.
Non-Final Office Action received for U.S. Appl. No. 16/922,675, dated Jun. 8, 2022, 21 pages.
Non-Final Office Action received for U.S. Appl. No. 17/314,948, dated Aug. 1, 2022, 33 pages.
Notice of Allowance received for Japanese Patent Application No. 2022-079682, dated Jul. 15, 2022, 4 pages (1 page of English Translation and 3 pages of Official Copy).
Notice of Allowance received for U.S. Appl. No. 17/461,103, dated Jun. 20, 2022, 6 pages.
Office Action received for European Patent Application No. 20158824.1, dated Jun. 13, 2022, 5 pages.
Office Action received for European Patent Application No. 21197457.1, dated Sep. 2, 2022, 8 pages.
Office Action received for Korean Patent Application No. 10-2022-7006175, dated May 27, 2022, 7 pages (3 pages of English Translation and 4 pages of Official Copy).
Summons to Attend Oral Proceedings received for European Patent Application No. 18728002.9, mailed on Jun. 3, 2022, 15 pages.
Farmboyreef, "Apple watch controlling your tv", Available online at: https://www.youtube.com/watch?v=xaJPG0Wm3Tg, Jun. 23, 2015, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
Hobbyistsoftwareltd, "VLC Remote", Online available at: https://watchaware.com/watch-apps/297244048, 2016, 7 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov Anton, "Design principle: Consistency", Available online at: https://uxdesign.cc/design-principle-consistency-6b0cf7e7339f, Apr. 8, 2017, 9 pages.
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Pairing Your Apple Watch with Your Apple TV, Available online at: https://www.youtube.com/watch?v=C4t8YFSJ-UY, Apr. 27, 2015, 3 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap% 20on%20Add%20Music., Mar. 2, 2018, 13 pages.
Applicant-Initiated Interview Summary received for U.S. Appl. No. 17/314,948, dated Oct. 21, 2022, 6 pages.
Notice of Allowance received for U.S. Appl. No. 16/888,775, dated Oct. 19, 2022, 6 pages.
Office Action received for Danish Patent Application No. PA202270464, dated Oct. 25, 2022, 9 pages.

* cited by examiner

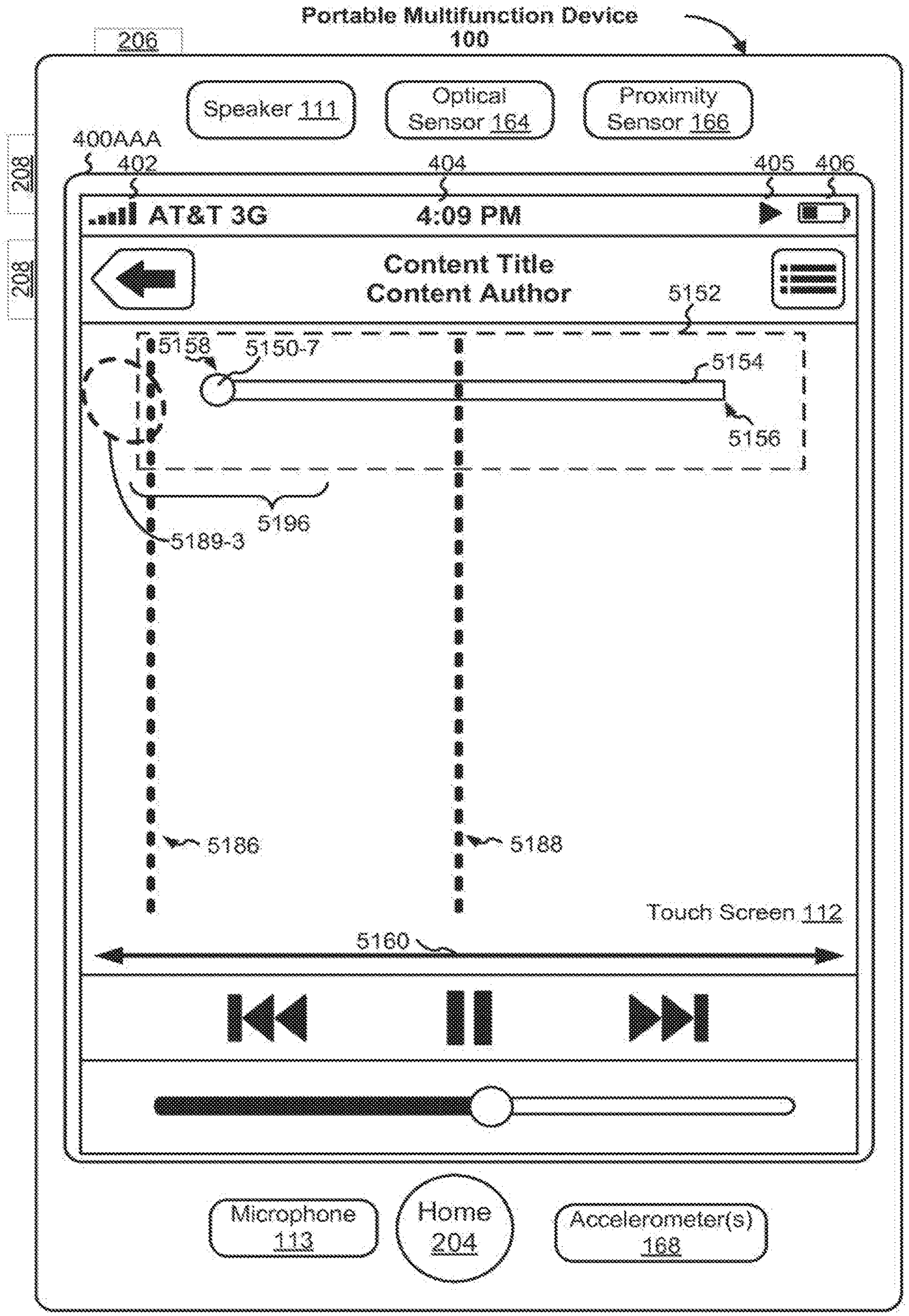
Figure 5AAA

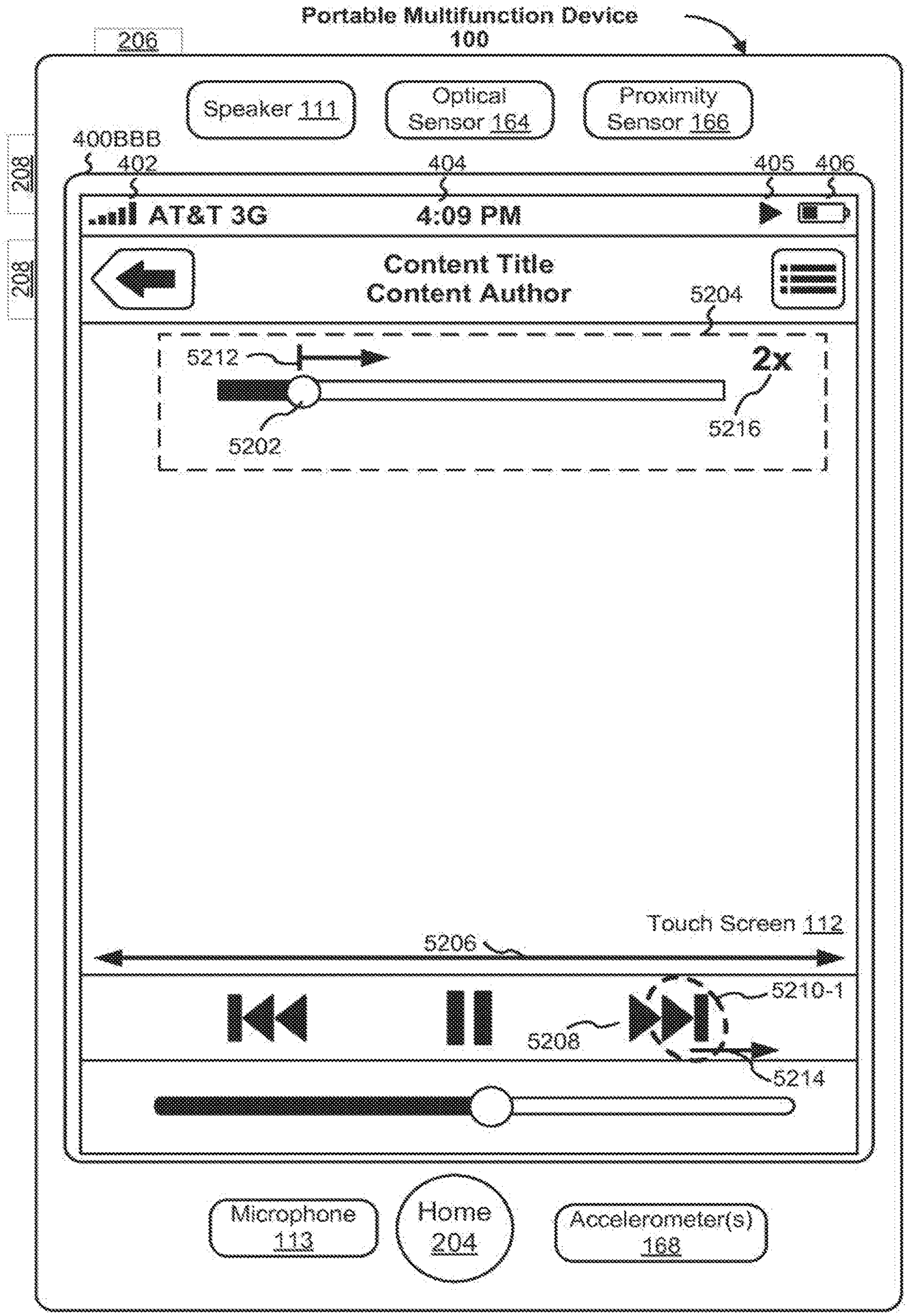
Figure 5BBB

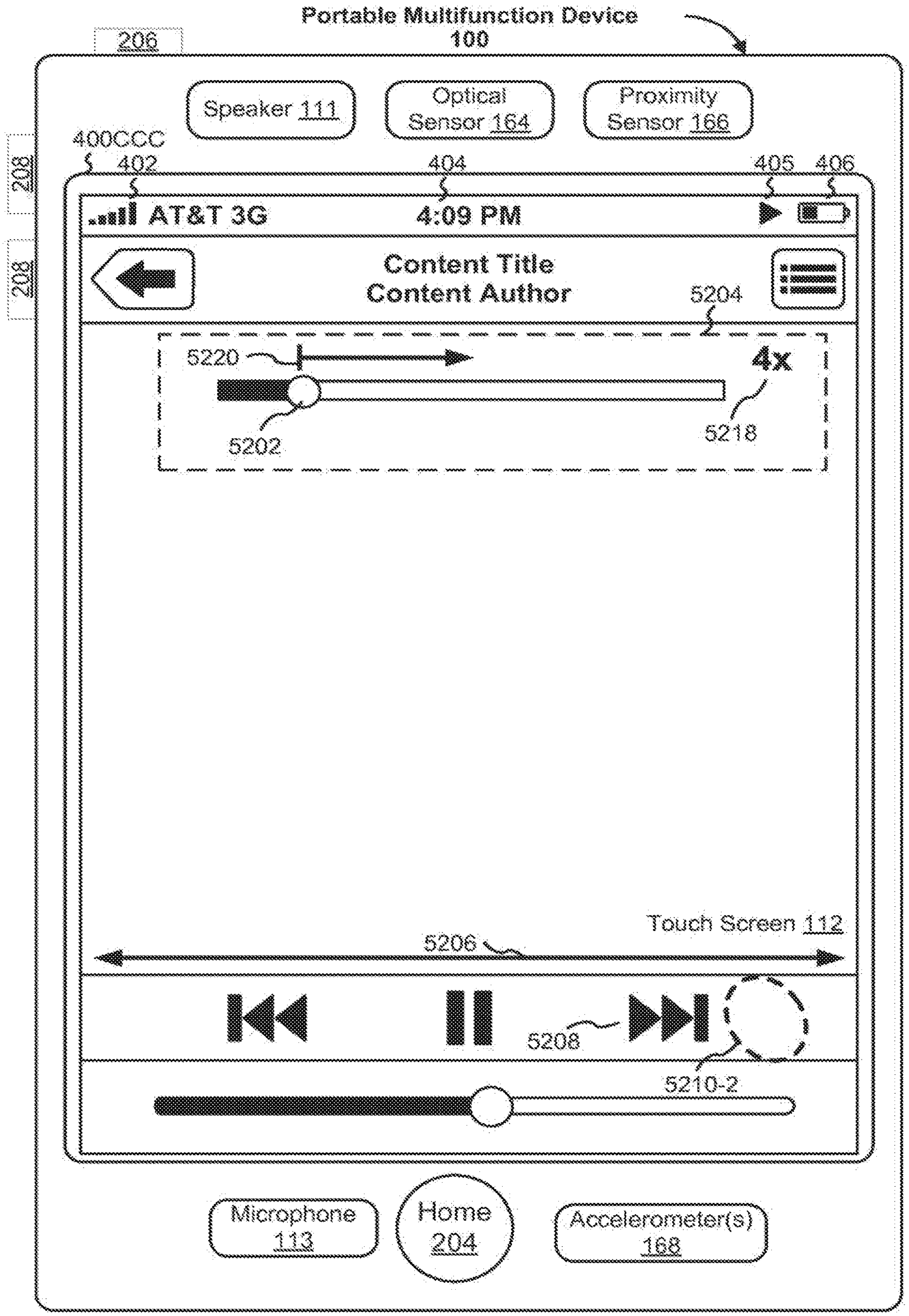
Figure 5CCC

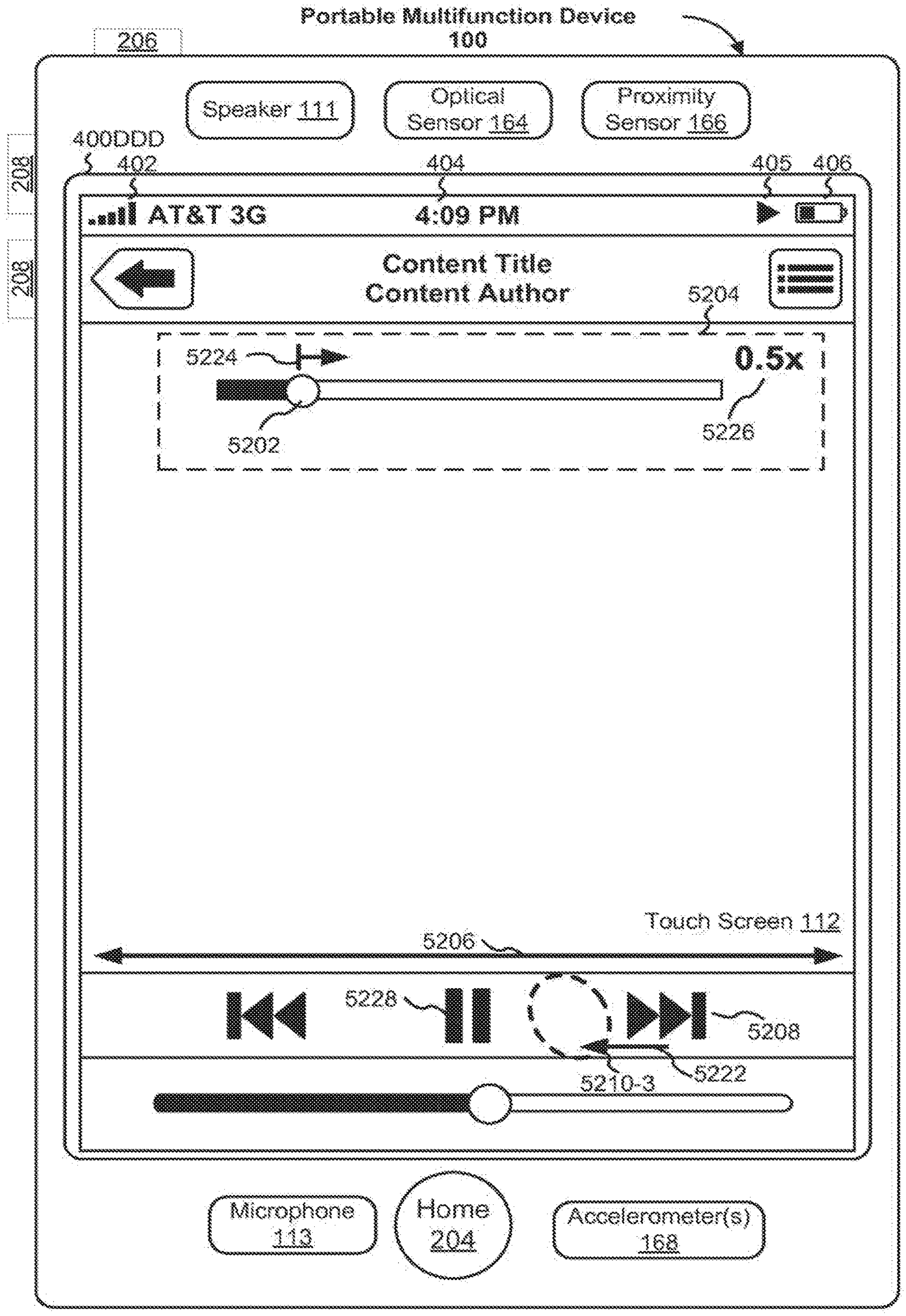
Figure 5DDD

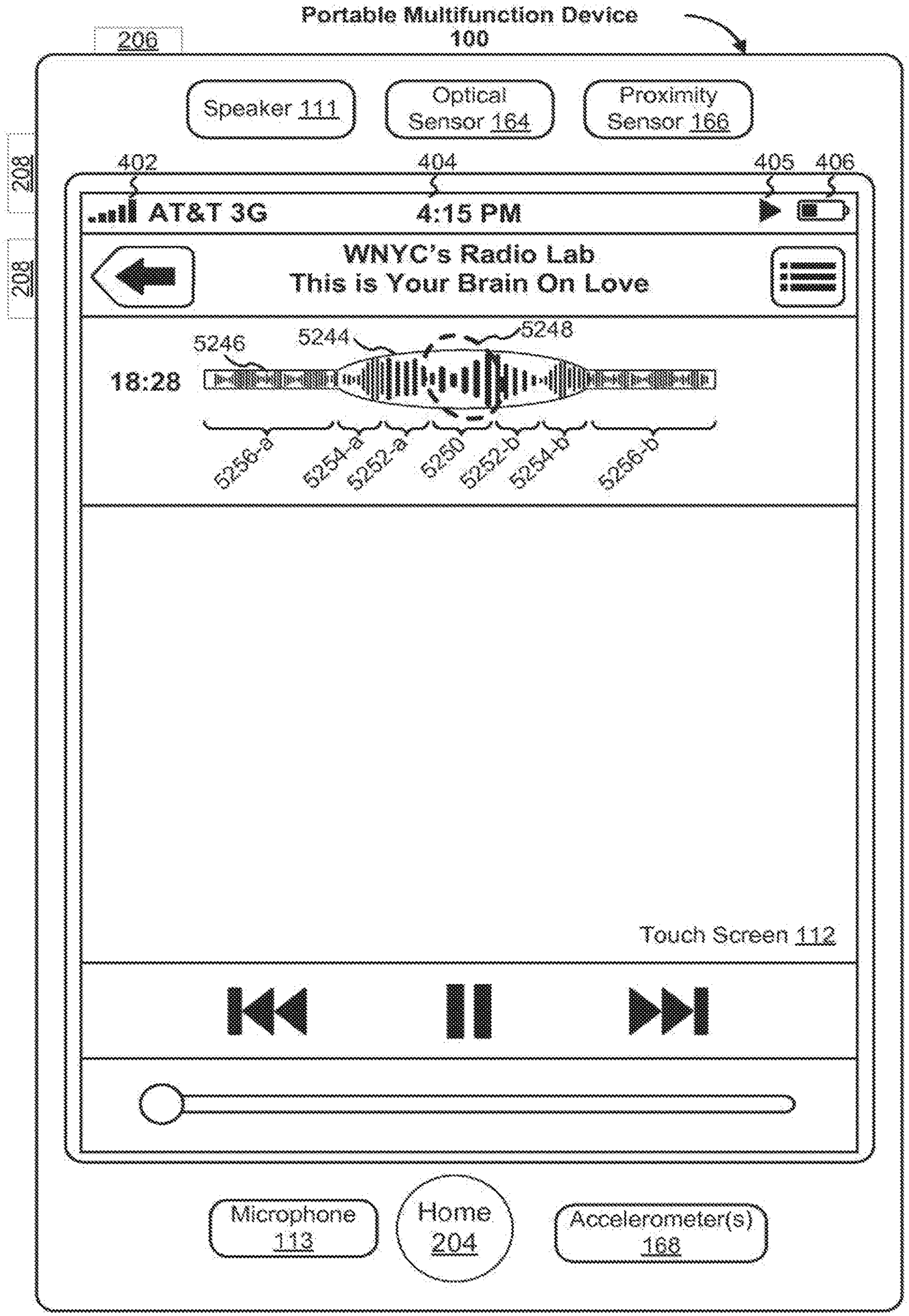
Figure 5EEE

DEVICE, METHOD, AND GRAPHICAL USER INTERFACE FOR MOVING A CURRENT POSITION IN CONTENT AT A VARIABLE SCRUBBING RATE

RELATED APPLICATIONS

This application is a continuation of U.S. patent application Ser. No. 12/566,673, Device, Method, And Graphical User Interface for Moving a Current Position in Content at a Variable Scrubbing Rate," filed Sep. 25, 2009, which claims priority to U.S. Provisional Patent Application No. 61/210,338, entitled "Device, Method, and Graphical User Interface for Moving a Current Position in Content at a Variable Scrubbing Rate," filed Mar. 16, 2009, the contents of which are incorporated herein by reference in their entirety.

This application is related to the following applications: (1) U.S. patent application Ser. No. 12/566,669, "Device, Method, and Graphical User Interface for Moving a Current Position in Content at a Variable Scrubbing Rate," filed Sep. 25, 2009; (2) U.S. patent application Ser. No. 12/566,671, "Device, Method, and Graphical User Interface for Moving a Current Position in Content at a Variable Scrubbing Rate," filed Sep. 25, 2009; and (3) U.S. patent application Ser. No. 12/566,672, "Device, Method, and Graphical User Interface for Moving a Current Position in Content at a Variable Scrubbing Rate," filed Sep. 25, 2009, which are incorporated by reference herein in their entirety.

TECHNICAL FIELD

The disclosed embodiments relate generally to electronic devices with touch-sensitive surfaces operable to manipulate user interface objects, such as a progress icon for indicating a current position within content.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to navigate through content that is provided on an electronic computing device. A user may wish to move the current position in provided content to a user desired position in the provided content. For example, a user may need to perform such navigation operations in music applications (e.g., iTunes from Apple Computer, Inc. of Cupertino, Calif.), a video application (e.g., Quicktime from Apple Computer, Inc. of Cupertino, Calif.), an image editing or viewing application (Aperture or iPhoto from Apple Computer, Inc. of Cupertino, Calif.), and/or a mobile media player (iPod Touch or iPhone from Apple Computer, Inc. of Cupertino, Calif.).

But conventional methods for performing these manipulations are cumbersome and inefficient. For example, scrubbing through content at a single fixed rate is tedious and creates a significant cognitive burden on a user. In addition, conventional methods take longer than necessary, thereby wasting energy. This latter consideration is particularly important in battery-operated devices.

Accordingly, there is a need for electronic devices with faster, more efficient methods and interfaces for quickly and efficiently scrubbing through content to find a user desired location within the content. Such methods and interfaces may complement or replace conventional methods for scrolling content (or equivalently scrubbing through content). Such methods and interfaces reduce the cognitive burden on a user and produce a more efficient human-machine interface. For battery-operated electronic devices, such methods and interfaces conserve power and increase the time between battery charges.

SUMMARY

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions include one or more of: image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computer-implemented method is performed at an electronic device with a display and a touch-sensitive surface. The computer-implemented method includes: displaying a progress icon in a predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a location on the display outside the predefined area that includes the progress icon, wherein movement of the contact comprises a first component of movement on the touch-sensitive surface in a direction corresponding to movement on the display parallel to the first predefined direction and a second component of movement on the touch-sensitive surface in a direction corresponding to movement on the display perpendicular to the first predefined direction; while continuing to detect the contact on the touch-sensitive surface, moving the current position within the content at a scrubbing rate, wherein the scrubbing rate decreases as the second component of movement on the touch-sensitive surface increases.

In accordance with some embodiments, an electronic device includes a touch-sensitive surface, a display, one or more processors, memory, and one or more programs. The one or more programs are stored in the memory and configured to be executed by the one or more processors. The one or more programs include instructions for: displaying a progress icon in a predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a location on the display outside the predefined area that includes the progress icon, wherein movement of the contact comprises a first component of movement on the touch-sensitive surface in a direction corresponding to movement on the display parallel to the first predefined direction and a second component of movement on the touch-sensitive surface in a direction corresponding to movement on the display perpendicular to the first predefined direction; while continuing to detect the contact on the touch-sensitive surface, moving the current position within the content at a scrubbing rate, wherein the scrubbing rate decreases as the second component of movement on the touch-sensitive surface increases.

In accordance with some embodiments, a computer readable storage medium has stored therein instructions which when executed by an electronic device with a touch-sensitive surface and a display, cause the device to: display a progress icon in a predefined area on the display, wherein the progress icon is configured to move in a first predefined direction on the display; provide content with the electronic device; indicate a current position within the content with the progress icon; while providing the content with the electronic device: detect a contact with the touch-sensitive surface at a location that corresponds to the progress icon; detect movement of the contact across the touch-sensitive surface to a location on the touch-sensitive surface that corresponds to a location on the display outside the predefined area that includes the progress icon, wherein movement of the contact comprises a first component of movement on the touch-sensitive surface in a direction corresponding to movement on the display parallel to the first predefined direction and a second component of movement on the touch-sensitive surface in a direction corresponding to movement on the display perpendicular to the first predefined direction; while continuing to detect the contact on the touch-sensitive surface, move the current position within the content at a scrubbing rate, wherein the scrubbing rate decreases as the second component of movement on the touch-sensitive surface increases.

In accordance with some embodiments, a graphical user interface on an electronic device with a touch-sensitive surface, a display, a memory, and one or more processors to execute one or more programs stored in the memory further includes a progress icon configured to move in a first predefined direction in a predefined area on the display; wherein: content is provided with the electronic device; a current position within the content is indicated with the progress icon; while providing the content with the electronic device: a contact is detected with the touch-sensitive surface at a location that corresponds to the progress icon; movement of the contact across the touch-sensitive surface to a location on the touch-sensitive surface that corresponds to a location on the display outside the predefined area that includes the progress icon is detected, wherein movement of the contact comprises a first component of movement on the touch-sensitive surface in a direction corresponding to movement on the display parallel to the first predefined direction and a second component of movement on the touch-sensitive surface in a direction corresponding to movement on the display perpendicular to the first predefined direction; while continuing to detect the contact on the touch-sensitive surface, the current position within the content is moved at a scrubbing rate, wherein the scrubbing rate decreases as the second component of movement on the touch-sensitive surface increases.

In accordance with some embodiments, an electronic device includes: a touch-sensitive surface; a display; means for displaying a progress icon in a predefined area on the display, wherein the progress icon is configured to move in a first predefined direction on the display; means for providing content with the electronic device; means for indicating a current position within the content with the progress icon; means for detecting a contact with the touch-sensitive surface at a location that corresponds to the progress icon while providing the content with the electronic device; means for detecting movement of the contact across the touch-sensitive surface to a location on the touch-sensitive surface that corresponds to a location on the display outside the predefined area that includes the progress icon while providing the content with the electronic device, wherein movement of the contact comprises a first component of movement on the touch-sensitive surface in a direction corresponding to movement on the display parallel to the first predefined direction and a second component of movement on the touch-sensitive surface in a direction corresponding to movement on the display perpendicular to the first predefined direction; means for moving the current position within the content at a scrubbing rate while continuing to detect the contact on the touch-sensitive surface, wherein the scrubbing rate decreases as the second component of movement on the touch-sensitive surface increases.

In accordance with some embodiments, a computer-implemented method is performed at an electronic device with a display and a touch-sensitive surface. The computer-implemented method includes: displaying a progress icon in a predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while detecting movement of the contact across the touch-sensitive surface: determining a current offset distance in accordance with a detected amount of the second component of movement of the contact; detecting a current first component of movement of the contact; in response to detecting the current first component of movement of the contact, moving the current position within the content at a scrubbing rate, wherein: the scrubbing rate decreases as the current offset distance increases, and the direction of movement of the current position within the content is in accordance with the direction of the current first component of movement of the contact.

In accordance with some embodiments, an electronic device includes a touch-sensitive surface, a display, one or more processors, memory, and one or more programs. The one or more programs are stored in the memory and configured to be executed by the one or more processors. The one or more programs include instructions for: displaying a progress icon in a predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while detecting movement of the contact across the touch-sensitive surface: determining a current offset distance in accordance with a detected amount of the second component of movement of the contact; detecting a current first component of movement of the contact; in response to detecting the current first component of movement of the contact, moving the current position within the content at a scrubbing rate, wherein: the scrubbing rate decreases as the current offset distance increases, and the direction of movement of the current position within the content is in accordance with the direction of the current first component of movement of the contact.

In accordance with some embodiments, a computer readable storage medium has stored therein instructions which when executed by an electronic device with a touch-sensitive surface and a display, cause the device to: display a progress icon in a predefined area on the display, wherein the progress icon is configured to move in a first predefined direction on the display; provide content with the electronic device; indicate a current position within the content with the progress icon; while providing the content with the electronic device: detect a contact with the touch-sensitive surface at a location that corresponds to the progress icon; detect movement of the contact across the touch-sensitive surface to a location on the touch-sensitive surface that corresponds to a location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while detecting movement of the contact across the touch-sensitive surface: determine a current offset distance in accordance with a detected amount of the second component of movement of the contact; detect a current first component of movement of the contact; in response to detecting the current first component of movement of the contact, move the current position within the content at a scrubbing rate, wherein: the scrubbing rate decreases as the current offset distance increases, and the direction of movement of the current position within the content is in accordance with the direction of the current first component of movement of the contact.

In accordance with some embodiments, a graphical user interface on an electronic device with a touch-sensitive surface, a display, a memory, and one or more processors to execute one or more programs stored in the memory further includes a progress icon configured to move in a first predefined direction in a predefined area on the display, wherein: content is provided with the electronic device; a current position is indicated within the content with the progress icon; while providing the content with the electronic device: a contact is detected with the touch-sensitive surface at a location that corresponds to the progress icon; movement of the contact across the touch-sensitive surface to a location on the touch-sensitive surface that corresponds to a location on the display outside the predefined area that includes the progress icon is detected, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while detecting movement of the contact across the touch-sensitive surface: a current offset distance is determined in accordance with a detected amount of the second component of movement of the contact; a current first component of movement of the contact is determined; in response to detecting the current first component of movement of the contact, the current position within the content is moved at a scrubbing rate, wherein: the scrubbing rate decreases as the current offset distance increases, and the direction of movement of the current position within the content is in accordance with the direction of the current first component of movement of the contact.

In accordance with some embodiments, an electronic device includes: a touch-sensitive surface; a display; means for displaying a progress icon in a predefined area on the display, wherein the progress icon is configured to move in a first predefined direction on the display; means for providing content with the electronic device; means for indicating a current position within the content with the progress icon; means for detecting a contact with the touch-sensitive surface at a location that corresponds to the progress icon while providing the content with the electronic device; means for detecting movement of the contact across the touch-sensitive surface to a location on the touch-sensitive surface that corresponds to a location on the display outside the predefined area that includes the progress icon while providing the content with the electronic device, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; means for determining a current offset distance in accordance with a detected amount of the second component of movement of the contact while detecting movement of the contact across the touch-sensitive surface;

means for detecting a current first component of movement of the contact while detecting movement of the contact across the touch-sensitive surface; means responsive to detecting the current first component of movement of the contact, for moving the current position within the content at a scrubbing rate while detecting movement of the contact across the touch-sensitive surface, wherein: the scrubbing rate decreases as the current offset distance increases, and the direction of movement of the current position within the content is in accordance with the direction of the current first component of movement of the contact.

In accordance with some embodiments, a computer-implemented method is performed at an electronic device with a display and a touch-sensitive surface. The computer-implemented method includes: displaying a progress icon in a first predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while the contact is located in an area on the touch-sensitive surface that corresponds to the second predefined area on the display: detecting a current first component of movement of the contact; in response to detecting the current first component of movement of the contact, moving the current position within the content at a first scrubbing rate, wherein the direction of movement of the current position within the content is in accordance with the direction of the current first component of movement of the contact; detecting movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, while the contact is located in an area on the touch-sensitive surface that corresponds to the third predefined area on the display: detecting a current first component of movement of the contact; in response to detecting the current first component of movement of the contact, moving the current position within the content at a second scrubbing rate, wherein: the direction of movement of the current position within the content is in accordance with the direction of the current first component of movement of the contact; and the second scrubbing rate is less than the first scrubbing rate.

In accordance with some embodiments, an electronic device includes a touch-sensitive surface, a display, one or more processors, memory, and one or more programs. The one or more programs are stored in the memory and configured to be executed by the one or more processors. The one or more programs include instructions for: displaying a progress icon in a first predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while the contact is located in an area on the touch-sensitive surface that corresponds to the second predefined area on the display: detecting a current first component of movement of the contact; in response to detecting the current first component of movement of the contact, moving the current position within the content at a first scrubbing rate, wherein the direction of movement of the current position within the content is in accordance with the direction of the current first component of movement of the contact; detecting movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, while the contact is located in an area on the touch-sensitive surface that corresponds to the third predefined area on the display: detecting a current first component of movement of the contact; in response to detecting the current first component of movement of the contact, moving the current position within the content at a second scrubbing rate, wherein: the direction of movement of the current position within the content is in accordance with the direction of the current first component of movement of the contact; and the second scrubbing rate is less than the first scrubbing rate.

In accordance with some embodiments, a computer readable storage medium has stored therein instructions which when executed by an electronic device with a touch-sensitive surface and a display, cause the device to: display a progress icon in a first predefined area on the display, wherein the progress icon is configured to move in a first predefined direction on the display; provide content with the electronic device; indicate a current position within the content with the progress icon; while providing the content with the electronic device: detect a contact with the touch-sensitive surface at a location that corresponds to the progress icon; detect movement of the contact across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while the contact is located in an area on the touch-sensitive surface that corresponds to the second predefined area on the display: detect a current first component of movement of the contact; in response to detecting the current first component of movement of the contact, move the current position within the content at a first scrubbing rate, wherein the direction of movement of the current position within the content is in accordance with the direction of the current first component of movement of the contact; detect movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, while the contact is located in an area on the touch-sensitive surface that corresponds to the third predefined area on the display: detect a current first component of movement of the contact; in response to detecting the current first component of movement of the contact, move the current position within the content at a second scrubbing rate, wherein: the direction of movement of the current position within the content is in accordance with the direction of the current first component of movement of the contact; and the second scrubbing rate is less than the first scrubbing rate.

In accordance with some embodiments, a graphical user interface on an electronic device with a touch-sensitive surface, a display, a memory, and one or more processors to execute one or more programs stored in the memory includes a progress icon configured to move in a first predefined direction in a first predefined area on the display; wherein: content is provided with the electronic device; a current position is indicated within the content with the progress icon; while providing the content with the electronic device: a contact is detected with the touch-sensitive surface at a location that corresponds to the progress icon; movement of the contact is detected across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; while the contact is located in an area on the touch-sensitive surface that corresponds to the second predefined area on the display: a current first component of movement of the contact is detected; in response to detecting the current first component of movement of the contact, the current position within the content at a first scrubbing rate is moved, wherein the direction of movement of the current position within the content is in accordance with the direction of the current first component of movement of the contact; movement of the contact across the touch-sensitive surface to a location on the touch-sensitive surface that corresponds to a third predefined area on the display outside the first predefined area and the second predefined area is detected, wherein the progress icon is farther from the third predefined area than from the second predefined area; and, while the contact is located in an area on the touch-sensitive surface that corresponds to the third predefined area on the display: a current first component of movement of the contact is detected; in response to detecting the current first component of movement of the contact, the current position within the content at a second scrubbing rate is moved, wherein: the direction of movement of the current position within the content is in accordance with the direction of the current first component of movement of the contact; and the second scrubbing rate is less than the first scrubbing rate.

In accordance with some embodiments, an electronic device includes: a touch-sensitive surface; a display; means for displaying a progress icon in a first predefined area on the display, wherein the progress icon is configured to move in a first predefined direction on the display; means for providing content with the electronic device; means for indicating a current position within the content with the progress icon; means for detecting a contact with the touch-sensitive surface at a location that corresponds to the progress icon while providing the content with the electronic device; means for detecting movement of the contact across the touch-sensitive surface to a location on the touch-sensitive surface that corresponds to a second predefined area on the display outside the first predefined area while providing the content with the electronic device, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction, wherein the first component of movement of the contact comprises a direction and a speed; means for detecting a current first component of movement of the contact while the contact is located in an area on the touch-sensitive surface that corresponds to the second predefined area on the display; means, responsive to detecting the current first component of movement of the contact, for moving the current position within the content at a first scrubbing rate, wherein the direction of movement of the current position within the content is in accordance with the direction of the current first component of movement of the contact; means for detecting movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, means for detecting a current first component of movement of the contact while the contact is located in an area on the touch-sensitive surface that corresponds to the third predefined area on the display; means, responsive to detecting the current first component of movement of the contact while the contact is located in an area on the touch-sensitive surface that corresponds to the third predefined area on the display, means for moving the current position within the content at a second scrubbing rate, wherein: the direction of movement of the current position within the content is in accordance with the direction of the current first component of movement of the contact; and the second scrubbing rate is less than the first scrubbing rate.

In accordance with some embodiments, a computer-implemented method is performed at an electronic device with a display and a touch-sensitive surface. The computer-implemented method includes: displaying a progress icon in a predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a first location on the touch-sensitive surface that corresponds to a first location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction; while the contact is located at the first location on the touch-sensitive surface: determining a first current offset distance in accordance with a detected amount of the second component of movement of the contact; moving the current position within the content at a first scrubbing rate; detecting movement of the contact across the touch-sensitive surface to a second location on the touch-sensitive surface that corresponds to a second location on the display outside the predefined area that includes the progress icon; and while the contact is located at the second location on the touch-sensitive surface: determining a second current offset distance in accordance with a detected amount of the second component of movement of the contact; and moving the current position within the content at a second scrubbing rate, wherein: the second scrubbing rate is less than the first scrubbing rate when the second current offset distance is greater than the first current offset distance, and the second scrubbing rate is greater than the first scrubbing rate when the second current offset distance is less than the first current offset distance.

In accordance with some embodiments, an electronic device includes a touch-sensitive surface, a display, one or more processors, memory, and one or more programs. The one or more programs are stored in the memory and configured to be executed by the one or more processors. The one or more programs include instructions for: displaying a progress icon in a predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a first location on the touch-sensitive surface that corresponds to a first location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction; while the contact is located at the first location on the touch-sensitive surface: determining a first current offset distance in accordance with a detected amount of the second component of movement of the contact; and moving the current position within the content at a first scrubbing rate; detecting movement of the contact across the touch-sensitive surface to a second location on the touch-sensitive surface that corresponds to a second location on the display outside the predefined area that includes the progress icon; and while the contact is located at the second location on the touch-sensitive surface: determining a second current offset distance in accordance with a detected amount of the second component of movement of the contact; and moving the current position within the content at a second scrubbing rate, wherein: the second scrubbing rate is less than the first scrubbing rate when the second current offset distance is greater than the first current offset distance, and the second scrubbing rate is greater than the first scrubbing rate when the second current offset distance is less than the first current offset distance.

In accordance with some embodiments, a computer readable storage medium has stored therein instructions which when executed by an electronic device with a touch-sensitive surface and a display, cause the device to: display a progress icon in a predefined area on the display, wherein the progress icon is configured to move in a first predefined direction on the display; provide content with the electronic device; indicate a current position within the content with the progress icon; while providing the content with the electronic device: detect a contact with the touch-sensitive surface at a location that corresponds to the progress icon; detect movement of the contact across the touch-sensitive surface to a first location on the touch-sensitive surface that corresponds to a first location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction; while the contact is located at the first location on the touch-sensitive surface: determine a first current offset distance in accordance with a detected amount of the second component of movement of the contact; and move the current position within the content at a first scrubbing rate; detect movement of the contact across the touch-sensitive surface to a second location on the touch-sensitive surface that corresponds to a second location on the display outside the predefined area that includes the progress icon; and while the contact is located at the second location on the touch-sensitive surface: determine a second current offset distance in accordance with a detected amount of the second component of movement of the contact; and move the current position within the content at a second scrubbing rate, wherein: the second scrubbing rate is less than the first scrubbing rate when the second current offset distance is greater than the first current offset distance, and the second scrubbing rate is greater than the first scrubbing rate when the second current offset distance is less than the first current offset distance.

In accordance with some embodiments, a graphical user interface on an electronic device with a touch-sensitive surface, a display, a memory, and one or more processors to execute one or more programs stored in the memory includes a progress icon configured to move in a first predefined direction in a predefined area on the display; wherein; content is provided with the electronic device; a current position is indicated within the content with the progress icon; while providing the content with the electronic device: a contact is detected with the touch-sensitive surface at a location that corresponds to the progress icon; movement of the contact is detected across the touch-sensitive surface to a first location on the touch-sensitive surface that corresponds to a first location on the display outside the predefined area that includes the progress icon, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction; while the contact is located at the first location on the touch-sensitive surface: a first current offset distance in accordance with a detected amount of the second component of movement of the contact is determined; and the current position within the content is moved at a first scrubbing rate; movement of the contact across the touch-sensitive surface to a second location on the touch-sensitive surface that corresponds to a second location on the display outside the predefined area that includes the progress icon is detected; and while the contact is located at the second location on the touch-sensitive surface: a second current offset distance is determined in accordance with a detected amount of the second component of movement of the contact; and the current position within the content is moved at a second scrubbing rate, wherein: the second scrubbing rate is less than the first scrubbing rate when the second current offset distance is greater than the first current offset distance, and the second scrubbing rate is greater than the first scrubbing rate when the second current offset distance is less than the first current offset distance.

In accordance with some embodiments, an electronic device includes: a touch-sensitive surface; a display; means for displaying a progress icon in a predefined area on the display, wherein the progress icon is configured to move in a first predefined direction on the display; means for providing content with the electronic device; means for indicating a current position within the content with the progress icon; means for detecting a contact with the touch-sensitive surface at a location that corresponds to the progress icon while providing the content with the electronic device; means for detecting movement of the contact across the touch-sensitive surface to a first location on the touch-sensitive surface that corresponds to a first location on the display outside the predefined area that includes the progress icon while providing the content with the electronic device, wherein movement of the contact comprises a first component of movement of the contact on the touch-sensitive surface in a direction corresponding to movement on the display parallel to the first predefined direction and a second component of movement of the contact on the touch-sensitive surface in a direction corresponding to movement on the display perpendicular to the first predefined direction; means for determining a first current offset distance in accordance with a detected amount of the second component of movement of the contact while the contact is located at the first location on the touch-sensitive surface; and means for moving the current position within the content at a first scrubbing rate while the contact is located at the first location on the touch-sensitive surface; means for detecting movement of the contact across the touch-sensitive surface to a second location on the touch-sensitive surface that corresponds to a second location on the display outside the predefined area that includes the progress icon; and means for determining a second current offset distance in accordance with a detected amount of the second component of movement of the contact while the contact is located at the second location on the touch-sensitive surface; and means for moving the current position within the content at a second scrubbing rate while the contact is located at the second location on the touch-sensitive surface, wherein: the second scrubbing rate is less than the first scrubbing rate when the second current offset distance is greater than the first current offset distance, and the second scrubbing rate is greater than the first scrubbing rate when the second current offset distance is less than the first current offset distance.

In accordance with some embodiments, a computer-implemented method is performed at an electronic device with a display and a touch-sensitive surface. The computer-implemented method includes: displaying a progress icon in a first predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction; while the contact is located in an area on the touch-sensitive surface that corresponds to the second predefined area on the display, moving the current position within the content at a first scrubbing rate; detecting movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, while the contact is located in an area on the touch-sensitive surface that corresponds to the third predefined area on the display, moving the current position within the content at a second scrubbing rate, wherein the second scrubbing rate is less than the first scrubbing rate.

In accordance with some embodiments, an electronic device includes a touch-sensitive surface, a display, one or more processors, memory, and one or more programs. The one or more programs are stored in the memory and configured to be executed by the one or more processors. The one or more programs include instructions for: displaying a progress icon in a first predefined area on the display, wherein the progress icon is configured to move in a first predefined direction on the display; providing content with the electronic device; indicating a current position within the content with the progress icon; while providing the content with the electronic device: detecting a contact with the touch-sensitive surface at a location that corresponds to the progress icon; detecting movement of the contact across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction; while the contact is located in an area on the touch-sensitive surface that corresponds to the second predefined area on the display, moving the current position within the content at a first scrubbing rate; detecting movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, while the contact is located in an area on the touch-sensitive surface that corresponds to the third predefined area on the display, moving the current position within the content at a second scrubbing rate, wherein the second scrubbing rate is less than the first scrubbing rate.

In accordance with some embodiments, a computer readable storage medium has stored therein instructions which when executed by an electronic device with a touch-sensitive surface and a display, cause the device to: display a progress icon in a first predefined area on the display, wherein the progress icon is configured to move in a first predefined direction on the display; provide content with the electronic device; indicate a current position within the content with the progress icon; while providing the content with the electronic device: detect a contact with the touch-sensitive surface at a location that corresponds to the progress icon; detect movement of the contact across the touch-sensitive surface to a location on the touch-sensitive surface that corresponds to a second predefined area on the display outside the first predefined area, wherein movement of the contact comprises a first component of movement of the contact on the touch-sensitive surface in a direction corresponding to movement on the display parallel to the first predefined direction; while the contact is located in an area on the touch-sensitive surface that corresponds to the second predefined area on the display, move the current position within the content at a first scrubbing rate; detect movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, while the contact is located in an area on the touch-sensitive surface that corresponds to the third predefined area on the display, move the current position within the content at a second scrubbing rate, wherein the second scrubbing rate is less than the first scrubbing rate.

In accordance with some embodiments, a graphical user interface on an electronic device with a touch-sensitive surface, a display, a memory, and one or more processors to execute one or more programs stored in the memory includes: a progress icon configured to move in a first predefined direction in a first predefined area on the display; wherein: content is provided with the electronic device; a current position is indicated within the content with the progress icon; while providing the content with the electronic device: a contact is detected with the touch-sensitive surface at a location that corresponds to the progress icon; movement of the contact across the touch-sensitive surface to a location on the touch-sensitive surface that corresponds to a second predefined area on the display outside the first predefined area is detected, wherein movement of the contact comprises a first component of movement of the contact on the touch-sensitive surface in a direction corresponding to movement on the display parallel to the first predefined direction; while the contact is located in an area on the touch-sensitive surface that corresponds to the second predefined area on the display, the current position within the content is moved at a first scrubbing rate; movement of the contact across the touch-sensitive surface to a location on the touch-sensitive surface that corresponds to a third predefined area on the display outside the first predefined area and the second predefined area is detected, wherein the progress icon is farther from the third predefined area than from the second predefined area; and, while the contact is located in an area on the touch-sensitive surface that corresponds to the third predefined area on the display, the current position within the content is moved at a second scrubbing rate, wherein the second scrubbing rate is less than the first scrubbing rate.

In accordance with some embodiments, an electronic device includes: a touch-sensitive surface; a display; means for displaying a progress icon in a first predefined area on the display, wherein the progress icon is configured to move in a first predefined direction on the display; means for providing content with the electronic device; means for indicating a current position within the content with the progress icon; means for detecting a contact with the touch-sensitive surface at a location that corresponds to the progress icon while providing the content with the electronic device; means for detecting movement of the contact across the touch-sensitive surface to a location on the touch-sensitive surface that corresponds to a second predefined area on the display outside the first predefined area while providing the content with the electronic device, wherein movement of the contact comprises a first component of movement of the contact on the touch-sensitive surface in a direction corresponding to movement on the display parallel to the first predefined direction; means for moving the current position within the content at a first scrubbing rate while the contact is located in an area on the touch-sensitive surface that corresponds to the second predefined area on the display; means for detecting movement of the contact across the touch-sensitive surface to a location on the touch-sensitive surface that corresponds to a third predefined area on the display outside the first predefined area and the second predefined area, wherein the progress icon is farther from the third predefined area than from the second predefined area; and, means for moving the current position within the content at a second scrubbing rate while the contact is located in an area on the touch-sensitive surface that corresponds to the third predefined area on the display, wherein the second scrubbing rate is less than the first scrubbing rate.

At any instant in time, a current location of the contact on the touch-sensitive surface corresponds to a current location on the display. The current location on the display will have a corresponding current total distance to the progress icon on the display. In some embodiments, the scrubbing rate decreases as the current total distance to the progress icon increases, rather than having the scrubbing rate decrease as the second component of movement on the touch-sensitive surface or a current offset distance increases.

In accordance with some embodiments, a computer-implemented method is performed at an electronic device with a display and a touch-sensitive surface. The computer-implemented method includes providing content with the electronic device; while providing the content with the electronic device: displaying a progress icon in a predefined area on the display, wherein the progress icon indicates a current position within the content and is configured to move within a predefined path on the display, wherein the predefined path includes two endpoints and has a primary axis; detecting a contact with the touch-sensitive surface, movement of the contact, and a scrubbing component of the movement of the contact that corresponds to movement on the display parallel to the primary axis of the predefined path; moving a current position of the progress icon in accordance with the scrubbing component of the movement of the contact, and moving the current position in the content in accordance with the current position of the progress icon; detecting a pause in movement of the contact at a contact pause location that corresponds to an icon pause location of the progress icon; in response to detecting the pause in movement of the contact, determining positions of two detailed scrubbing boundaries on the display, wherein the detailed scrubbing boundaries are determined at least in part based on a predefined distance from the icon pause location; after determining the positions of the two detailed scrubbing boundaries, detecting movement of the contact from the contact pause location to a current contact location, including detecting the scrubbing component of movement of the contact from the contact pause location, wherein the scrubbing component corresponds to an uncompensated scrubbing distance on the display; and in response to detecting the scrubbing component: when the uncompensated scrubbing distance corresponds to a position on the display between the two detailed scrubbing boundaries and between the two endpoints of the predefined path, moving the current position of the progress icon by a distance less than the uncompensated scrubbing distance; and when the uncompensated scrubbing distance corresponds to a position on the display outside the two detailed scrubbing boundaries and between the two endpoints of the predefined path, moving the current position of the progress icon by a distance equal to the uncompensated scrubbing distance.

In accordance with some embodiments, a graphical user interface on an electronic device with a display and a touch-sensitive surface, includes a progress icon configured to move within a predefined path on the display in a predefined area on the display, the predefined path including two endpoints and a primary axis; wherein: content is provided with the electronic device; while providing the content with the electronic device: the progress icon indicates a current position within the content; a contact with the touch-sensitive surface is detected, movement of the contact is detected, and a scrubbing component of the movement of the contact that corresponds to movement on the display parallel to the primary axis of the predefined path is detected; a current position of the progress icon is moved in accordance with the scrubbing component of the movement of the contact, and the current position in the content is moved in accordance with the current position of the progress icon; a pause in movement of the contact at a contact pause location that corresponds to an icon pause location of the progress icon is detected; in response to detection of the pause in movement of the contact, positions of two detailed scrubbing boundaries on the display are determined, wherein the detailed scrubbing boundaries are determined at least in part based on a predefined distance from the icon pause location; after determination of the positions of the two detailed scrubbing boundaries, movement of the contact from the contact pause location to a current contact location is detected, including detection of the scrubbing component of movement of the contact from the contact pause location, wherein the scrubbing component corresponds to an uncompensated scrubbing distance on the display; and in response to detection of the scrubbing component: when the uncompensated scrubbing distance corresponds to a position on the display between the two detailed scrubbing boundaries and between the two endpoints of the predefined path, the current position of the progress icon is moved a distance less than the uncompensated scrubbing distance; and when the uncompensated scrubbing distance corresponds to a position on the display outside the two detailed scrubbing boundaries and between the two endpoints of the predefined path, the current position of the progress icon is moved a distance equal to the uncompensated scrubbing distance.

In accordance with some embodiments, an electronic device, comprises a display; a touch-sensitive surface; one or more processors; memory; and one or more programs, wherein the one or more programs are stored in the memory and configured to be executed by the one or more processors, the one or more programs including instructions for: providing content with the electronic device; while providing the content with the electronic device: displaying a progress icon in a predefined area on the display, wherein the progress icon indicates a current position within the content and is configured to move within a predefined path on the display, wherein the predefined path includes two endpoints and has a primary axis; detecting a contact with the touch-sensitive surface, movement of the contact, and a scrubbing component of the movement of the contact that corresponds to movement on the display parallel to the primary axis of the predefined path; moving a current position of the progress icon in accordance with the scrubbing component of the movement of the contact, and moving the current position in the content in accordance with the current position of the progress icon; detecting a pause in movement of the contact at a contact pause location that corresponds to an icon pause location of the progress icon; responding to detection of the pause in movement of the contact, by determining positions of two detailed scrubbing boundaries on the display, wherein the detailed scrubbing boundaries are determined at least in part based on a predefined distance from the icon pause location; detecting movement of the contact from the contact pause location to a current contact location after determining the positions of the two detailed scrubbing boundaries, including detecting the scrubbing component of movement of the contact from the contact pause location, wherein the scrubbing component corresponds to an uncompensated scrubbing distance on the display; and responding to detection of the scrubbing component by: when the uncompensated scrubbing distance corresponds to a position on the display between the two detailed scrubbing boundaries and between the two endpoints of the predefined path, moving the current position of the progress icon by a distance less than the uncompensated scrubbing distance; and when the uncompensated scrubbing distance corresponds to a position on the display outside the two detailed scrubbing boundaries and between the two endpoints of the predefined path, moving the current position of the progress icon by a distance equal to the uncompensated scrubbing distance.

In accordance with some embodiments, a computer readable storage medium storing one or more programs, the one or more programs comprising instructions, which when executed by an electronic device with a display and a touch-sensitive surface, causes the device to: provide content with the electronic device; and while providing the content with the electronic device: display a progress icon in a predefined area on the display, wherein the progress icon indicates a current position within the content and is configured to move within a predefined path on the display, wherein the predefined path includes two endpoints and has a primary axis; detect a contact with the touch-sensitive surface, movement of the contact, and a scrubbing component of the movement of the contact that corresponds to movement on the display parallel to the primary axis of the predefined path; move a current position of the progress icon in accordance with the scrubbing component of the movement of the contact, and move the current position in the content in accordance with the current position of the progress icon; detect a pause in movement of the contact at a contact pause location that corresponds to an icon pause location of the progress icon; respond to detecting the pause in movement of the contact, by determining positions of two detailed scrubbing boundaries on the display, wherein the determination of detailed scrubbing boundaries are based least in part on a predefined distance from the icon pause location; detect movement of the contact from the contact pause location to a current contact location after determining the positions of the two detailed scrubbing boundaries, including detecting the scrubbing component of movement of the contact from the contact pause location, wherein the scrubbing component corresponds to an uncompensated scrubbing distance on the display; and respond to detecting the scrubbing component by: when the uncompensated scrubbing distance corresponds to a position on the display between the two detailed scrubbing boundaries and between the two endpoints of the predefined path, moving the current position of the progress icon by a distance less than the uncompensated scrubbing distance; and when the uncompensated scrubbing distance corresponds to a position on the display outside the two detailed scrubbing boundaries and between the two endpoints of the predefined path, moving the current position of the progress icon by a distance equal to the uncompensated scrubbing distance.

In accordance with some embodiments, an electronic device, includes a display; a touch-sensitive surface; means for displaying a progress icon in a predefined area on the display, wherein the progress icon indicates a current position within the content and is configured to move within a predefined path on the display, wherein the predefined path includes two endpoints and has a primary axis; means for detecting a contact with the touch-sensitive surface, movement of the contact, and a scrubbing component of the movement of the contact that corresponds to movement on the display parallel to the primary axis of the predefined path; means for moving a current position of the progress icon in accordance with the scrubbing component of the movement of the contact, and moving the current position in the content in accordance with the current position of the progress icon; means for detecting a pause in movement of the contact at a contact pause location that corresponds to an icon pause location of the progress icon; means, responsive to detection of the pause in movement of the contact, for determining positions of two detailed scrubbing boundaries on the display, wherein the detailed scrubbing boundaries are determined at least in part based on a predefined distance from the icon pause location; means for detecting movement of the contact from the contact pause location to a current contact location after determining the positions of the two detailed scrubbing boundaries, including detecting the scrubbing component of movement of the contact from the contact pause location, wherein the scrubbing component corresponds to an uncompensated scrubbing distance on the display; and means, responsive to detection of the scrubbing component, for: when the uncompensated scrubbing distance corresponds to a position on the display between the two detailed scrubbing boundaries and between the two endpoints of the predefined path, moving the current position of the progress icon by a distance less than the uncompensated scrubbing distance; and when the uncompensated scrubbing distance corresponds to a position on the display outside the two detailed scrubbing boundaries and between the two endpoints of the predefined path, moving the current position of the progress icon by a distance equal to the uncompensated scrubbing distance.

In accordance with some embodiments, a computer-implemented method is performed at an electronic device with a display and a touch-sensitive surface. The computer-implemented method includes displaying a progress icon in a predefined area on the display, wherein the progress icon is configured to move in a first predefined direction on the display; providing a first piece of content with the electronic device; indicating a current position within the first piece of content with the progress icon; displaying a multi-purpose content navigation icon; while providing the first piece of content with the electronic device: detecting a first contact with the touch-sensitive surface at a first location that corresponds to the multi-purpose content navigation icon for at least a predetermined time period; while continuing to detect the contact at the first location, moving the current position within the first piece of content at a predefined scrubbing rate; detecting movement of the contact, wherein movement of the contact comprises a first component of movement on the touch-sensitive surface in a direction that corresponds to movement on the display parallel to the first predefined direction; and in response to detecting the movement of the contact, moving the current position within the first piece of content at a variable scrubbing rate, wherein the variable scrubbing rate varies monotonically as the first component of movement on the touch-sensitive surface increases In accordance with some embodiments, a graphical user interface on an electronic device with a display and a touch-sensitive surface, includes: a progress icon configured to move in a first predefined direction in a first predefined area on the display; a multi-purpose content navigation icon; wherein: a first piece of content is provided with the electronic device; a current position within the first piece of content is indicated with the progress icon; while providing the first piece of content with the electronic device: a first contact with the touch-sensitive surface is detected at a first location that corresponds to the multi-purpose content navigation icon for at least a predetermined time period; while continuing to detect the contact at the first location, the current position within the first piece of content is moved at a predefined scrubbing rate; movement of the contact is detected, wherein movement of the contact comprises a first component of movement on the touch-sensitive surface in a direction that corresponds to movement on the display parallel to the first predefined direction; and in response to detection of the movement of the contact the current position within the first piece of content is moved at a variable scrubbing rate, wherein the variable scrubbing rate varies monotonically as the first component of movement on the touch-sensitive surface increases.

In accordance with some embodiments, an electronic device, includes: a display; a touch-sensitive surface; one or more processors; memory; and one or more programs, wherein the one or more programs are stored in the memory and configured to be executed by the one or more processors, the one or more programs including instructions for: displaying a progress icon in a predefined area on the display, wherein the progress icon is configured to move in a first predefined direction on the display; providing a first piece of content with the electronic device; indicating a current position within the first piece of content with the progress icon; displaying a multi-purpose content navigation icon; while providing the first piece of content with the electronic device: detecting a first contact with the touch-sensitive surface at a first location that corresponds to the multi-purpose content navigation icon for at least a predetermined time period; while continuing to detect the contact at the first location, moving the current position within the first piece of content at a predefined scrubbing rate; detecting movement of the contact, wherein movement of the contact comprises a first component of movement on the touch-sensitive surface in a direction that corresponds to movement on the display parallel to the first predefined direction; and responding to detecting the movement of the contact by moving the current position within the first piece of content at a variable scrubbing rate, wherein the variable scrubbing rate varies monotonically as the first component of movement on the touch-sensitive surface increases.

In accordance with some embodiments, a computer readable storage medium storing one or more programs, the one or more programs comprising instructions, which when executed by an electronic device with a display and a touch-sensitive surface, causes the device to: display a progress icon in a predefined area on the display, wherein the progress icon is configured to move in a first predefined direction on the display; provide a first piece of content with the electronic device; indicate a current position within the first piece of content with the progress icon; display a multi-purpose content navigation icon; while providing the first piece of content with the electronic device: detect a first contact with the touch-sensitive surface at a first location that corresponds to the multi-purpose content navigation icon for at least a predetermined time period; while continuing to detect the contact at the first location, move the current position within the first piece of content at a predefined scrubbing rate; detect movement of the contact, wherein movement of the contact comprises a first component of movement on the touch-sensitive surface in a direction that corresponds to movement on the display parallel to the first predefined direction; and respond to detecting the movement of the contact by moving the current position within the first piece of content at a variable scrubbing rate, wherein the variable scrubbing rate varies monotonically as the first component of movement on the touch-sensitive surface increases.

In accordance with some embodiments, an electronic device, includes a display; a touch-sensitive surface; means for displaying a progress icon in a predefined area on the display, wherein the progress icon is configured to move in a first predefined direction on the display; means for providing a first piece of content with the electronic device; means for indicating a current position within the first piece of content with the progress icon; means for displaying a multi-purpose content navigation icon; while providing the first piece of content with the electronic device: means for detecting a first contact with the touch-sensitive surface at a first location that corresponds to the multi-purpose content navigation icon for at least a predetermined time period; means for, while continuing to detect the contact at the first location, moving the current position within the first piece of content at a predefined scrubbing rate; means for detecting movement of the contact, wherein movement of the contact comprises a first component of movement on the touch-sensitive surface in a direction that corresponds to movement on the display parallel to the first predefined direction; and means responsive to detecting the movement of the contact, for moving the current position within the first piece of content at a variable scrubbing rate, wherein the variable scrubbing rate varies monotonically as the first component of movement on the touch-sensitive surface increases.

Thus, electronic devices with touch-sensitive surfaces are provided with faster, more efficient methods and interfaces for scrubbing through content, thereby increasing the effectiveness, efficiency, and user satisfaction with such devices. Such methods and interfaces may complement or replace conventional methods for scrolling content.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
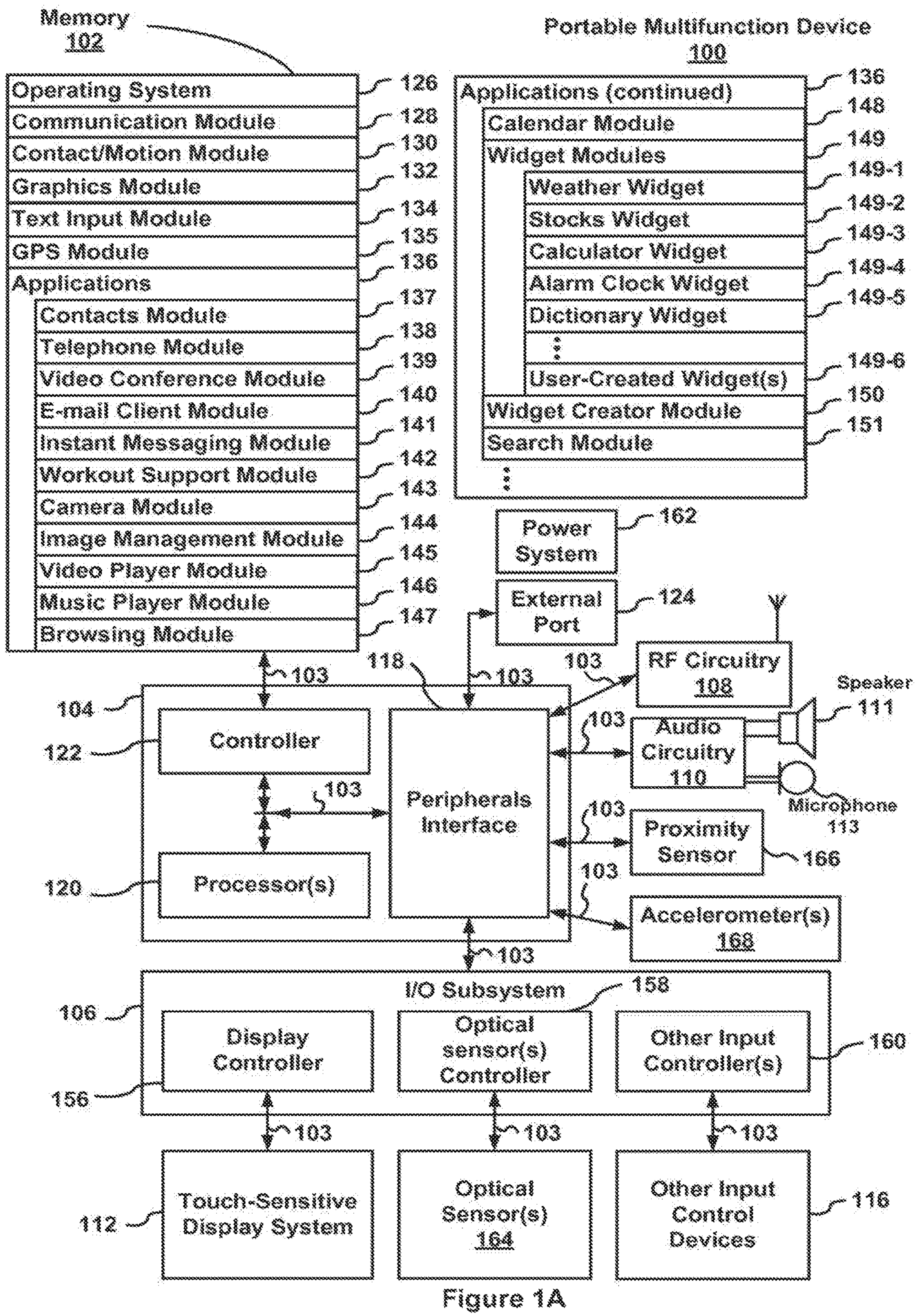
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Computer, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
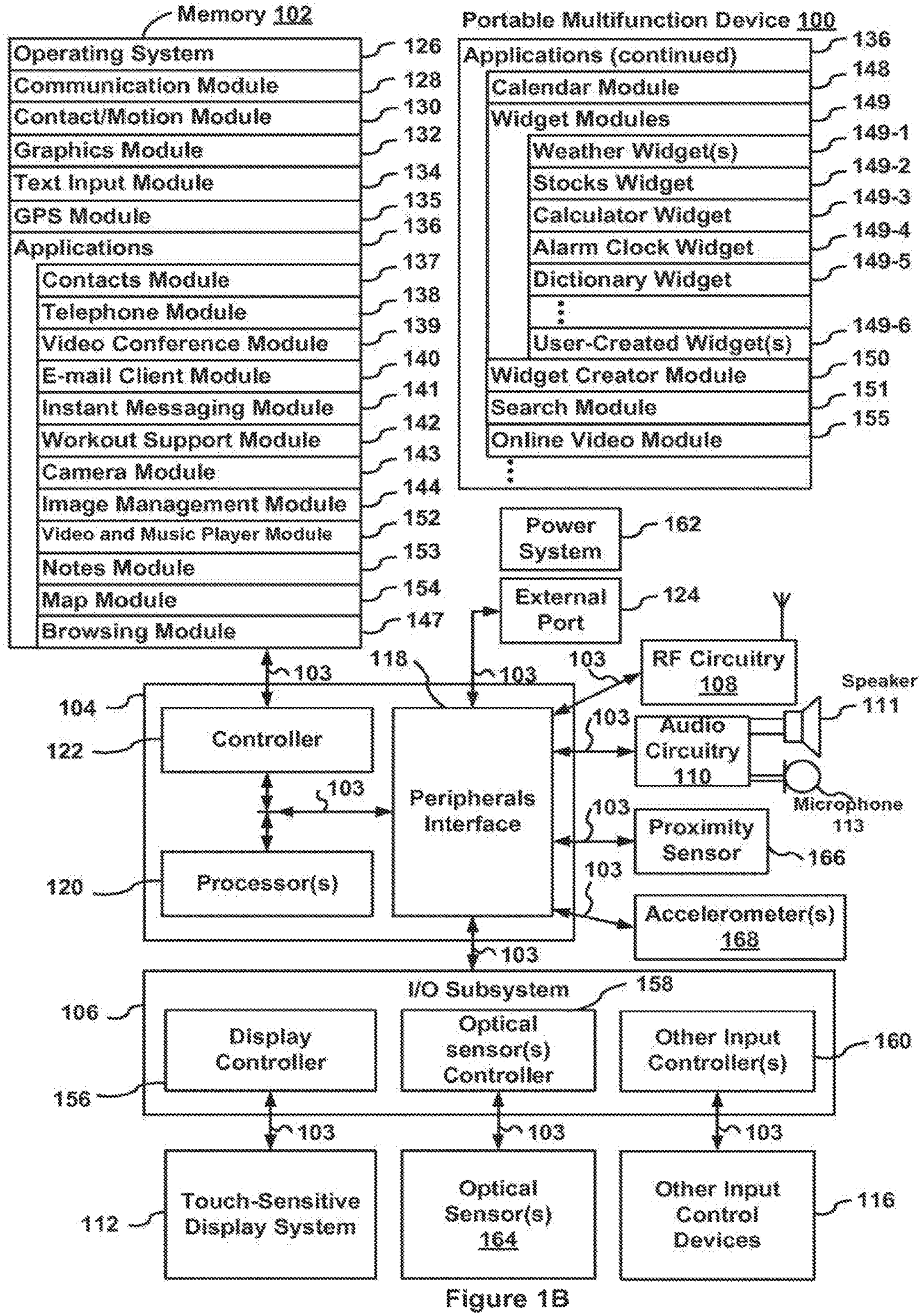

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

In some embodiments, the contact/motion module 130 (FIG. 3) detects finger gestures, and implements variable rate scrubbing for positioning a current position in content being displayed or played on the device in accordance with the position and/or movement of a contact on a touch sensitive surface of the device. Variable rate scrubbing is described below with reference to FIGS. 5A-5RR and flow diagrams in FIGS. 6A-6D, 7A-7E, 8A-8G, 9A-9G and 10A-10G. In some embodiments, variable rate scrubbing is implemented in one or more content players, such a video player module 145 and/or music player module 146.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
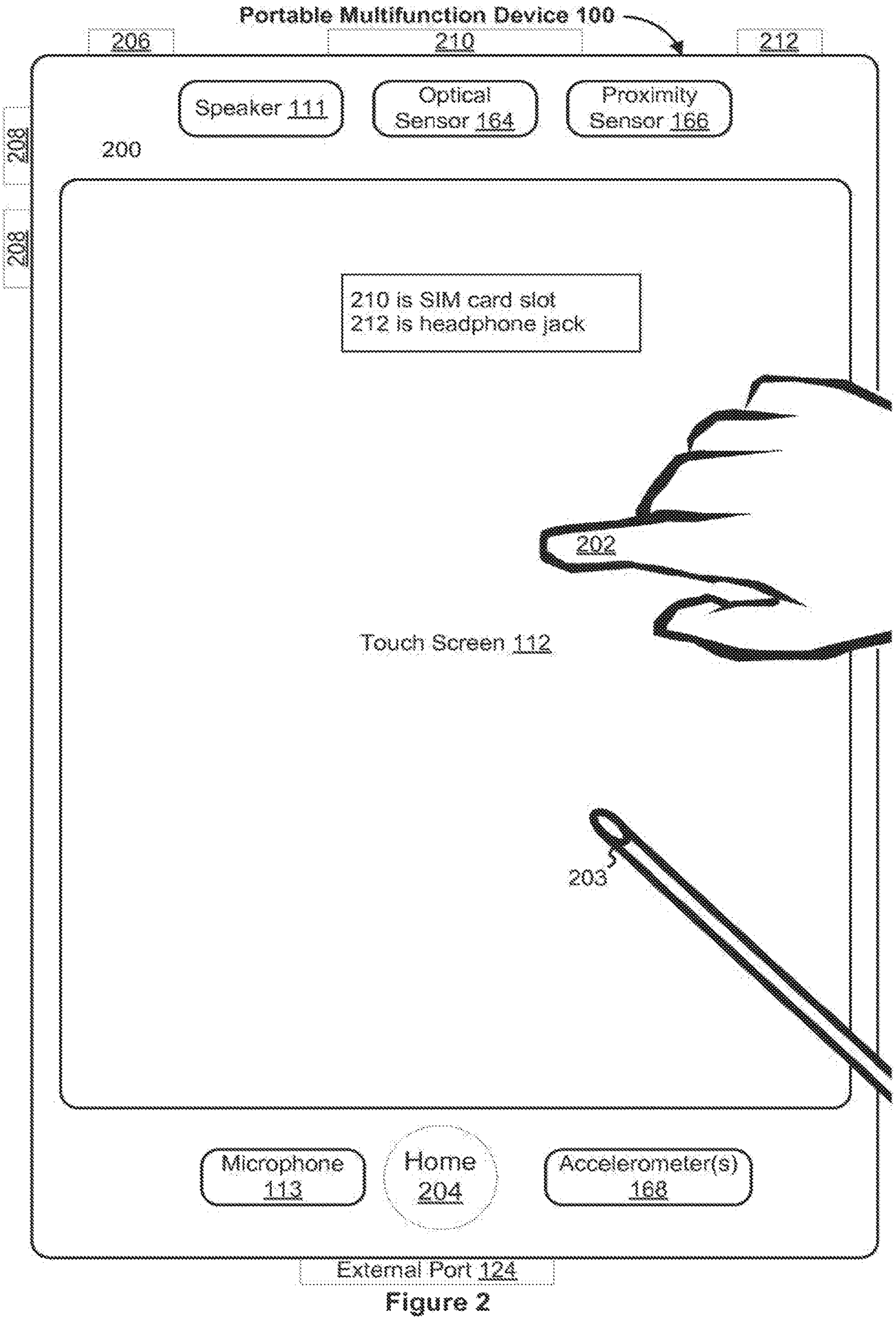
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
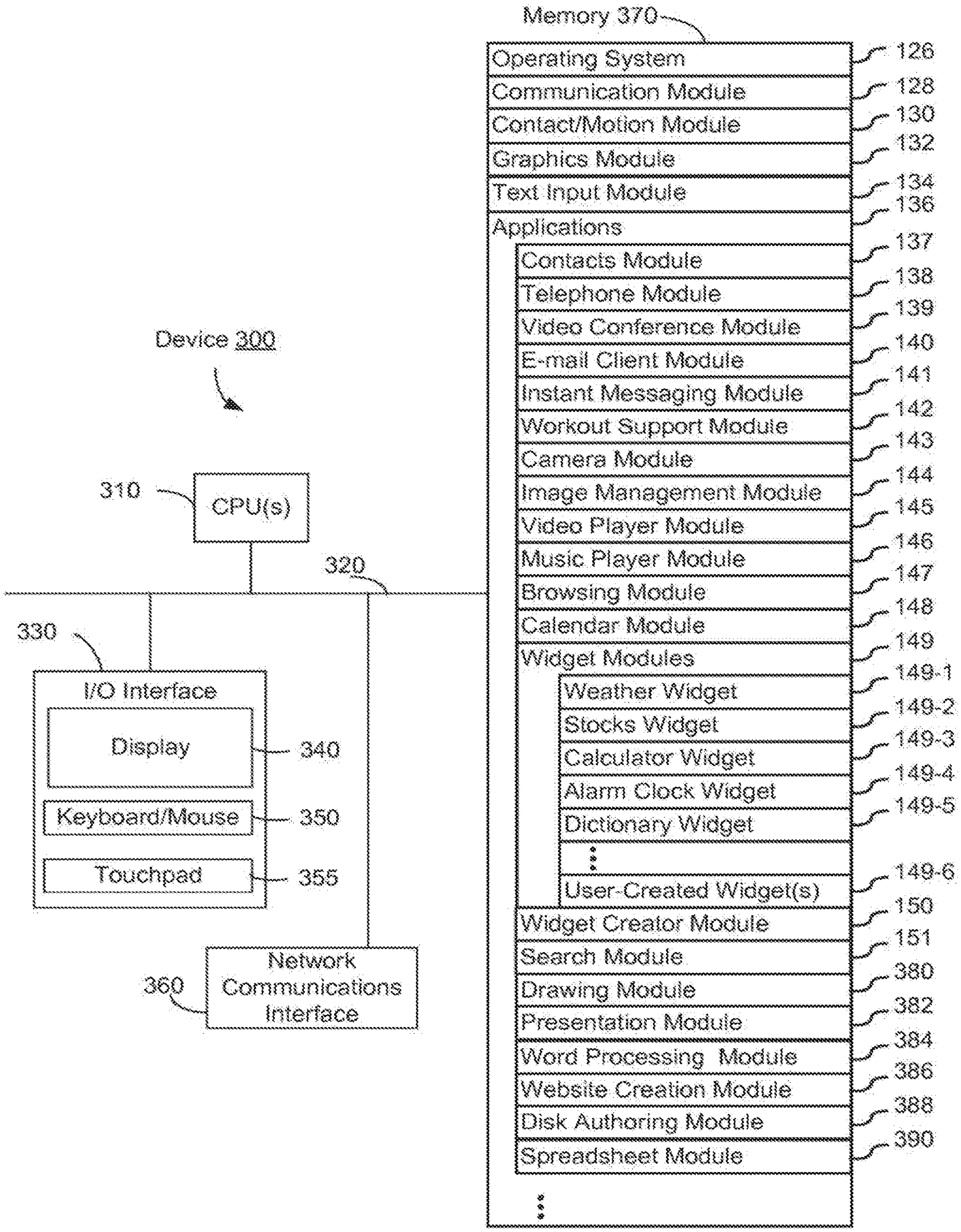
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
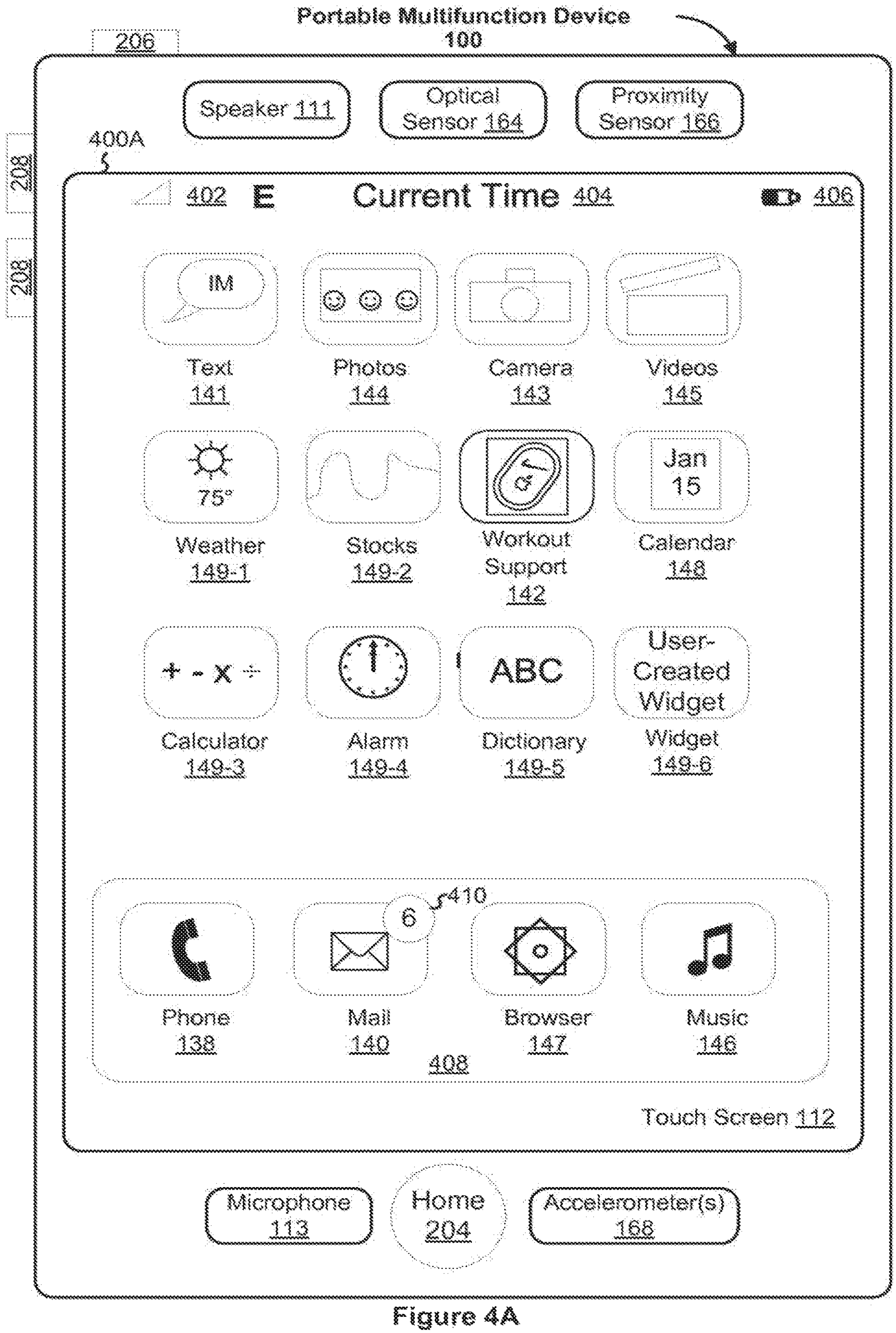
FIGS. 4A and 4B illustrate exemplary user interfaces for a menu of applications on a portable multifunction device in accordance with some embodiments.
Figure 4B:
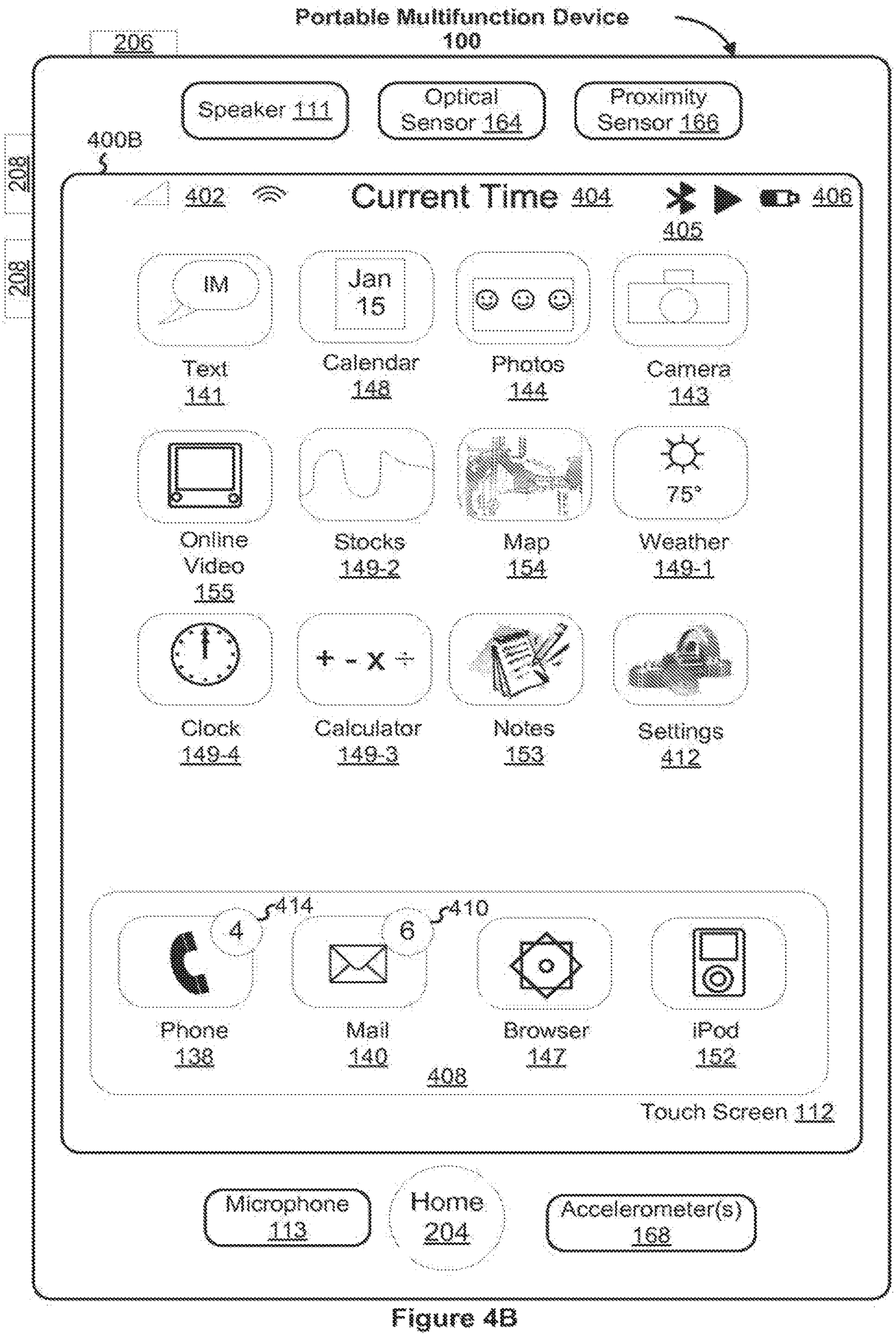

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Computer, Inc.) module 152; and
- Online video module 155, also referred to as YouTube (trademark of Google, Inc.) module 155.

Attention is now directed towards embodiments of user interfaces ("UI") and associated processes that may be implemented on a computing device with a display and a touch-sensitive surface, such as device 300 or portable multifunction device 100.

Figure 5A:
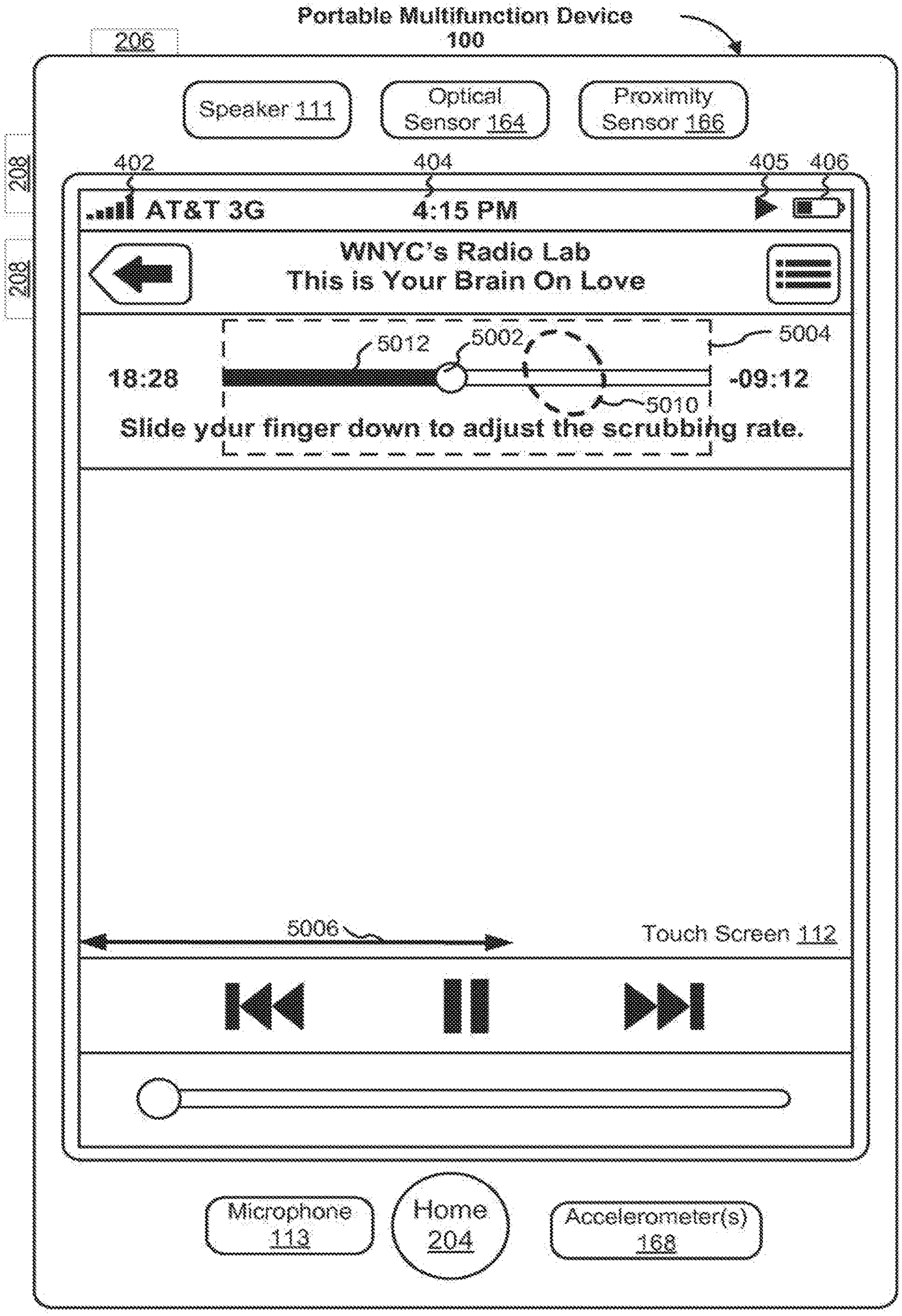
FIGS. 5A-5RR illustrate exemplary user interfaces for scrolling in accordance with some embodiments.
Figure 5B:
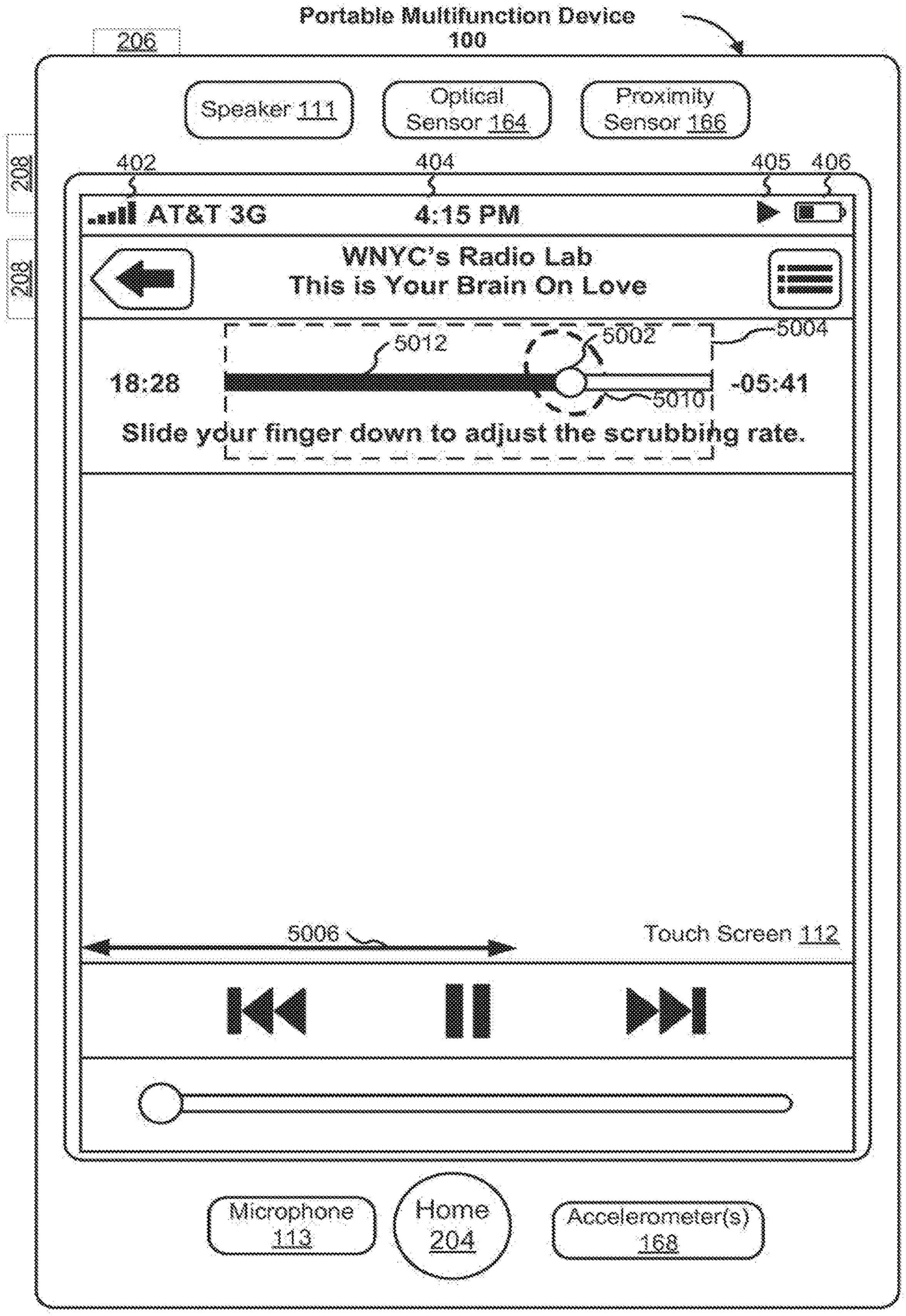
FIGS. 5SS-5EEE illustrate exemplary user interfaces for scrubbing through content at a variable scrubbing rate in accordance with some embodiments.
Figure 5C:
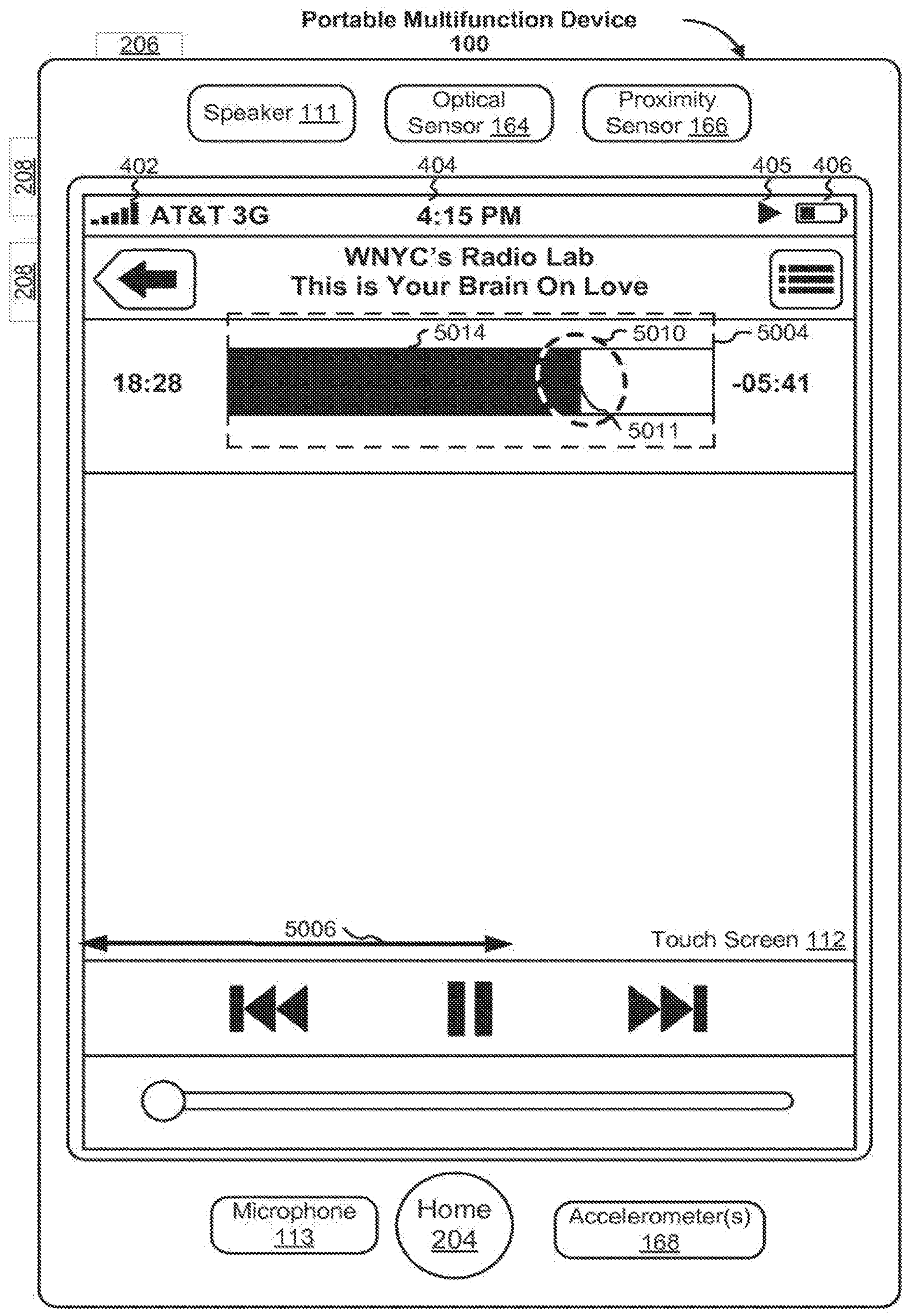
Figure 5D:
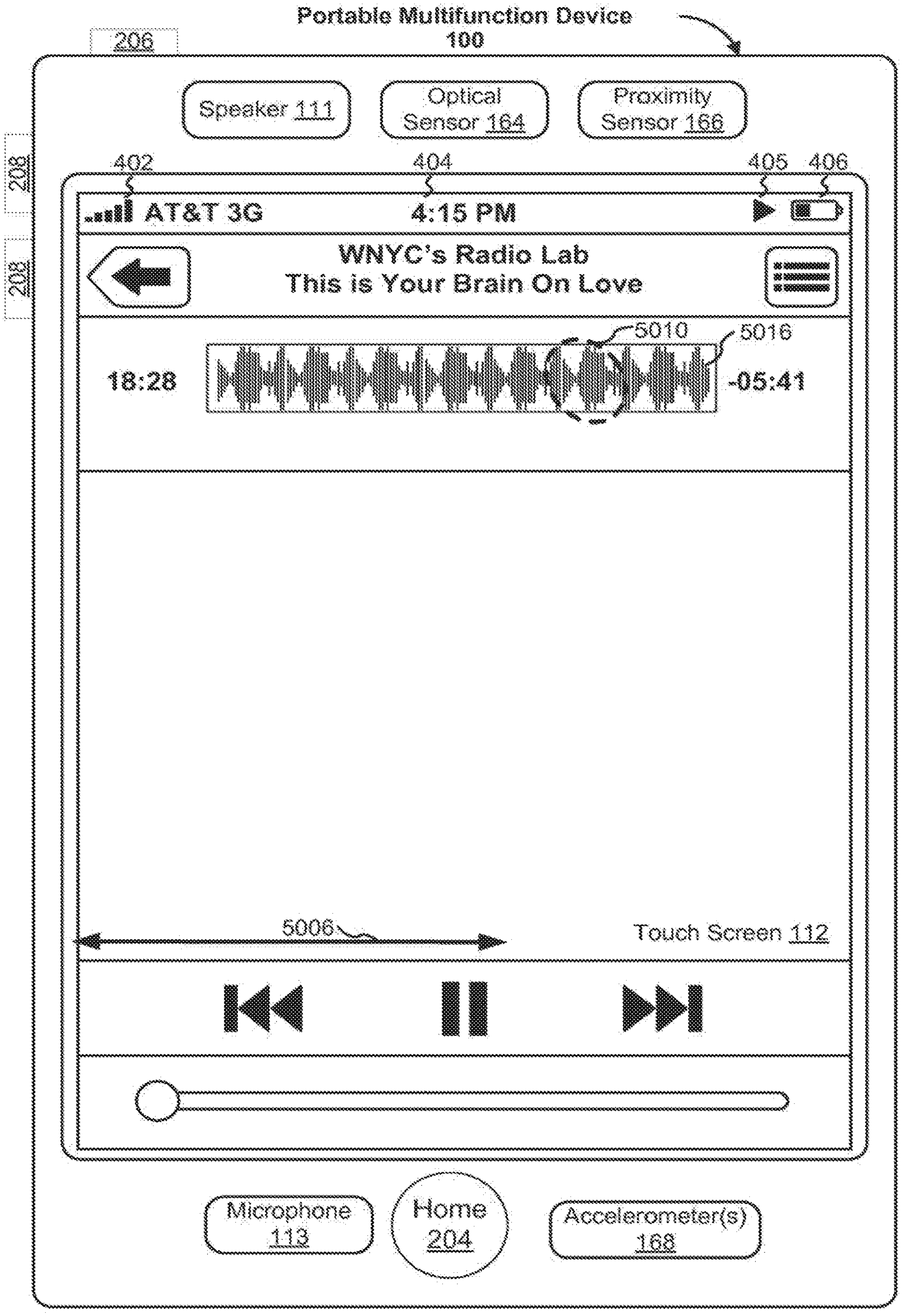
Figure 5E:
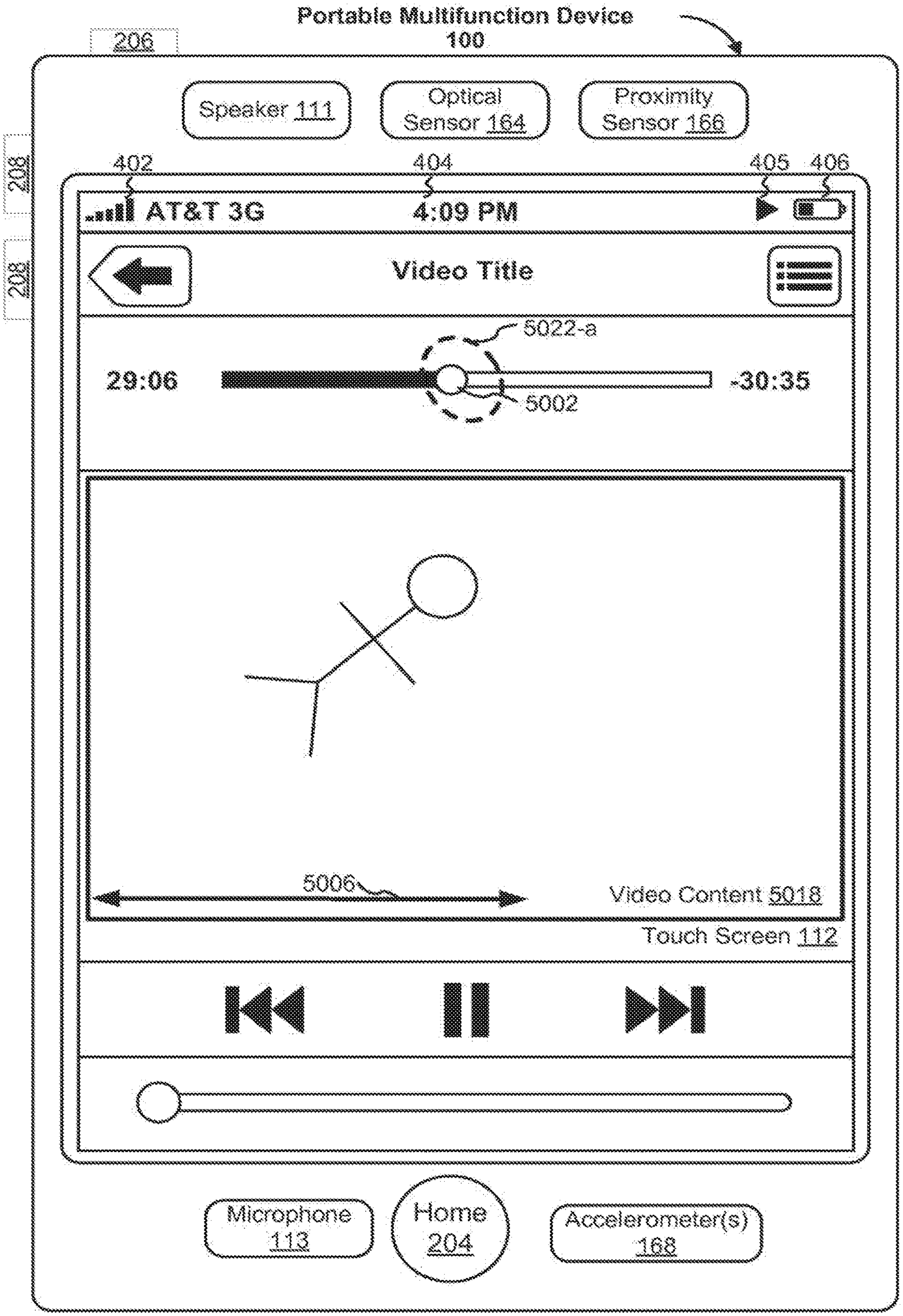
Figure 5F:
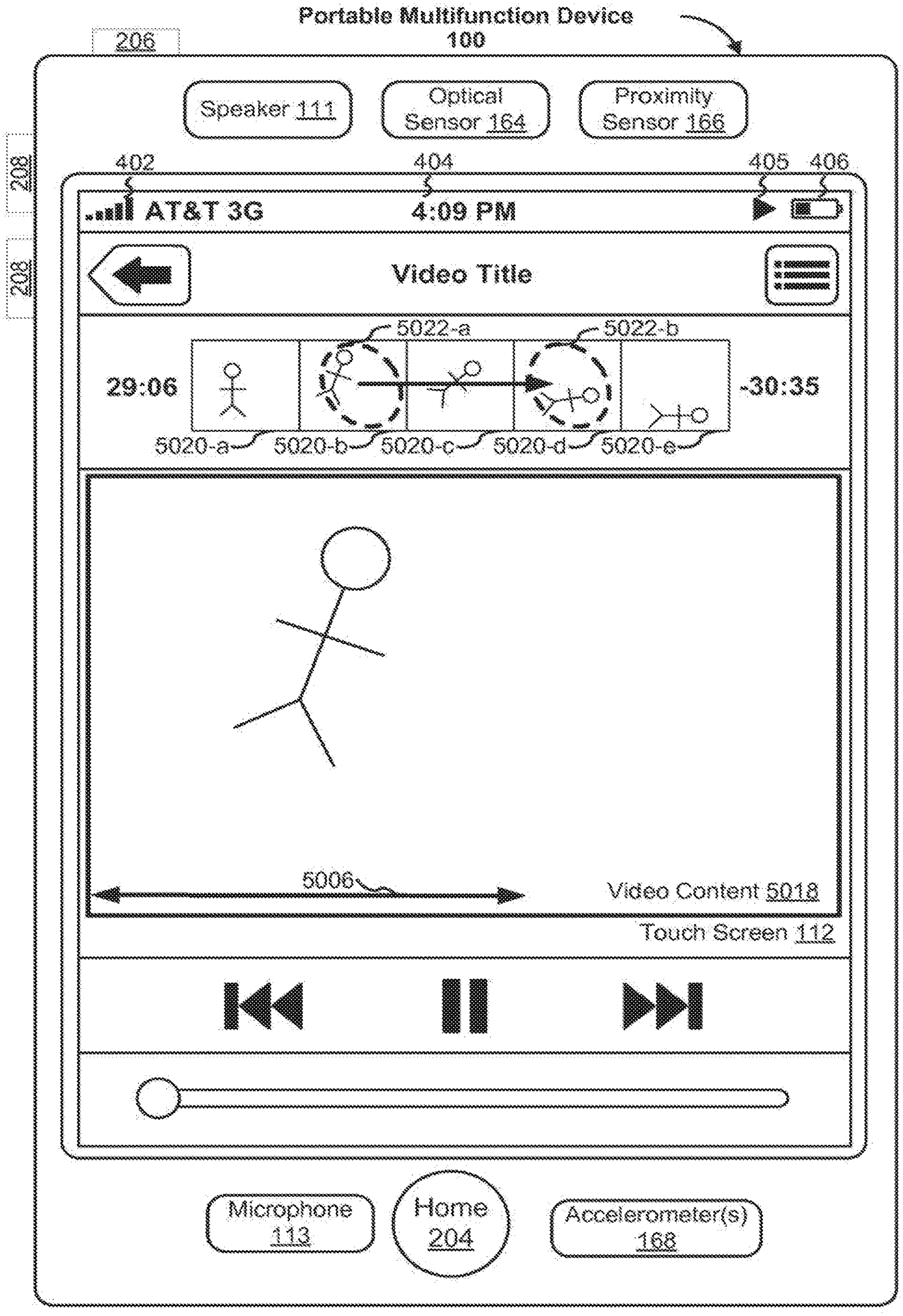
Figure 5G:
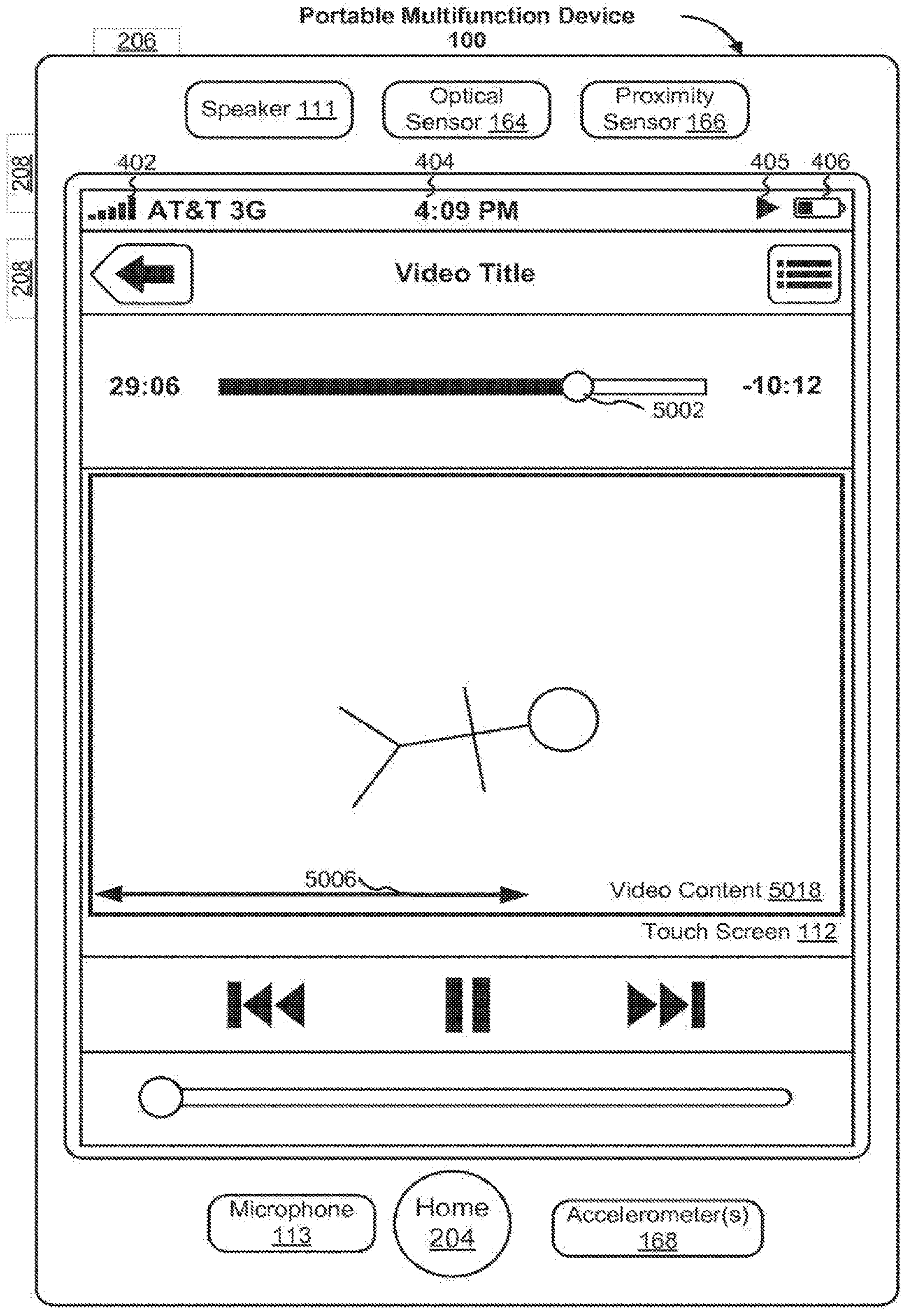
Figure 5H:
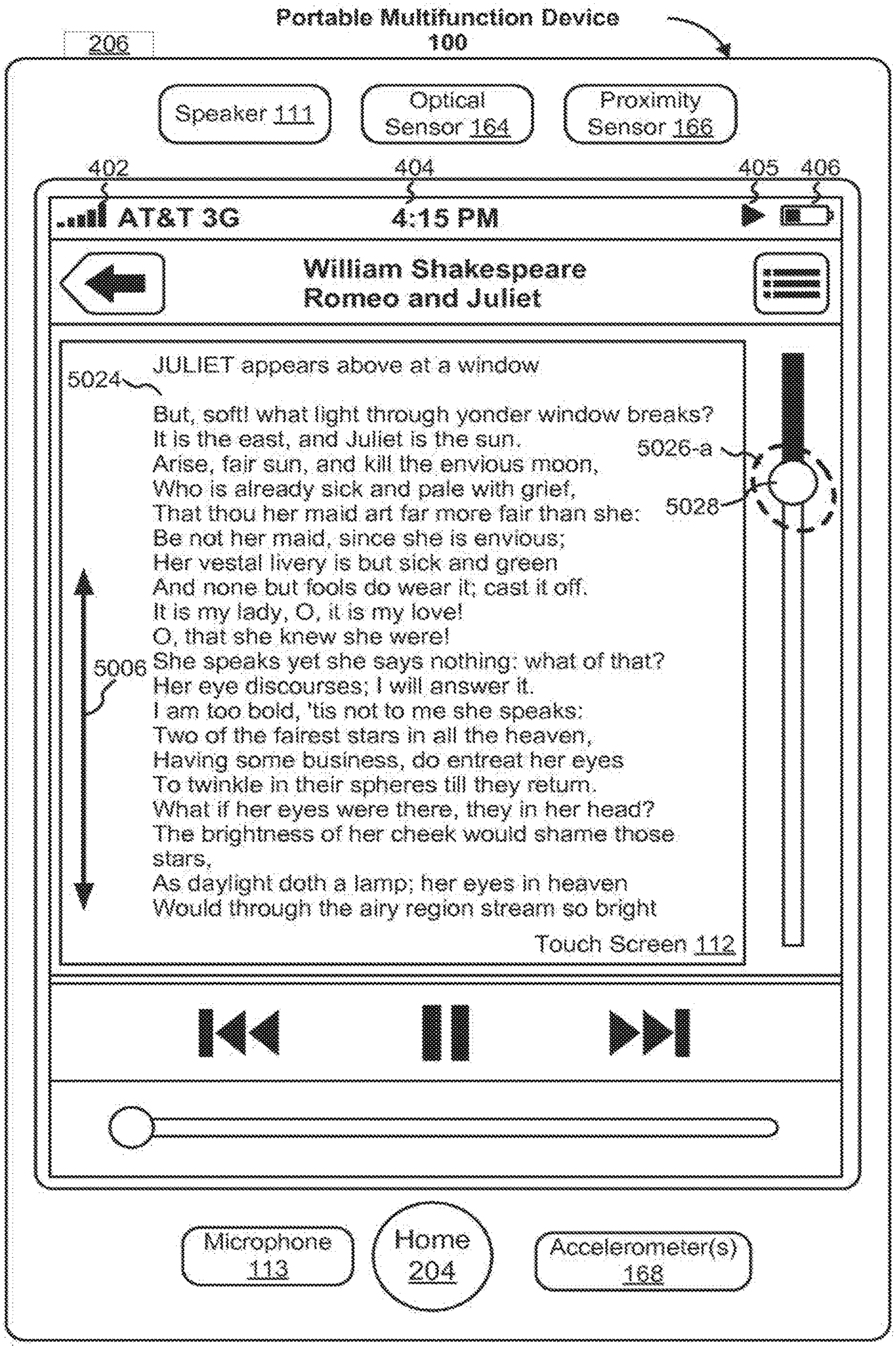
Figure 5I:
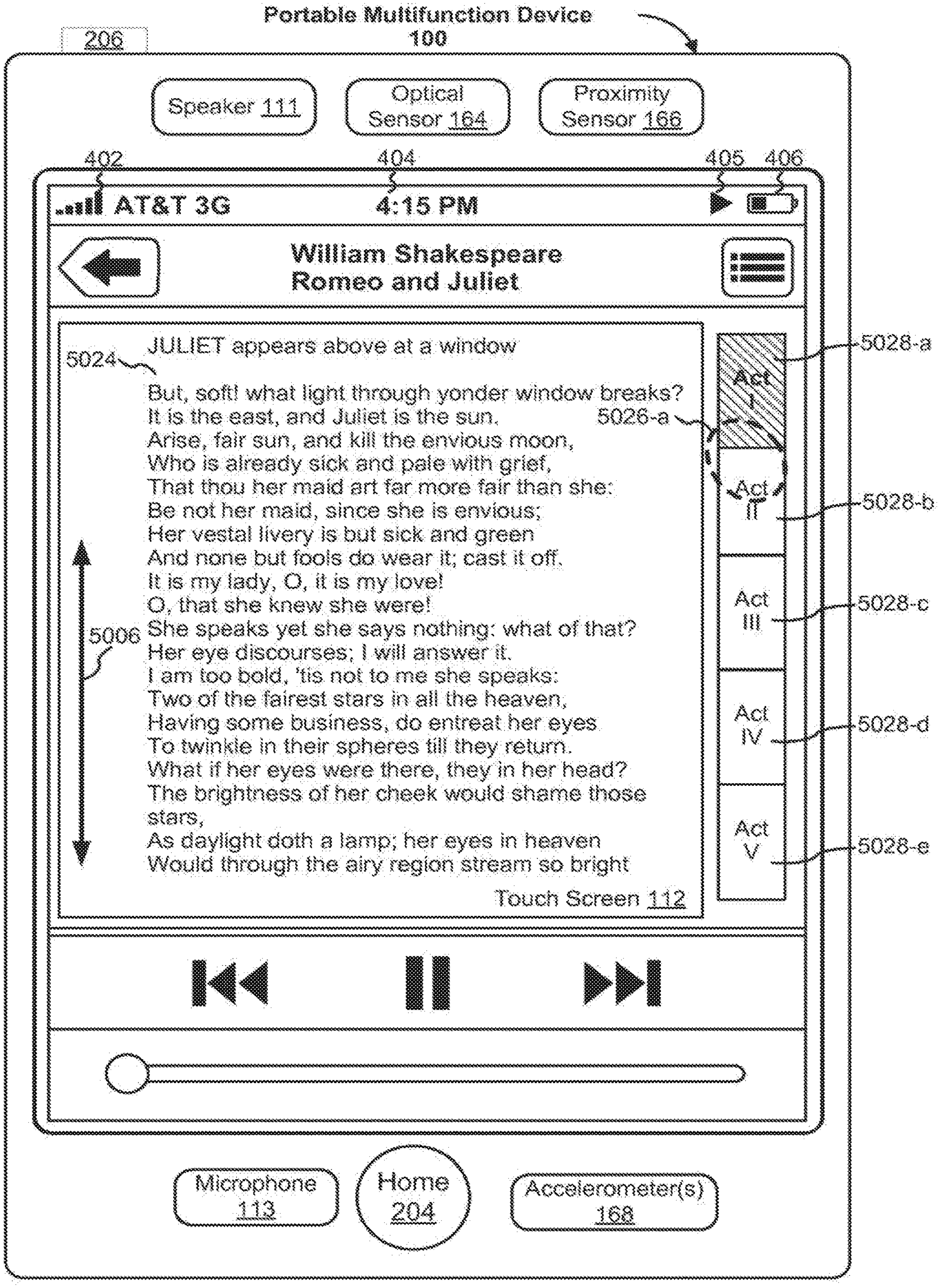
Figure 5J:
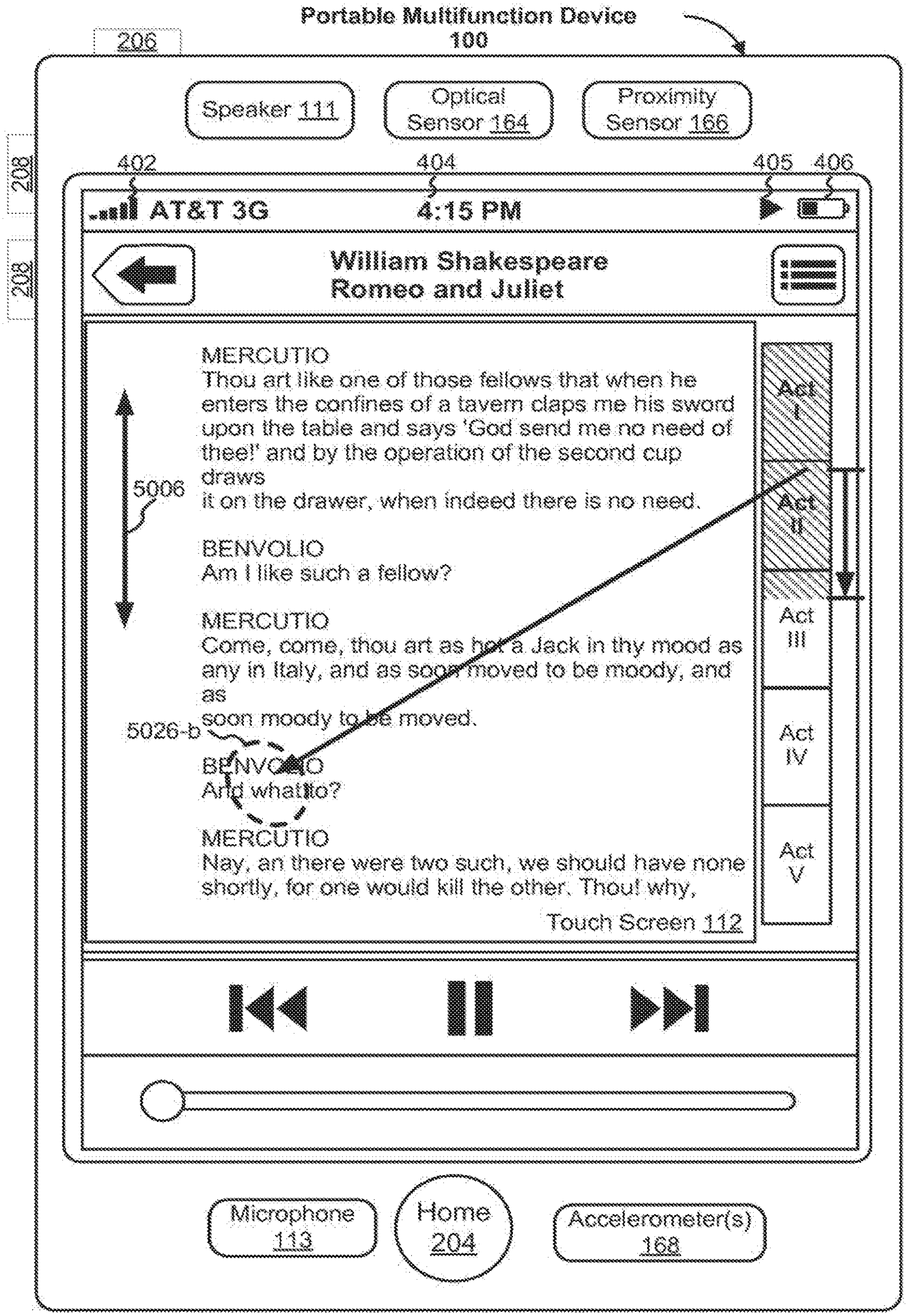
Figure 5K:
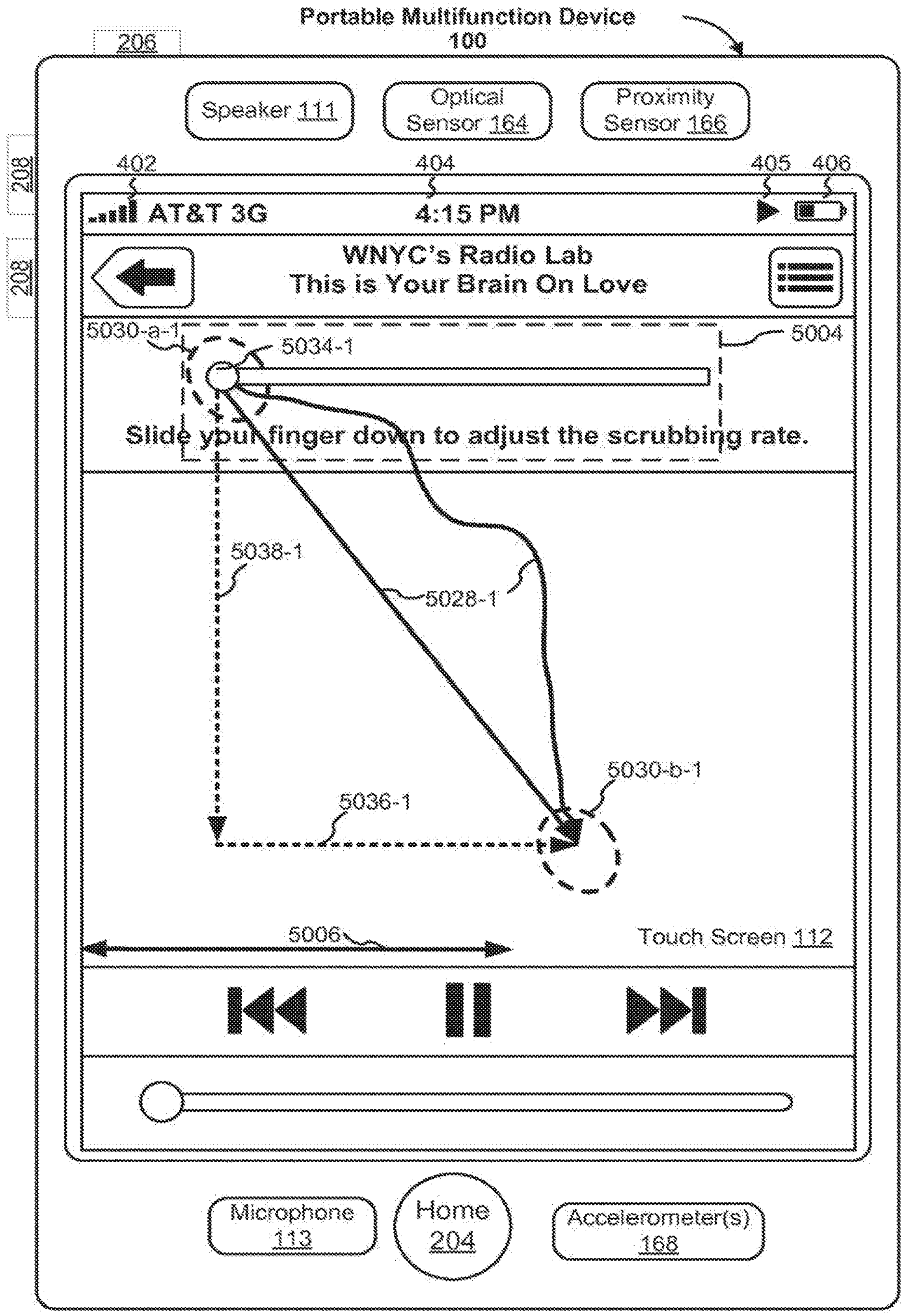
Figure 5L:
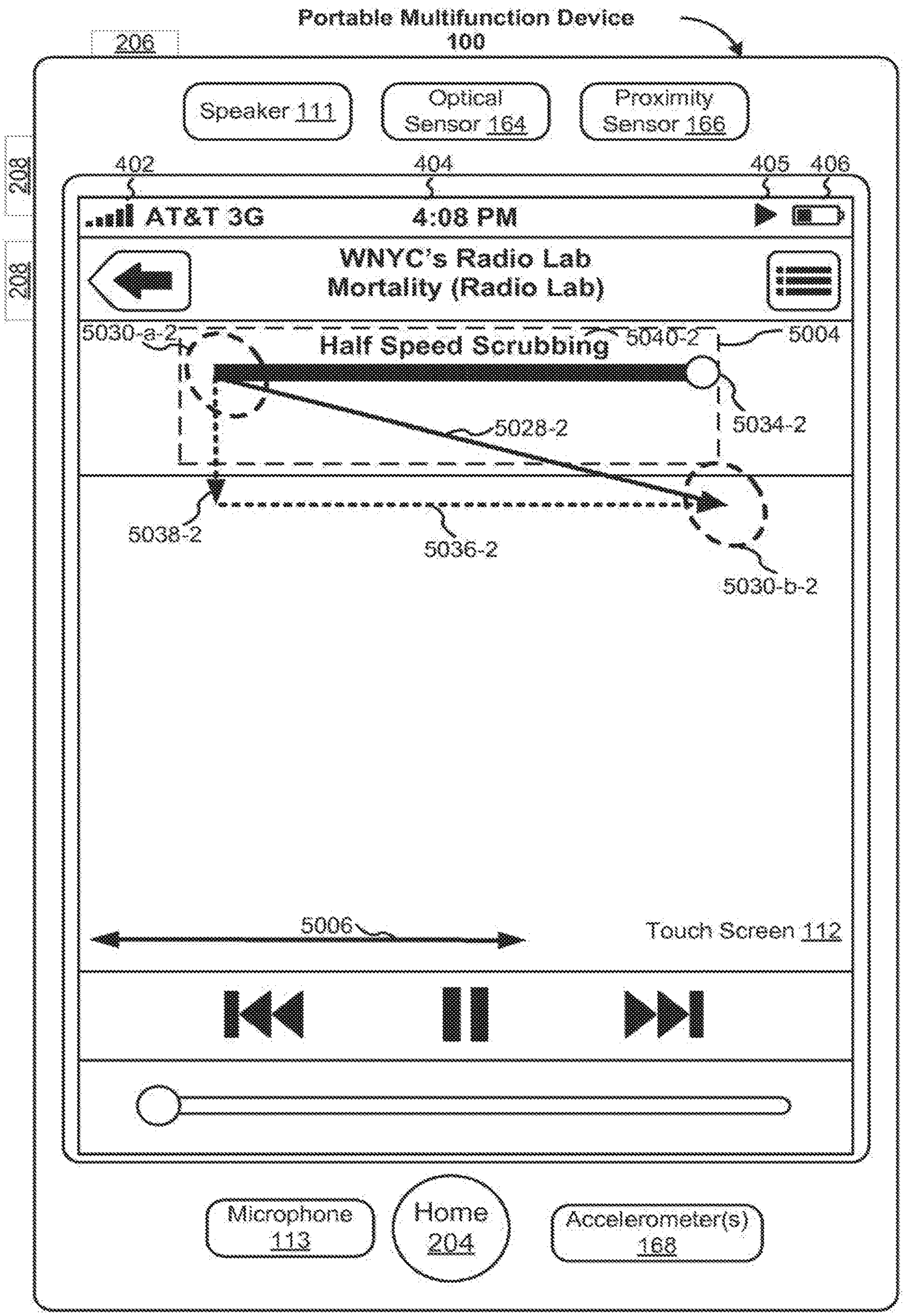
Figure 5M:
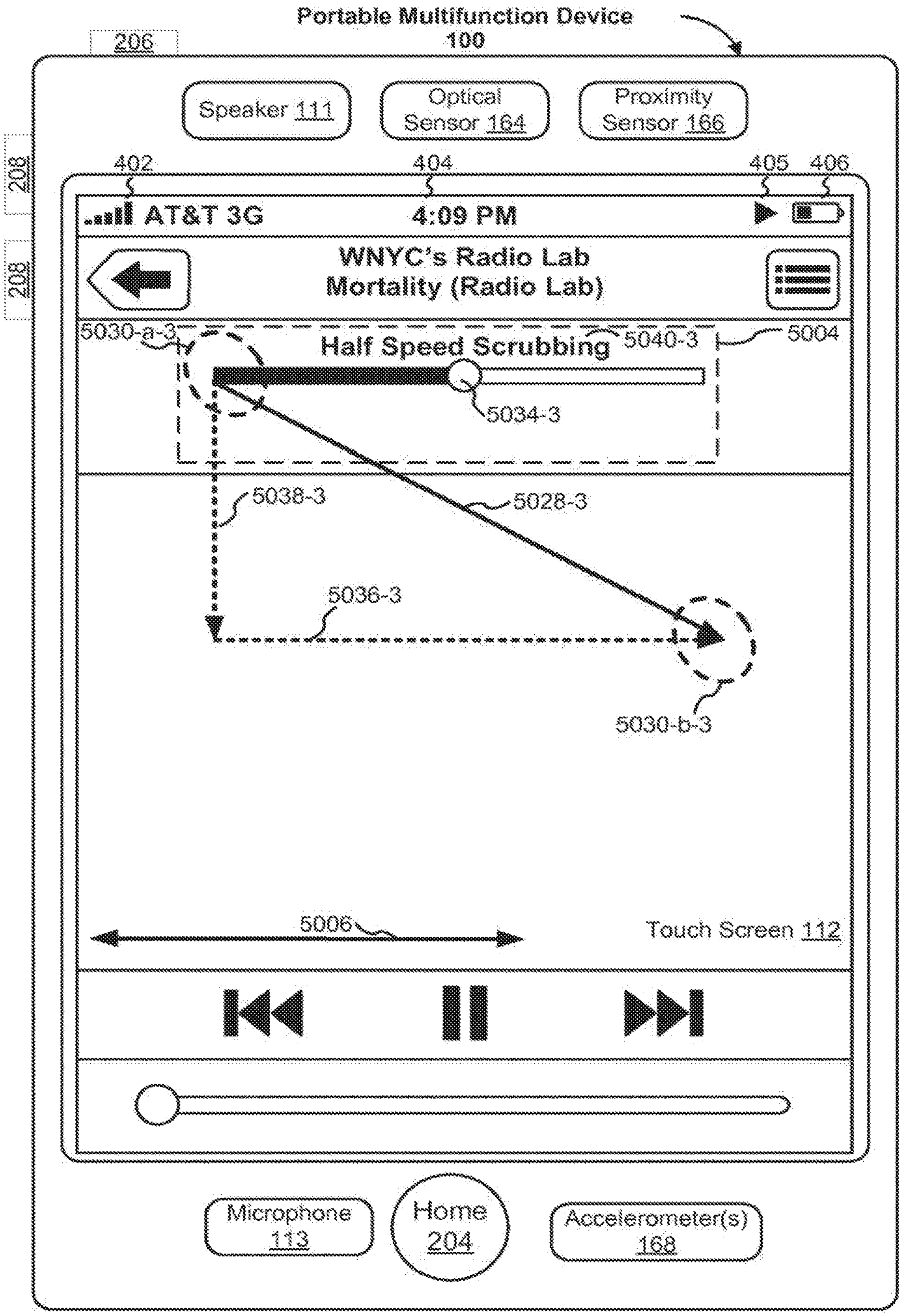
Figure 5N:
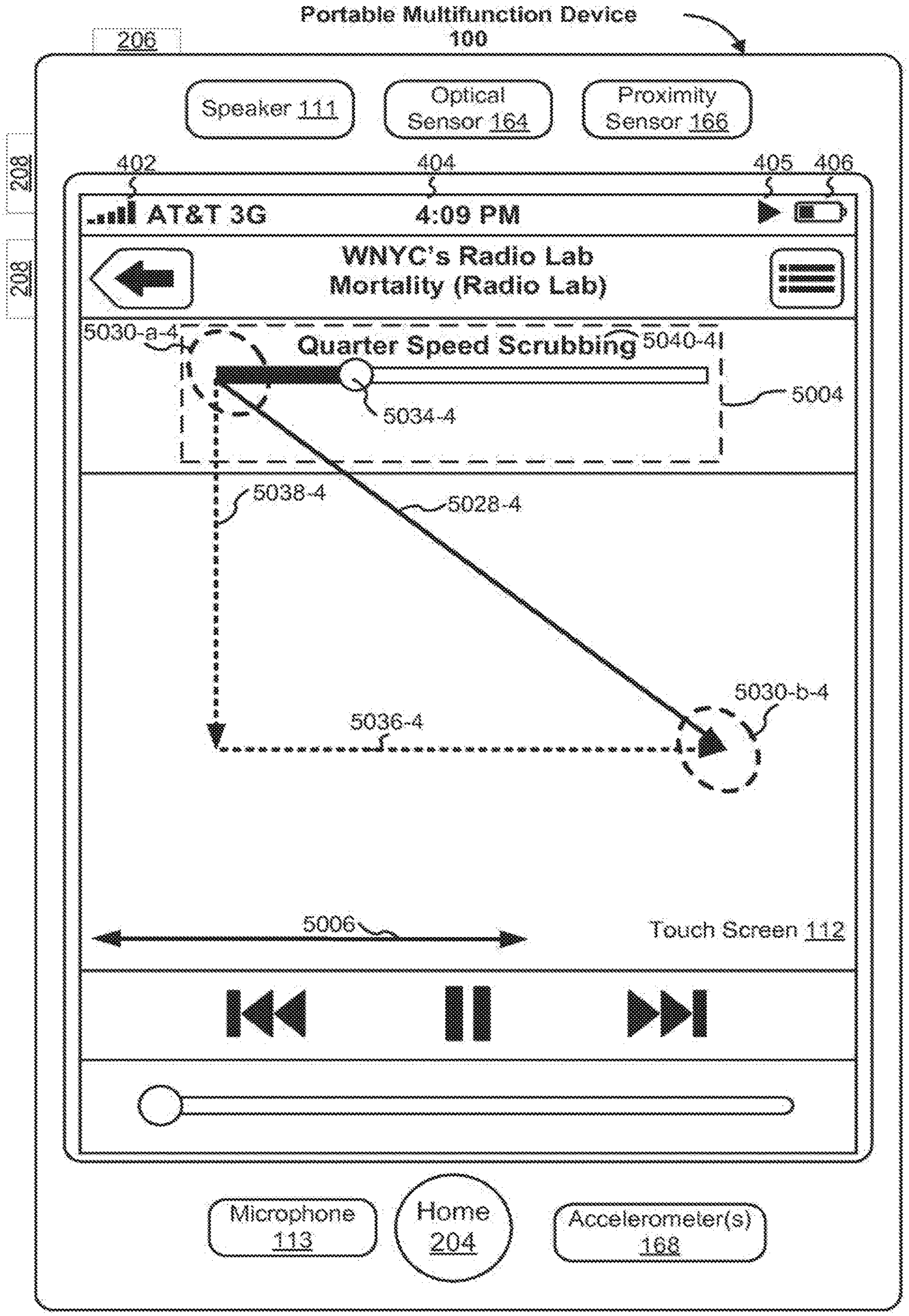
Figure 5O:
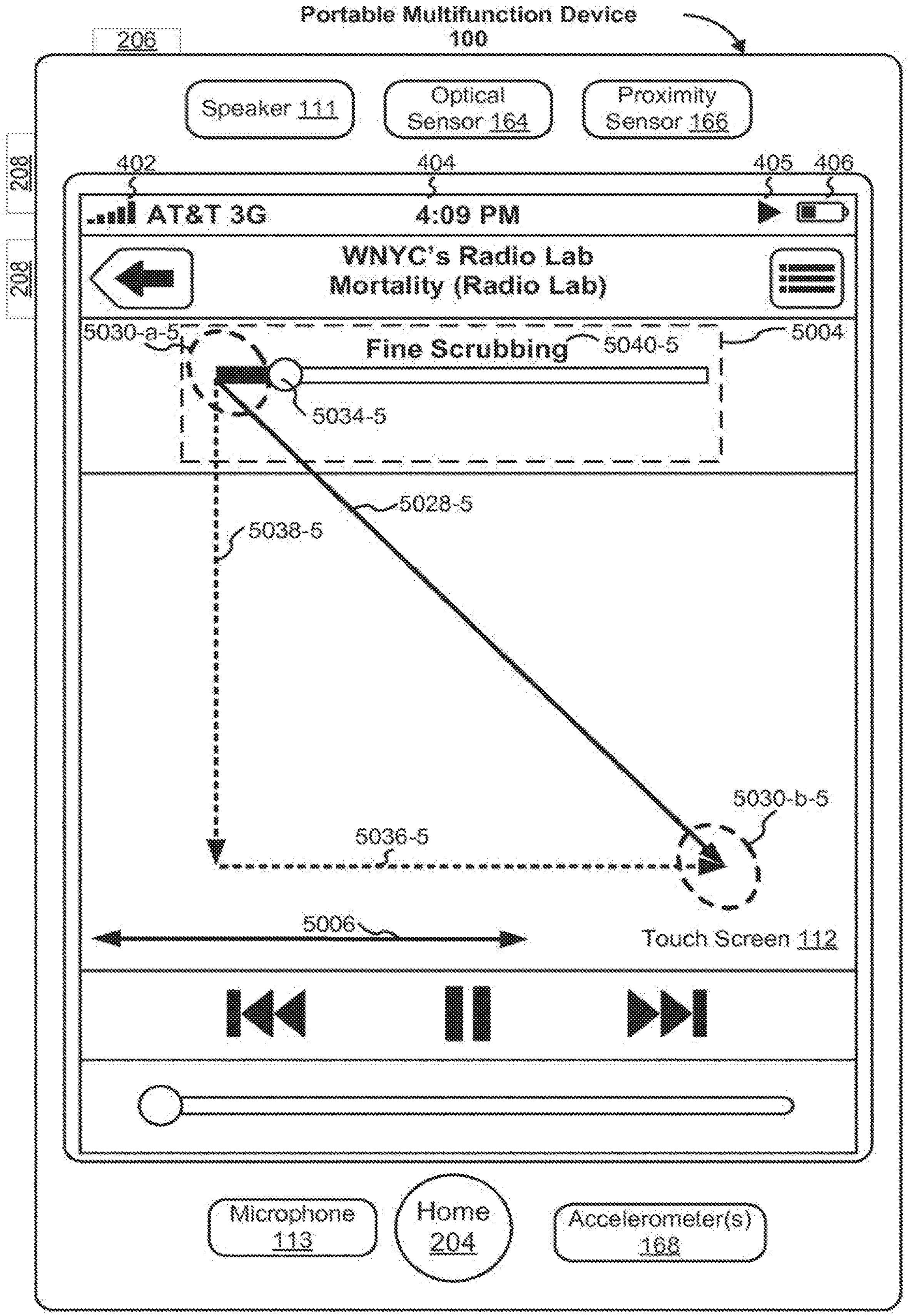
Figure 5P:
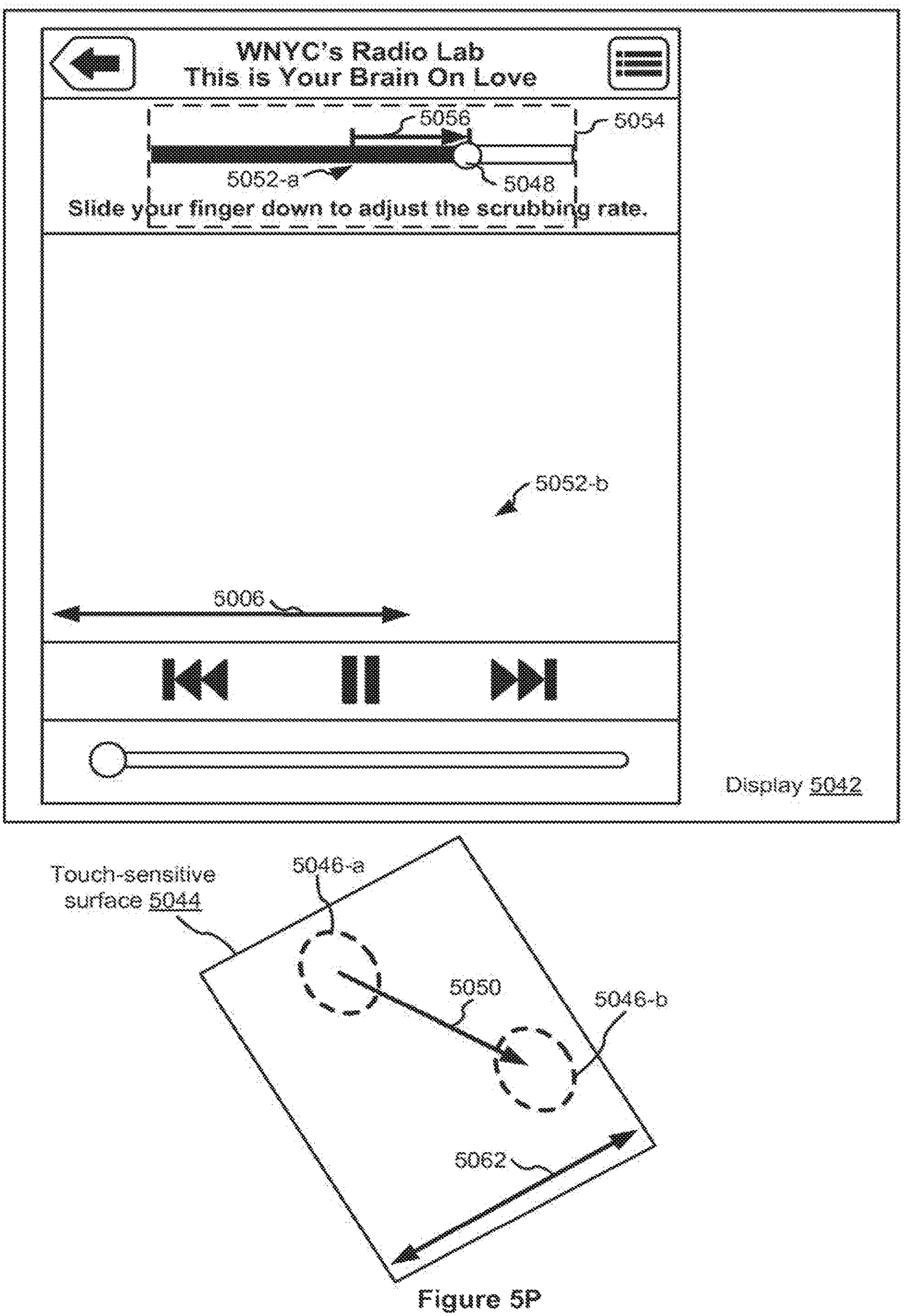
Figure 5Q:
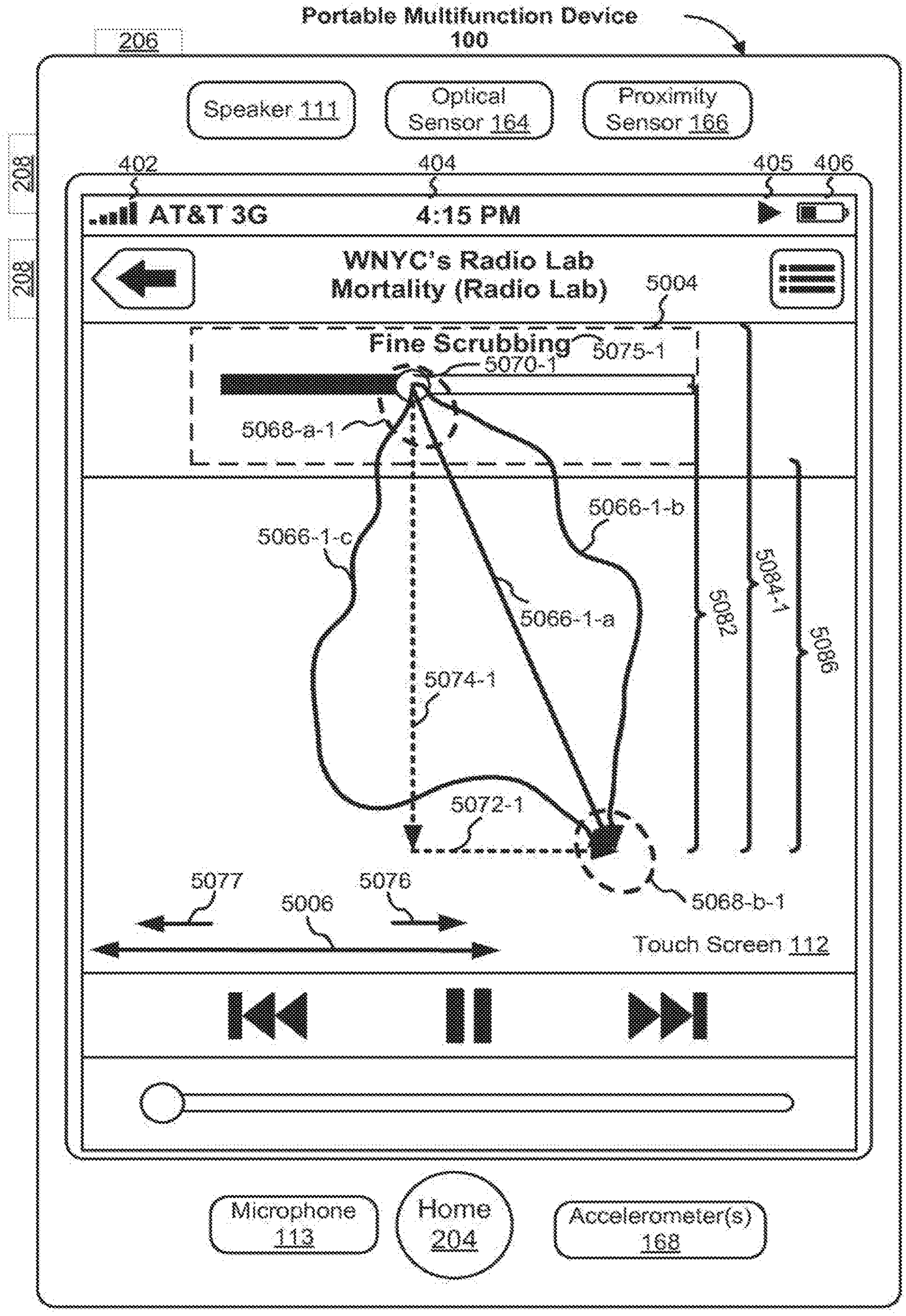
Figure 5R:
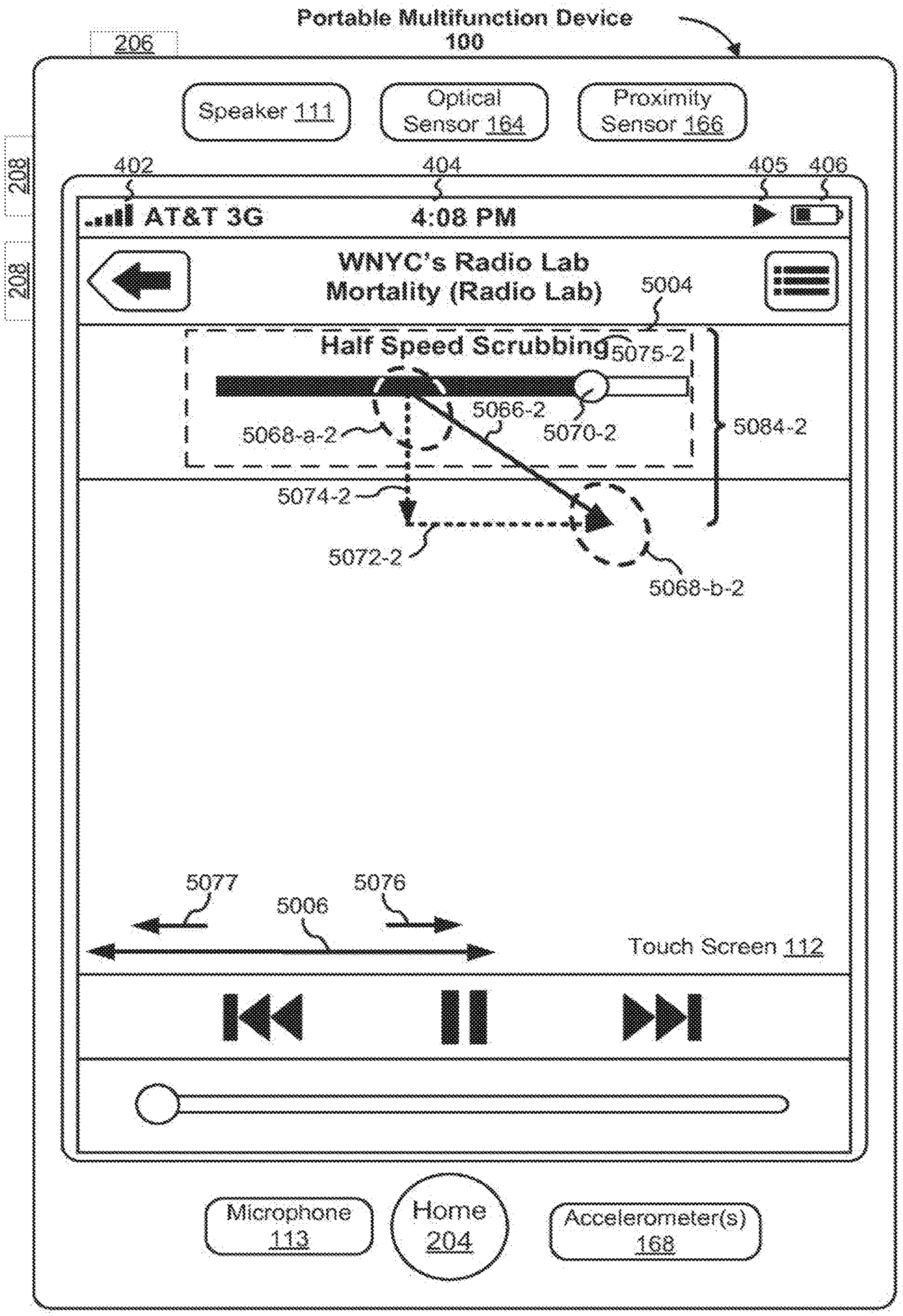

FIGS. 5A-5RR illustrate exemplary user interfaces for scrubbing through content that is provided on a computing device with a display and a touch-sensitive surface in accordance with some embodiments. The user interfaces in these figures are used to illustrate the processes described below with respect to FIGS. 6A-6D, 7A-7E, 8A-8G, 9A-9G, and 10A-10G. In some embodiments, the contact/motion module 130 (FIG. 3) detects contacts with the device's touch-sensitive surface, and implements variable rate scrubbing for positioning a current position in content being displayed or played on the device. In some embodiments, variable rate scrubbing is implemented in one or more content players, such a video player module 145 and/or music player module 146.

FIGS. 5A-5B illustrate user interfaces for changing a current position in content by detecting a contact in a predefined area. FIG. 5A illustrates detecting a contact 5010 in a predefined area 5004. FIG. 5B illustrates moving a current position within content (as indicated by moving a progress icon 5002 to the location of the contact 5010).

FIGS. 5C-5D, 5F and 5I illustrate user interfaces for changing a current position in content including displaying an expanded portion of a scroll bar. FIG. 5C illustrates displaying an expanded portion 5014 of a scroll bar after detecting a contact 5010. FIG. 5D illustrates displaying an indication of signal intensity 5016 within the expanded portion of the scroll bar. FIG. 5F illustrates displaying representative images (5020-*a*, 5020-*b*, 5020-*c*, 5020-*d*, 5020-*e*) in the expanded portion of the scroll bar. FIG. 5I illustrates displaying representative text (5028-*a*, 5028-*b*, 5028-*c*, 5028-*d*, 5028-*e*) in the expanded portion of the scroll bar.

FIGS. 5A-5J illustrate providing different kinds of content with the electronic device. FIGS. 5A-5D illustrate providing audio content. FIGS. 5E-5G illustrate providing video content 5018 with the device. FIGS. 5H-5J illustrate providing text content 5024.

FIGS. 5K-5O illustrate changing a current position in content at a scrubbing rate, where the scrubbing rate is determined by a second component of motion (e.g., 5038-1 in FIG. 5K.).

FIG. 5P illustrates an electronic device with a separate display 5042 and touch-sensitive surface 5044, where a first predefined direction on the display 5006 corresponds to a first predefined direction 5062 on the touch-sensitive surface.

FIGS. 5Q-5U illustrate changing a current position in content at a scrubbing rate, where the scrubbing rate is determined by an offset distance (e.g., 5082, 5084-1 or 5086 in FIG. 5Q) and a detected first component of motion (e.g., 5072-1 in FIG. 5Q).

Figure 5S:
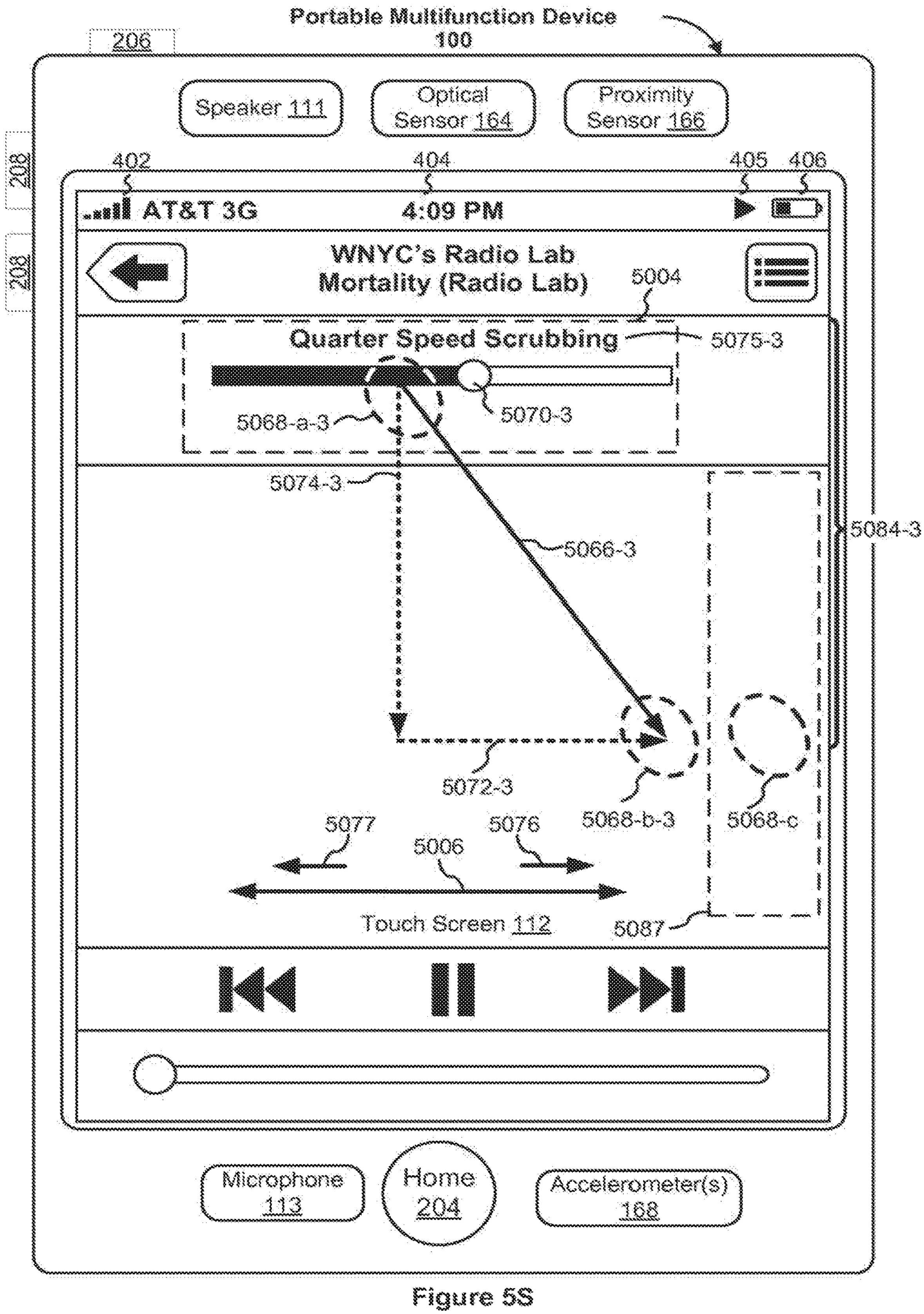
Figure 5T:
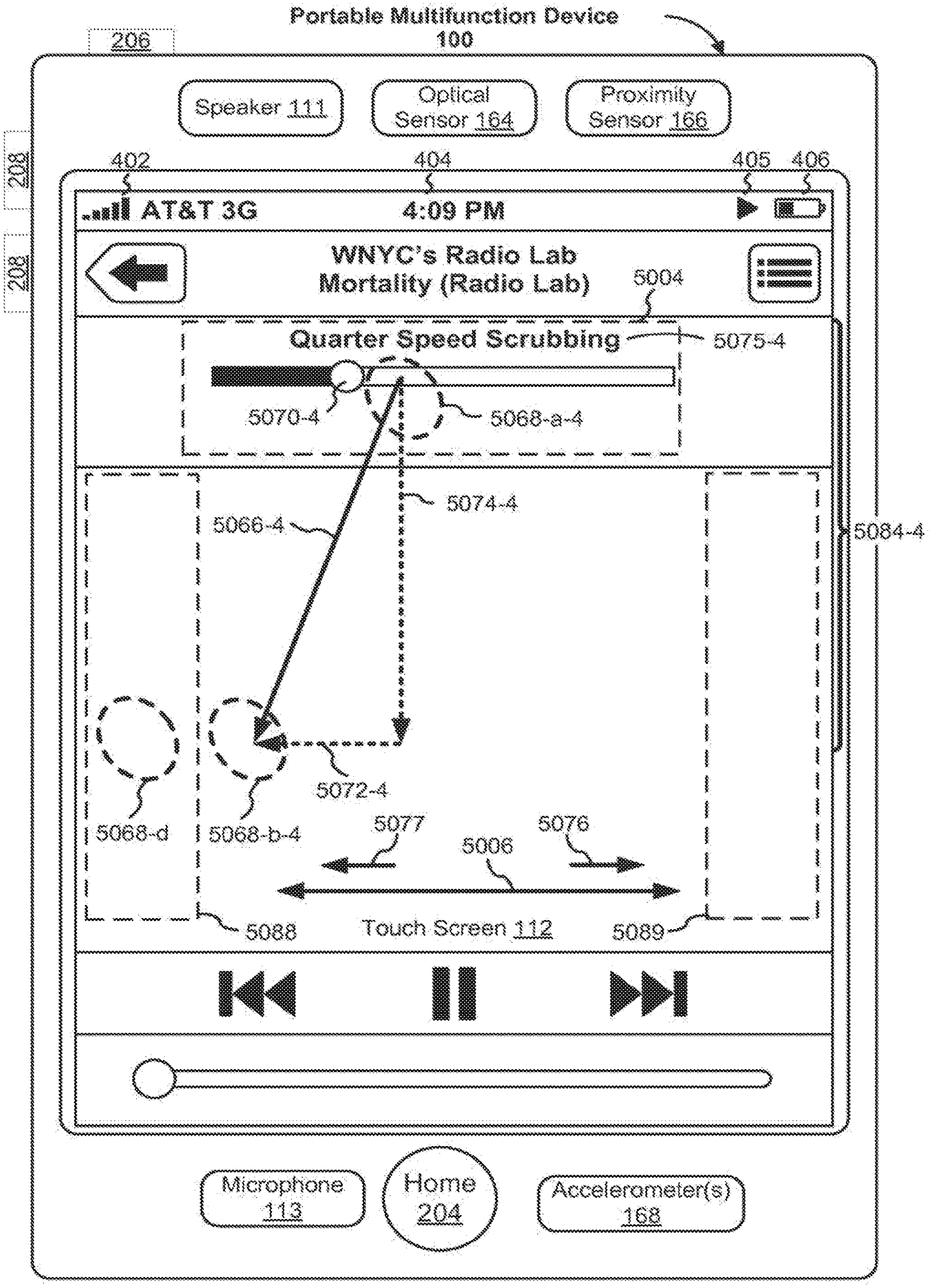
Figure 5U:
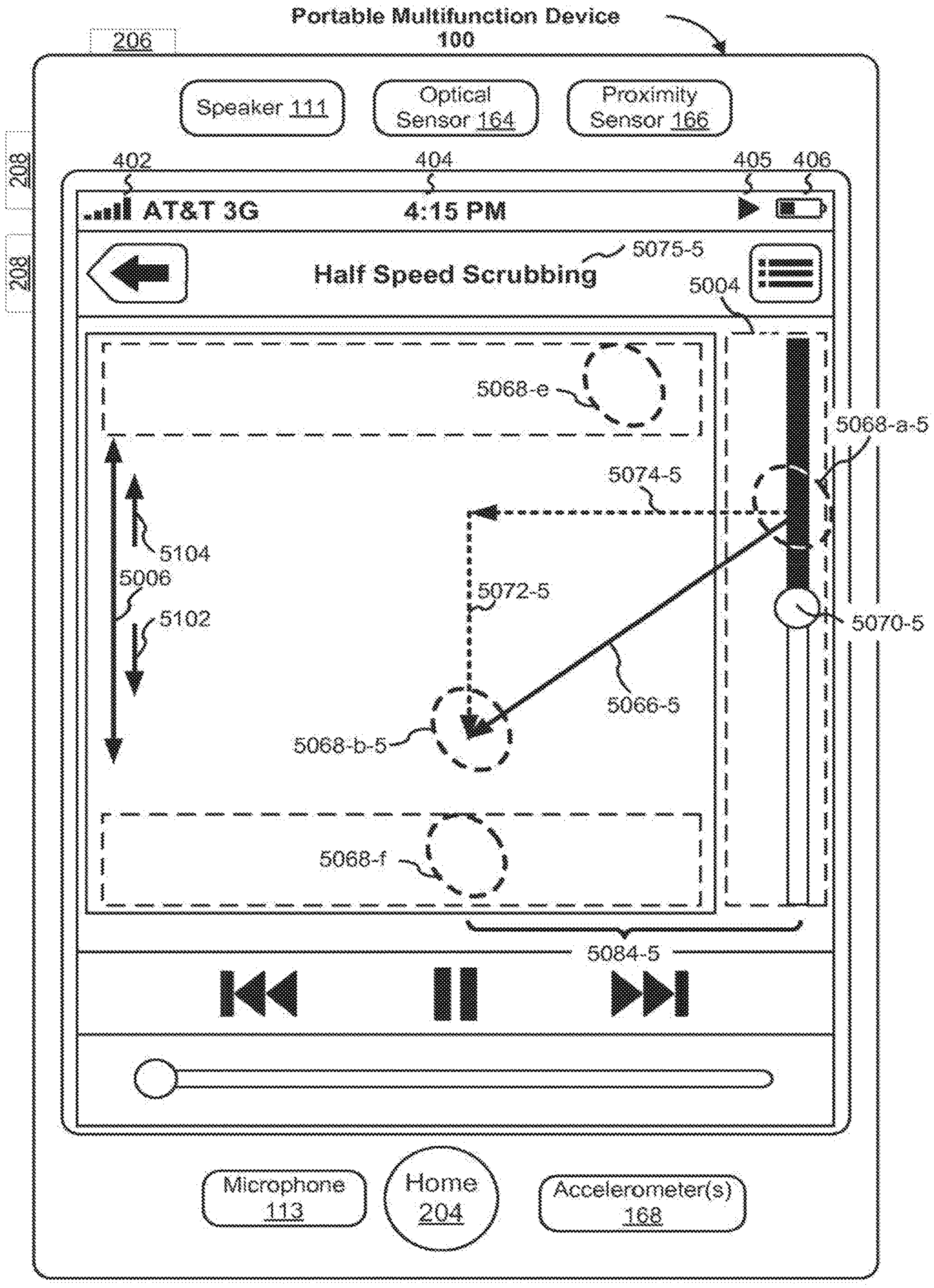
Figure 5V:
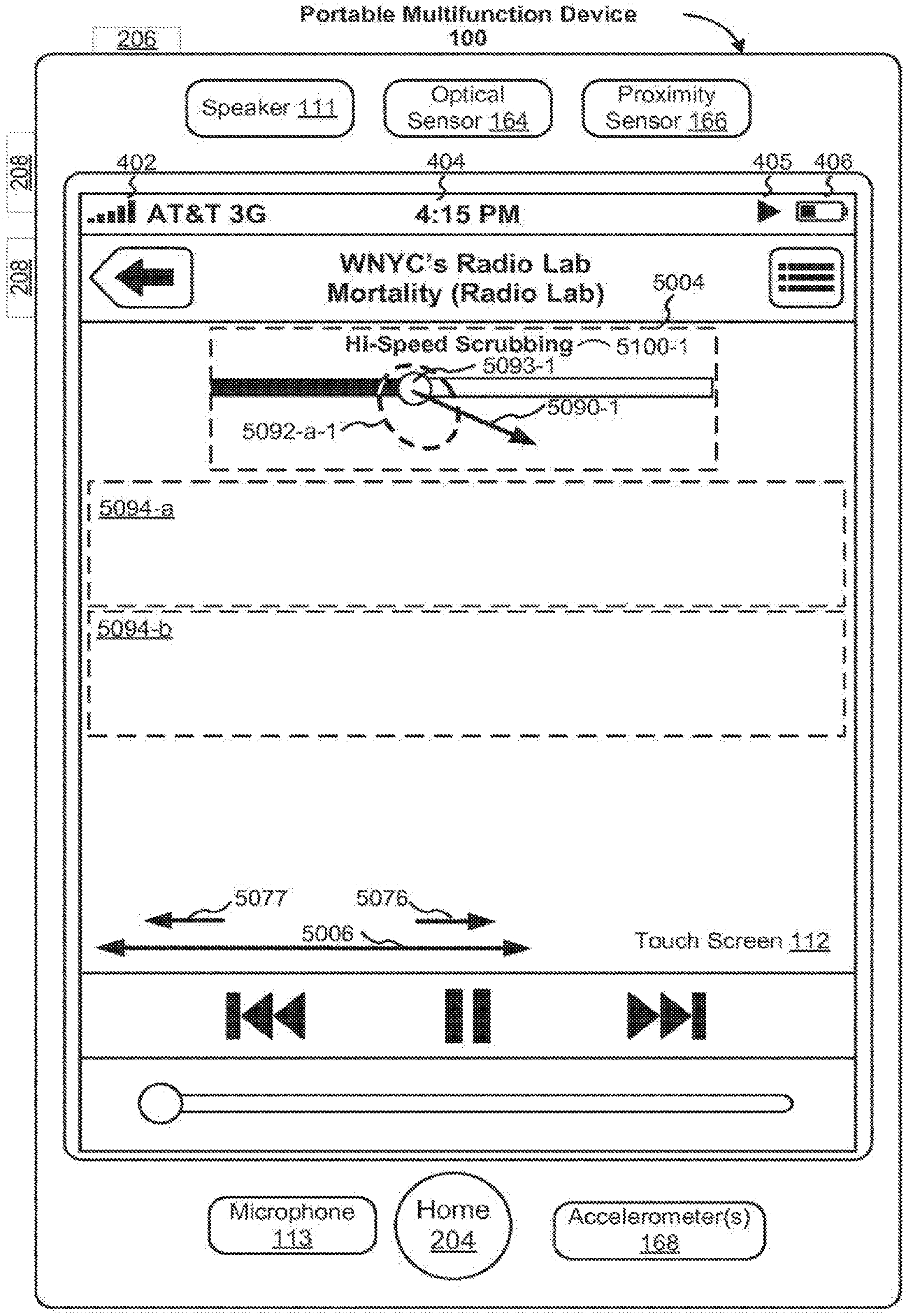

FIGS. 5V-5BB illustrate changing a current position in content at a scrubbing rate, where the scrubbing rate is determined by detecting a contact in a predefined region (e.g., 5094-*a* or 5094-*b* in FIG. 5V) and a detected first component of motion (e.g., 5096-1 in FIG. 5V).

FIGS. 5CC-5JJ illustrate changing a current position in content at a scrubbing rate, where the scrubbing rate is determined by an offset distance (e.g., 5118, 5120-1 or 5122 in FIG. 5CC) and the scrubbing direction is determined by which side of a boundary (e.g., 5124-1 in FIG. 5CC) the contact is located on.

FIGS. 5KK-5RR illustrate changing a current position in content at a scrubbing rate, where the scrubbing rate is determined by detecting a contact in a predefined region (e.g., 5134-*a* or 5134-*b* in FIG. 5KK) and the scrubbing direction is determined by which side of a boundary (e.g., 5142-1 in FIG. 5KK) the contact is located on.

FIGS. 5SS-5AAA illustrate changing a current position in content at a variable scrubbing rate, where the variable scrubbing rate is determined at least in part based on an uncompensated scrubbing distance and the location of a detailed scrubbing boundary (e.g., 5168 or 5170 in FIG. 5TT).

FIGS. 5BBB-5DDD illustrate changing a current position in content at a variable scrubbing rate, where the variable scrubbing rate is determined at least in part based on detecting a contact (e.g., 5210-1 in FIG. 5BBB) with a multi-purpose content navigation icon (e.g., 5208 in FIG. 5BBB) on a touch screen, and detecting movement (e.g., 5214 in FIG. 5BBB) of the contact on the touch screen.

FIG. 5EEE illustrates displaying an expanded portion 5244 of a scroll bar 5246 in response to detecting a contact 5248 with the scroll bar 5426.

FIGS. 6A-6D are flow diagrams illustrating a method 600 of scrolling in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 600 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

The device displays (602) a progress icon (e.g., 5002 in FIG. 5A) in a predefined area (e.g., 5004 in FIG. 5A) on the display (e.g., 112 in FIG. 5A). The progress icon is configured to move in a first predefined direction (e.g., 5006 in FIG. 5A or 5006 in FIG. 5H) on the display. If the first predefined direction is horizontal (e.g., 5006 in FIG. 5A), then the progress icon can only move to the right and to the left. Alternatively if the first predefined direction is vertical (e.g., 5006 in FIG. 5H), then the progress icon can only move up and down. In some embodiments, the progress icon is (604) a thumb icon (e.g., 5002 in FIG. 5A) in a scroll bar. In some embodiments, the progress icon is (606) an end of a bar (e.g., 5011 in FIG. 5C). In some embodiments, the end of the bar moves in accordance with the current position in the content. For example, when the content is a song and the position of the content is halfway through the song, the end of the bar is in the middle of the predefined area.

Content is provided (608) with the electronic device. In some embodiments, providing content includes playing back (610) audio content (e.g., a voice mail, music, audio book, podcast, or other audio recording). For example, in FIG. 5A, a podcast is provided with the device. In some embodiments, providing content includes playing back (612) video content (e.g., a movie, television show, web video, slideshow, or animation). For example, in FIG. 5E a movie 5018 is provided with the device. In some embodiments, providing content includes displaying (614) an electronic document. (e.g., an electronic book, web page, PDF file, word processing document, presentation, or spreadsheet). For example, in FIG. 5H a play is provided with the device.

The device indicates (616) a current position within the content with the progress icon. In some embodiments, providing content with the electronic device includes playing back (618) content with the electronic device at a playback speed prior to detecting movement of the contact across the touch-sensitive surface. In some embodiments, indicating (620) a current position within the content with the progress icon includes indicating a current playback position within the content with the progress icon. For example, where the provided content is a song, initially the song is playing at a normal playback speed, and the progress icon (e.g., 5002 in FIG. 5A) shows the current part in the music that is being played.

Operations 624-668, discussed below, are performed while providing (622) the content with the electronic device.

The device detects (624) a contact with the touch-sensitive surface at a location that corresponds to the progress icon. In some embodiments, detecting contact with a location that corresponds to the predefined area that includes the progress icon is sufficient (e.g., the contact may be anywhere in the predefined region rather than exactly at the location that corresponds to the predefined icon). In some embodiments, the contact is (626) a finger contact (e.g., 5010 in FIG. 5A). In some embodiments, the contact is (628) a stylus contact (e.g., 203 in FIG. 2).

In some embodiments, in response to detecting the contact at a location on the touch-sensitive surface that corresponds to a location in the predefined area on the display, the device moves (630) the progress icon to a position on the display that corresponds to the location of the contact on the touch-sensitive surface. For example, in FIG. 5A, a device with a touch screen display detects a contact 5010 with the touch screen display in the predefined area 5004 that contains the progress icon 5002 and then moves the progress icon 5002 to a position on the display that corresponds to the position of the contact, as shown in FIG. 5B.

In some embodiments, the device displays (632) a scroll bar (e.g., 5012 in FIG. 5B) in the predefined area (e.g., 5004 in FIG. 5B) on the display. In some embodiments, after detecting the contact (e.g., 5010 in FIG. 5B) with the touch-sensitive surface at the location that corresponds to the progress icon on the display, the device displays (634) an expanded portion of the scroll bar (e.g., 5014 in FIG. 5C). In some embodiments, detecting contact with the touch sensitive surface at any location that corresponds to a location in the predefined area on the display that includes the progress icon is sufficient. In some embodiments, display (636) of the expanded portion of the scroll bar replaces the display of the scroll bar (e.g., the expanded portion of the scroll 5014 bar shown in FIG. 5C replaces the scroll bar 5012 shown in FIG. 5B).

In some embodiments, the expanded portion of the scroll bar is displayed in response to detecting the contact with the touch-sensitive surface at the location that corresponds to the progress icon. In some embodiments, the expanded portion of the scroll bar is displayed after contact is detected at the location that corresponds to the progress icon for at least a predetermined time period (e.g., 0.5-1.0 seconds). In some embodiments, the device displays (638) a signal intensity (e.g., 5016 in FIG. 5D) within the expanded portion of the scroll bar (e.g., if the content contains audio, displaying signal intensity includes displaying a waveform of the audio intensity that corresponds to the audio content within the expanded portion of the scroll bar).

In some embodiments, the expanded portion of the scroll bar is representative of the full extent of the provided content. In other embodiments, the expanded portion of the scroll bar is representative of only a portion of the provided content. For example, if a user is listening to a ten minute long song on a device with a touch sensitive display, the device initially displays a scroll bar that is representative of the entire ten minute song (e.g., a first end of the bar corresponds to the beginning of the song and a second end of the bar corresponds to the end of the song.) In this example, when the device detects a contact in the predefined area, the device will present the user with an expanded portion of the scroll bar that is representative of a two minute segment of the song (e.g., the expanded portion of the scroll bar corresponds to one minute of the content on either side of the current position of the detected contact). In some embodiments the scrolling rate is variable over the length of the scroll bar (e.g., the scrolling rate is slow near the contact and fast near the ends of the scroll bar, which provides the user with fine control over content near the contact while still allowing the user to scrub to an end of the content by moving the contact to the end of the scroll bar). The user may then move the contact along the expanded scroll bar to move the progress icon to a location corresponding to a position in the content, as described in greater detail below.

In some embodiments the device displays (640) representative images (e.g., 5020-*a*, 5020-*b*, 5020-*c*, 5020-*d* and/or 5020-*e* in FIG. 5F) from the content within the expanded portion of the scroll bar (e.g., if the content contains video, displaying images that corresponds to frames in the video content within the expanded portion of the scroll bar). For example, a user is watching a movie (e.g., 5018 FIG. 5E), and makes contact 5022-*a* with the progress icon 5002. In this example, in response to the contact, the device displays frames from the video (e.g., 5020-*a*, 5020-*b*, 5020-*c*, 5020-*d*, 5020-*e* in FIG. 5F), and the user slides the contact to 5022-*b*, moving progress icon to a location associated with an image 5020-*d* from the content that is displayed in the expanded portion of the scroll bar. In this example, when the user releases contact, the video content begins playing at the point associated with the progress icon at a normal playback speed.

In some embodiments, the device displays (642) representative text from the content within the expanded portion of the scroll bar (e.g., displaying chapter or section headings that corresponds to the content within the expanded portion of the scroll bar). For example, a user is reading a play (e.g., 5024 FIG. 5H) on a device with a touch sensitive display and makes contact 5026-*a* with a progress icon 5028. In this example, in response to detecting the contact with the progress icon, the device displays text from the content (e.g., "Act I" 5028-*a*, "Act II" 5028-*b*, "Act III" 5028-*c*, "Act IV" 5028-*d* and/or "Act V" 5028-*e* in FIG. 5I) within the expanded portion of the scroll bar. It should be noted in this example, that because the scroll bar is vertical, the first predefined direction 5006 is along the vertical axis of the electronic device (e.g., parallel to the scroll bar). In some embodiments, a user scrubs through the content by moving the contact in a direction along the first predefined direction 5006. For example, to advance to a later act in the play, the user may move the contact 5026-*a* along the touch screen device to a new contact location 5026-*b*.

The device detects (644) movement (e.g., 5028-1 in FIG. 5K) of the contact (e.g., 5030-*a*-1 in FIG. 5K) across the touch-sensitive surface to a location on the touch-sensitive surface that corresponds to a location (e.g., contact 5030-*b*-1 in FIG. 5K) on the display outside the predefined area (e.g., 5004 in FIG. 5K) that includes the progress icon (e.g., 5034-1 in FIG. 5K). Movement of the contact includes (646) a first component of movement (e.g., 5036-1 in FIG. 5K) on the touch-sensitive surface in a direction corresponding to movement on the display parallel to the first predefined direction (e.g., 5006 in FIG. 5K) and a second component of movement (e.g., 5038-1 in FIG. 5K) on the touch-sensitive surface in a direction corresponding to movement on the display perpendicular to the first predefined direction. In some embodiments, the first component of movement (e.g., 5036-1 in FIG. 5K) and the second component of movement (e.g., 5038-1 in FIG. 5K) are perpendicular to each other (648). In some embodiments, the first predefined direction is a horizontal direction on the display (650) (e.g., 5006 in FIG. 5A). In some embodiments, the first predefined direction is a vertical direction on the display (652) (e.g., 5006 in FIG. 5H).

Operations 654-660 are performed while continuing to detect the contact on the touch-sensitive surface.

The device moves (654) the current position within the content at a scrubbing rate, wherein the scrubbing rate decreases as the second component of movement on the touch-sensitive surface increases.

In some embodiments, the scrubbing rate is the rate at which the device moves the current position in the content (e.g., as indicated by the progress icon) to a new position in the content. In some embodiments (when the content has a normal playback rate), this scrubbing rate is faster than the normal playback rate of the content. In some embodiments (when the content has a normal playback rate), the scrubbing rate is slower than the normal playback rate of the content.

As described in greater detail below, in some embodiments, the "scrubbing rate" is the amount by which the current position within the content changes (as indicated by the movement of a progress icon in a scroll bar) for a given amount of movement of the contact in a predefined direction. For example, consider a device with a touch screen display that displays a progress icon in a horizontal scroll bar. The scroll bar has a predefined width. The device detects movement of a contact on the touch screen display that includes a first component of movement with a magnitude equal to the width of the scroll bar (e.g., a component of movement parallel to the scroll bar). In this example, when the scrubbing rate is a "quarter speed scrubbing" rate, the progress icon (which indicates the current position in the content) moves a distance along the scroll bar that is approximately one quarter of the magnitude of the first component of motion. In other words, for a "quarter speed scrubbing" rate, horizontal movement of the contact by an amount equal to the width of the scroll bar causes the device to move the progress icon in the scroll bar by an amount equal to one quarter of the width of the scroll bar. The current position in the content moves by a corresponding amount (e.g., by one quarter of the content). Similarly, when the scrubbing rate is a minimum scrubbing rate (e.g., a "fine scrubbing" rate that corresponds to an eighth speed scrubbing rate), the progress icon moves a distance along the scroll bar that is approximately one eighth of the magnitude of the first component of motion. In other words, for a "fine scrubbing" rate, horizontal movement of the contact by an amount equal to the width of the scroll bar causes the device to move the progress icon in the scroll bar by an amount equal to one eighth of the width of the scroll bar. The current position in the content moves by a corresponding amount (e.g., by one eighth of the content). It should be understood that the same principles may be applied to "hi-speed scrubbing" or "half speed scrubbing," as described in greater detail below.

In some embodiments at least a portion of the content is presented to the user as the user scrubs through the content. For example, for a video, the device displays frames from the video that are representative of the current position within the content. For example, for audio content, the device reproduces small portions of the audio content that are representative of the current position within the content.

FIGS. 5K-5O provide an illustrative example of one embodiment of moving the current position within the content at a scrubbing rate wherein the scrubbing rate decreases as the second component of movement on the touch-sensitive surface increases. For this example, FIG. 5K illustrates the initial state of the device, with the current position within the content indicated by the progress icon 5034-1 located at the left hand side of a predefined region.

In FIG. 5L, the device detects a contact 5030-*a*-2 in a first predefined region 5004. The contact moves 5028-2 to a new contact location 5030-*b*-2 that is outside of the predefined region. The movement of the contact has a first component of motion 5036-2 and a second component of motion 5038-2. In response to detecting the movement of the contact, the device moves the current position within the content, as indicated by the movement of the progress icon 5034-2 to a new location at a "hi-speed scrubbing" rate 5040-2.

In FIG. 5M, the device detects a contact 5030-*a*-3 in a first predefined region 5004. The contact moves 5028-3 to a new contact location 5030-*b*-3 that is outside of the predefined region. The movement of the contact has a first component of motion 5036-3 and a second component of motion 5038-3. In response to detecting the movement of the contact, the device moves the current position within the content, as indicated by the movement of the progress icon 5034-3 to a new location at a "half speed scrubbing" rate 5040-3. Here, the second component of motion 5038-2 for the "hi-speed scrubbing" example in FIG. 5L is less than the second component of motion 5038-3 for the "half speed scrubbing" example in FIG. 5M.

In some embodiments, if the device continued to detect the contact for the same amount of time in the "hi-speed scrubbing" and "half speed scrubbing" examples, (e.g., thirty seconds) the current position in the content, as indicated by the progress icon, would move further in the "hi-speed scrubbing" example of FIG. 5L than the "half speed scrubbing" example in FIG. 5M.

In FIG. 5N, the device detects a contact 5030-*a*-4 in a first predefined region 5004. The contact moves 5028-4 to a new contact location 5030-*b*-4 that is outside of the predefined region. The movement of the contact has a first component of motion 5036-4 and a second component of motion 5038-4. In response to detecting the movement of the contact, the device moves the current position within the content, as indicated by the movement of the progress icon 5034-4 to a new location at a "quarter speed scrubbing" rate 5040-4 (e.g., the progress icon, indicating a current position in the content, moves a distance across the display that is approximately one quarter of the magnitude of the first component of motion of the contact). Here, the second component of motion 5038-3 for the "half speed scrubbing" example in FIG. 5M is less than the second component of motion 5038-4 for the "quarter speed scrubbing" example in FIG. 5N.

In some embodiments, if the device continued to detect the contact for the same amount of time in the "half speed scrubbing" and "quarter speed scrubbing" examples (e.g., thirty seconds) the current position in the content, as indicated by the progress icon, would move further in the "half speed scrubbing" example in FIG. 5M than in the "quarter speed scrubbing" example in FIG. 5N.

In FIG. 5O, the device detects a contact 5030-*a*-5 in a first predefined region 5004. The contact moves 5028-5 to a new contact location 5030-*b*-5 that is outside of the predefined region. The movement of the contact has a first component of motion 5036-5 and a second component of motion 5038-5. In response to detecting the movement of the contact, the device moves the current position within the content, as indicated by the movement of the progress icon 5034-5 to a new location at a "fine scrubbing" rate 5040-5 (e.g., the progress icon, indicating a current position in the content, moves a distance across the display that is approximately one eighth of the magnitude of the first component of motion of the contact). Here, the second component of motion 5038-4 for the "quarter speed scrubbing" example in FIG. 5N is less than the second component of motion 5038-5 for the "fine scrubbing" example in FIG. 5O.

In some embodiments, if the device continued to detect the contact for the same amount of time in the "quarter speed scrubbing" and "fine scrubbing" examples (e.g., thirty seconds) the current position in the content, as indicated by the progress icon, would move further in the "quarter speed scrubbing" example in FIG. 5N than in the "fine scrubbing" example in FIG. 5O.

In the foregoing examples of moving at varying scrubbing speeds based on the second component of movement (FIGS. 5K-5O), the first component of movement has been to the right on a touch screen device where the first predefined direction is horizontal. However, one having ordinary skill in the art would readily understand that the first predefined direction could be horizontal or vertical; and first component of motion could be to the right or the left (when the first predefined direction is horizontal), above or below (when the first predefined direction is vertical), as variously described in FIGS. 5A-5J, or in some other direction parallel to the first predefined direction.

Additionally, although the preceding examples have been given with reference to a touch screen display. In some embodiments the display and the touch-sensitive surface are separate, as shown in FIG. 5P. For example, in FIG. 5P, the display 5042 and the touch-sensitive surface 5044 are separate. The device detects a contact 5046-*a* with the touch-sensitive surface at a location that corresponds to an initial location 5052-*a* on the display of the progress icon 5048. The device detects movement 5050 of the contact across the touch-sensitive surface 5044 to a location on the touch-sensitive surface 5046-*b* that corresponds to a location on the display 5052-*b* outside the predefined area 5054 that includes the progress icon 5048. While continuing to detect the contact on the touch-sensitive surface, the device moves 5056 the current position within the content at a scrubbing rate. In some embodiments, the display has a first predefined direction 5006 which corresponds to a first predefined direction 5062 on the touch-sensitive surface. As discussed in greater detail above, the progress icon is configured to move in the first predefined direction on the display, wherein the scrubbing rate decreases as the second component of movement (in the second predefined direction) on the touch-sensitive surface increases.

In some embodiments, the scrubbing rate decreases (656) to a predetermined minimum rate as the second component of movement on the touch-sensitive surface increases. In some embodiments, the predetermined minimum rate is a determined based on a comparison between the distance moved by the contact on the touch sensitive surface and the distance moved by the progress icon. For example, the minimum rate may indicate that magnitude of the movement of the progress icon must always be at least one eighth of the magnitude of the component of the movement of the contact in the first predefined direction. In some embodiments, the minimum rate is a determined based on a comparison between the distance moved by the contact on the touch sensitive surface and the rate of movement through the content. For example, the minimum rate may indicate that the movement of the contact from one edge of a touch-sensitive surface to an opposite edge of the touch sensitive surface moves the current position in the content by at least a minimum amount, such as ten pages (for written content) or one minute (for audio or video content).

In some embodiments, while detecting the contact on the touch-sensitive surface, the device displays (658) an indicator of the scrubbing rate (e.g., "half-speed scrubbing" 5040-3 in FIG. 5M). In some embodiments, while detecting movement of the contact on the touch-sensitive surface, the device displays (660) an indicator of the scrubbing rate (e.g., "half-speed scrubbing" 5040-3 in FIG. 5M).

In some embodiments, the device detects a break in the contact (662) (e.g., detecting lift off of the contact), and in response to detecting the break in the contact, the device stops (664) movement of the current position within the content. For example, if a user is scrubbing through a set of images, the scrubbing stops when the user lifts the contact from the touch-sensitive surface. In some embodiments, the device detects a break in the contact (666) (e.g., detecting lift off of the contact) and, in response to detecting the break in the contact, the device plays back (668) the content at the playback speed (e.g., at the adjusted/updated/then current position within the content). For example, if the user is scrubbing through a set of images, the scrubbing continues at the current scrubbing rate when the user lifts the contact (e.g., allowing the user to set a speed for a slideshow). As another example, if a user is scrubbing through an audio file (e.g., song), when the user lifts off the contact, the device beings to play the audio file (e.g., song) at a normal playback speed for the audio content (e.g., the speed at which the song was recorded).

In accordance with some embodiments, at any instant in time, a current location of the contact on the touch-sensitive surface corresponds to a current location on the display. The current location on the display will have a corresponding current total distance to the progress icon on the display. In some embodiments, the scrubbing rate decreases as the current total distance to the progress icon increases, rather than having the scrubbing rate decrease as the second component of movement on the touch-sensitive surface or a current offset distance increases.

FIGS. 7A-7E are flow diagrams illustrating a method 700 of scrolling in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 700 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

The device displays (702) a progress icon (e.g., 5002 in FIG. 5A) in a predefined area (e.g., 5004 in FIG. 5A) on the display (e.g., 112 in FIG. 5A), wherein the progress icon is configured to move in a first predefined direction (e.g., 5006 in FIG. 5A or 5006 in FIG. 5H) on the display. If the first predefined direction is horizontal (e.g., 5006 in FIG. 5A), then the progress icon can only move to the right and to the left. Alternatively if the first predefined direction is vertical (e.g., 5006 in FIG. 5H), then the progress icon can only move up and down. In some embodiments, the progress icon is (704) a thumb icon (e.g., 5002 in FIG. 5A) in a scroll bar. In some embodiments, the progress icon is (706) an end of a bar (e.g., 5011 in FIG. 5C). In some embodiments, the end of the bar moves in accordance with the current position in the content.

In some embodiments, the first predefined direction is (708) a horizontal direction on the display (e.g., 5006 in FIG. 5A). In some embodiments, the first predefined direction is (710) a vertical direction on the display (e.g., 5006 in FIG. 5H).

Content is provided (712) with the electronic device. In some embodiments, providing content includes playing back (714) audio content (e.g., a voice mail, music, audio book, podcast, or other audio recording). For example, in FIG. 5A, a podcast is provided with the device. In some embodiments, providing content includes playing back (716) video content (e.g., a movie, television show, web video, slideshow, or animation). For example, in FIG. 5E a movie 5018 is provided with the device. In some embodiments, providing content includes displaying (718) an electronic document (e.g., an electronic book, web page, PDF file, word processing document, presentation, or spreadsheet). For example, in FIG. 5H a play is provided with the device.

The device indicates (720) a current position within the content with the progress icon. In some embodiments, providing content with the electronic device includes playing back (722) content with the electronic device at a playback speed prior to detecting movement of the contact across the touch-sensitive surface, and indicating a current position within the content with the progress icon includes indicating (724) a current playback position within the content with the progress icon. For example, where the provided content is a song, initially the song is playing at a normal playback speed, and the progress icon (e.g., 5002 in FIG. 5A) shows the current part of the music that is being played.

Operations 728-794, discussed below, are performed while content is provided (726) with the electronic device.

The device detects (728) a contact with the touch-sensitive surface at a location that corresponds to the progress icon. In some embodiments, detecting contact with a location that corresponds to the predefined area that includes the progress icon is sufficient. (e.g., the contact may be anywhere in the predefined region rather than exactly at the location that corresponds to the predefined icon). In some embodiments, the contact is (730) a finger contact (e.g., 5010 in FIG. 5A). In some embodiments, the contact is (732) a stylus contact (e.g., 203 in FIG. 2).

In some embodiments, in response to detecting (734) the contact at a location on the touch-sensitive surface that corresponds to a location in the predefined area, the device moves (736) the progress icon to a position on the display that corresponds to the location of the contact on the touch-sensitive surface. For example, in FIG. 5A, a device with a touch screen display detects a contact 5010 with the touch screen display in the predefined area 5004 that contains the progress icon 5002 and then moves the progress icon 5002 to a position in the display that corresponds to the position of the contact 5010, as shown in FIG. 5B.

In some embodiments, the device displays (738) a scroll bar (e.g., 5012 in FIG. 5B) in the predefined area (e.g., 5004 in FIG. 5B) on the display. In some embodiments, after detecting the contact (e.g., 5010 in FIG. 5B) with the touch-sensitive surface at the location that corresponds to the progress icon on the display, the device displays (740) an expanded portion of the scroll bar (e.g., 5014 in FIG. 5C). In some embodiments, detecting with the touch sensitive surface at any location that corresponds to a position in the predefined area on the display that includes the progress icon is sufficient. In some embodiments, the display of the expanded portion of the scroll bar replaces (742) the display of the scroll bar (e.g., the expanded portion of the scroll 5014 bar shown in FIG. 5C replaces the scroll bar 5012 shown in FIG. 5B).

In some embodiments, the expanded portion of the scroll bar is displayed in response to detecting the contact with the touch-sensitive surface at the location that corresponds to the progress icon. In some embodiments, the expanded portion of the scroll bar is displayed after contact is detected at the location that corresponds to the progress icon for at least a predetermined time period (e.g., 0.5-1.0 seconds.) In some embodiments, the device displays (744) a signal intensity (e.g., 5016 in FIG. 5D) within the expanded portion of the scroll bar (e.g., if the content contains audio, displaying a waveform of the audio intensity that corresponds to the audio content within the expanded portion of the scroll bar).

In some embodiments, the expanded portion of the scroll bar is representative of the full extent of the provided content. In other embodiments, the expanded portion of the scroll bar is representative of only a portion of the provided content. For example, if a user is listening to a 10 minute long song on a device with a touch sensitive display, the device initially displays a scroll bar that is representative of the entire ten minute song (e.g., a first end of the bar corresponds to the beginning of the song and a second end of the bar corresponds to the end of the song.) In this example, when the device detects a contact in the predefined area, the device will present the user with an expanded portion of the scroll bar that is representative a two minute segment of the song (e.g., the expanded portion of the scroll bar corresponds to one minute of the content on either side of the current location of the detected contact). In some embodiments the scrolling rate is variable over the length of the scroll bar (e.g., the scrolling rate is slow near the contact and fast near the ends of the scroll bar, which provides the user with fine control over content near the contact while still allowing the user to scrub to an end of the content by moving the contact to the end of the scroll bar). The user may then move the contact along the expanded scroll bar to move the progress icon to a location corresponding to a position in the content, as described in greater detail below.

In some embodiments, the device displays (746) representative images (e.g., 5020-*a*, 5020-*b*, 5020-*c*, 5020-*d*, 5020-*e* in FIG. 5F) from the content within the expanded portion of the scroll bar (e.g., if the content contains video, displaying images that corresponds to frames in the video content within the expanded portion of the scroll bar). For example, a user is watching a movie (e.g., 5018 FIG. 5E), and makes contact 5022-*a* with the progress icon 5002. In this example, in response to the contact, the device displays frames from the video (e.g., 5020-*a*, 5020-*b*, 5020-*c*, 5020-*d*, 5020-*e* in FIG. 5F), and the user slides the contact to 5022-*b*, moving progress icon to a location associated with an image 5020-*d* from the content that is displayed in the expanded portion of the scroll bar. In this example, when the user releases contact, the video content begins playing at the point associated with the progress icon at a normal playback speed.

In some embodiments, the device displays (748) representative text from the content within the expanded portion of the scroll bar (e.g., displaying chapter or section headings that corresponds to the content within the expanded portion of the scroll bar). For example, a user is reading a play (e.g., 5024 FIG. 5H) on a device with a touch sensitive display and makes contact 5026-*a* with a progress icon 5028. In this example, in response to detecting the contact with the progress icon, the device displays text from the content (e.g., “Act I” 5028-*a*, “Act II” 5028-*b*, “Act III” 5028-*c*, “Act IV” 5028-*d* and/or “Act V” 5028-*e* in FIG. 5I) within the expanded portion of the scroll bar. It should be noted in this example, that because the scroll bar is vertical, the first predefined direction 5006 is along the vertical axis of the electronic device (e.g., parallel to the scroll bar). In some embodiments, a user scrubs through the content by moving the contact in a direction along the first predefined direction 5006. For example, to advance to a later act in the play, the user may move the contact 5026-*a* along the touch screen device to a new contact location 5026-*b*.

The device detects (750) movement (e.g., 5066-1 in FIG. 5Q) of the contact (e.g., 5068-*a*-1 in FIG. 5Q) across the touch-sensitive surface to a location on the touch-sensitive surface that corresponds to a location (e.g., contact 5068-*b*-1 in FIG. 5Q) on the display outside the predefined area (e.g., 5004 in FIG. 5Q) that includes the progress icon (e.g., 5070-1 in FIG. 5Q). Movement of the contact includes (752) a first component of movement (e.g., 5072-1 in FIG. 5Q) of the contact on the touch-sensitive surface in a direction corresponding to movement on the display parallel to the first predefined direction (e.g., 5006 in FIG. 5Q) and a second component of movement (e.g., 5074-1 in FIG. 5Q) of the contact on the touch-sensitive surface in a direction corresponding to movement on the display perpendicular to the first predefined direction.

In some embodiments, the movement of the contact is in a straight line (5066-1-*a*) across the touch sensitive surface. However, it should be understood that the movement 5066-1 may include movement across the touch sensitive surface that follows other paths (e.g., 5066-1-*b* or 5066-1-*c* in FIG. 5Q). Such movement may include an initial movement from the progress icon to a location on the touch sensitive surface corresponding to a predefined region on the display followed by a subsequent movement on the touch sensitive surface corresponding to movement on the display within the predefined region. It should also be understood that if the initial movement on the touch sensitive surface includes movement corresponding to movement through a plurality of predefined regions on the display, the method of determining the scrubbing rate described herein may be repeated once for the horizontal component of movement that occurs within each region of the plurality of regions.

Similarly, while the embodiments will be described below with reference to a small number of regions (less than 5), it should also be noted that, in some embodiments, a large number of small regions (each region associated with a distinct scrubbing rate) are defined such that the change in the scrubbing rate appears to a user to be continuous (i.e., a discrete change in scrubbing rate between two adjacent regions is small enough so that the change is not perceptible to a human). Additionally, it should be understood that in these embodiments, a visual indicator of the scrubbing rate may be displayed that gives a general indication of the scrubbing rate (e.g., "hi-speed scrubbing," "half speed scrubbing," "quarter speed scrubbing," "fine scrubbing," etc.) but does not specifically indicate a precise scrubbing rate for the current region. As one example, on a display with 100 regions, the "hi-speed scrubbing" is displayed when the contact is in a location anywhere in the first 25 adjacent regions, even though each of the first 25 regions is associated with a distinct scrubbing rate.

The first component of movement of the contact includes (754) a direction (e.g., 5076 or 5077 in FIG. 5Q) and a speed. In some embodiments, the first component of movement (e.g., 5072-1 in FIG. 5Q) and the second component of movement (e.g., 5074-1 in FIG. 5Q) are perpendicular to each other (756).

Above, the first predefined direction 5006 on the display may be a horizontal direction, which encompasses moving right and left, but not moving in other directions. Similarly, above, the first predefined direction on the display may be a vertical direction, which encompasses moving up and down, but not moving in other directions. In contrast, the "direction of the first component of movement" of a contact refers to a single direction. For example, for a touch screen display with a horizontal scroll bar with a progress icon (e.g., the electronic device illustrated in FIG. 5Q), the direction of the first component of movement at any instant in time may be either to the right (e.g., 5076 in FIG. 5Q) or to the left (e.g., 5077 in FIG. 5Q), but cannot be both to the right and to the left simultaneously.

Operations 760-774, discussed below, are performed while the device detects (758) movement of the contact across the touch-sensitive surface.

The device determines (760) a current offset distance in accordance with a detected amount of the second component of movement of the contact. It should be understood that there are many different options for determining the offset distance. For example, as illustrated in FIG. 5Q, for a touch screen display, the current offset distance may correspond to the distance perpendicular to the first predefined direction between: (1) the progress icon and the current location of the contact (e.g., 5082 in FIG. 5Q); (2) the top of the predefined area that includes the progress icon and the current location of the contact (e.g., 5084 in FIG. 5Q); (3) the bottom of the predefined area that includes the progress icon and the current location of the contact (e.g., 5086 in FIG. 5Q); or (4) some other predetermined point or line on the touch screen display and the current location of the contact.

The device detects (762) a current first component of movement of the contact. In some embodiments, the "current" first component of movement is a measure of the instantaneous movement of the contact. In some embodiments, the "current" first component of movement is a running average over a small time window to reduce jitter (e.g., to reduce small unintentional movements of the contact). In response to detecting the current first component of movement of the contact, the device moves (764) the current position within the content at a scrubbing rate, such that the scrubbing rate decreases (766) as the current offset distance increases, and the direction of movement of the current position within the content is in accordance (768) with the direction of the current first component of movement of the contact. In some embodiments, an indication of the scrubbing rate (e.g., "fine scrubbing" in 5075-1 in FIG. 5Q) is displayed in the user interface.

FIGS. 5Q-5T provide an illustrative example of one embodiment of moving the current position within the content at a scrubbing rate in response to detecting a first component of movement, such that the scrubbing rate decreases as the current offset distance increases, and the direction of movement of the current position within the content is in accordance with the direction of the current first component of movement of the contact. For this example, FIG. 5Q illustrates the initial state of the device, with the progress icon 5070-1 located in an initial position in the predefined region.

In FIG. 5R the device detects a contact 5068-*a*-2 in a first predefined region 5004. The contact moves 5066-2 to a new contact location 5068-*b*-2 that is outside of the predefined region. The movement of the contact has a first component of motion 5072-2 and a second component of motion 5074-2. In response to detecting the movement of the contact, the device determines a current offset distance 5084-2 and moves the current position within the content indicated by the progress icon 5070-2 to a new location at a "half speed scrubbing" rate 5075-2.

In FIG. 5S the device detects a contact 5068-*a*-3 in a first predefined region 5004. The contact moves 5066-3 to a new contact location 5068-*b*-3 that is outside of the predefined region. The movement of the contact has a first component of motion 5072-3 and a second component of motion 5074-3. In response to detecting the movement of the contact, the device determines a current offset distance 5084-3 and moves the current position within the content indicated by the progress icon 5070-3 to a new location at a "quarter speed scrubbing" rate 5075-3. Here, the offset distance 5084-2 for the "hi-speed scrubbing" example in FIG. 5R is less than the offset distance 5084-3 for the "quarter speed scrubbing" example in FIG. 5S.

In some embodiments, if the device continued to detect the contact for the same amount of time in the "half speed scrubbing" and "quarter speed scrubbing" examples (e.g., thirty seconds) the current position in the content, as indicated by the progress icon, would move further in the "half speed scrubbing" example in FIG. 5R than in the "quarter speed scrubbing" example in FIG. 5S.

In FIG. 5T the device detects a contact 5068-*a*-4 in a first predefined region 5004. The contact moves 5066-4 to a new contact location 5068-*b*-4 that is outside of the predefined region. The movement of the contact has a first component of motion 5072-4 and a second component of motion 5074-4. In response to detecting the movement of the contact, the device determines a current offset distance 5084-4 and moves the current position within the content indicated by the progress icon 5070-4 to a new location at a "quarter speed scrubbing" rate 5075-4 (e.g., the progress icon, indicating the current position of the content, moves a distance across the display that is approximately one quarter of the magnitude of the first component of motion of the contact in a direction corresponding to the direction of the first component of motion). Here, the first component of motion 5072-4 in FIG. 5T is to the left (e.g., 5077 in FIG. 5T) while the first component of motion 5072-3 in FIG. 5S is to the right (e.g., 5076 in FIG. 5S). Thus, the current position within the content, as indicated by the progress icon, moves to the left in the backward "quarter speed scrubbing" example in FIG. 5T and to the right in the forward "quarter speed scrubbing" example in FIG. 5S.

In FIG. 5U the device (where the first predefined direction 5006 is vertical) detects a contact 5068-*a*-5 in a first predefined region 5004. The contact moves 5066-5 to a new contact location 5068-*b*-5 that is outside of the predefined region. The movement of the contact has a first component of motion 5072-5 and a second component of motion 5074-5. In response to detecting the movement of the contact, the device determines a current offset distance 5084-5 and moves the current position within the content indicated by the progress icon 5070-5 to a new location at a "half speed scrubbing" rate 5075-5.

Although the preceding examples have been given with reference to a touch screen display. In some embodiments the display and the touch-sensitive surface are separate, as discussed in greater detail above with reference to FIG. 5P.

In some embodiments, in response to detecting the current first component of movement of the contact, the device plays back (770) the content at the scrubbing rate. For example, if the content is a slideshow, the content is played back at the scrubbing rate.

In some embodiments, the scrubbing rate decreases (772) to a predetermined minimum rate as the second component of movement on the touch-sensitive surface increases. For example, the scrubbing rate may decrease as the offset distance increases until the offset distance reaches a predefined maximum value (e.g., three quarters of the length of the touch sensitive surface in a direction perpendicular to the first predefined direction).

In some embodiments, the device starts to move (774) the current position within the content at a scrubbing rate in response to detecting the current first component of movement of the contact after an initial time delay. For example, the device may ignore (e.g., buffer) movement of the contact for a predefined time period, so as to avoid moving the current position in the content in accordance with accidental or unintentional movements of the contact.

In some embodiments, the device detects (776) the contact at a location on the touch-sensitive surface that corresponds to a predetermined region on the display (e.g., 5087 in FIG. 5S or 5088 in FIG. 5T). In some embodiments, in response (778) to detecting the contact (e.g., 5068-*c* in FIG. 5S or 5068-*d* in FIG. 5T) at the location on the touch-sensitive surface that corresponds to the predetermined region on the display, the device moves the current position within the content at the scrubbing rate in accordance with the current offset distance (e.g., 5084-4 in FIG. 5T). In FIG. 5S the predetermined region is on the right side of the display, while in FIG. 5T the predetermined regions are on two sides of the display. In some embodiments, as shown in FIG. 5T, continuous scrubbing occurs (even if the current first component of movement of the contact stops) if the contact location corresponds to an edge of the display (e.g., region 5088 or 5089).

For a touch screen display with a horizontal scroll bar, continuous scrubbing backwards through the content may occur if the contact (e.g., 5068-*d* in FIG. 5T) is at the left edge of the display and continuous scrubbing forwards through the content may occur if the contact (e.g., 5068-*c* in FIG. 5S is at the right edge of the display. Similarly, for a touch screen display (e.g. 112 in 5U) with a vertical scroll bar continuous scrubbing backwards through the content may occur if the contact (e.g., 5068-*e* in FIG. 5U) is at the top edge of the display and continuous scrubbing forwards through the content may occur if the contact is at the bottom (e.g., 5068-*f* in FIG. 5U) edge of the display.

In some embodiments, while detecting the contact on the touch-sensitive surface, the device displays (780) an indicator of the scrubbing rate (e.g., "quarter speed scrubbing" 5075-3 in FIG. 5S). In some embodiments, while detecting movement of the contact across the touch-sensitive surface, the device displays (782) an indicator of the scrubbing rate (e.g., "quarter speed scrubbing" 5075-3 in FIG. 5S).

In some embodiments, the device ceases (784) to detect the current first component of movement of the contact. In response to ceasing to detect the current first component of movement of the contact, the device ceases (786) to move the current position within the content. For example, when the provided content is music and device is scrubbing through the music, when the device ceases to detect movement of the contact (e.g., a user stops moving a finger along the touch screen display), the device stops scrubbing through the content (e.g., the device pauses).

In some embodiments, the device detects (788) a break in the contact (e.g., detecting lift off of the contact). In response to detecting the break in the contact, the device stops (790) movement of the current position within the content. For example if a user is scrubbing through a set of images, the scrubbing stops when the user lifts the contact from the touch-sensitive surface. In some embodiments, the device detects (792) a break in the contact (e.g., detecting lift off of the contact). In response to detecting the break in the contact, the device plays back (794) the content at the playback speed (e.g., at the adjusted/updated/then current position within the content). For example if the user is scrubbing through a set of images, the scrubbing continues at the current rate when the user lifts the contact, (e.g., setting a speed for a slideshow). As another example, if a user is scrubbing through an audio file (e.g., song), when the user lifts off the contact, the device beings to play the audio file (e.g., song) at a normal playback speed for the audio content (e.g., the speed at which the song was recorded).

It should be understood that at any instant in time, a current location of the contact on the touch-sensitive surface corresponds to a current location on the display. The current location on the display will have a corresponding current total distance to the progress icon on the display. In some embodiments, the scrubbing rate decreases as the current total distance to the progress icon increases, rather than having the scrubbing rate decrease as the current offset distance increases.

FIGS. 8A-8G are flow diagrams illustrating a method 800 of scrolling in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 800 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

The device displays (801) a progress icon (e.g., 5002 in FIG. 5A) in a first predefined area (e.g., 5004 in FIG. 5A) on the display (e.g., 112 in FIG. 5A). The progress icon is configured to move in a first predefined direction (e.g., 5006 in FIG. 5A or 5006 in FIG. 5H) on the display. For example, if the first predefined direction is horizontal (e.g., 5006 in FIG. 5A), then the progress icon can only move to the right and to the left; and if the first predefined direction is vertical (e.g., 5006 in FIG. 5H), then the progress icon can only move up and down.

In some embodiments, the progress icon is (802) a thumb icon (e.g., 5002 in FIG. 5A) in a scroll bar. In some embodiments, the progress icon is (803) an end of a bar (e.g., 5011 in FIG. 5C). In some embodiments, the end of the bar moves in accordance with the current position in the content.

In some embodiments, the first predefined direction is (804) a horizontal direction on the display (e.g., 5006 in FIG. 5A). In some embodiments, the first predefined direction is (805) a vertical direction on the display (e.g., 5006 in FIG. 5H).

Content is provided (806) with the electronic device. In some embodiments, providing content includes playing back (807) audio content (e.g., a voice mail, music, audio book, podcast, or other audio recording). For example, in FIG. 5A, a podcast is provided with the device. In some embodiments, providing content includes playing back (808) video content (e.g., a movie, television show, web video, slideshow, or animation). For example, in FIG. 5E a movie 5018 is provided with the device. In some embodiments, providing content includes displaying (809) an electronic document (e.g., an electronic book, web page, PDF file, word processing document, presentation, or spreadsheet). For example, in FIG. 5H a play is provided with the device.

The device indicates (810) a current position within the content with the progress icon. In some embodiments, providing content with the electronic device includes playing back (811) content with the electronic device at a playback speed prior to detecting movement of the contact across the touch-sensitive surface, and indicating a current position within the content with the progress icon includes indicating (812) a current playback position within the content with the progress icon. For example, where the provided content a song, initially the song is playing at a normal playback speed and the progress icon (e.g., 5002 in FIG. 5A) shows the current part of the music that is being played.

Operations 814-866, discussed below, are performed while content is provided (813) with the electronic device.

The device detects (814) a contact with the touch-sensitive surface at a location that corresponds to the progress icon. In some embodiments, detecting contact with a location that corresponds to the first predefined area that includes the progress icon is sufficient (e.g., the contact may be anywhere in the predefined region rather than exactly at the location that corresponds to the predefined icon). In some embodiments, the contact is (815) a finger contact (e.g., 5010 in FIG. 5A). In some embodiments, the contact is (816) a stylus contact (e.g., 203 in FIG. 2).

In some embodiments, in response to detecting (817) the contact at a location on the touch-sensitive surface that corresponds to a location in the first predefined area, the device moves (818) the progress icon to a position on the display that corresponds to the location of the contact on the touch-sensitive surface. For example, for a touch screen display, moving the progress icon to a position associated with the contact upon detecting the contact with the first predefined area on the touch screen display. For example, in FIG. 5A, a device with a touch screen display detects a contact 5010 with the touch screen display in the predefined area 5004 that contains the progress icon 5002 and then moves the progress icon 5002 to a position in the display that corresponds to the position of the contact 5010, as shown in FIG. 5B.

In some embodiments, the device displays (819) a scroll bar (e.g., 5012 in FIG. 5B) in the first predefined area (e.g., 5004 in FIG. 5B) on the display. In some embodiments, after detecting the contact (e.g., 5010 in FIG. 5B) with the touch-sensitive surface at the location that corresponds to the progress icon on the display, the device displays (820) an expanded portion of the scroll bar (e.g., 5014 in FIG. 5C). In some embodiments, detecting contact with the touch sensitive surface at any location that corresponds to a location in the first predefined area on the display that includes the progress icon is sufficient. In some embodiments, the display of the expanded portion of the scroll bar replaces (821) the display of the scroll bar (e.g., the expanded portion of the scroll 5014 bar shown in FIG. 5C replaces the scroll bar 5012 shown in FIG. 5B).

In some embodiments, the expanded portion of the scroll bar is displayed in response to detecting the contact with the touch-sensitive surface at the location that corresponds to the progress icon. In some embodiments, the expanded portion of the scroll bar is displayed after contact is detected at the location that corresponds to the progress icon for at least a predetermined time period (e.g., 0.5-1.0 seconds.) In some embodiments, the device displays (822) a signal intensity (e.g., 5016 in FIG. 5D) within the expanded portion of the scroll bar (e.g., if the content contains audio, displaying a waveform of the audio intensity that corresponds to the audio content within the expanded portion of the scroll bar).

In some embodiments, the expanded portion of the scroll bar is representative of the full extent of the provided content. In other embodiments, the expanded portion of the scroll bar is representative of only a portion of the provided content. For example, if a user is listening to a 10 minute long song on a device with a touch sensitive display, the device initially displays a scroll bar that is representative of the entire ten minute song (e.g., a first end of the bar corresponds to the beginning of the song and a second end of the bar corresponds to the end of the song.) In this example, when the device detects a contact in the predefined area, the device will present the user with an expanded portion of the scroll bar that is representative a two minute segment of the song (e.g., the expanded portion of the scroll bar corresponds to one minute of the content on either side of the current location of the detected contact). In some embodiments the scrolling rate is variable over the length of the scroll bar (e.g., the scrolling rate is slow near the contact and fast near the ends of the scroll bar, which provides the user with fine control over content near the contact while still allowing the user to scrub to an end of the content by moving the contact to the end of the scroll bar). The user may then move the contact along the expanded scroll bar to move the progress icon to a location corresponding to a position in the content, as described in greater detail below.

In some embodiments, the device displays (823) representative images (e.g., 5020-*a*, 5020-*b*, 5020-*c*, 5020-*d*, 5020-*e* in FIG. 5F) from the content within the expanded portion of the scroll bar (e.g., if the content contains video, displaying images that corresponds to frames in the video content within the expanded portion of the scroll bar). For example, a user is watching a movie (e.g., 5018 FIG. 5E), and makes contact 5022-*a* with the progress icon 5002. In this example, in response to the contact, the device displays frames from the video (e.g., 5020-*a*, 5020-*b*, 5020-*c*, 5020-*d*, 5020-*e* in FIG. 5F), and the user slides the contact to 5022-*b*, moving progress icon to a location associated with an image 5020-*d* from the content that is displayed in the expanded portion of the scroll bar. In this example, when the user releases contact, the video content begins playing at the point associated with the progress icon at a normal playback speed.

In some embodiments, the device displays (824) representative text from the content within the expanded portion of the scroll bar (e.g., displaying chapter or section headings that corresponds to the content within the expanded portion of the scroll bar). For example, a user is reading a play (e.g., 5024 FIG. 5H) on a device with a touch sensitive display and makes contact 5026-*a* with a progress icon 5028. In this example, in response to detecting the contact with the progress icon, the device displays text from the content (e.g., "Act I" 5028-*a*, "Act II" 5028-*b*, "Act III" 5028-*c*, "Act IV" 5028-*d* and/or "Act V" 5028-*e* in FIG. 5I) within the expanded portion of the scroll bar. It should be noted in this example, that because the scroll bar is vertical, the first predefined direction 5006 is along the vertical axis of the electronic device (e.g., parallel to the scroll bar). In some embodiments, a user scrubs through the content by moving the contact in a direction along the first predefined direction 5006. For example, to advance to a later act in the play, the user may move the contact 5026-*a* along the touch screen device to a new contact location 5026-*b*.

The device detects (825) movement (e.g., 5090-1 in FIG. 5V) of the contact (e.g., 5092-*a*-1 in FIG. 5V) across the touch-sensitive surface (e.g., touch screen 112 in FIG. 5V) to a location (e.g., contact 5092-*b*-1 in FIG. 5V) on the touch-sensitive surface that corresponds to a second predefined area (e.g., 5094-*a* in FIG. 5V) on the display outside the first predefined area (e.g., 5004 in FIG. 5V). Movement of the contact includes (826) a first component of movement (e.g., 5096-1 in FIG. 5V) of the contact on the touch-sensitive surface in a direction corresponding to movement on the display parallel to the first predefined direction (e.g., 5006 in FIG. 5V) and a second component of movement (e.g., 5098-1 in FIG. 5V) of the contact on the touch-sensitive surface in a direction corresponding to movement on the display perpendicular to the first predefined direction.

The first component of movement of the contact includes (827) a direction (e.g., 5076 or 5077 in FIG. 5V) and a speed. In some embodiments, the second component of movement of the contact includes a direction and speed. In some embodiments, the first component of movement (e.g., 5096-1 in FIG. 5V) and the second component of movement (e.g., 5098-1 in FIG. 5V) are perpendicular (828) to each other (927).

Above, the first predefined direction 5006 on the display may be a horizontal direction, which encompasses moving right and left, but not moving in other directions. Similarly, the first predefined direction on the display may be a vertical direction, which encompasses moving up and down, but not moving in other directions. Here, the direction of the first component of movement of the contact refers to a single direction. For example, for a touch screen display with a horizontal scroll bar with a progress icon (e.g., the electronic device illustrated in FIG. 5V), the direction of the first component of movement at any instant in time may be either to the right (e.g., 5076 in FIG. 5V) or to the left (e.g., 5077 in FIG. 5V), but cannot be both to the right and to the left simultaneously.

Operations 830-839, discussed below, are performed while the contact is located (829) in an area on the touch-sensitive surface that corresponds to the second predefined area (5094-*a* in FIG. 5V) on the display.

The device detects (830) a current first component of movement of the contact. In some embodiments, the "current" first component of movement is a measure of the instantaneous movement of the contact. In some embodiments, the "current" first component of movement is a running average over a small time window to reduce jitter (e.g., to reduce small unintentional movements of the contact). In response to detecting the current first component of movement of the contact, the device moves (831) the current position within the content at a first scrubbing rate. The direction of movement of the current position within the content is in accordance (832) with the direction (e.g., 5076 or 5077 in FIG. 5V) of the current first component of movement of the contact. In some embodiments, the first scrubbing rate is (833) a predetermined rate.

In some embodiments, the device starts (834) to move the current position within the content at the first scrubbing rate in response to detecting the current first component of movement of the contact after an initial time delay. For example, the device may ignore (e.g., buffer) movement of the contact for a predefined time period, so as to avoid moving the current position in the content in accordance with accidental or unintentional movements of the contact. In some embodiments, the scrubbing rate decreases (835) to a predetermined minimum rate as the second component of movement on the touch-sensitive surface increases. For example, the farthest vertical distance on screen has a predefined minimum scrubbing rate.

Figure 5W:
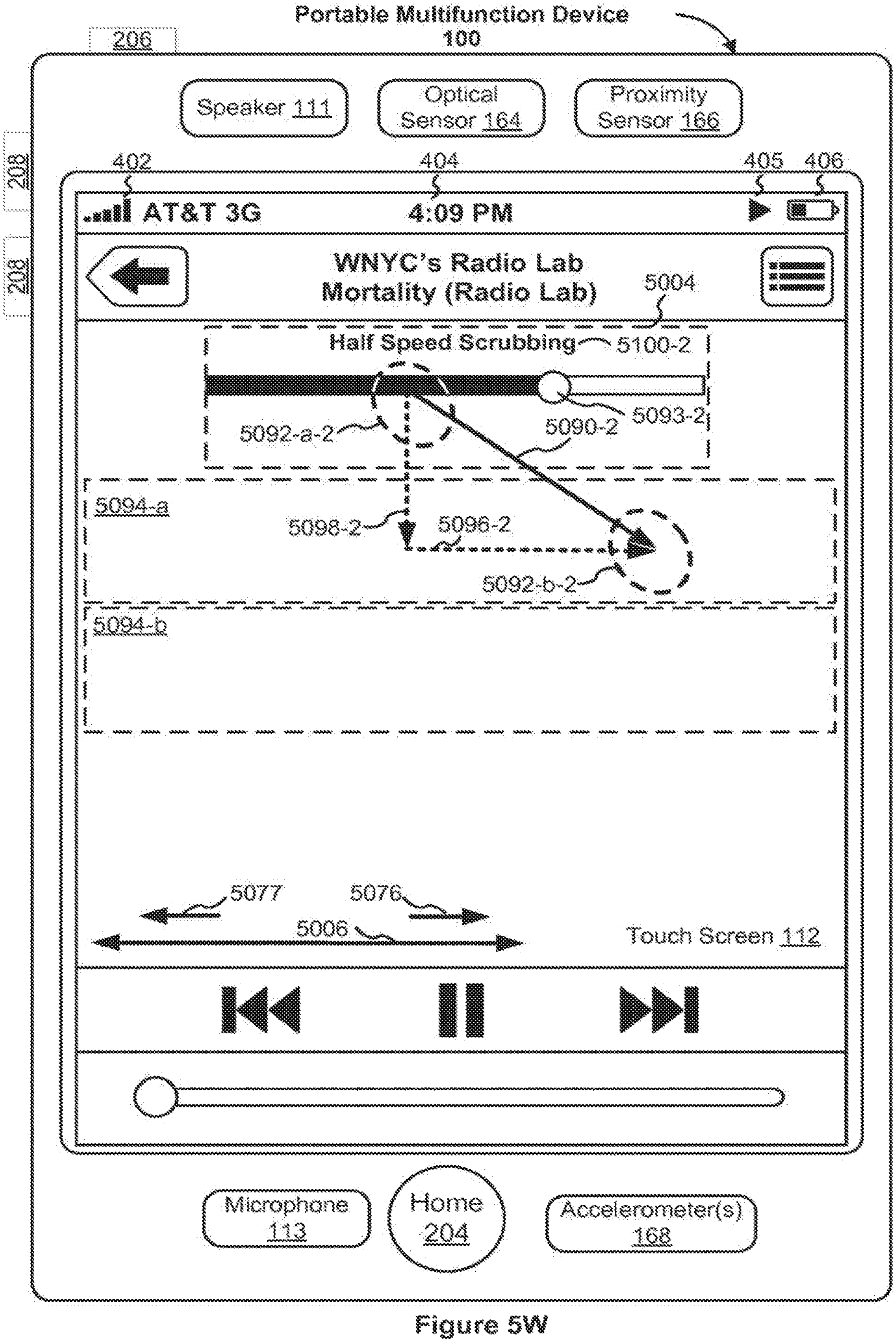

FIGS. 5V and 5W provide an illustrative example of one embodiment of moving the current position within the content at a first scrubbing rate in response to detecting a first component of movement while the contact is in the second predefined area (e.g., 5094-*a*), where the direction of movement of the current position within the content is in accordance with the direction of the current first component of movement of the contact. For this example, FIG. 5V illustrates the initial state of the device, with the progress icon 5093-1 located in an initial position in the first predefined area.

In FIG. 5V the device detects a contact 5092-*a*-2 in a first predefined area 5004. While in this first predefined area 5004, the device moves the current position within the content indicated by the progress icon 5093-*a* at a "hi-speed scrubbing" rate 5100-1 in response to movement of the contact 5090-1 within the first predefined region 5004. As shown in FIG. 5V, the contact moves 5090-2 to a new contact location 5092-*b*-2 that is within the second predefined area 5094-*a*. The movement of the contact has a first component of motion 5096-2 and a second component of motion 5098-2. In response to detecting the movement of the contact, the device moves the current position within the content indicated by the progress icon 5093-2 to a new location at a "half speed scrubbing" rate 5100-2 based on the horizontal component of movement of the contact on the touch sensitive surface in the region that corresponds to the second predefined region 5094-*a* on the display.

In some embodiments, while the contact is located in the area on the touch-sensitive surface that corresponds to the second predefined area on the display, the device plays back (836) the content at the first scrubbing rate in response to detecting the current first component (e.g., 5096-2 in FIG. 5W) of movement of the contact. In some embodiments, while the contact is located in the area on the touch-sensitive surface that corresponds to the second predefined area on the display, the device displays (837) an indicator of the first scrubbing rate. (e.g., "half speed scrubbing" 5100-2 in FIG. 5W)

In some embodiments, while the contact is located in the area on the touch-sensitive surface that corresponds to the second predefined area on the display, the device ceases (838) to detect the current first component of movement of the contact. In response to ceasing to detect the current first component of movement of the contact, the device ceases (839) to move the current position within the content. For example, when the provided content is music and device is scrubbing through the music, when the device ceases to detect movement of the contact (e.g., a user stops moving a finger along the touch screen display), the device stops scrubbing through the content (e.g., the device pauses).

The device detects (840) movement of the contact across the touch-sensitive surface to a location on the touch-sensitive surface that corresponds to a third predefined area (e.g., 5094-*b* in FIG. 5X) on the display outside the first predefined area and the second predefined area. In some embodiments, the progress icon is farther (841) from the third predefined area than from the second predefined area.

Operations 843-850, discussed below, are performed while the contact is located (842) in an area on the touch-sensitive surface that corresponds to the third predefined area (e.g., 5094-*b* in FIG. 5X) on the display:

The device detects (843) a current first component of movement of the contact. In some embodiments, the "current" first component of movement is a measure of the instantaneous movement of the contact. In some embodiments, the "current" first component of movement is a running average over a small time window to reduce jitter (e.g., to reduce small unintentional movements of the contact). In response to detecting the current first component of movement of the contact, the device moves (844) the current position within the content at a second scrubbing rate. In some embodiments, the direction of movement of the current position within the content is in accordance (845) with the direction (e.g., 5076 or 5077 in FIG. 5V) of the current first component of movement of the contact.

Figure 5X:
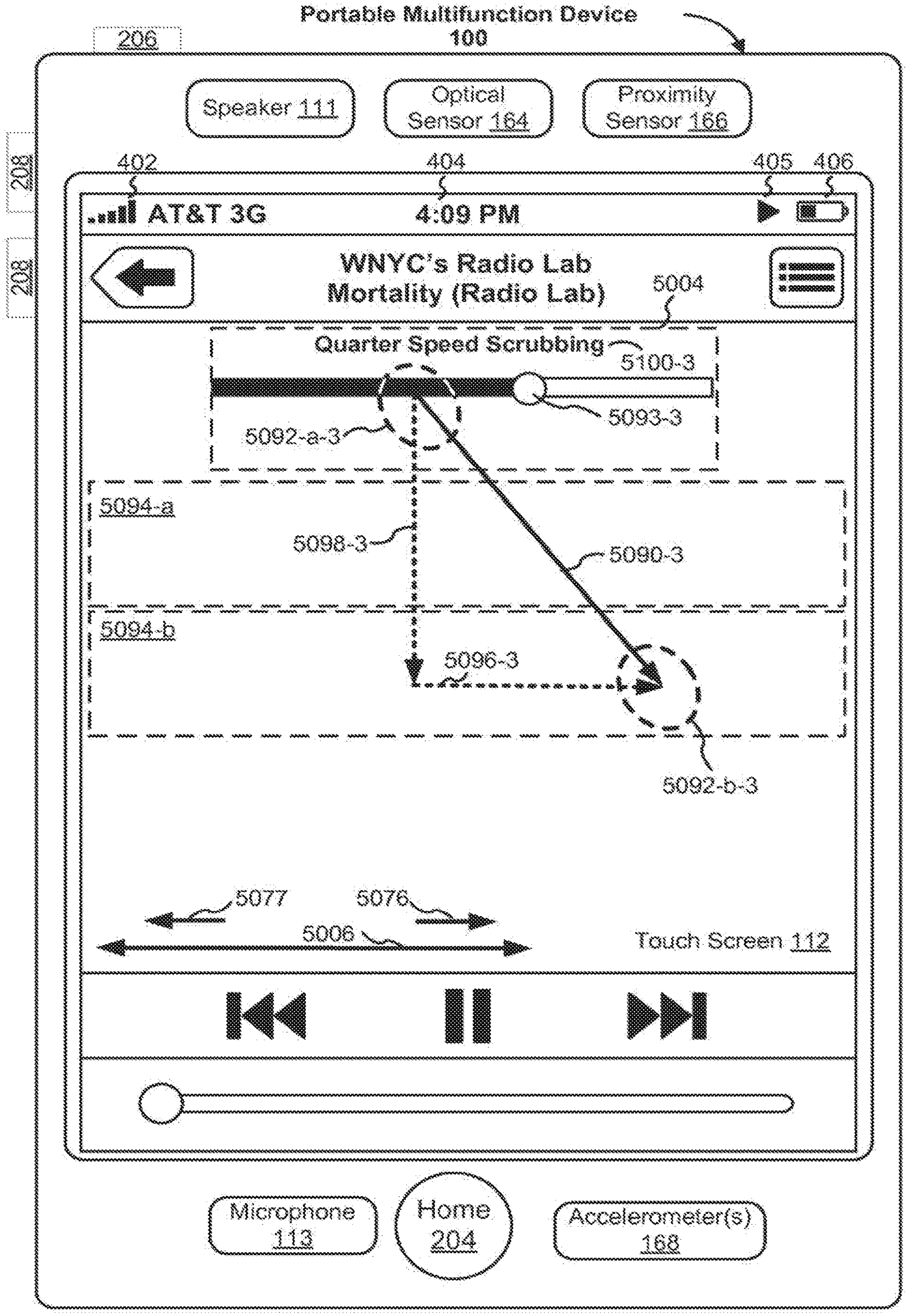

FIGS. 5V and 5X provide an illustrative example of one embodiment of moving the current position within the content at a second scrubbing rate while the contact is in the third predefined area (e.g., 5094-*b*), where the direction of movement of the current position within the content is in accordance with the direction of the current first component of movement of the contact. For this example, FIG. 5V illustrates the initial state of the device, with the progress icon 5093-1 located in an initial position in the first predefined area.

In FIG. 5X the device detects a contact 5092-*a*-3 in a first predefined area 5004. The contact moves 5090-3 to a new contact location 5092-*b*-3 that is within the third predefined area 5094-*b*. The movement of the contact has a first component of motion 5096-3 and a second component of motion 5098-3. In response to detecting the movement of the contact, the device moves the current position within the content indicated by the progress icon 5093-3 to a new location at a "quarter speed scrubbing" rate 5100-3.

The second scrubbing rate is less than the first scrubbing rate (846).

In some embodiments, if the device continued to detect the contact for the same amount of time in the "half speed scrubbing" and "quarter scrubbing" examples (e.g., thirty seconds) the current position in the content, as indicated by the progress icon, would move further in the "half speed scrubbing" example in FIG. 5W than in the "quarter speed scrubbing" example in FIG. 5X.

In some embodiments, while the contact is located in the area on the touch-sensitive surface that corresponds to the third predefined area on the display, the device plays back (847) the content at the second scrubbing rate that is less than the first scrubbing rate in response to detecting the current first component of movement of the contact. In some embodiments, while the contact is located in the area on the touch-sensitive surface that corresponds to the third predefined area on the display, the device displays (848) an indicator of the second scrubbing rate. (e.g., "quarter-speed scrubbing" 5100-3 in FIG. 5X)

In some embodiments, while the contact is located in the area on the touch-sensitive surface that corresponds to the third predefined area on the display, the device ceases (849) to detect the current first component of movement of the contact; and, in response to ceasing to detect the current first component of movement of the contact, the device ceases (850) to move the current position within the content. For example, when the provided content is music and device is scrubbing through the music, when the device ceases to detect movement of the contact (e.g., a user stops moving a finger contact along the touch screen display), the device stops scrubbing through the content (e.g., the device pauses).

In some embodiments, the device detects (851) movement of the contact across the touch-sensitive surface to a location that corresponds to a fourth predefined area (e.g., 5094-*c* in FIG. 5Y) on the display outside of the first predefined area, the second predefined area and the third predefined area. In some embodiments, the progress icon (e.g., 5093-4) is farther from the fourth predefined area than from the third predefined area (852).

Figure 5Y:
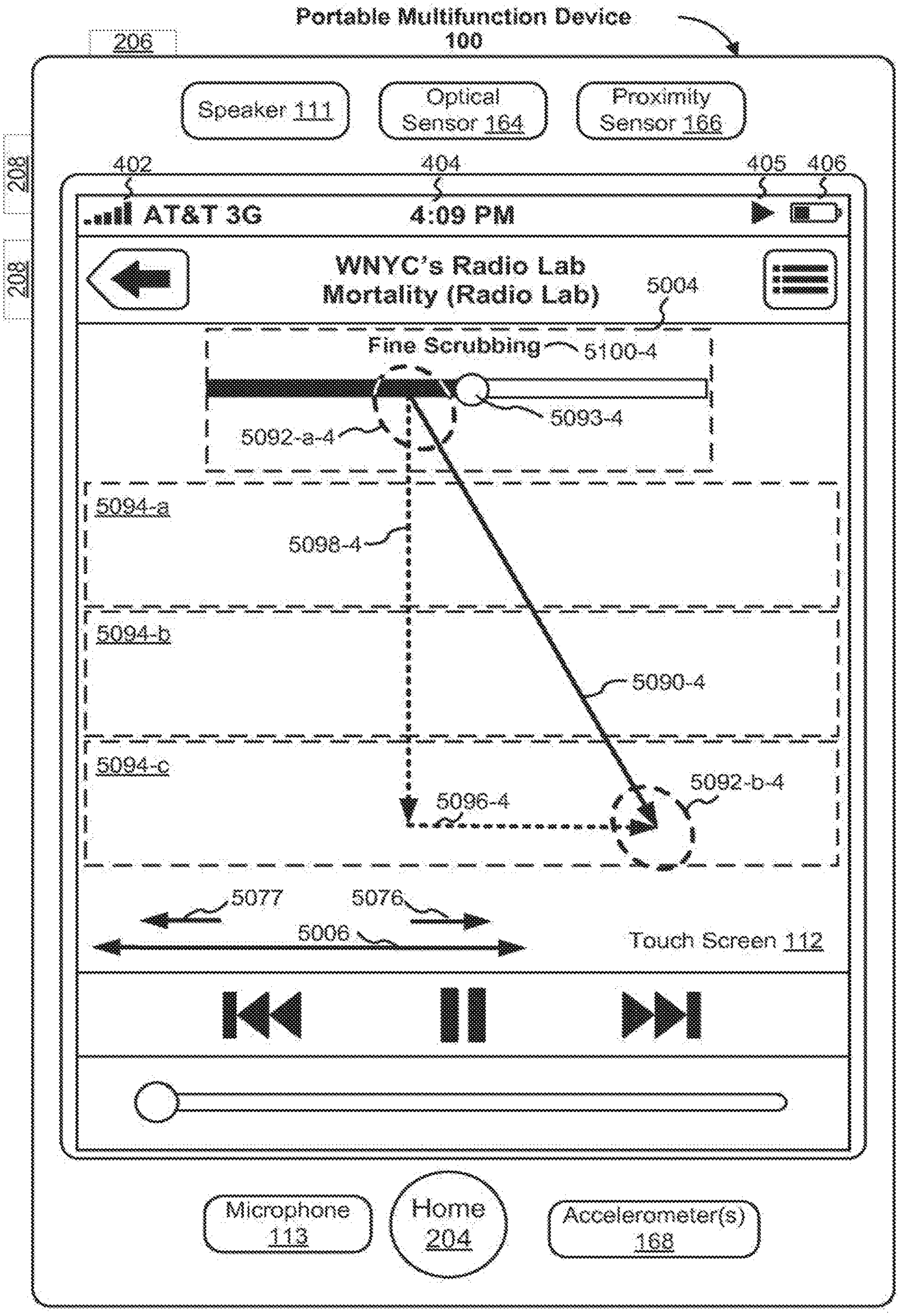

FIGS. 5V and 5Y provide an illustrative example of one embodiment of moving the current position within the content at a third scrubbing rate while the contact is in the fourth predefined area (e.g., 5094-*c*), where the direction of movement of the current position within the content is in accordance with the direction of the current first component of movement of the contact. For this example, FIG. 5V illustrates the initial state of the device, with the progress icon 5093-1 located in an initial position in the first predefined area.

In FIG. 5X the device detects a contact 5092-*a*-4 in a first predefined area 5004. The contact moves 5090-4 to a new contact location 5092-*b*-4 that is within the fourth predefined area 5094-*c*. The movement of the contact has a first component of motion 5096-4 and a second component of motion 5098-4. In response to detecting the movement of the contact, the device moves the current position within the content indicated by the progress icon 5093-4 to a new location at a "fine scrubbing" rate 5100-4.

In some embodiments, while the contact is located in the fourth predefined area on the touch-sensitive surface that corresponds to the fourth predefined area on the display, the device moves (853) the current position within the content at a third scrubbing rate, wherein the third scrubbing rate is less than the second scrubbing rate.

In some embodiments, if the device continued to detect the contact for the same amount of time in the "quarter speed scrubbing" and "fine scrubbing" examples (e.g., thirty seconds) the current position in the content, as indicated by the progress icon, would move further in the "quarter speed scrubbing" example in FIG. 5X than in the "fine scrubbing" example in FIG. 5Y.

In FIG. 5BB the device (where the first predefined direction is vertical) detects a contact 5092-*a*-7 in a first predefined area 5004. The contact moves 5090-7 to a new contact location 5092-*b*-7 that is within the fourth predefined area 5094-*c*. The movement of the contact has a first component of motion 5096-7 and a second component of motion 5098-7. In response to detecting the movement of the contact, the device moves the current position within the content indicated by the progress icon 5093-7 to a new location at a "quarter speed scrubbing" rate 5100-7.

In some embodiments, the device detects (854) movement of the contact across the touch-sensitive surface to a location on the touch-sensitive surface that corresponds to a fourth predefined area on the display outside the first predefined area, the second predefined area and the third predefined area. In some embodiments, the progress icon (e.g., 5093-4 in FIG. 5Y) is farther from the fourth predefined area (e.g., 5094-*c* in FIG. 5Y) than from the third predefined area (e.g., 5094-*b* in FIG. 5Y) (855).

In some embodiments, operations 857-860, discussed below, are performed while the contact is located (856) in an area on the touch-sensitive surface that corresponds to the fourth predefined area on the display.

In some embodiments, the device detects (857) a current first component of movement of the contact. For example, "current" can be instantaneous or a running average over a small time window to reduce jitter. In some embodiments, the "current" first component of movement is a measure of the instantaneous movement of the contact. In some embodiments, the "current" first component of movement is a running average over a small time window to reduce jitter (e.g., to reduce small unintentional movements of the contact).

Figure 5Z:
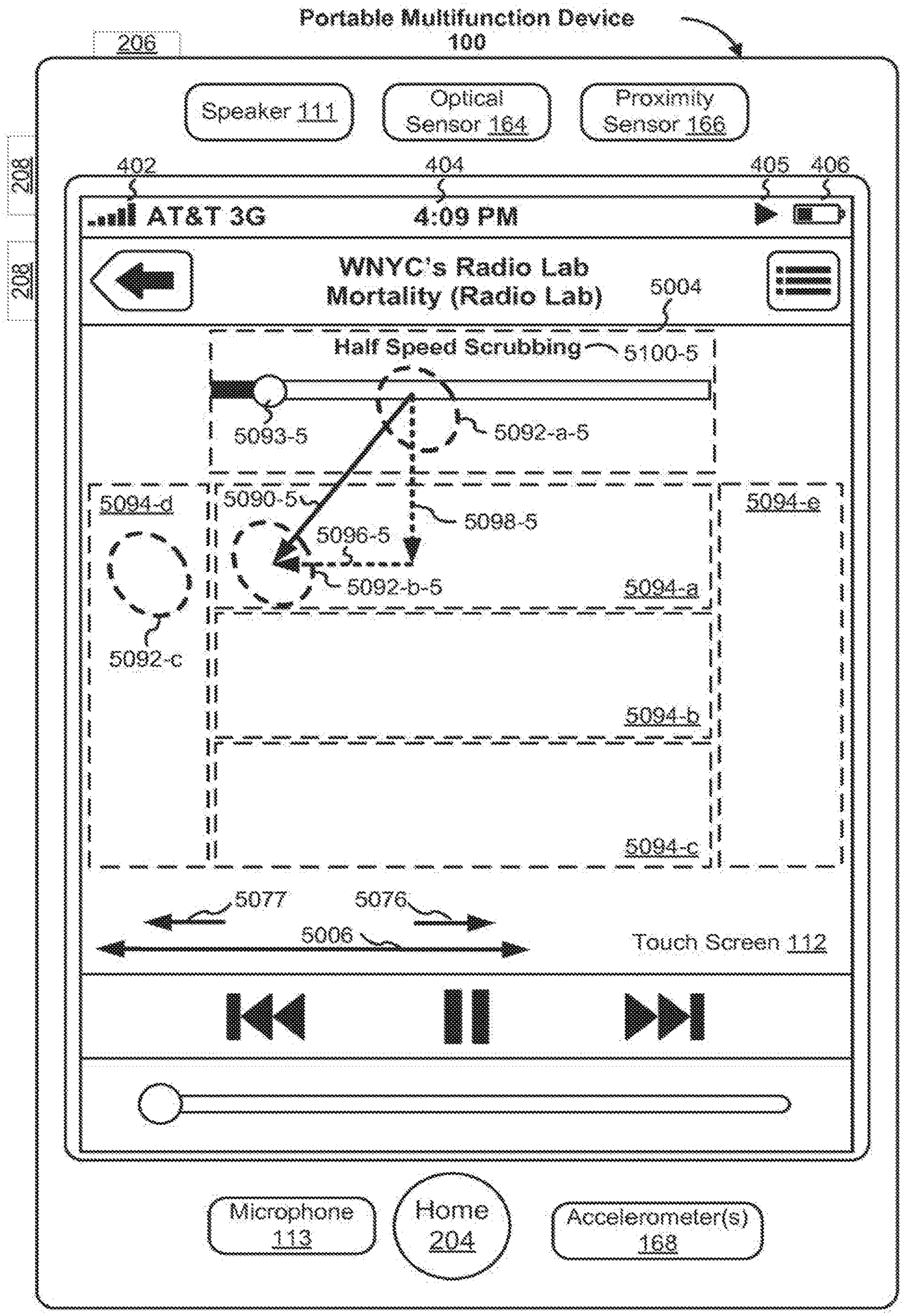
Figure 5A:
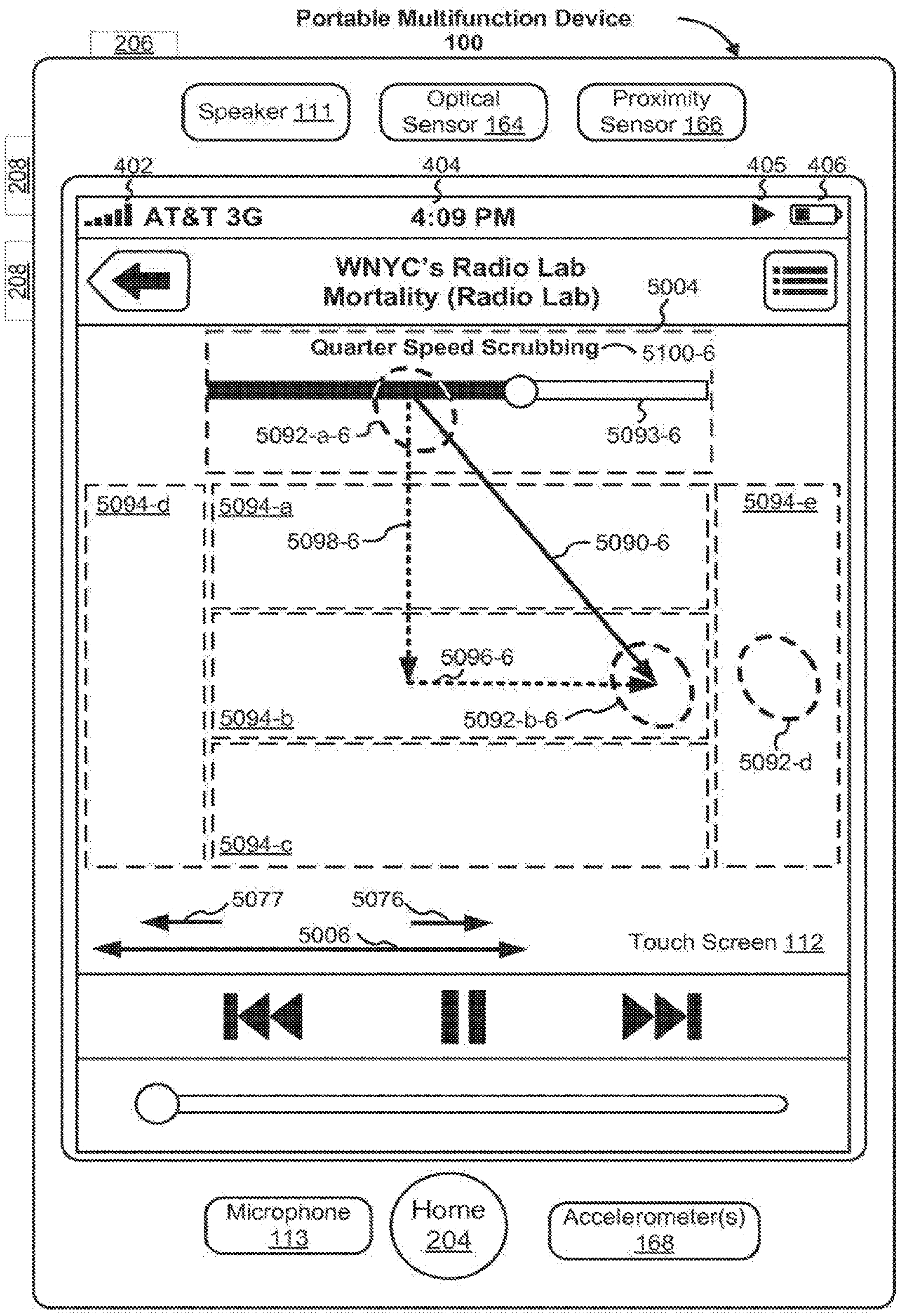
Figure 5B:
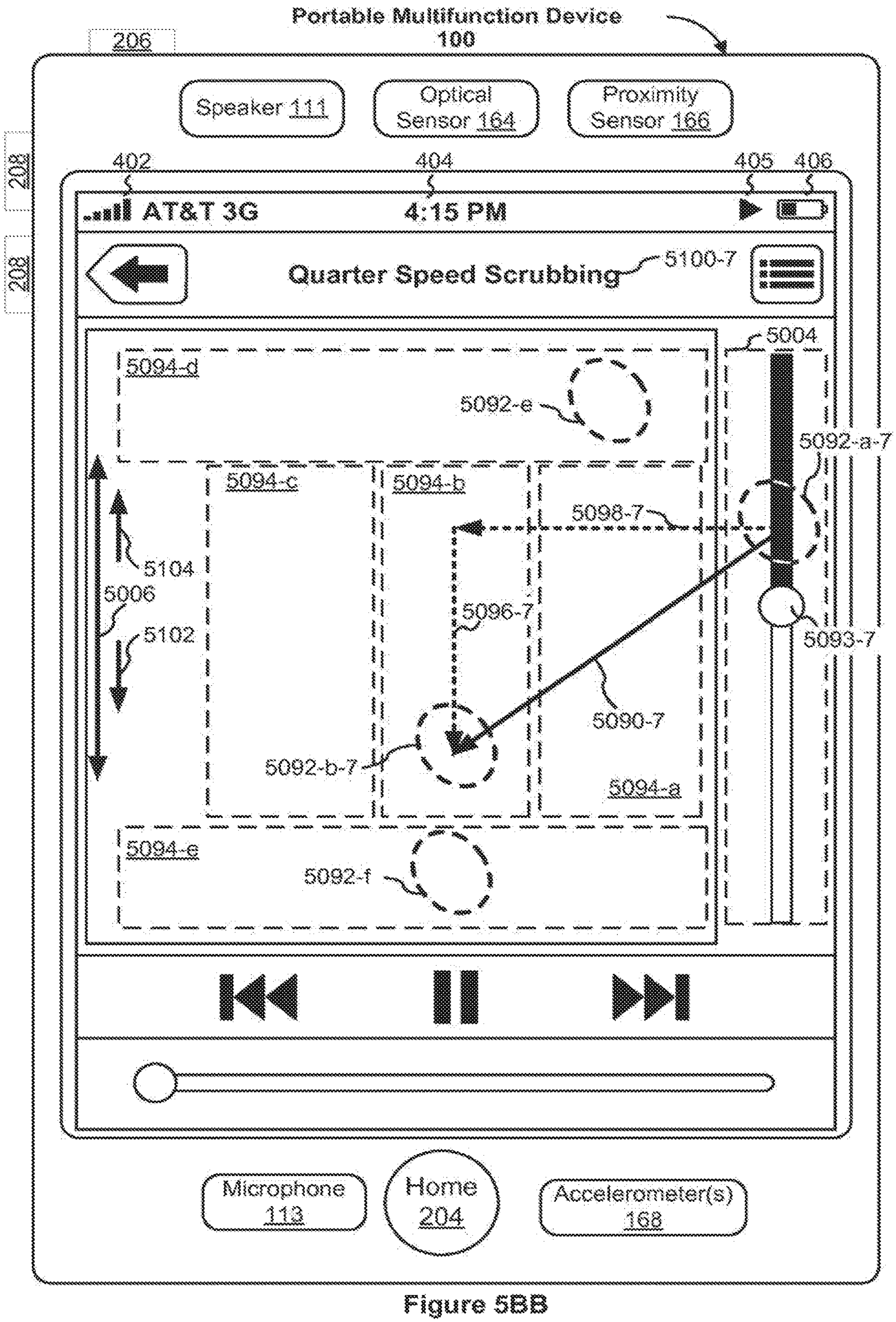
Figure 5C:
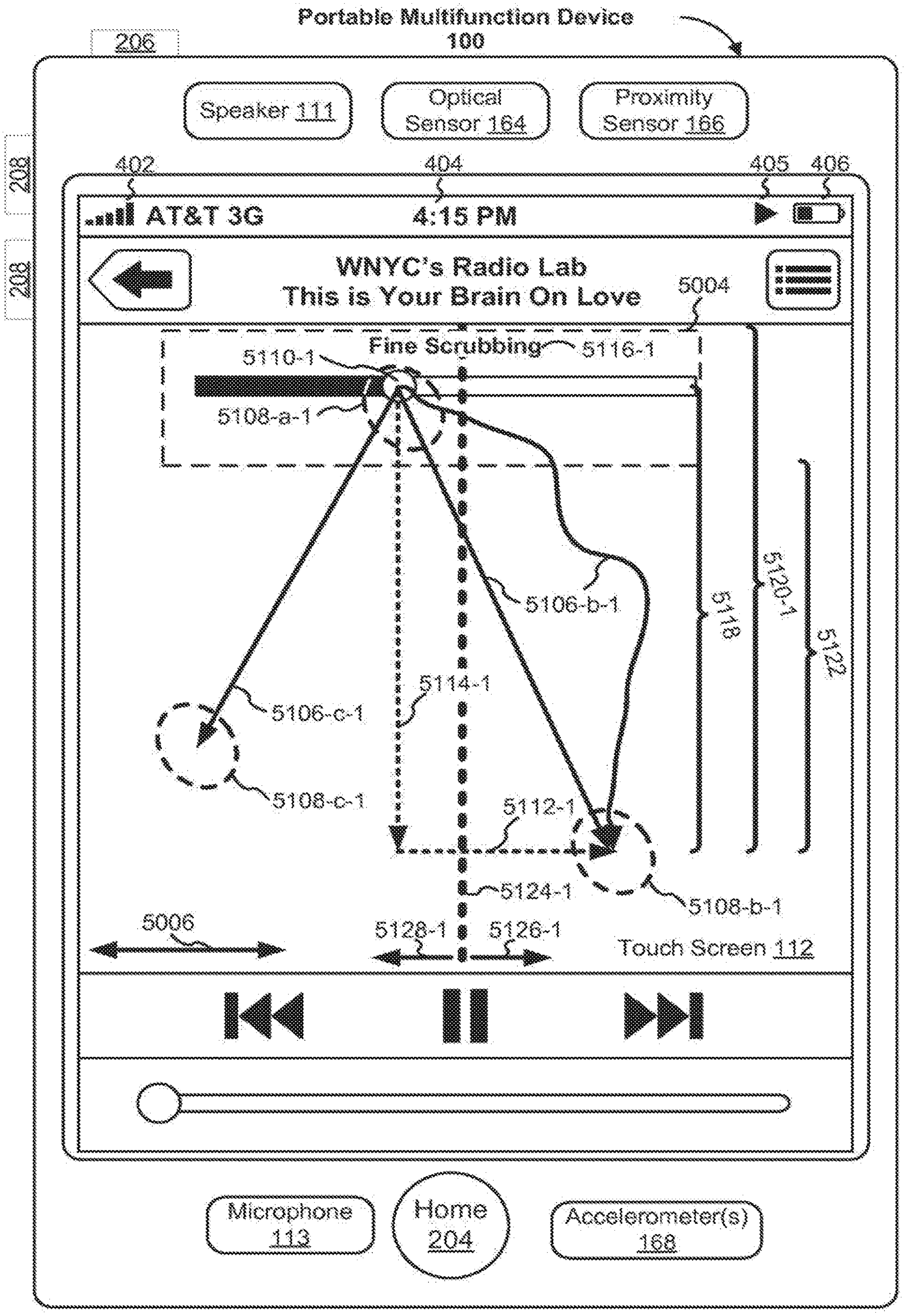
Figure 5D:
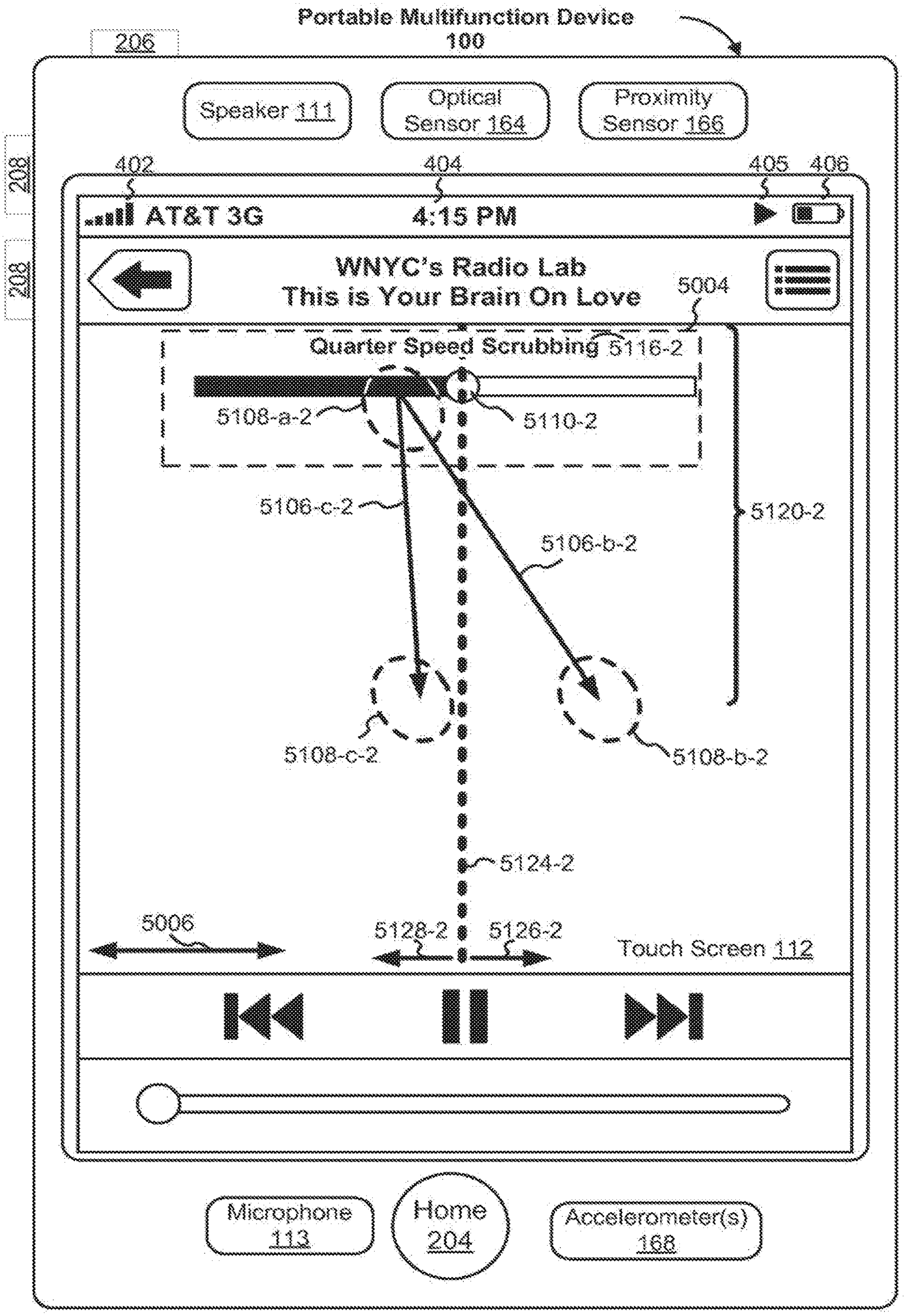
Figure 5E:
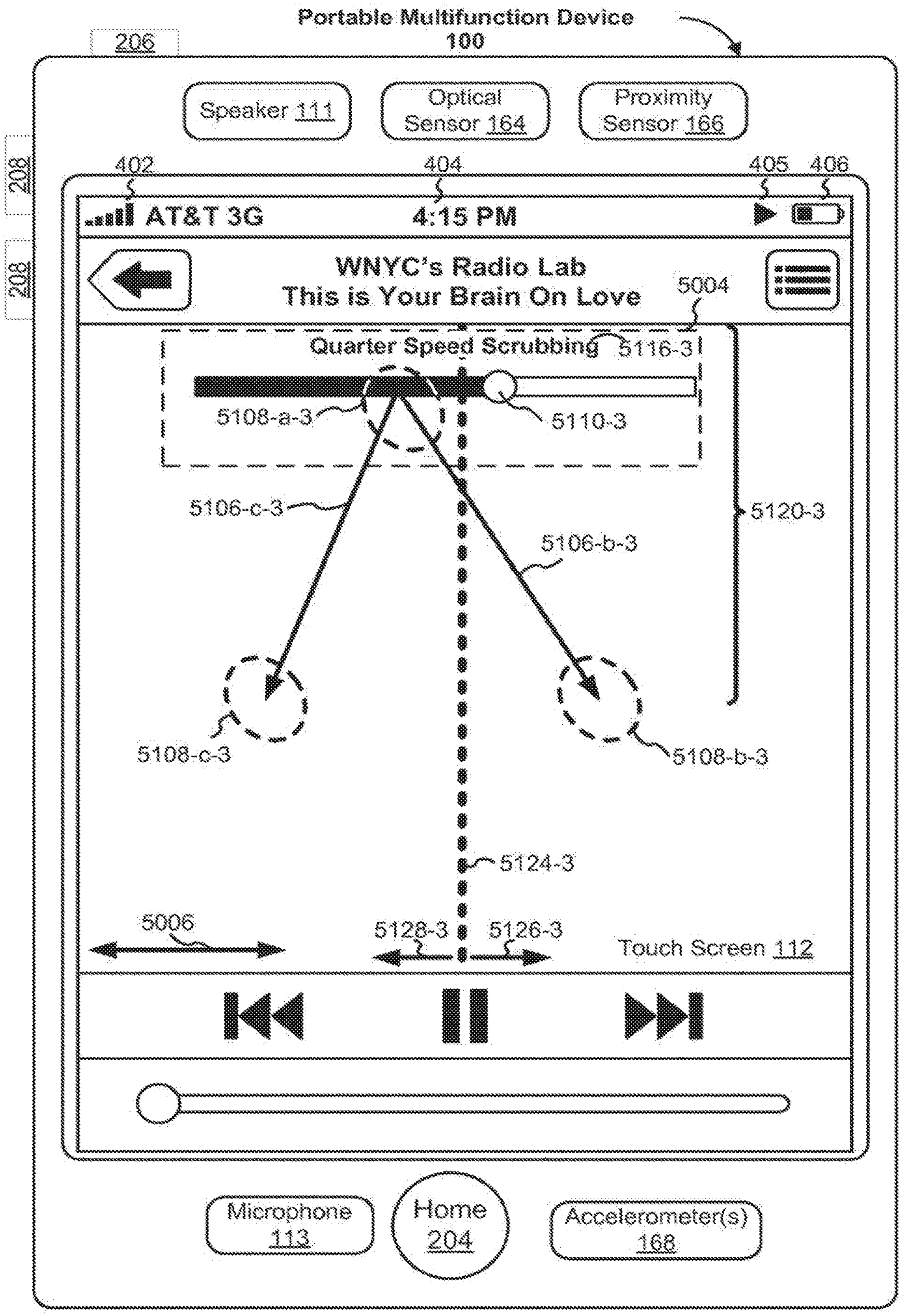
Figure 5F:
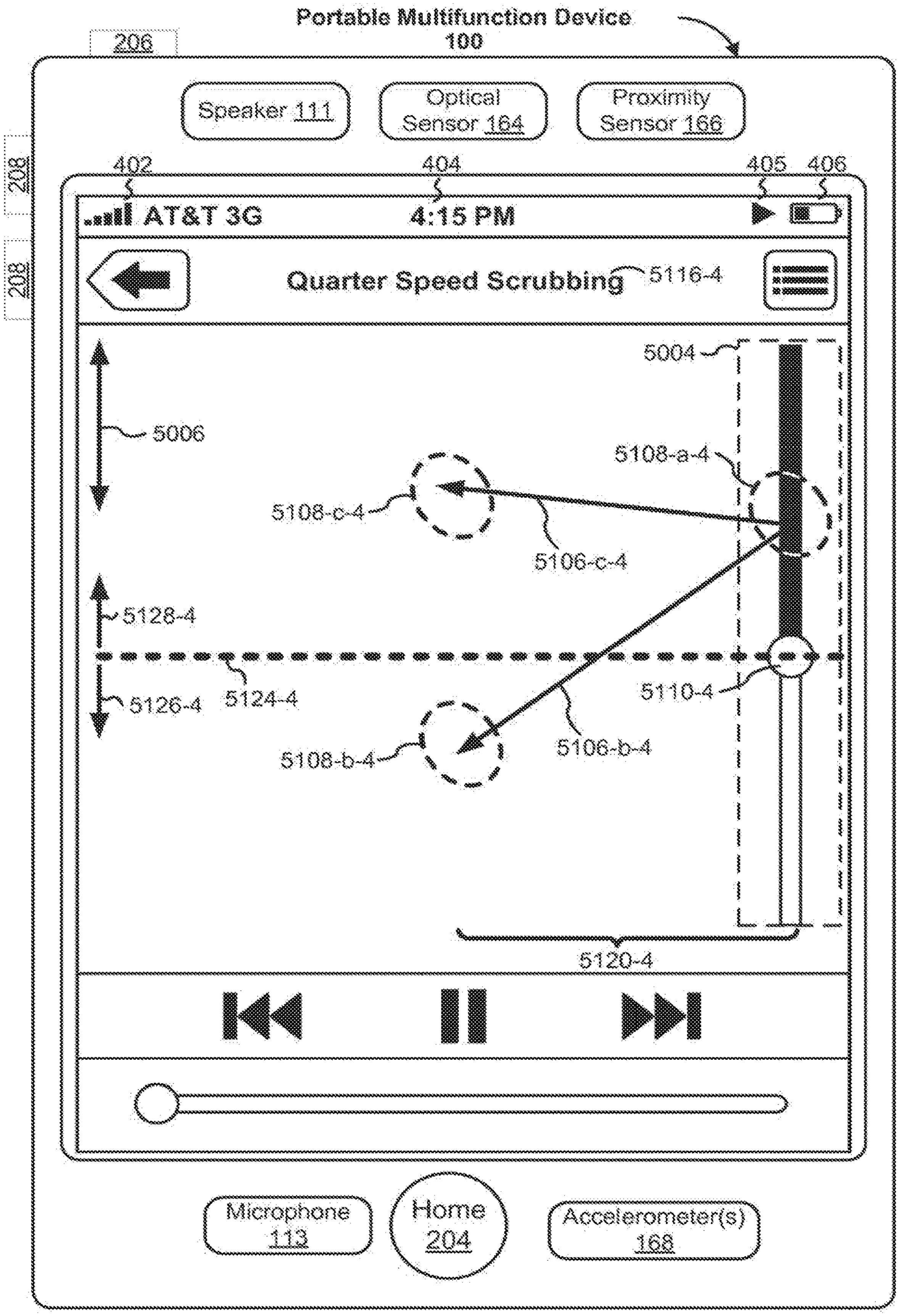
Figure 5G:
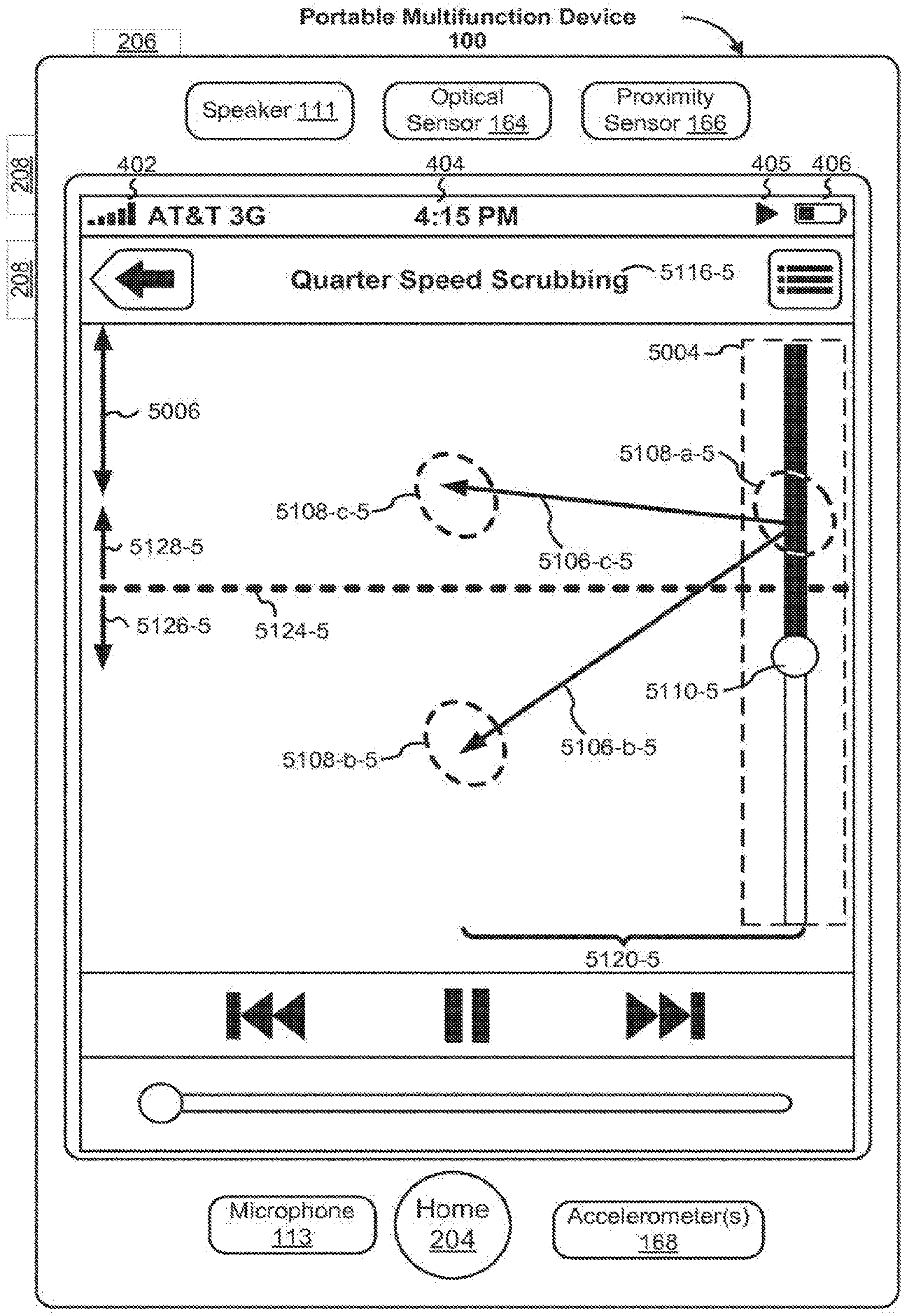
Figure 5H:
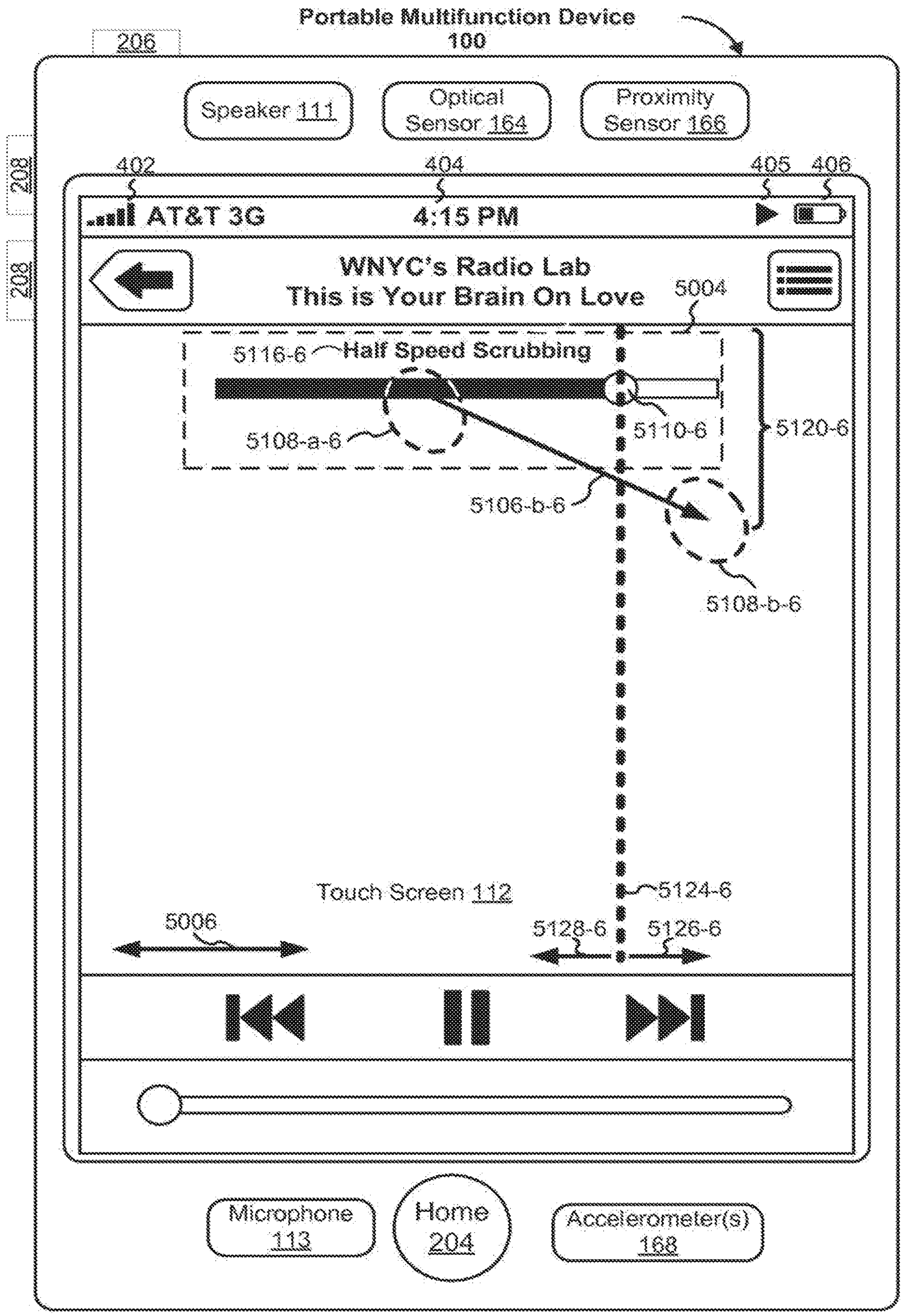
Figure 5I:
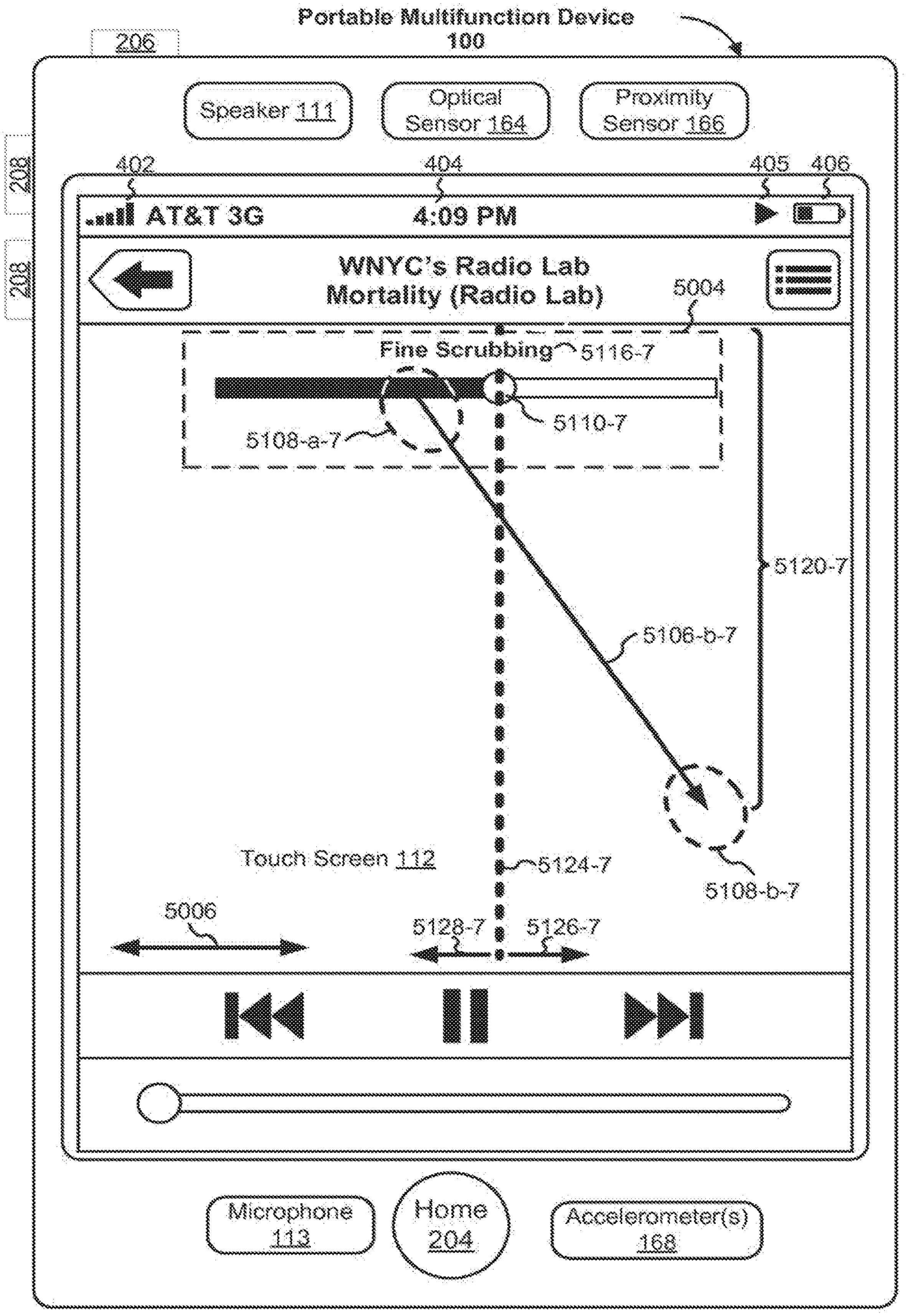
Figure 5J:
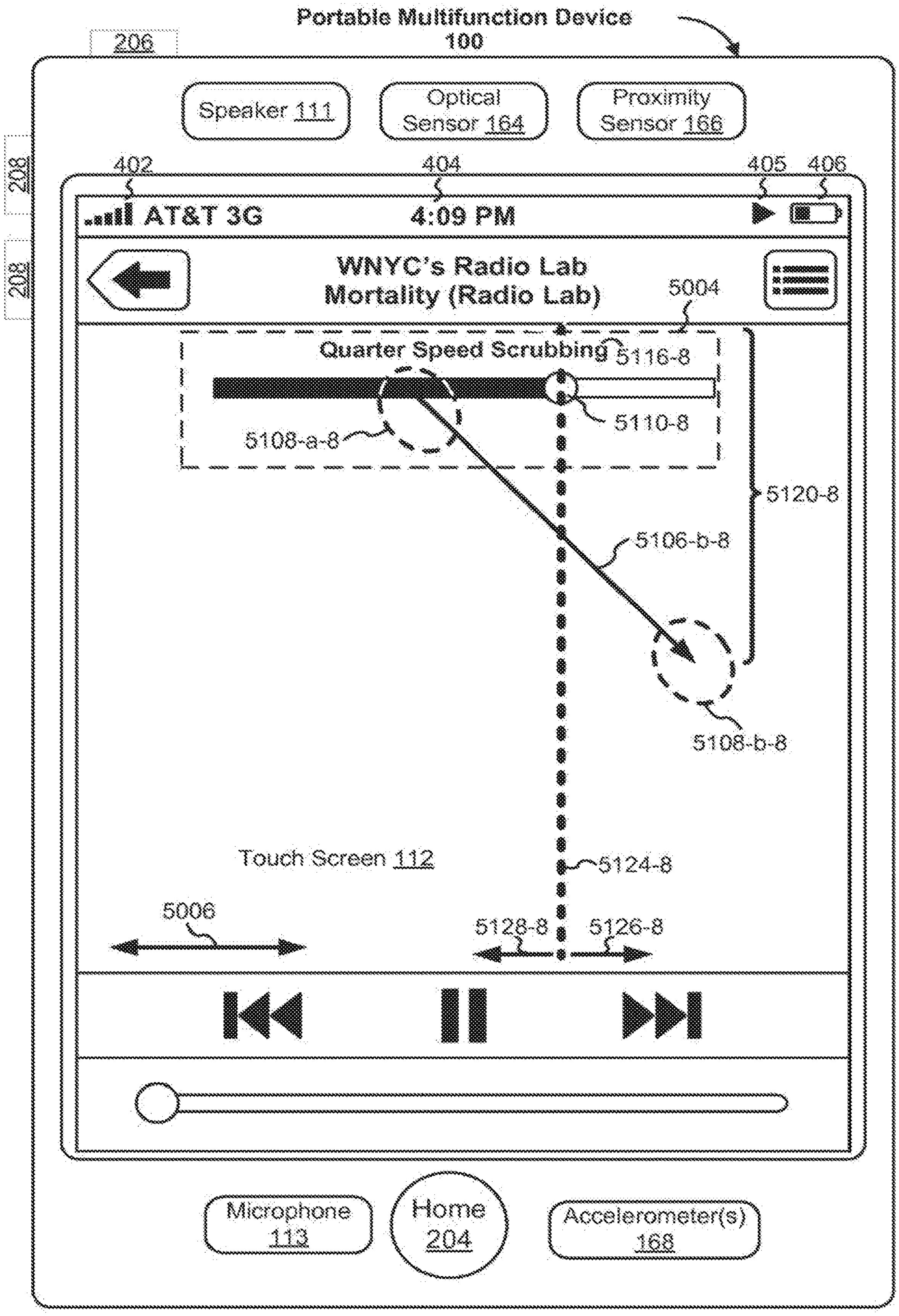
Figure 5K:
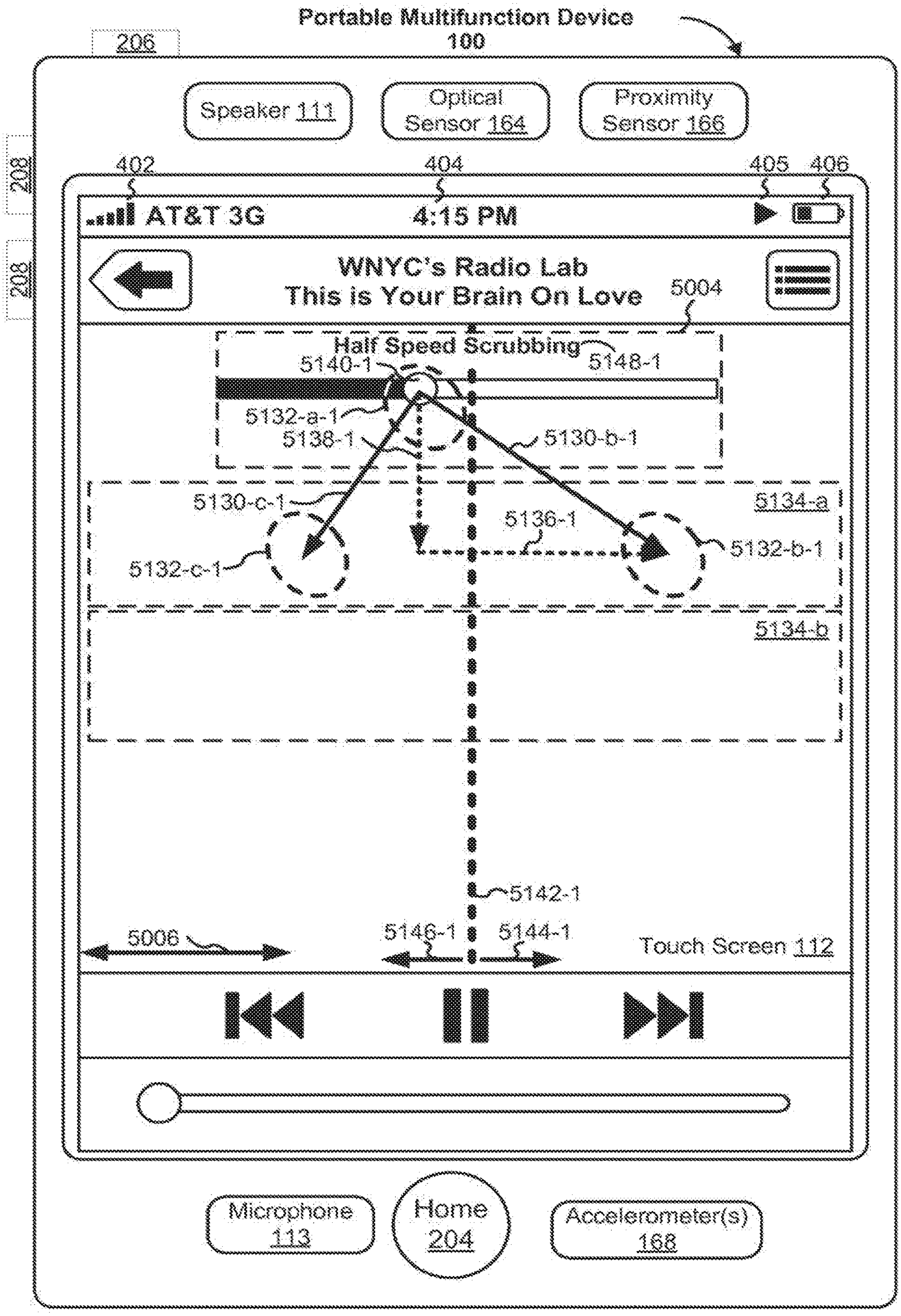
Figure 5L:
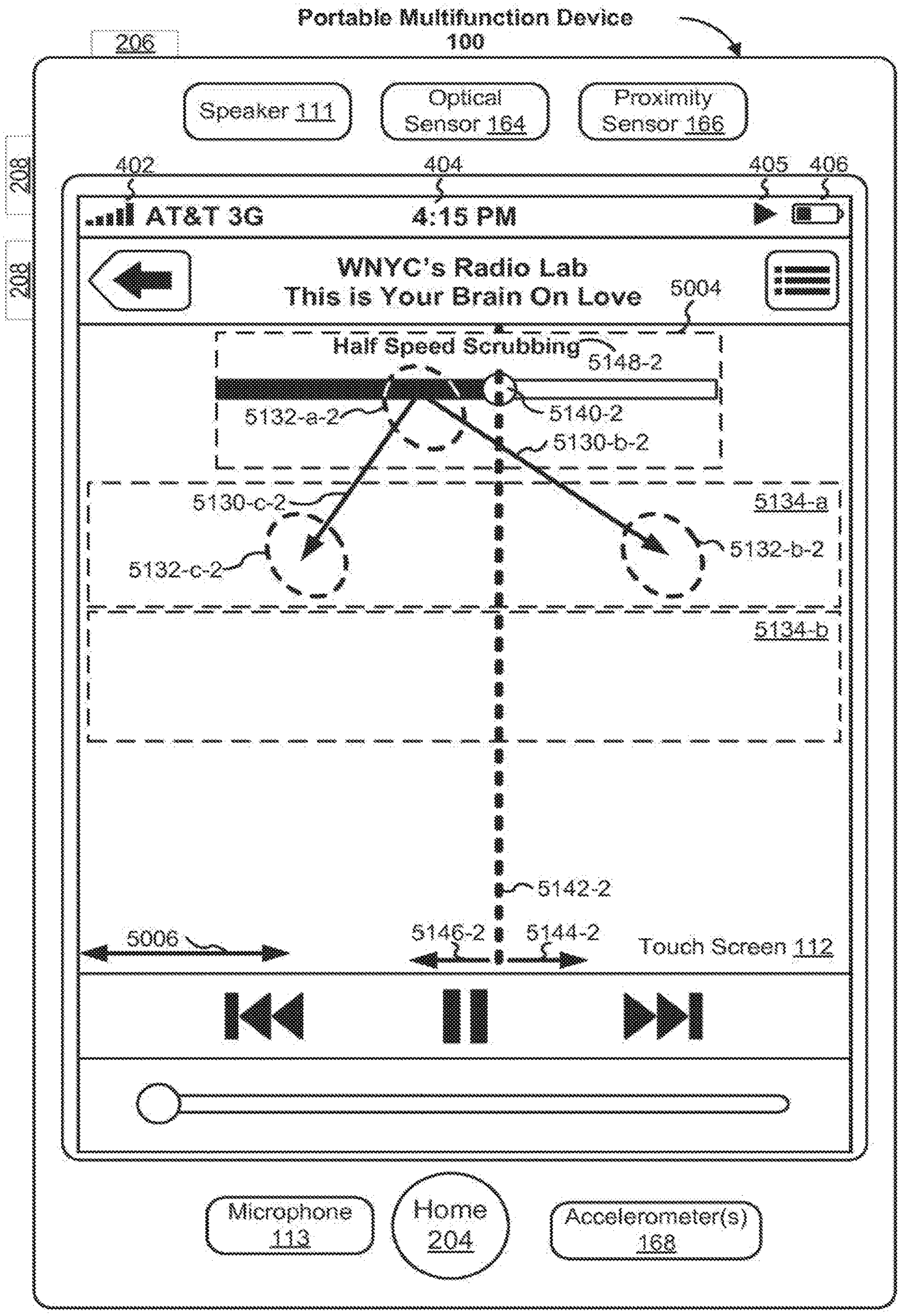
Figure 5M:
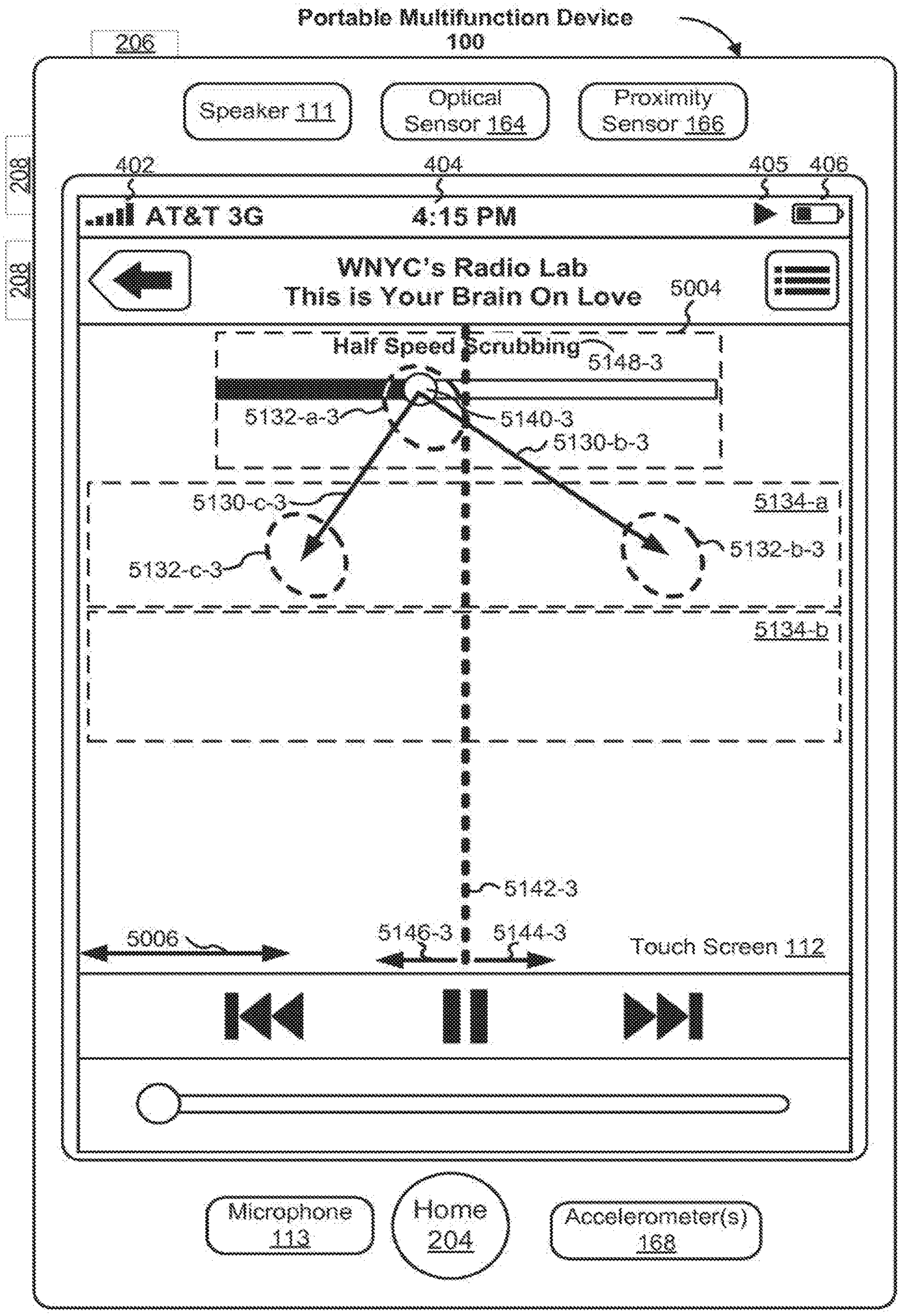
Figure 5N:
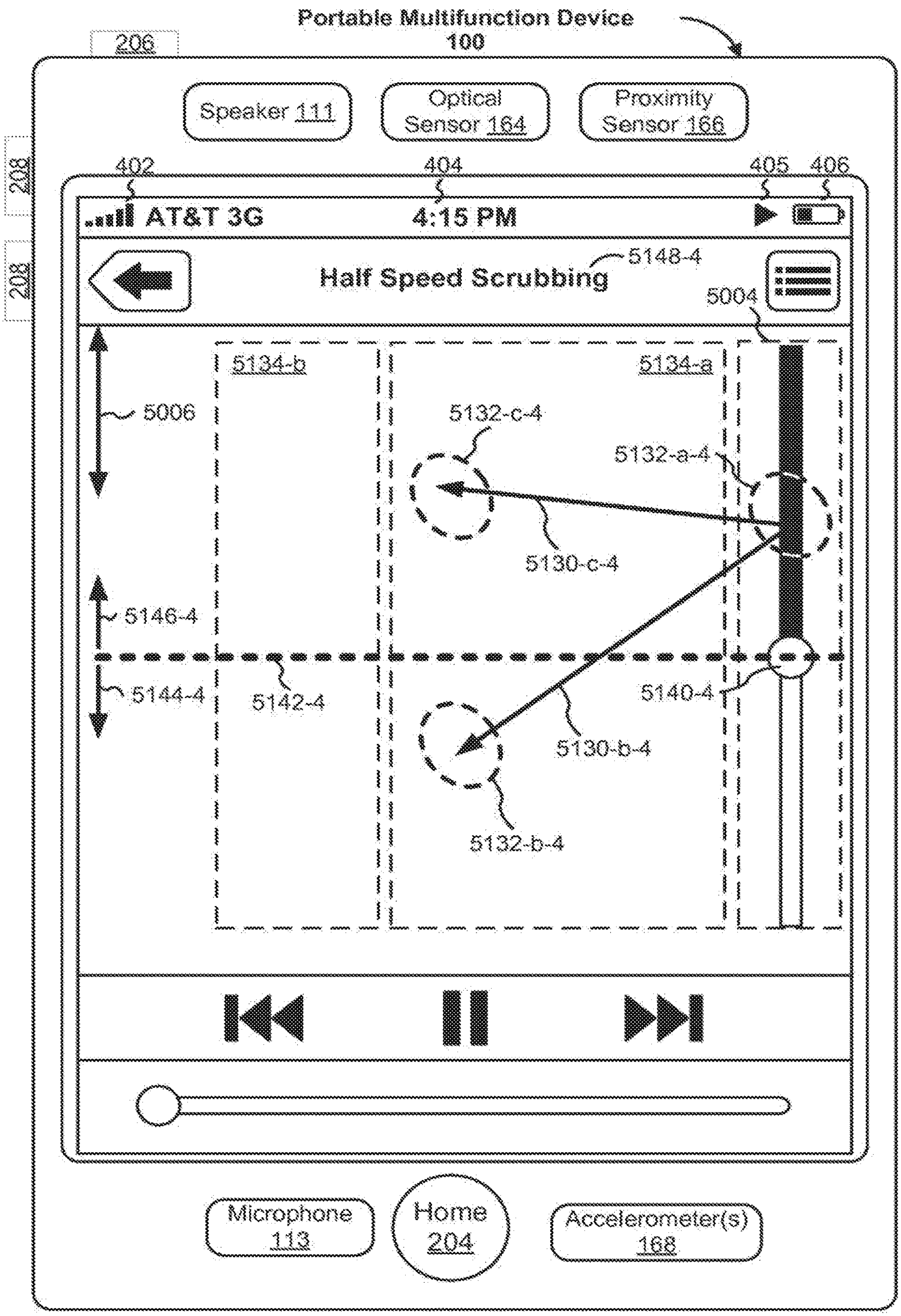
Figure 5O:
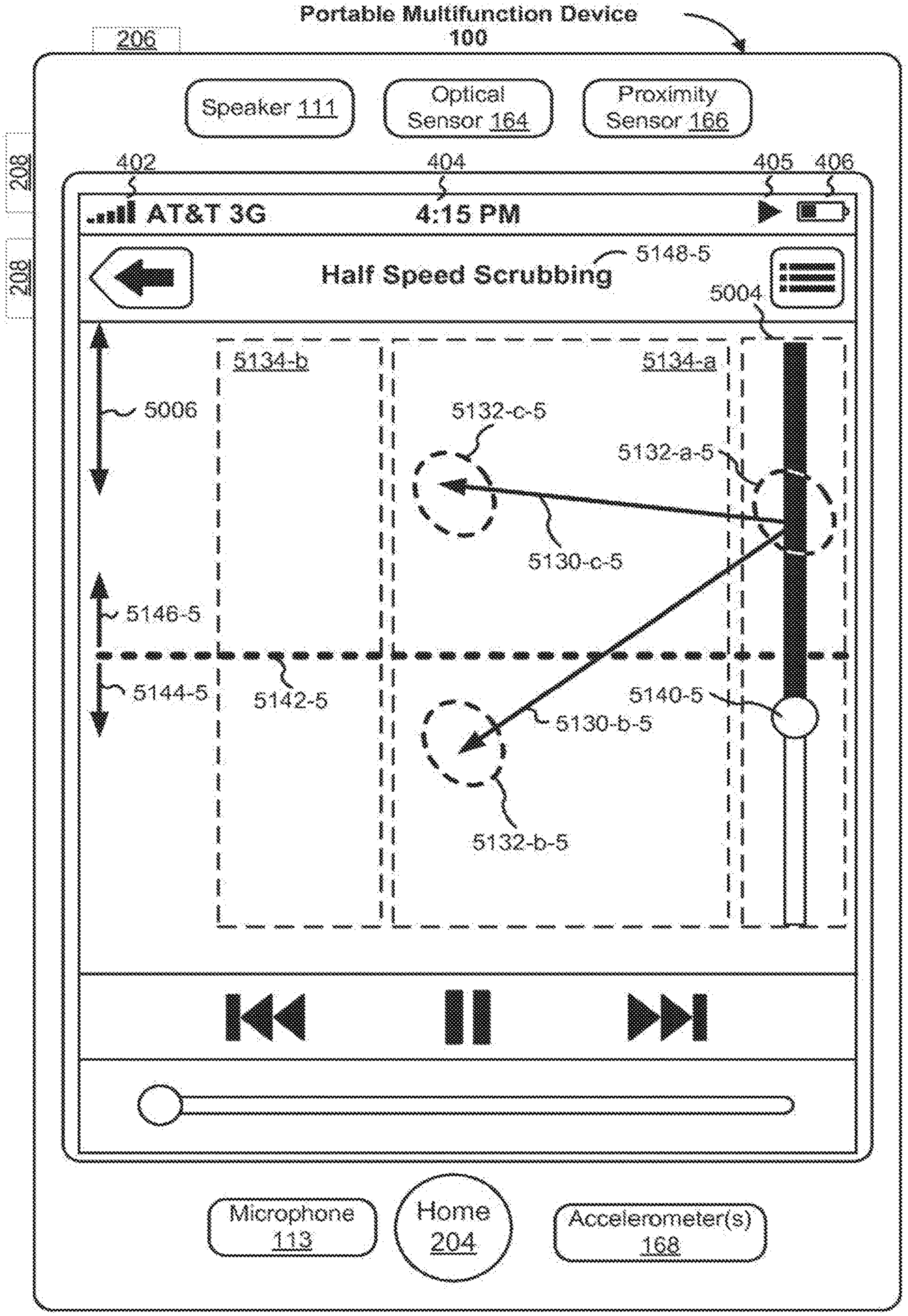
Figure 5P:
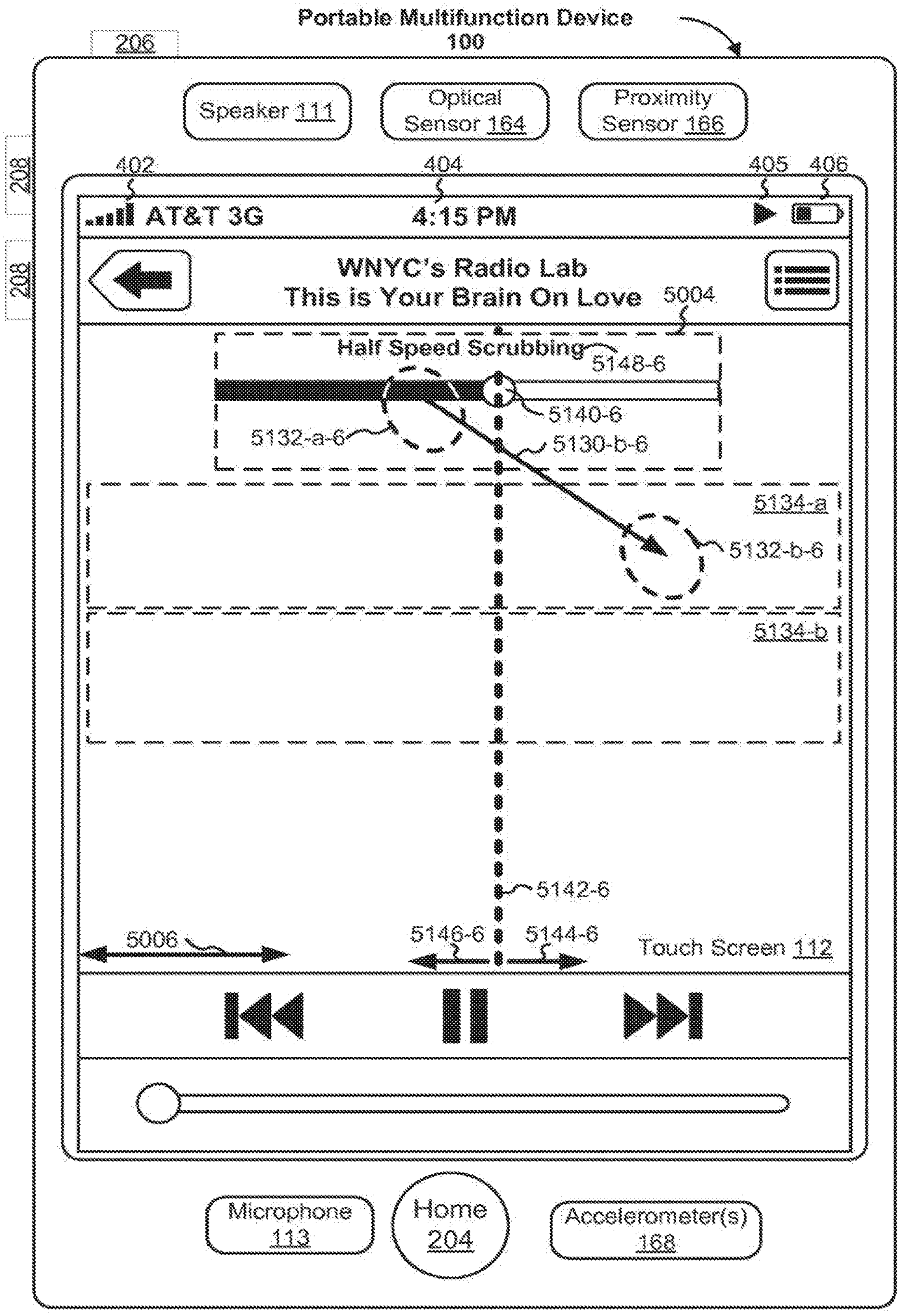
Figure 5Q:
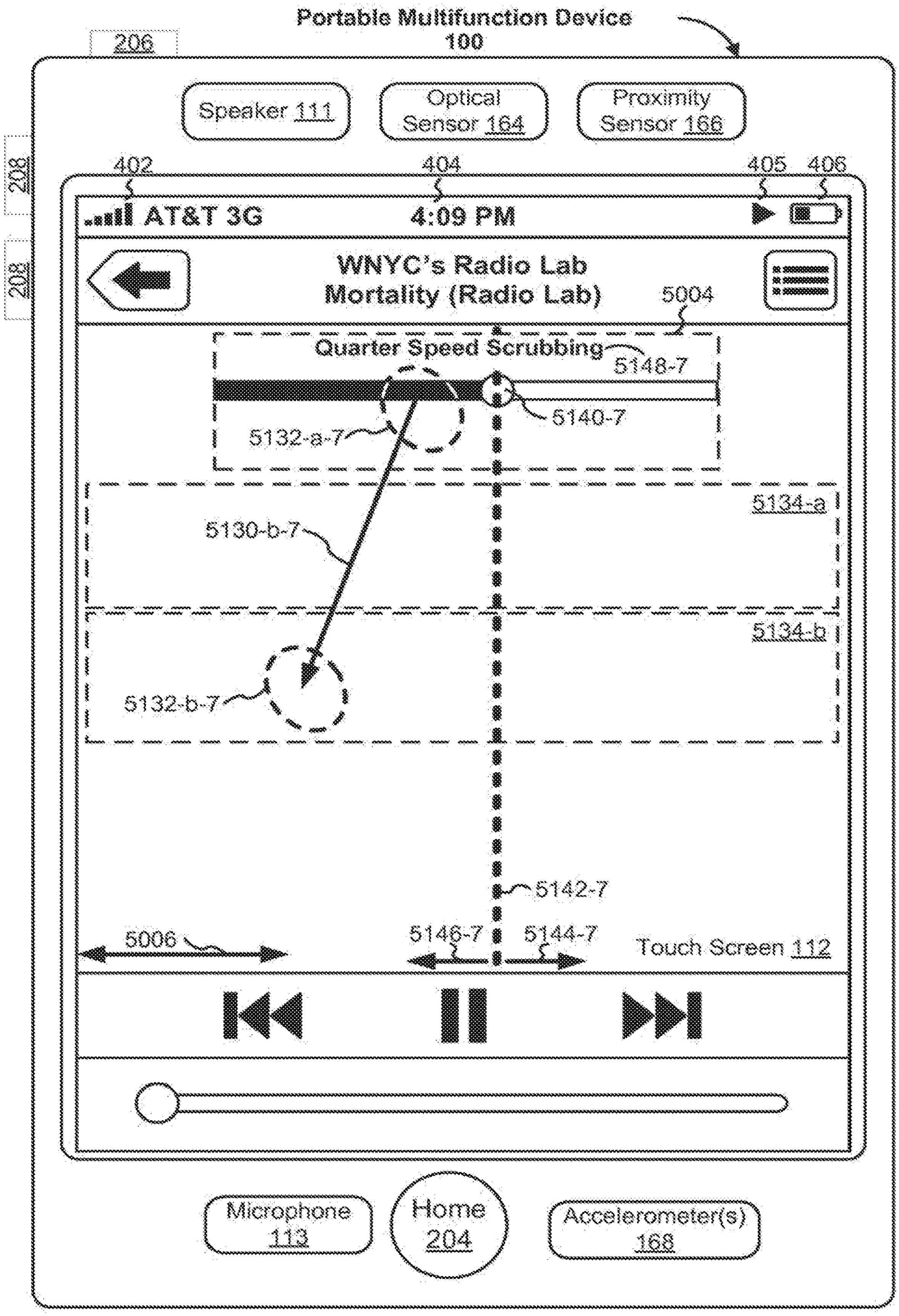
Figure 5R:
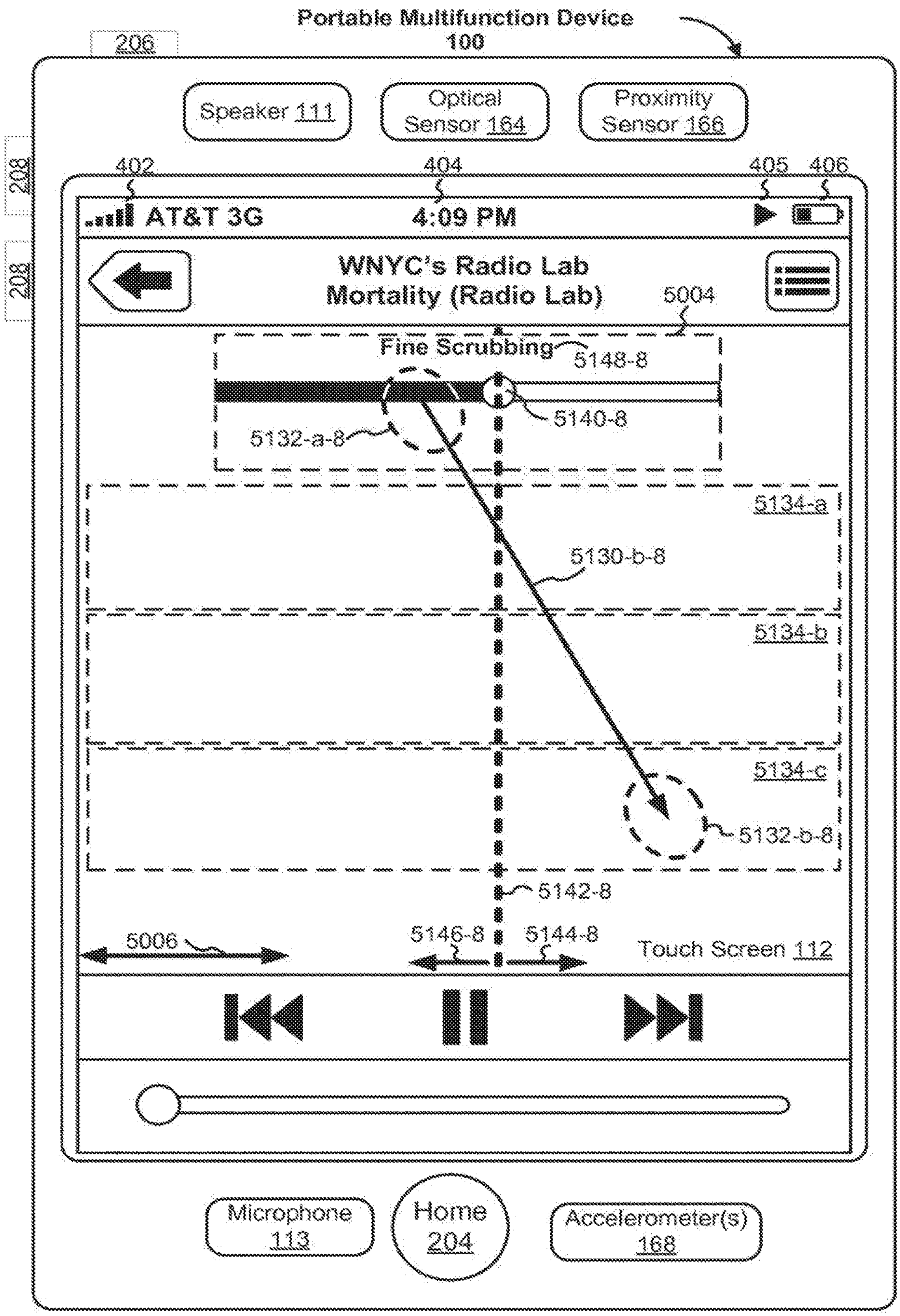
Figure 5S:
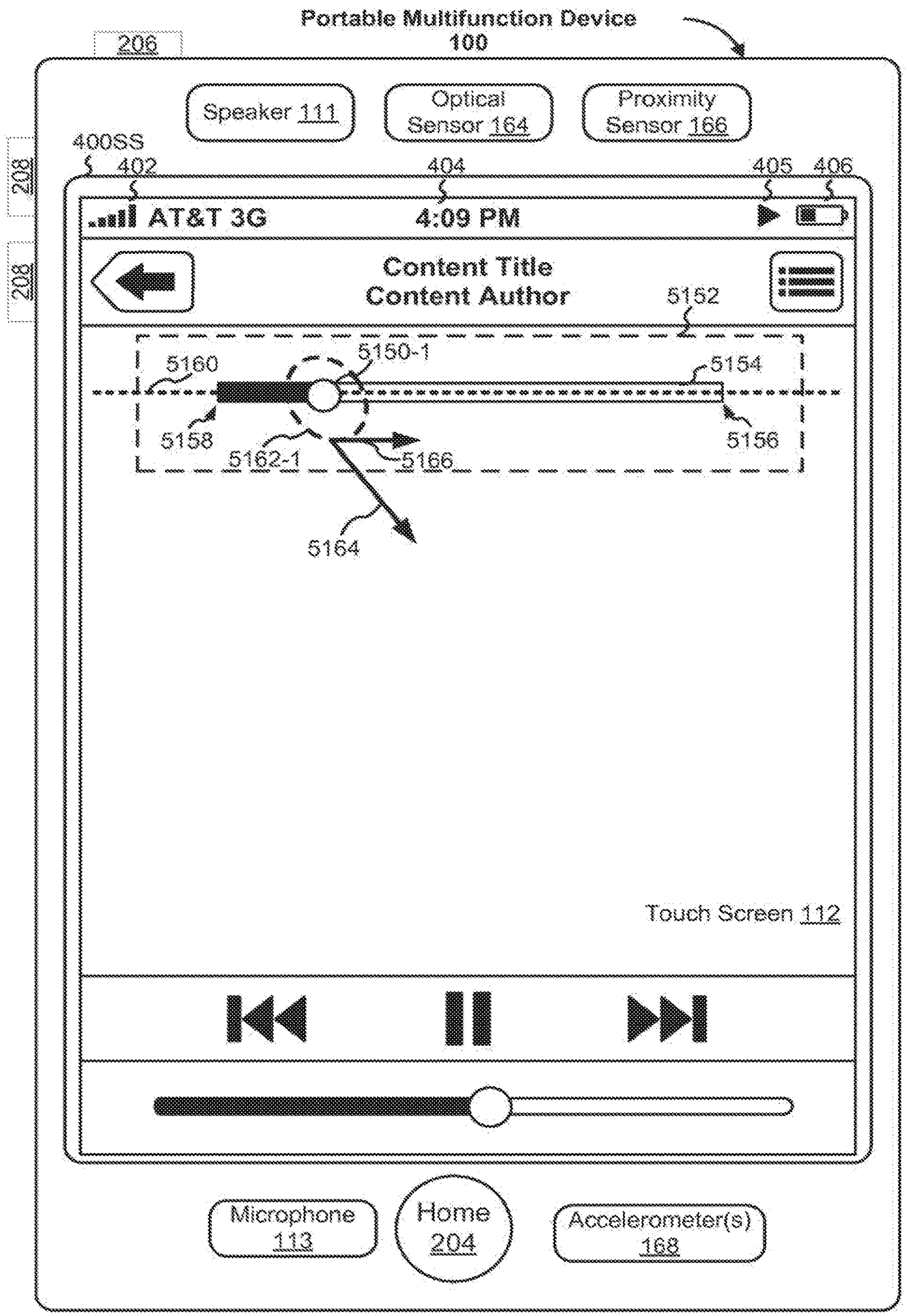
Figure 5T:
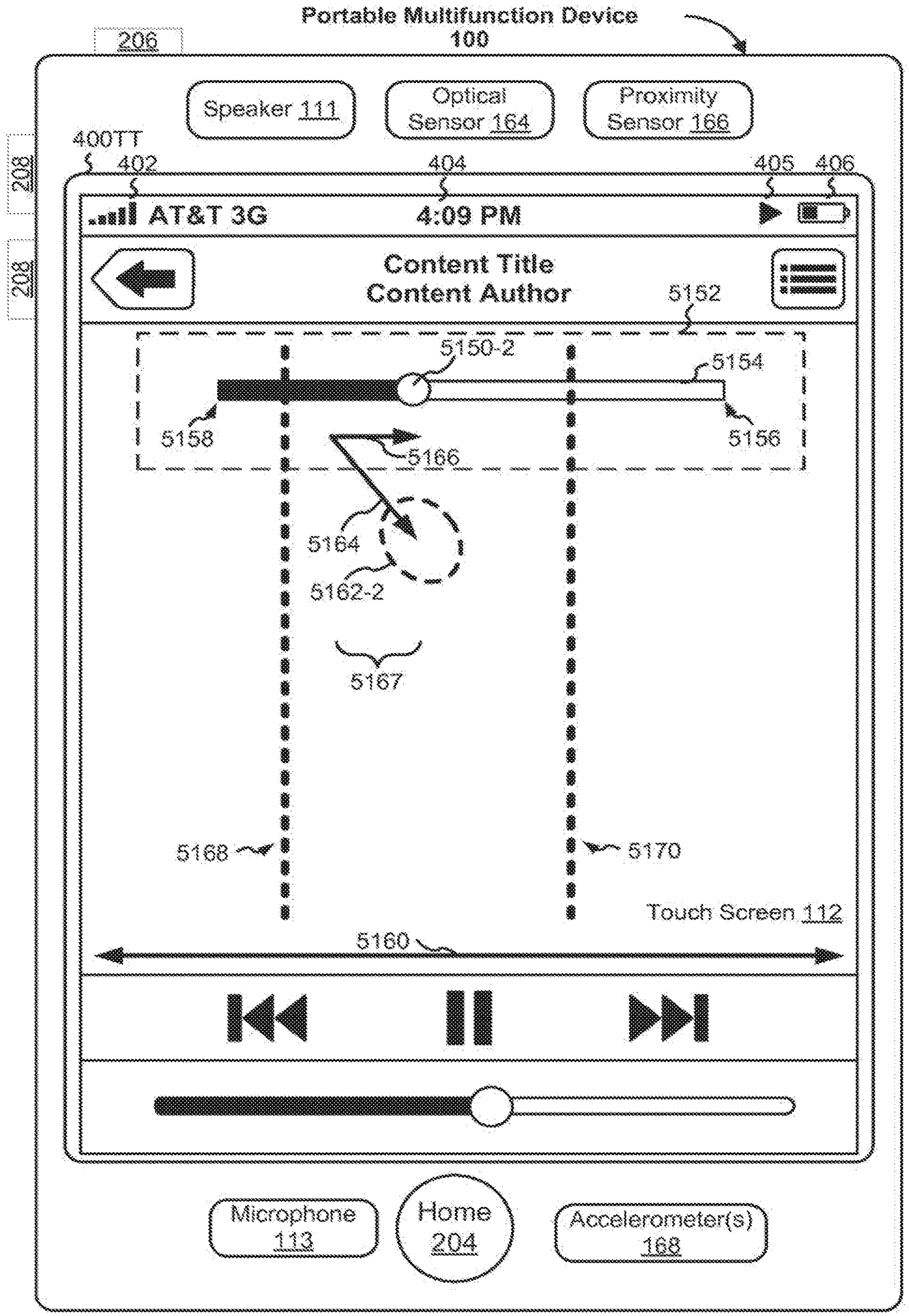
Figure 5U:
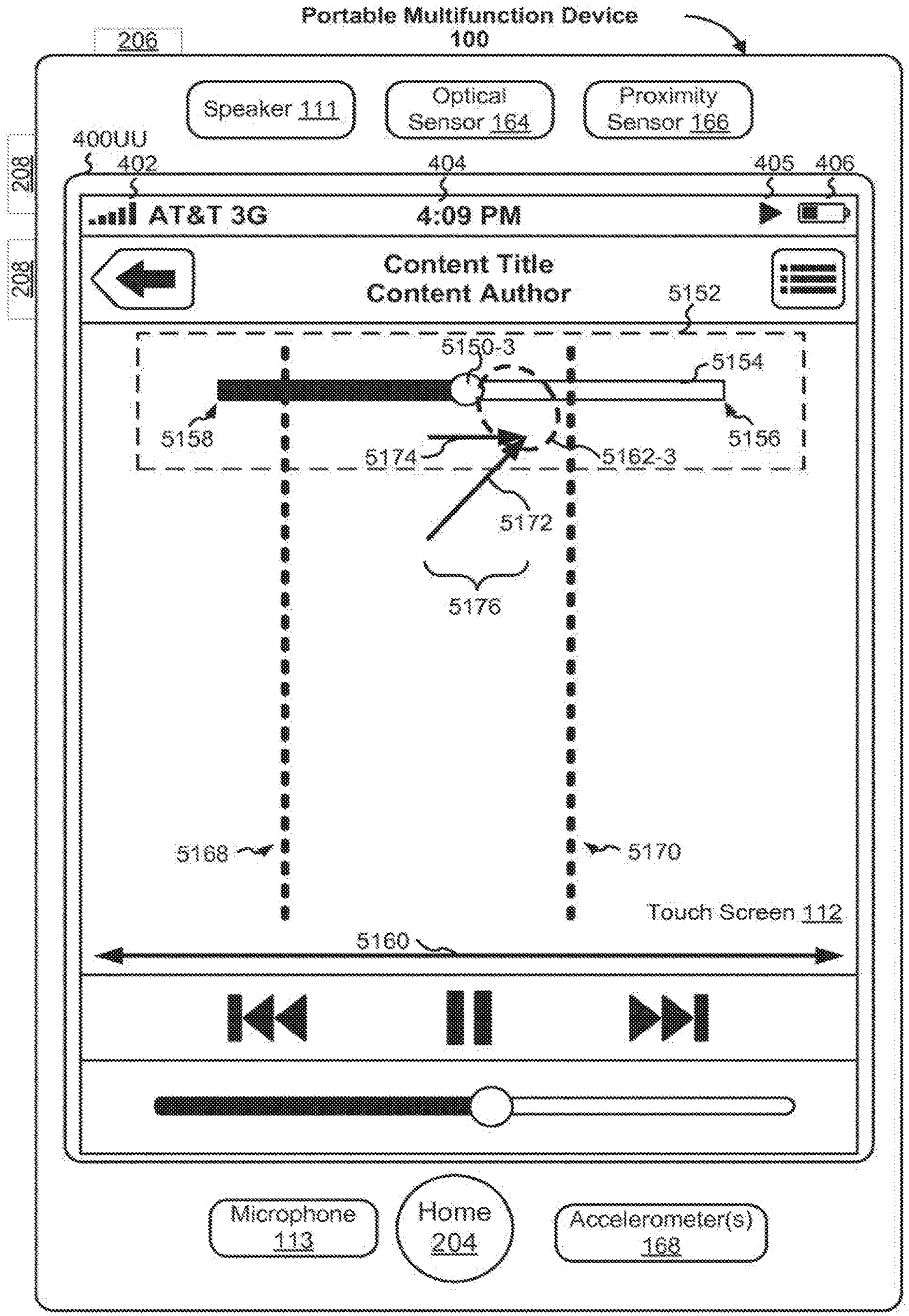
Figure 5V:
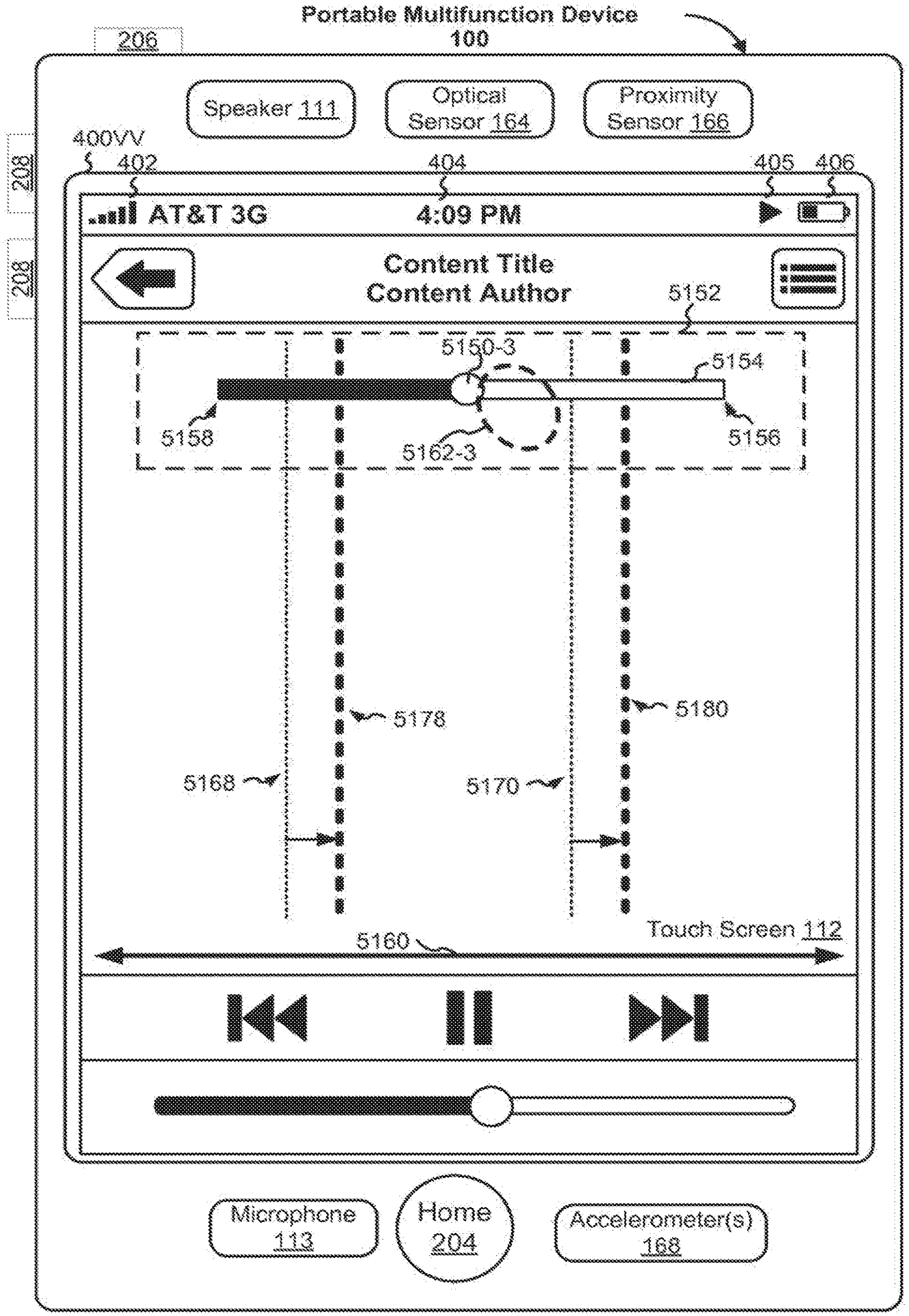
Figure 5W:
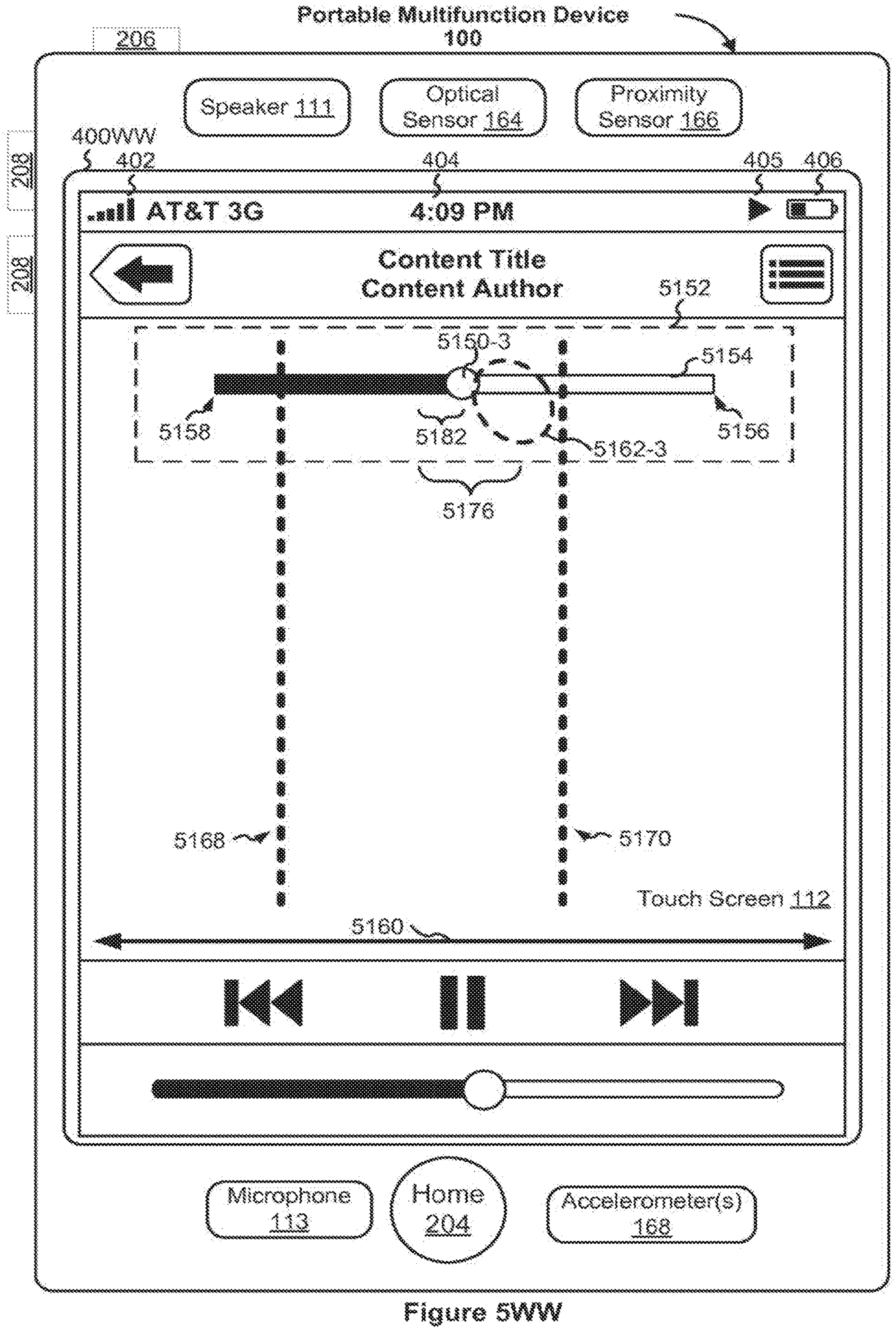
Figure 5X:
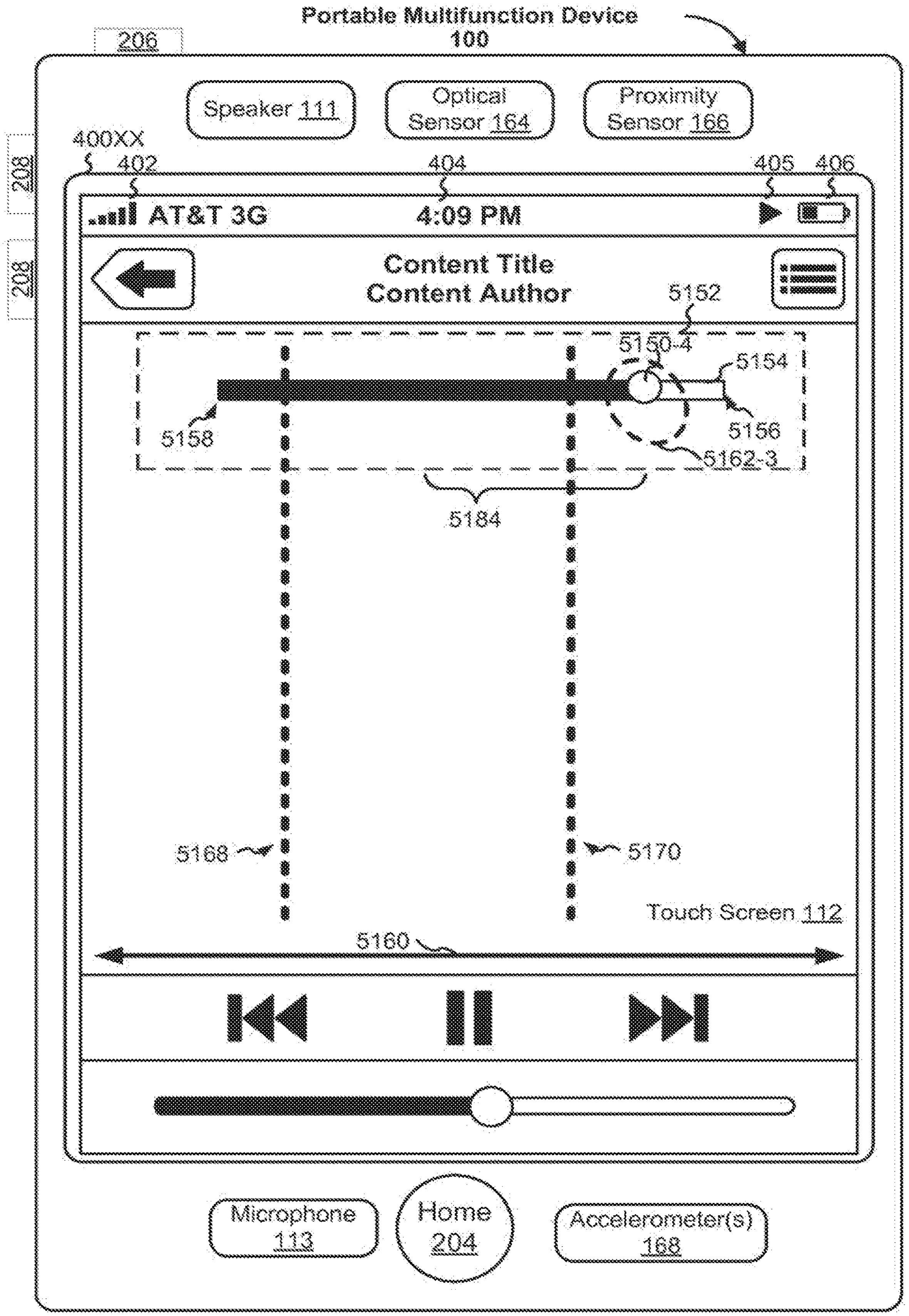
Figure 5Y:
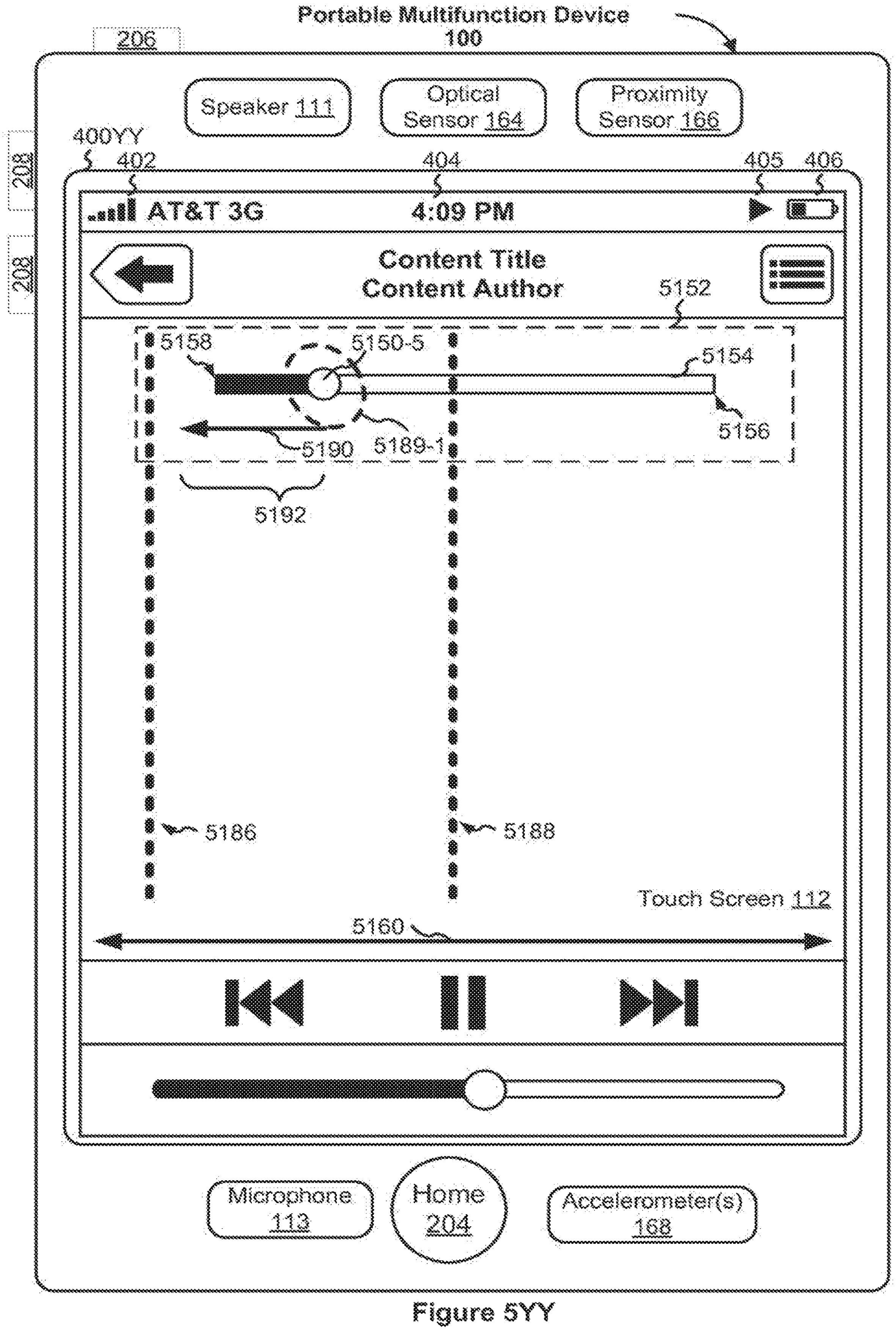
Figure 5Z:
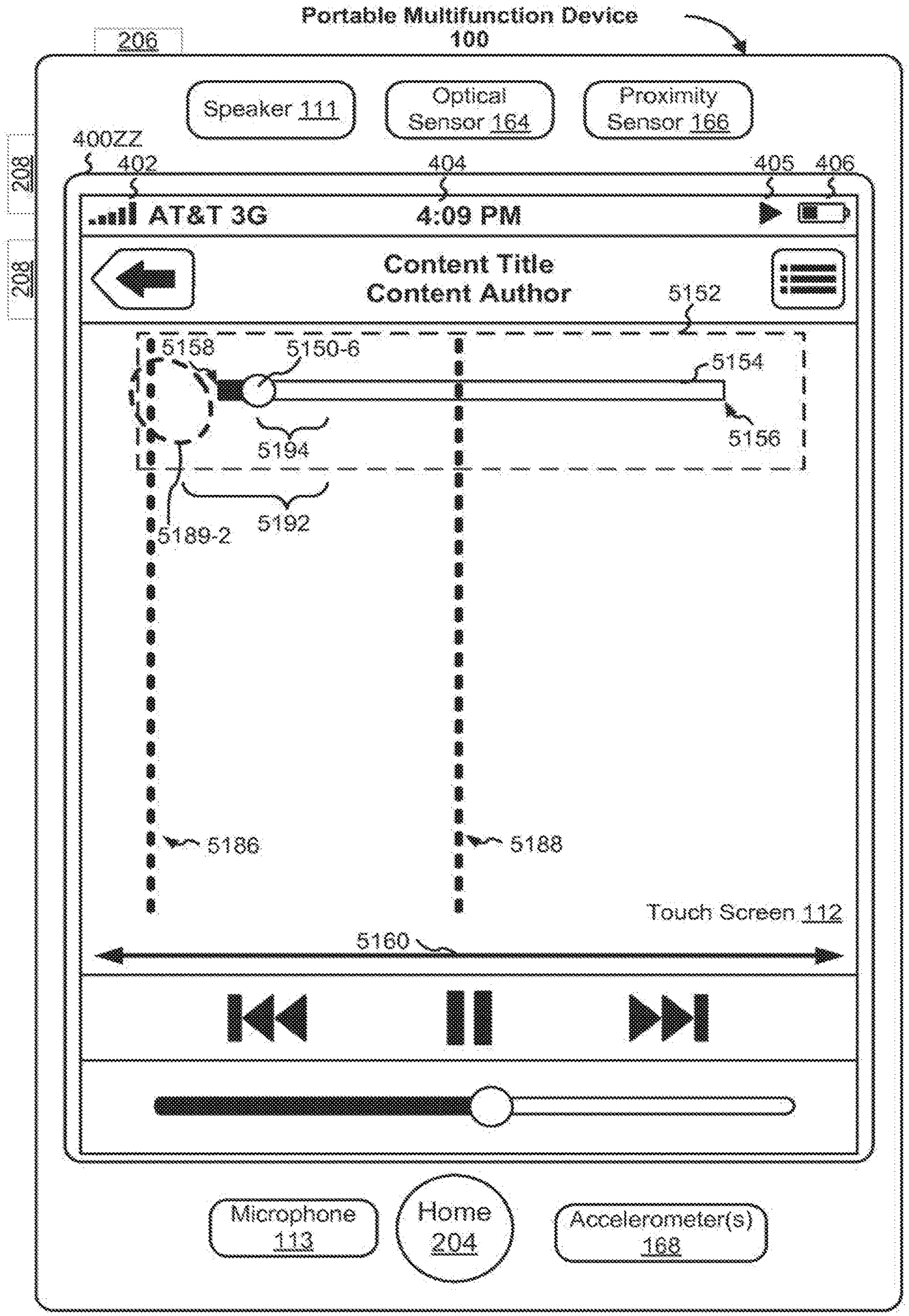
Figure 6A:
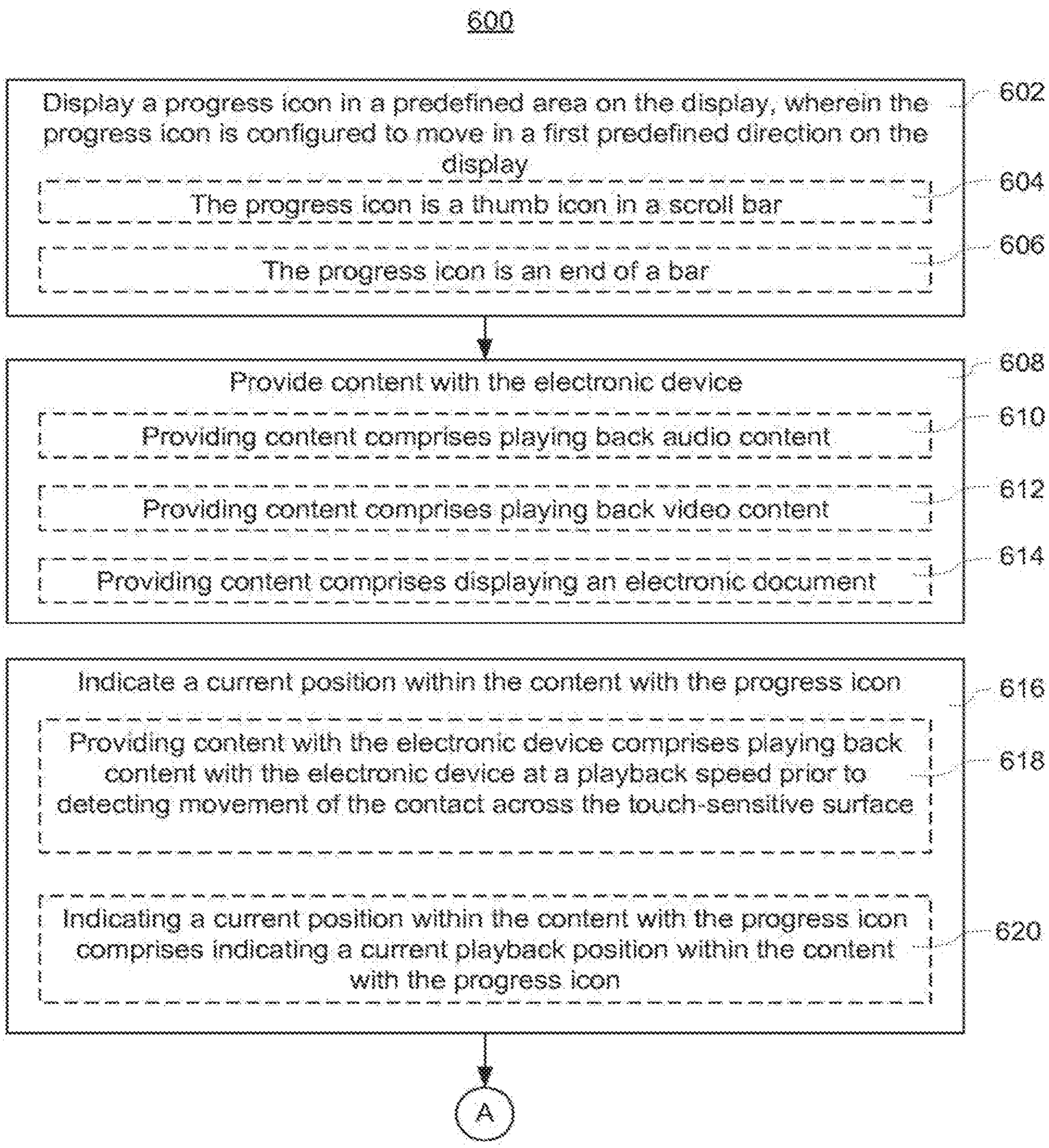
FIGS. 6A-6D are flow diagrams illustrating a method of scrolling in accordance with some embodiments.
Figure 6B:
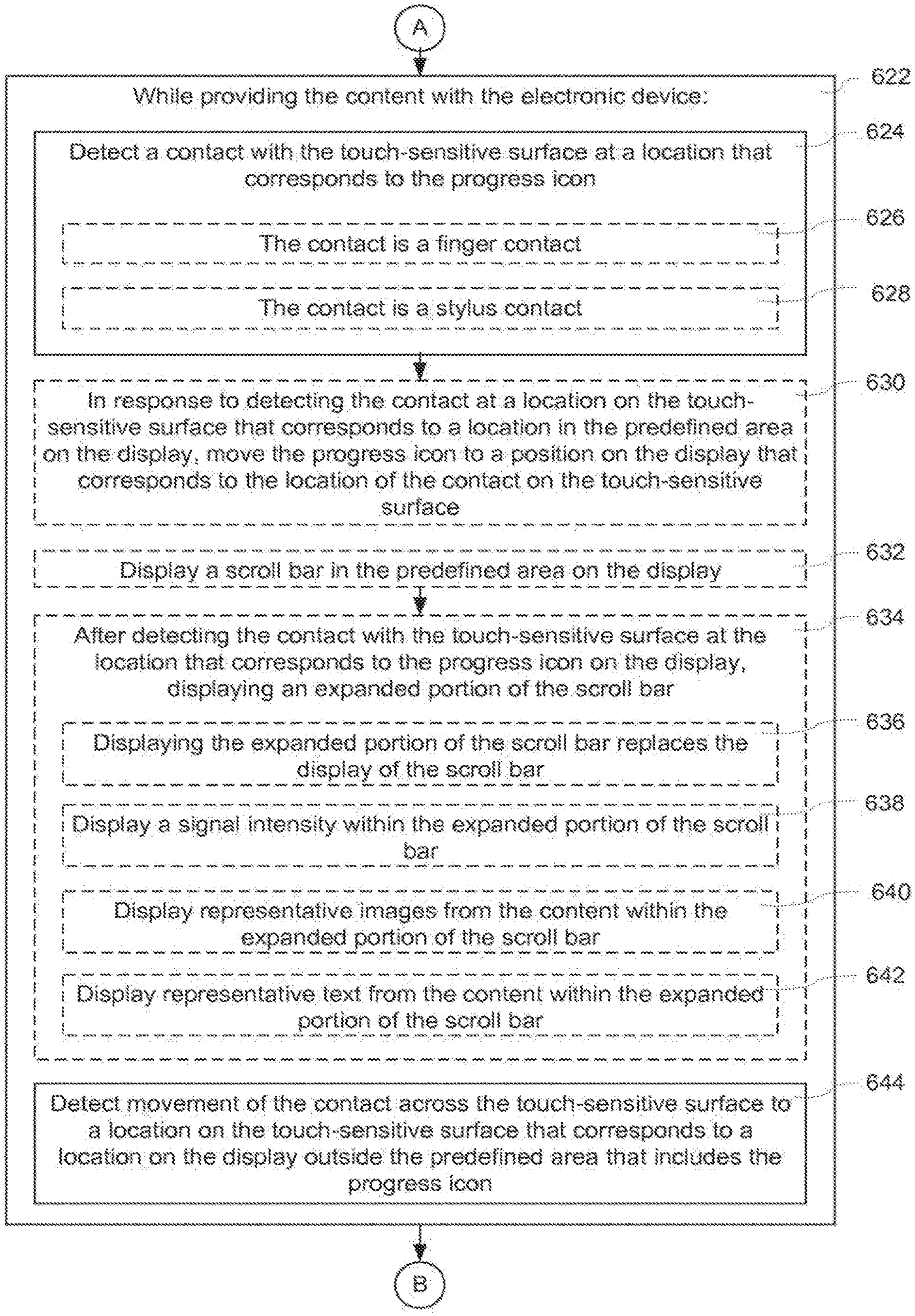
Figure 6C:
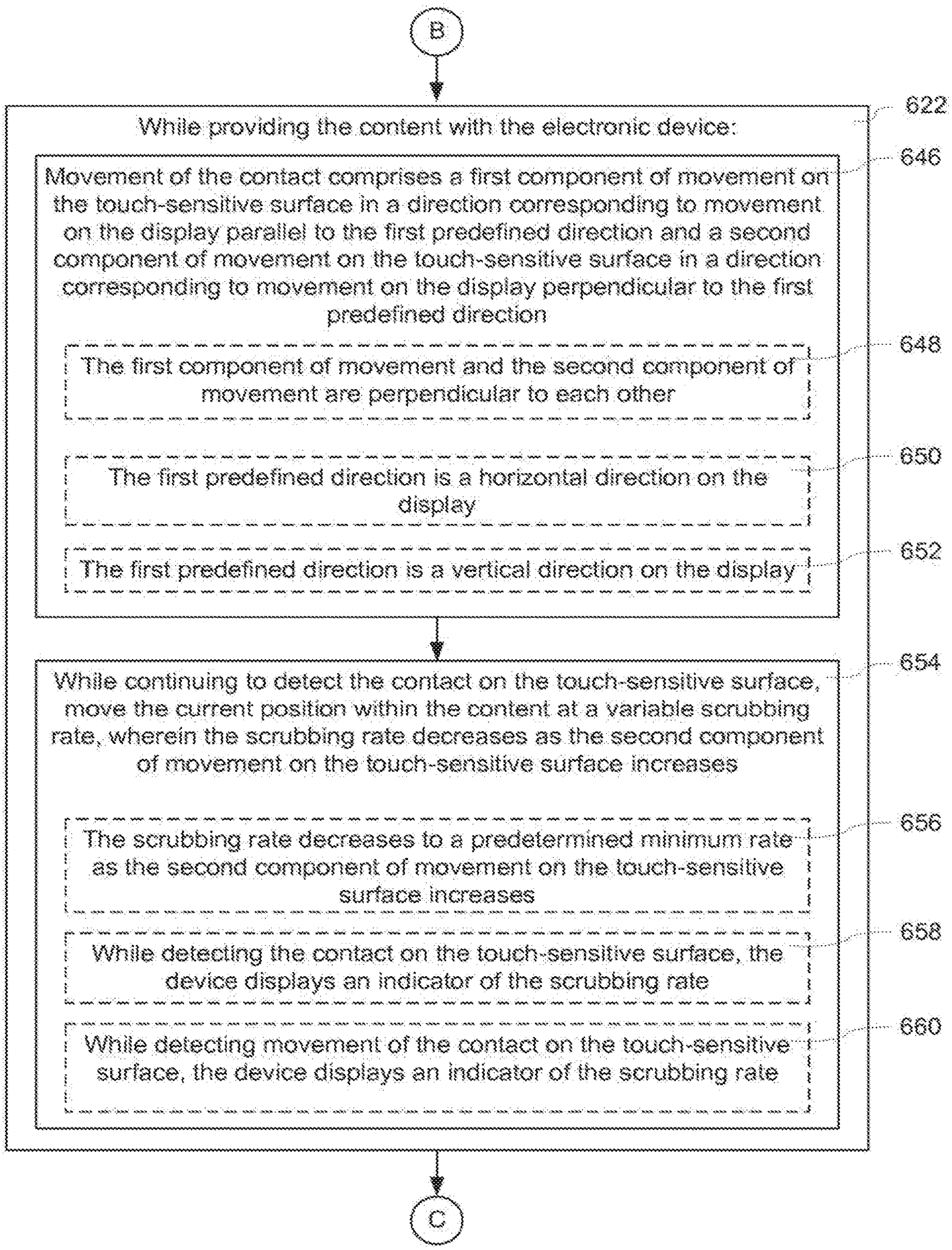
Figure 6D:
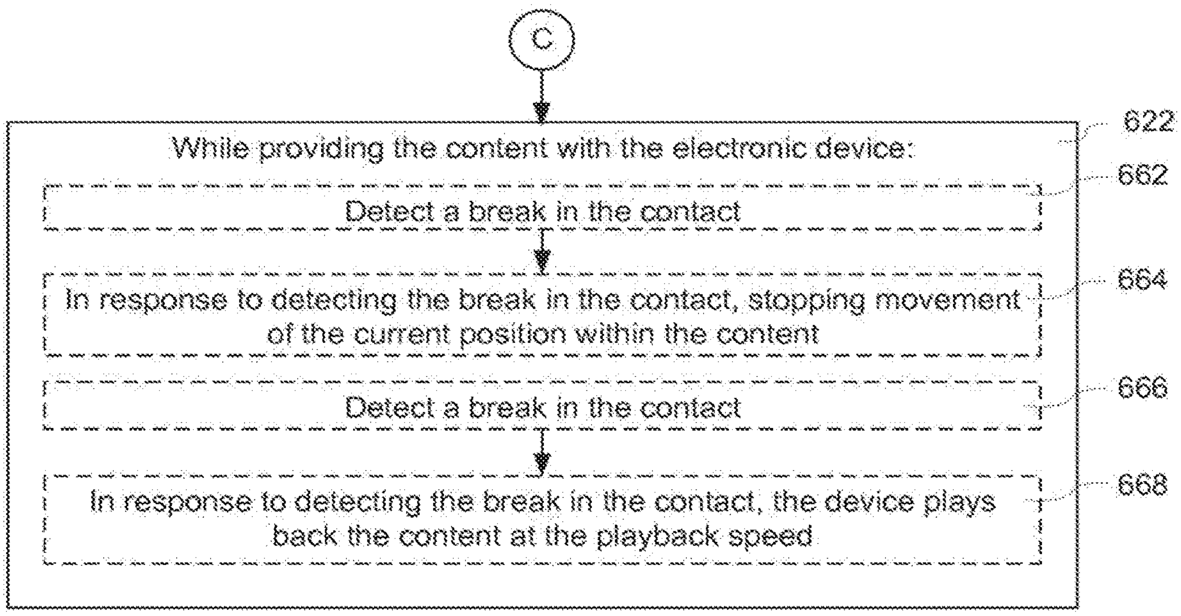
Figure 7A:
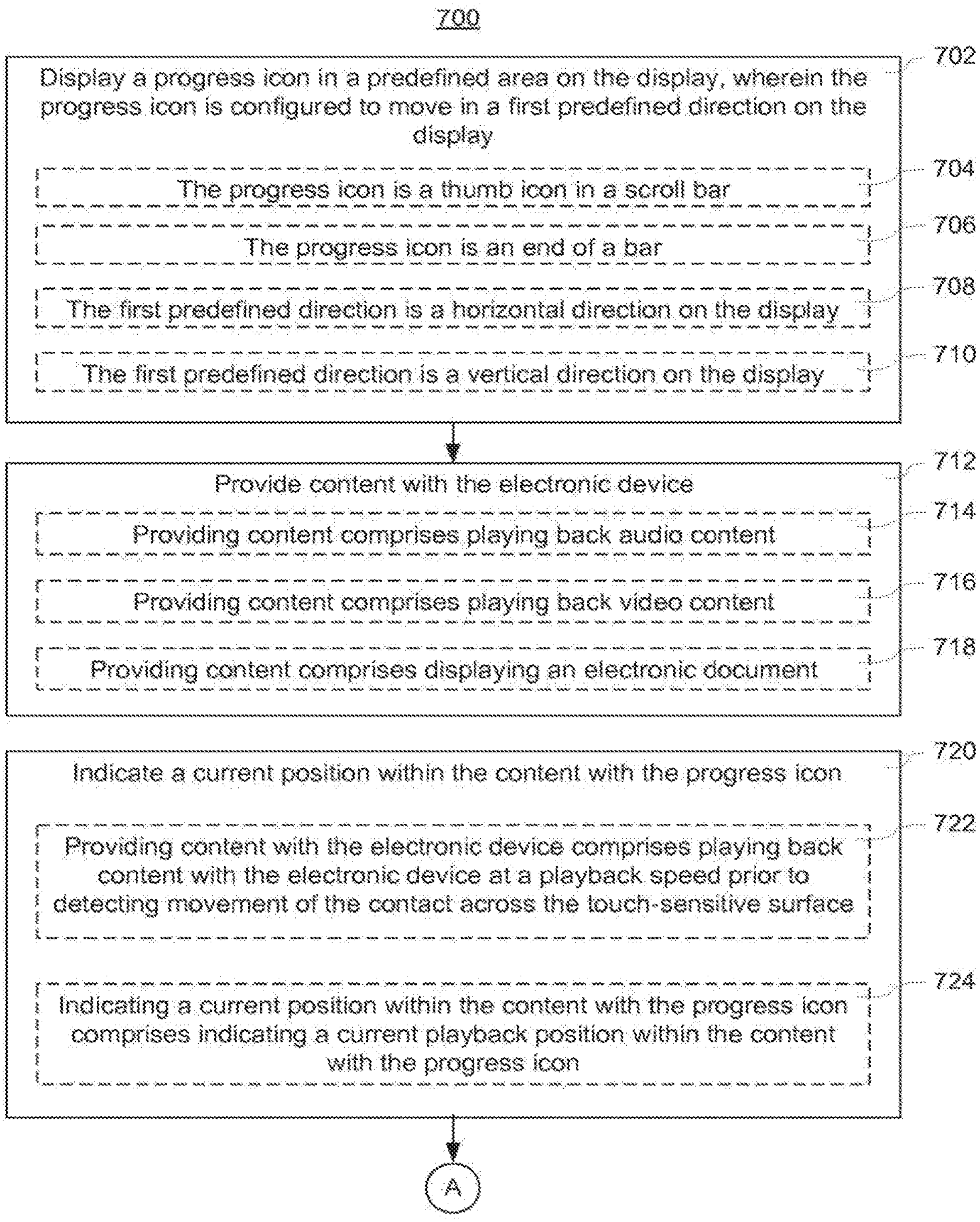
FIGS. 7A-7E are flow diagrams illustrating a method of scrolling in accordance with some embodiments.
Figure 7B:
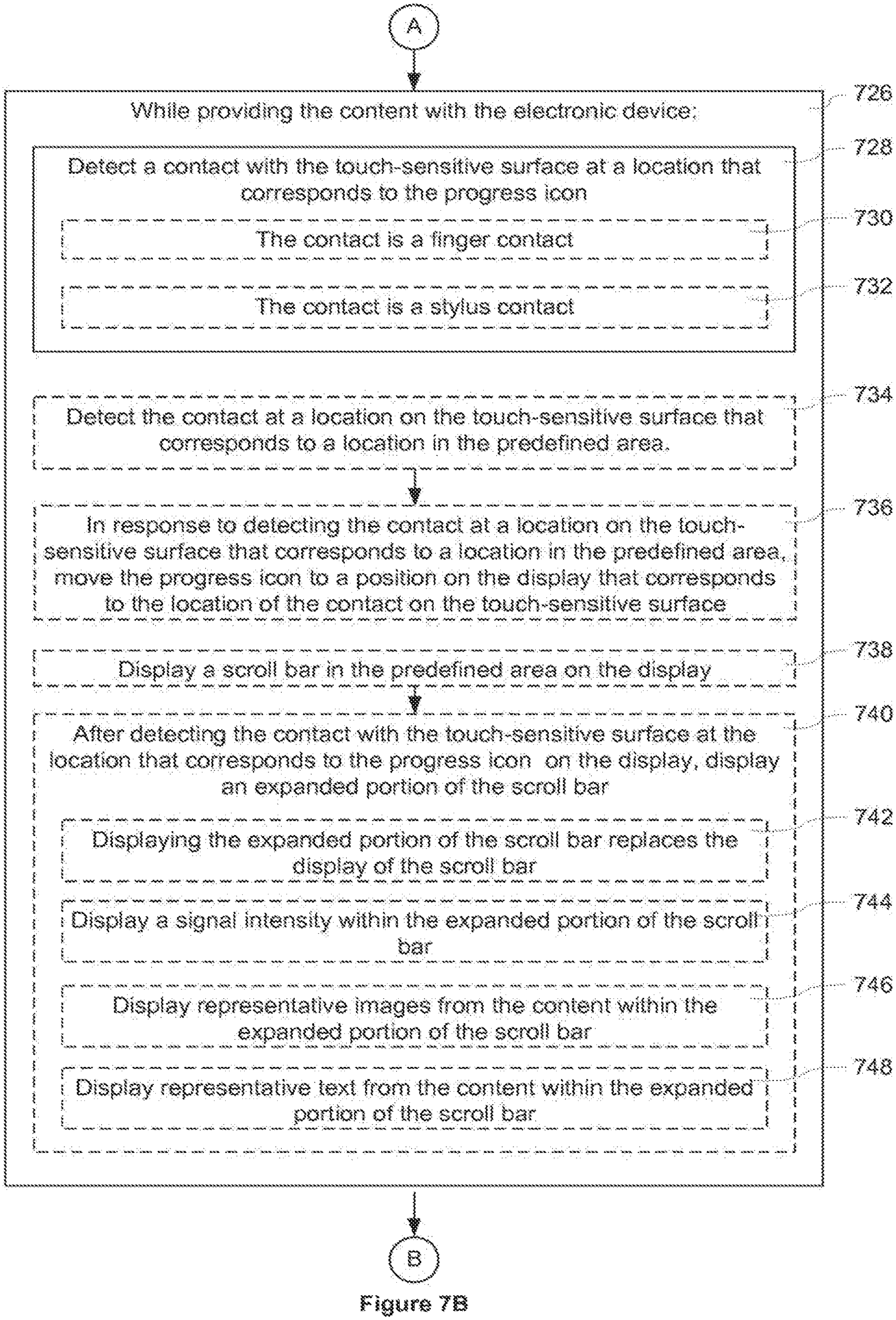
Figure 7C:
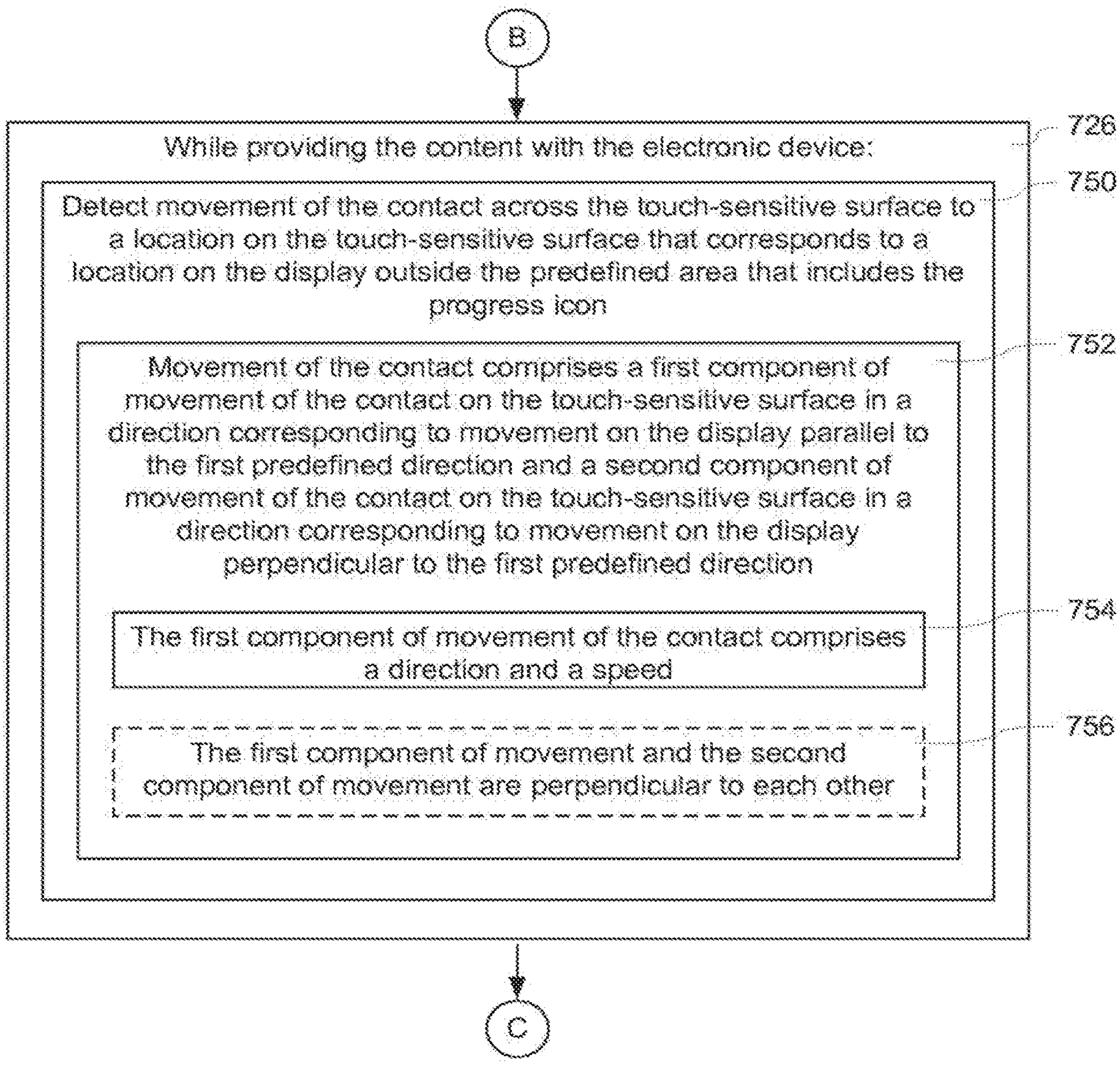
Figure 7D:
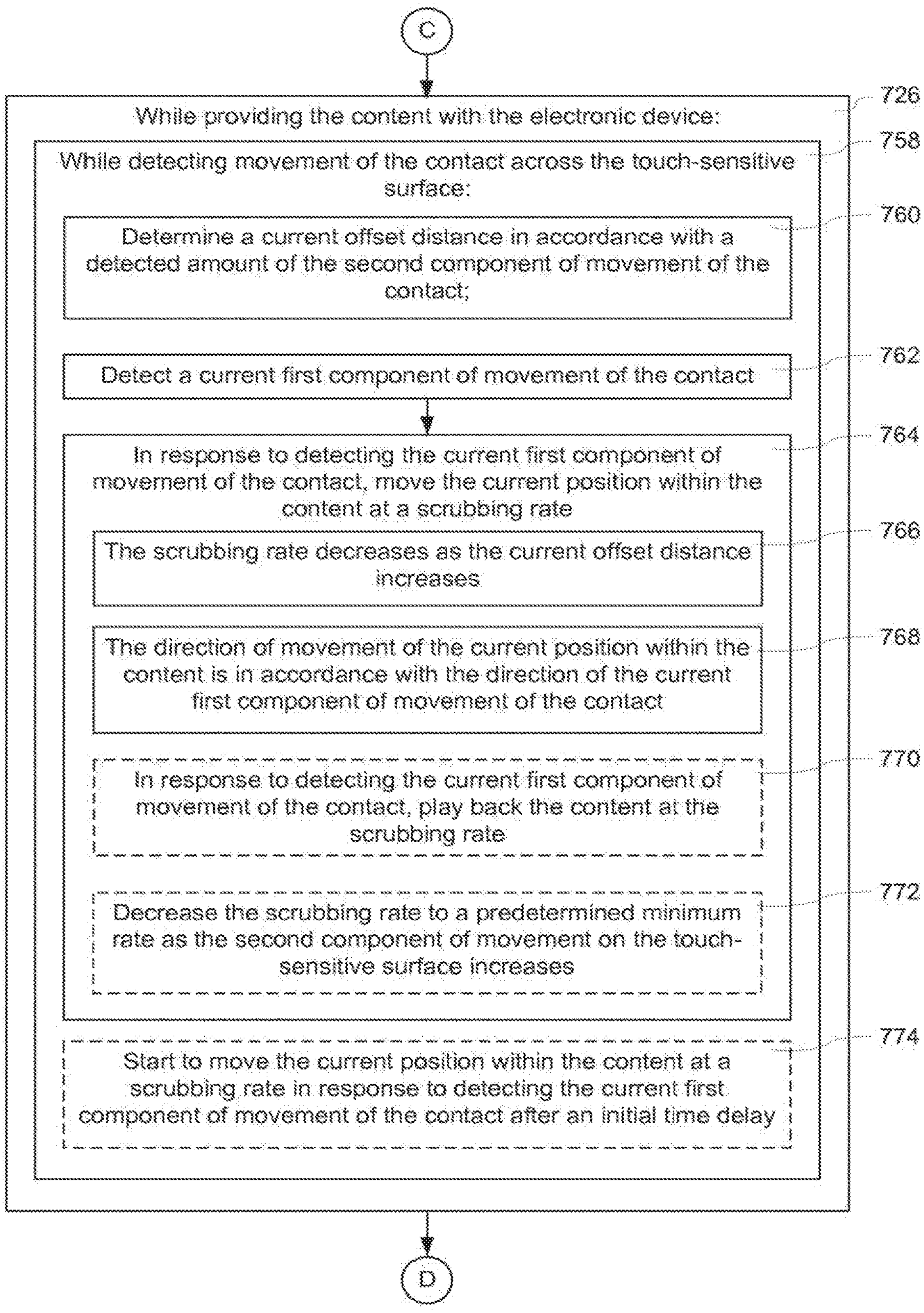
Figure 7E:
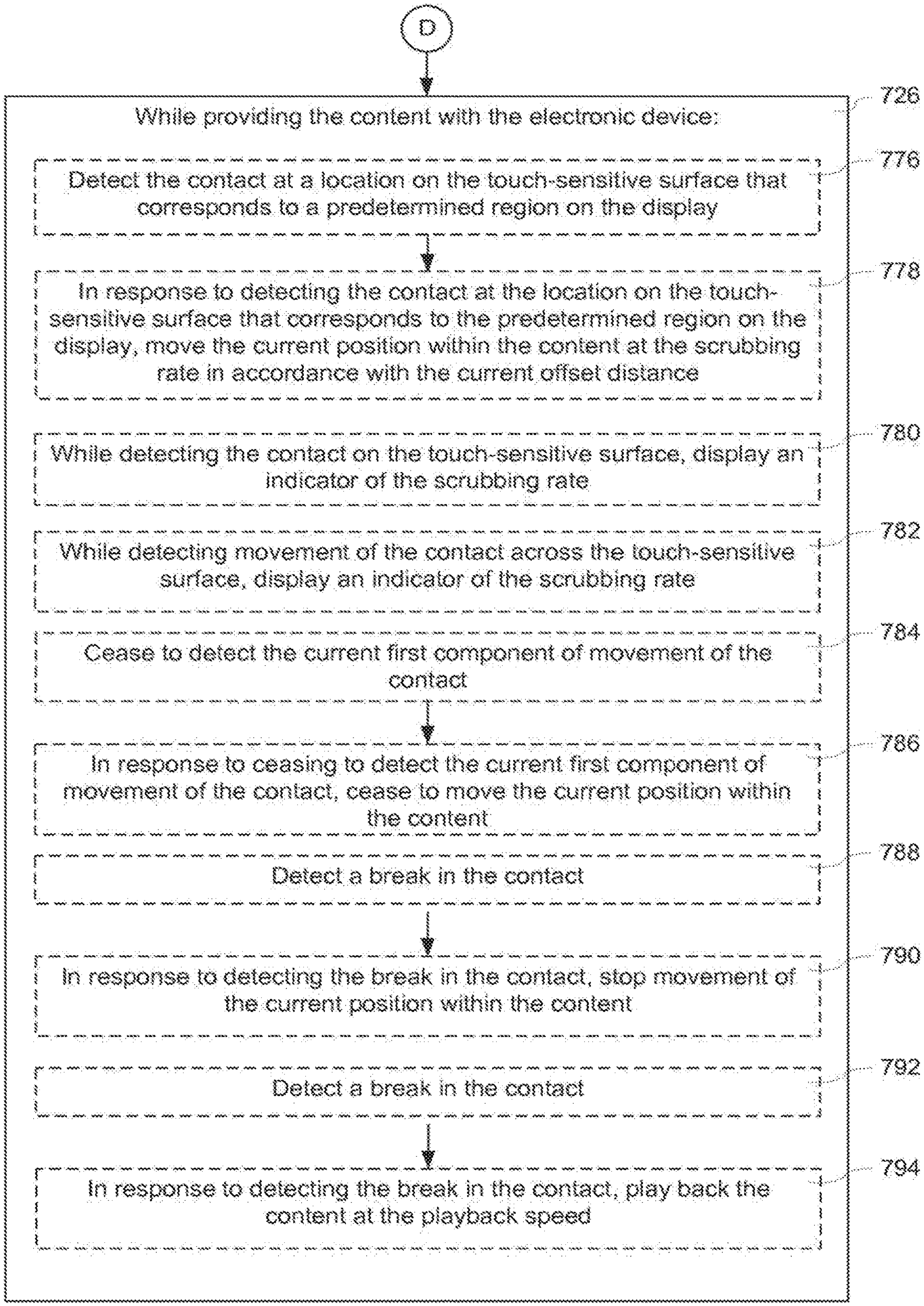
Figure 8A:
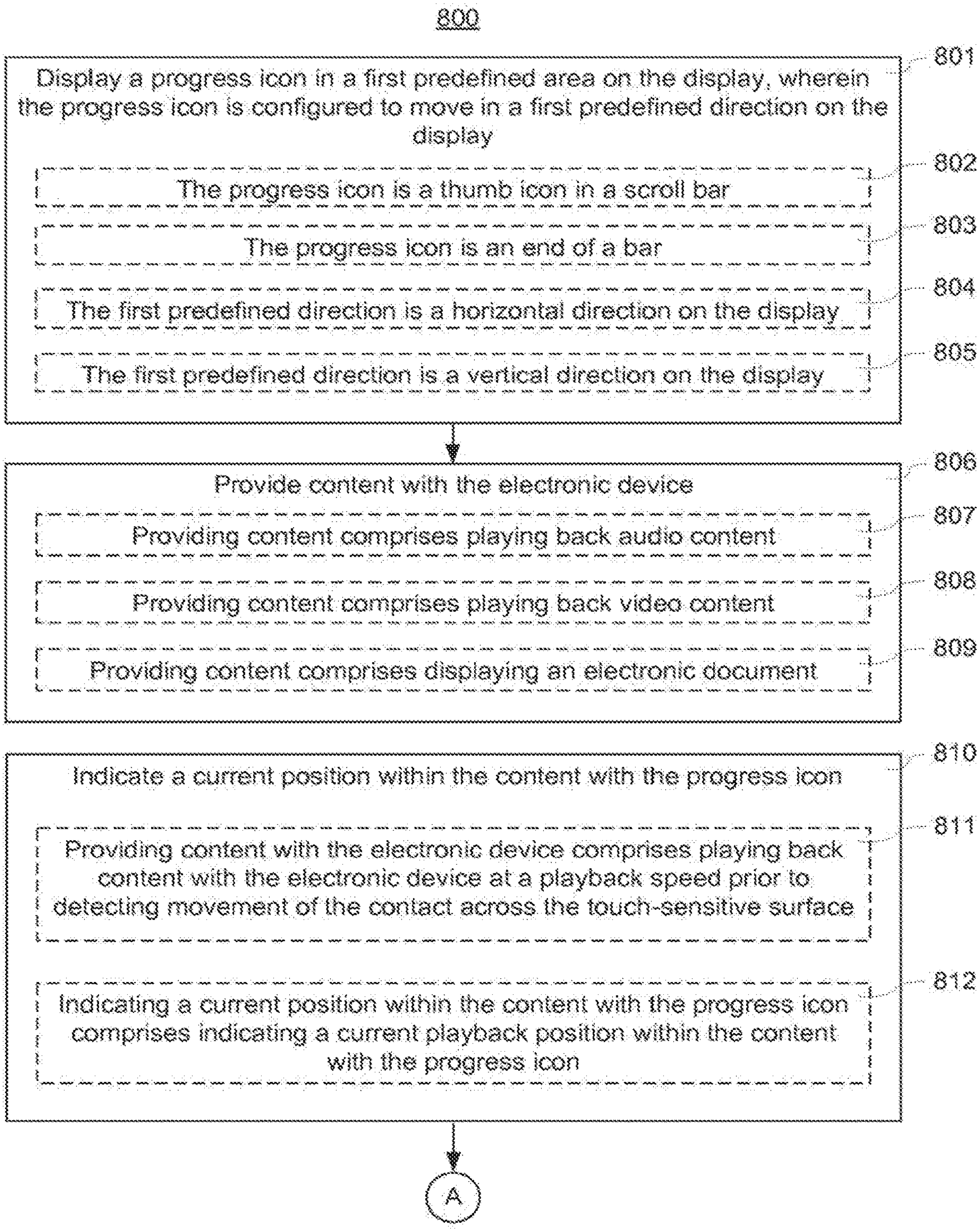
FIGS. 8A-8G are flow diagrams illustrating a method of scrolling in accordance with some embodiments.
Figure 8B:
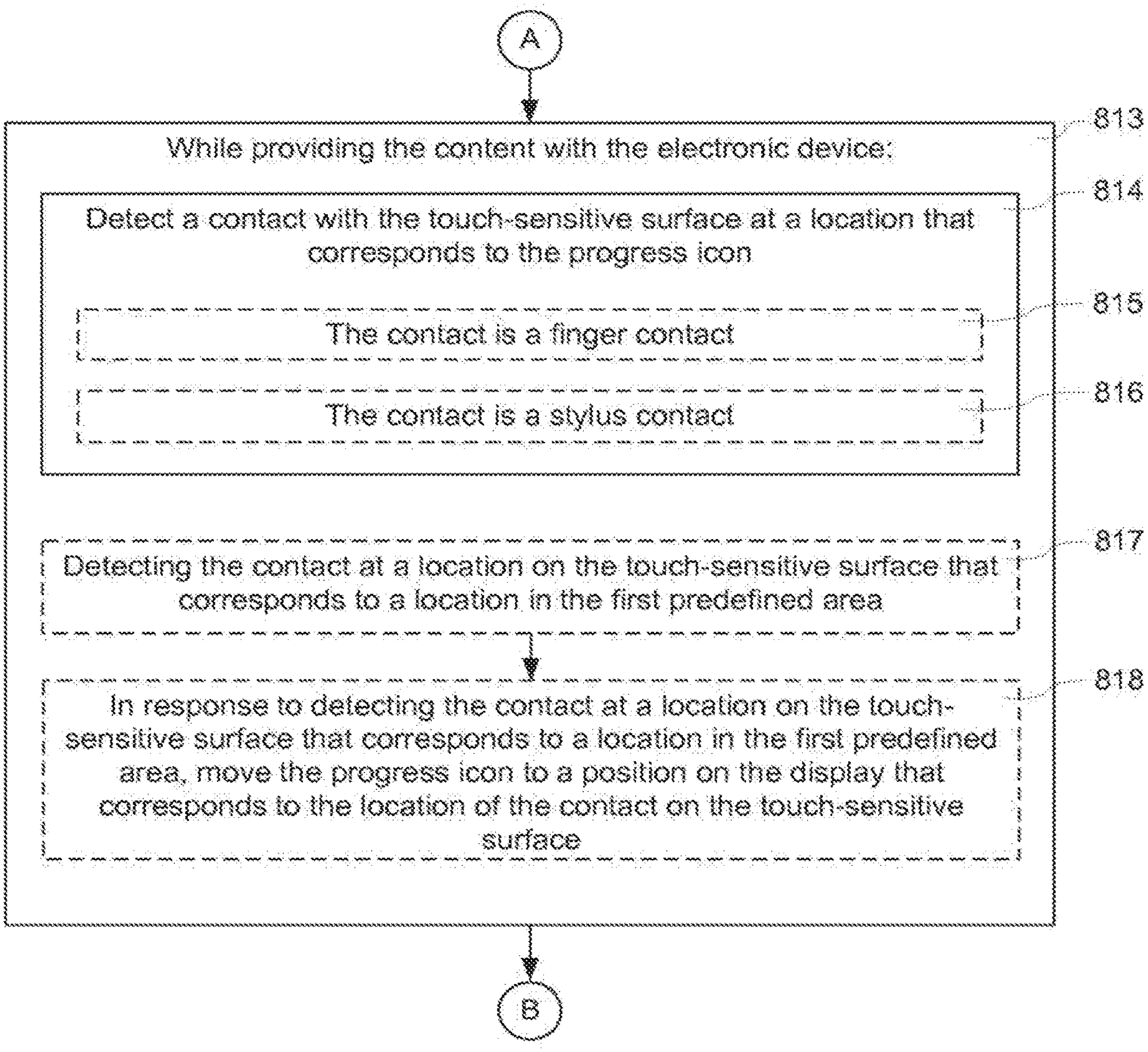
Figure 8C:
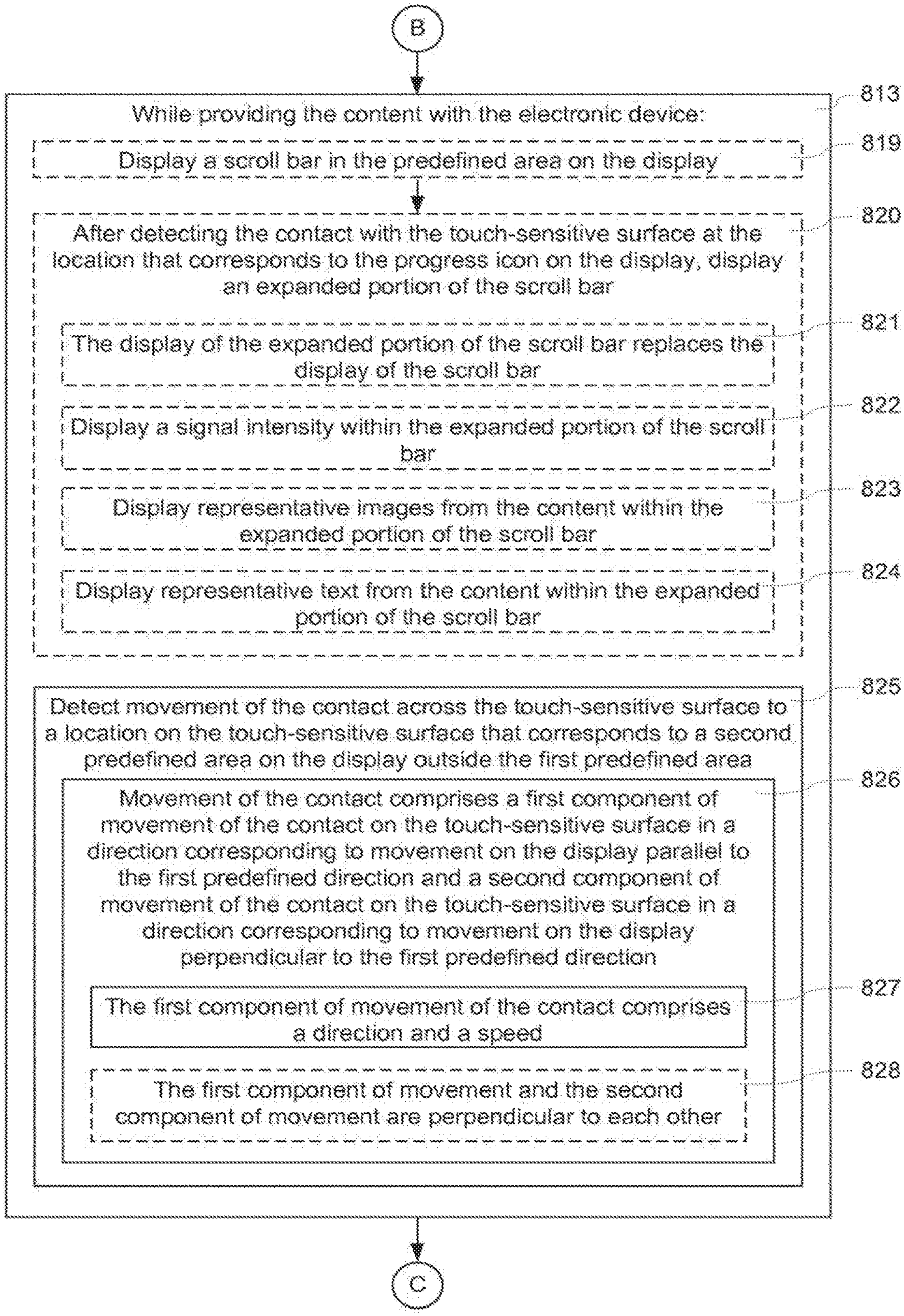
Figure 8D:
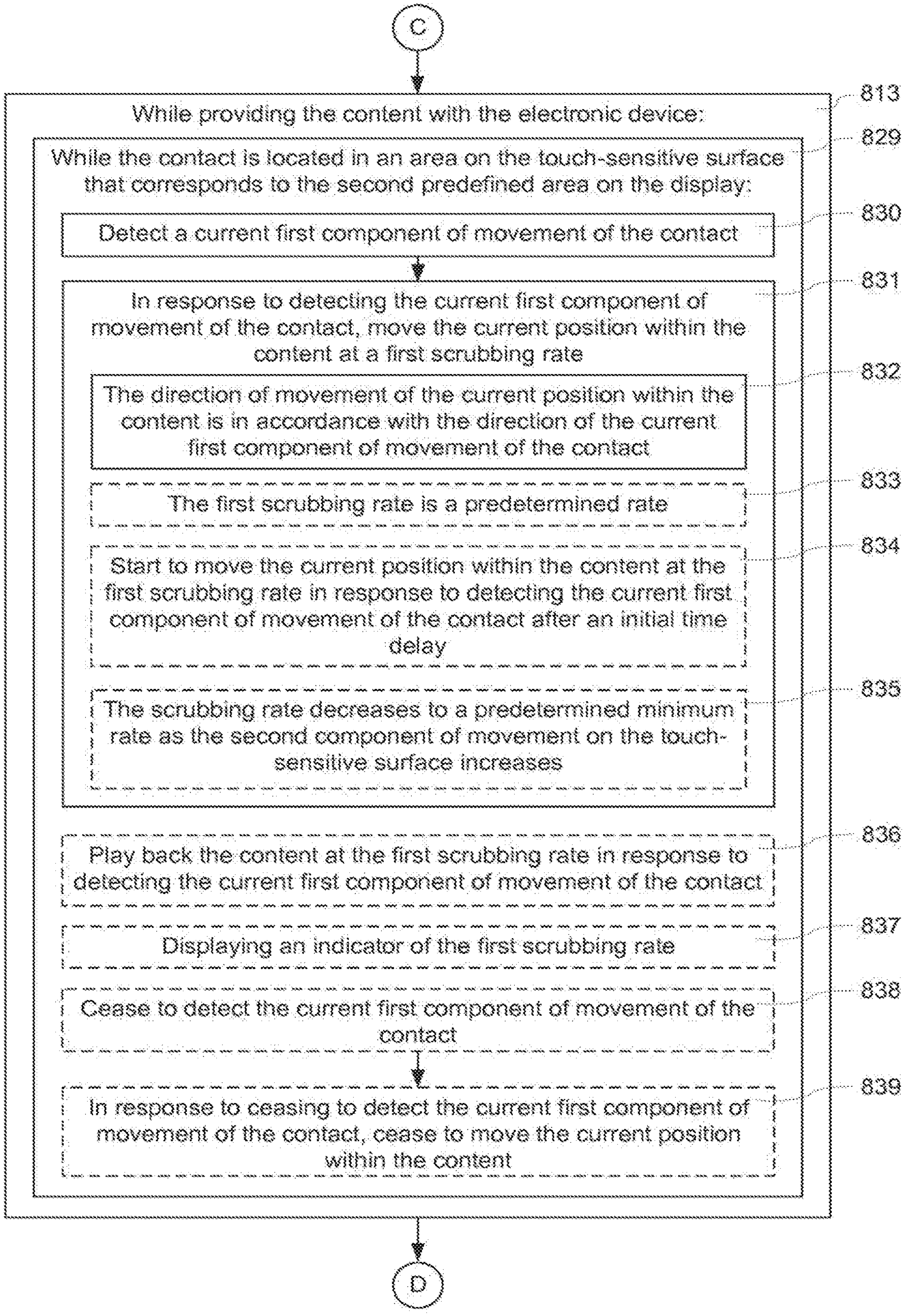
Figure 8E:
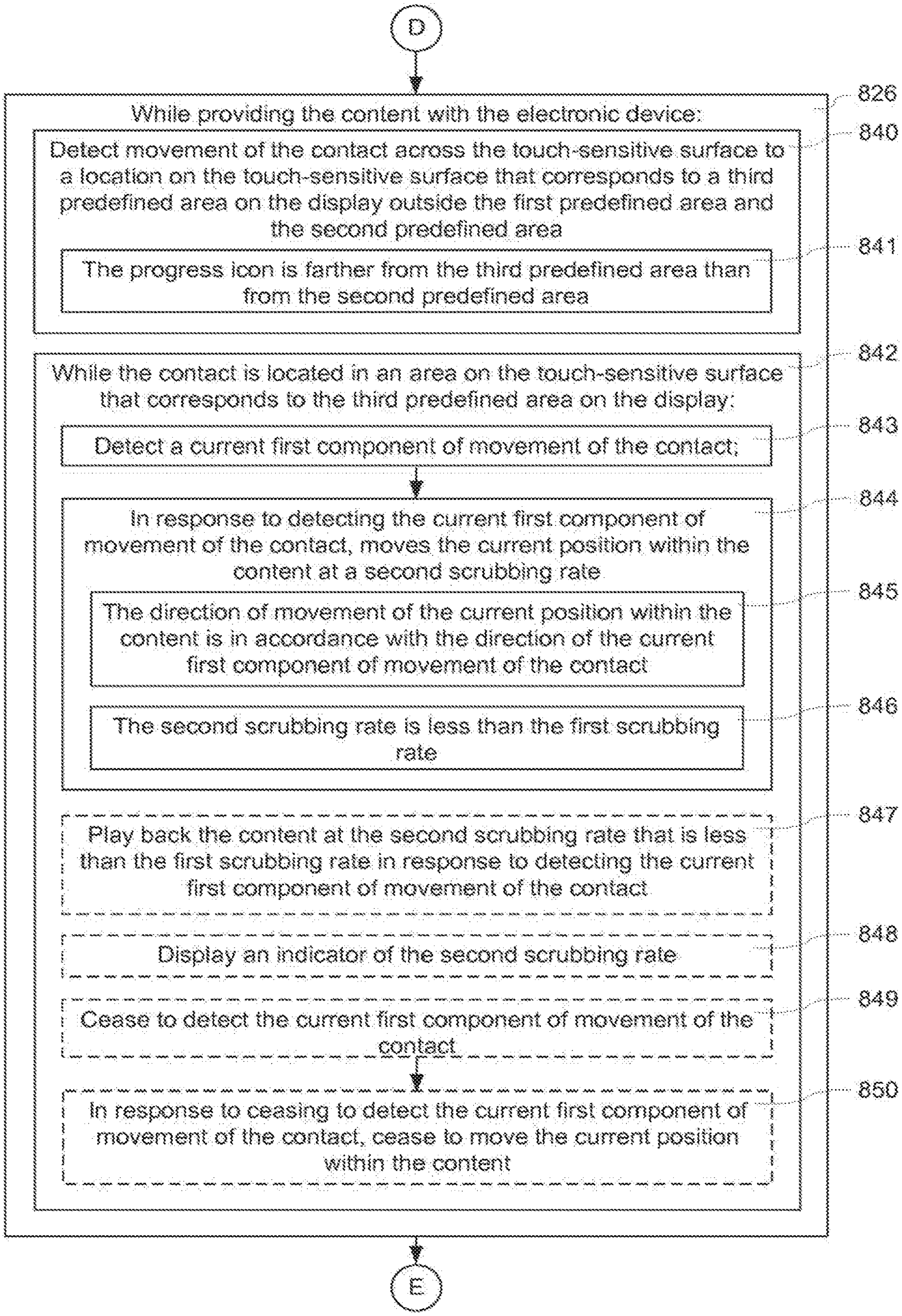
Figure 8F:
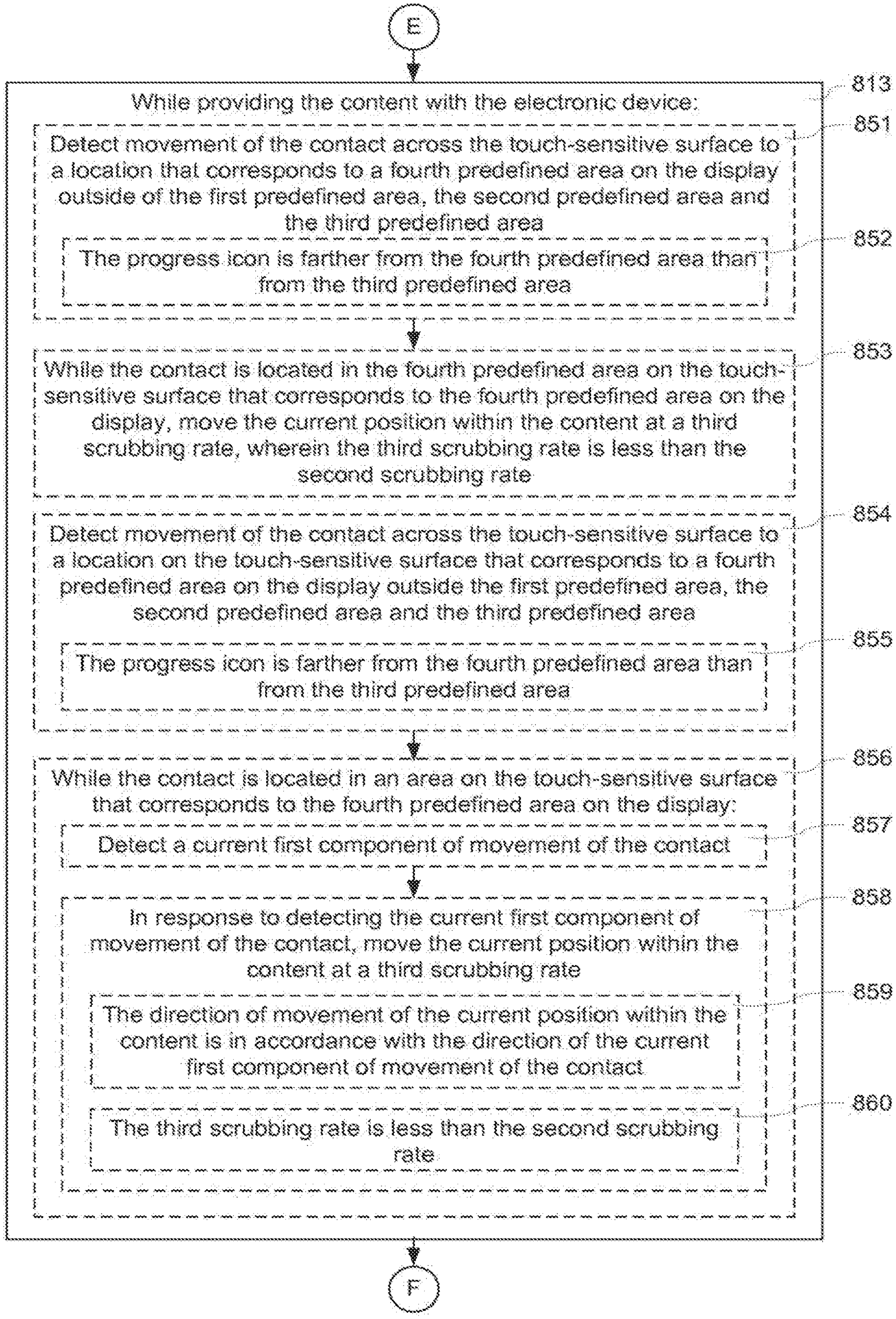
Figure 8G:
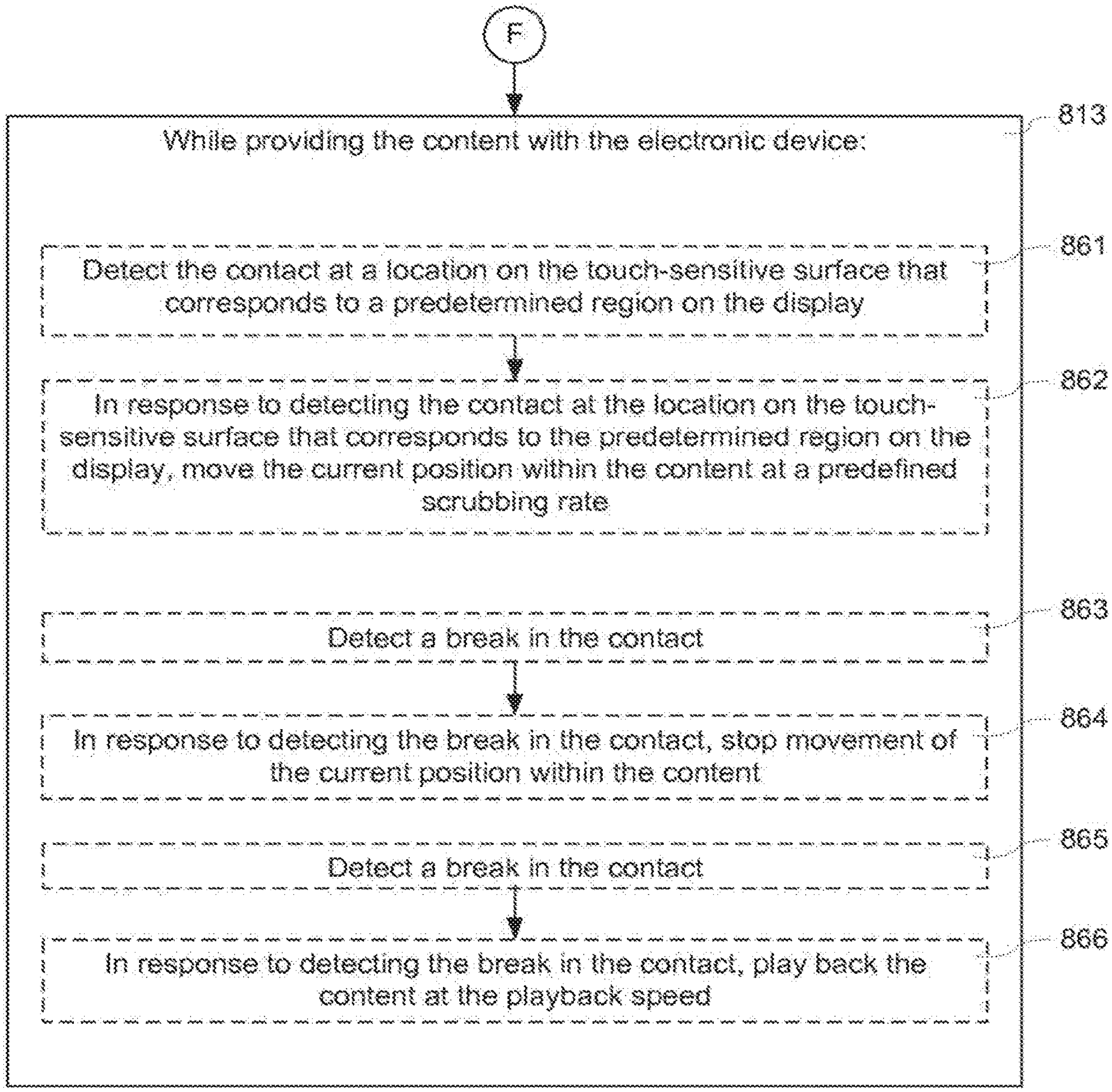
Figure 9A:
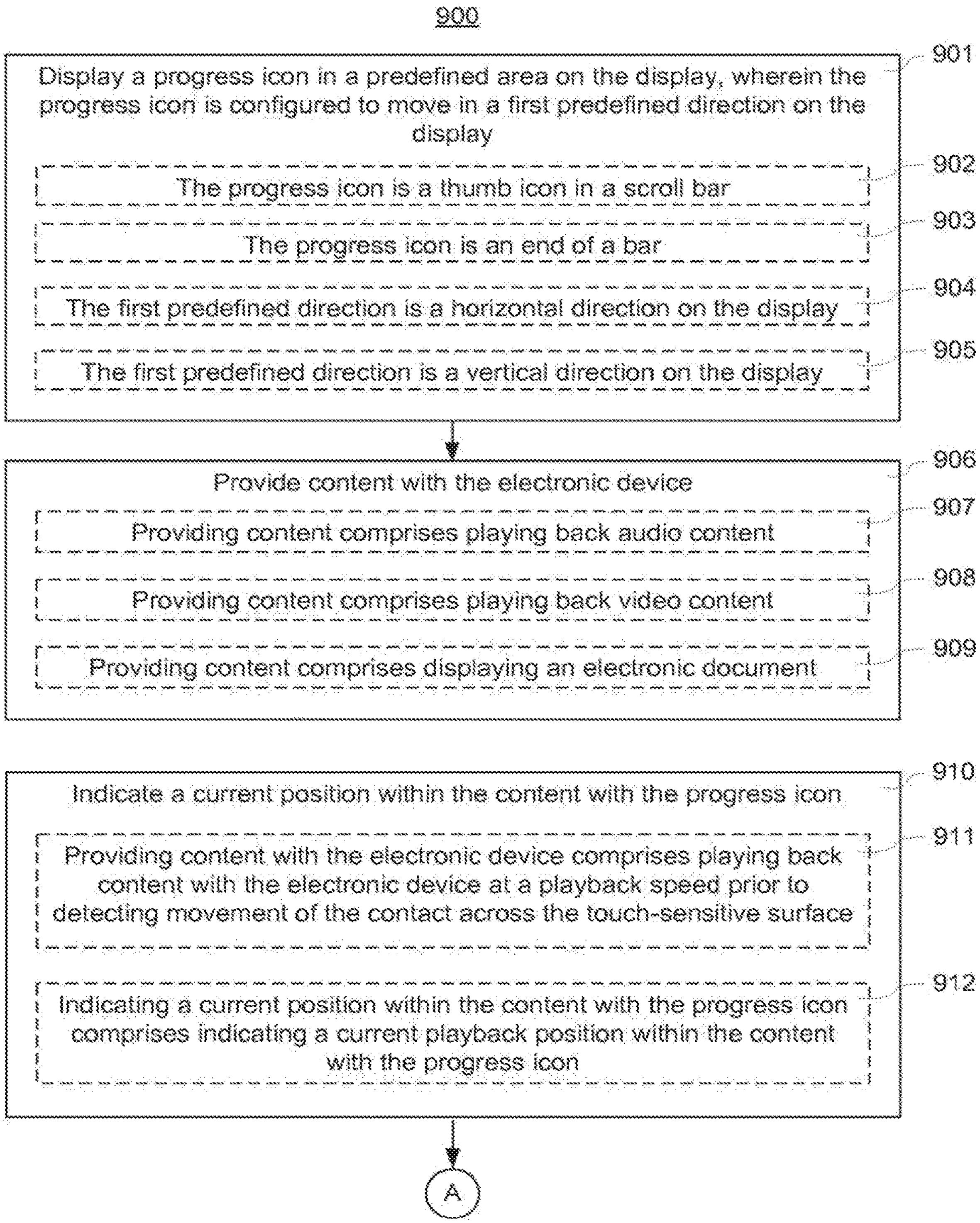
FIGS. 9A-9G are flow diagrams illustrating a method of scrolling in accordance with some embodiments.
Figure 9B:
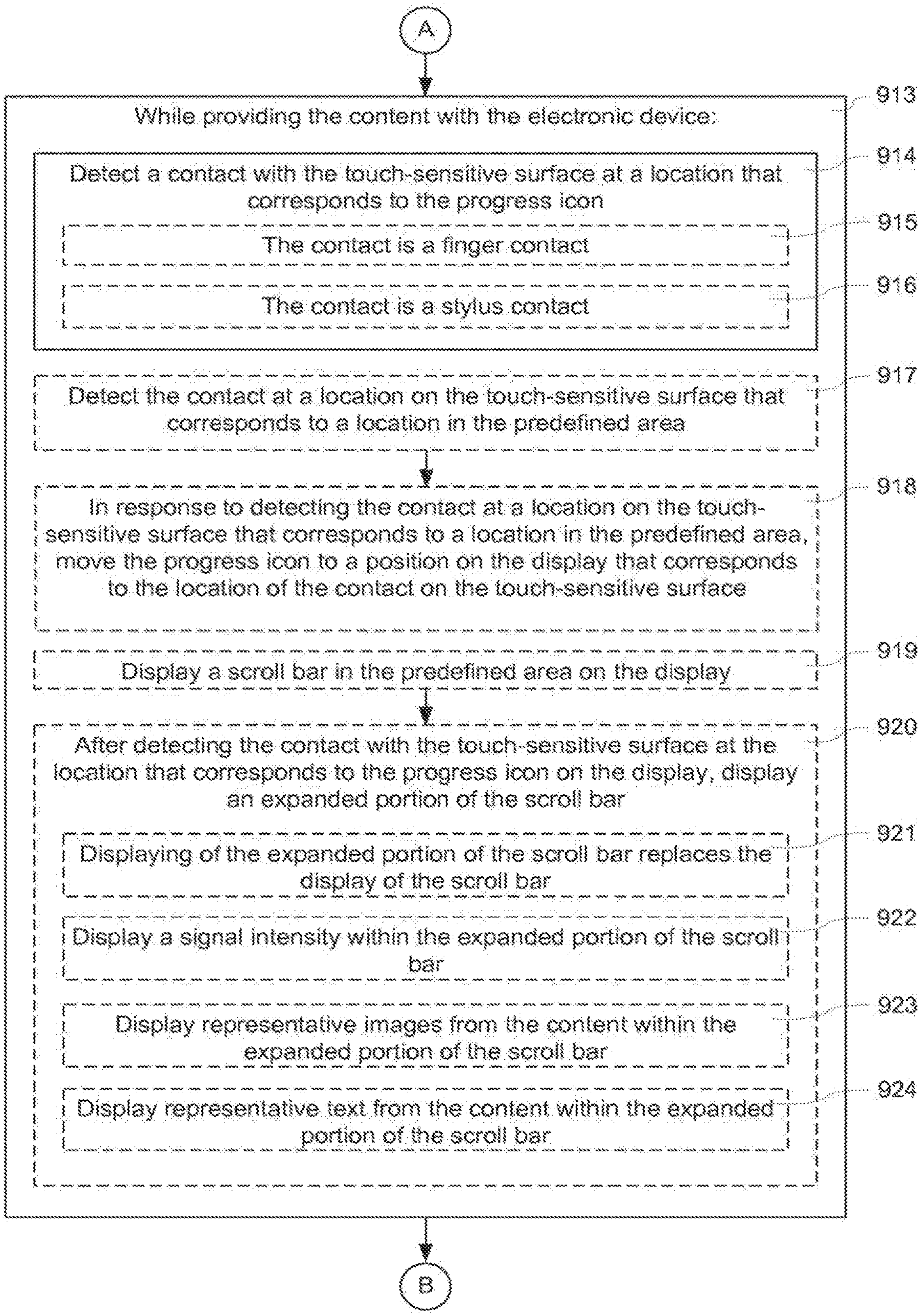
Figure 9C:
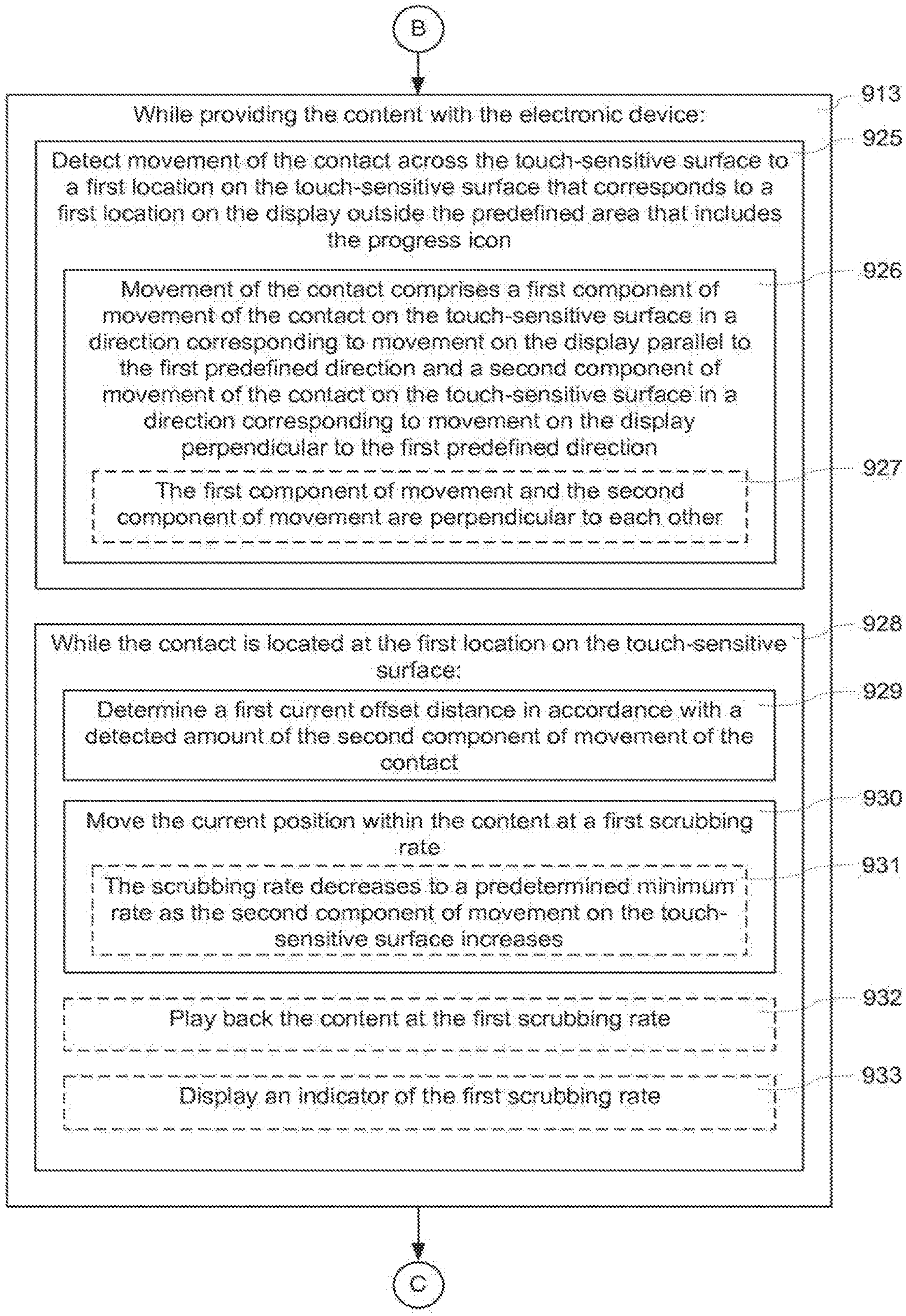
Figure 9D:
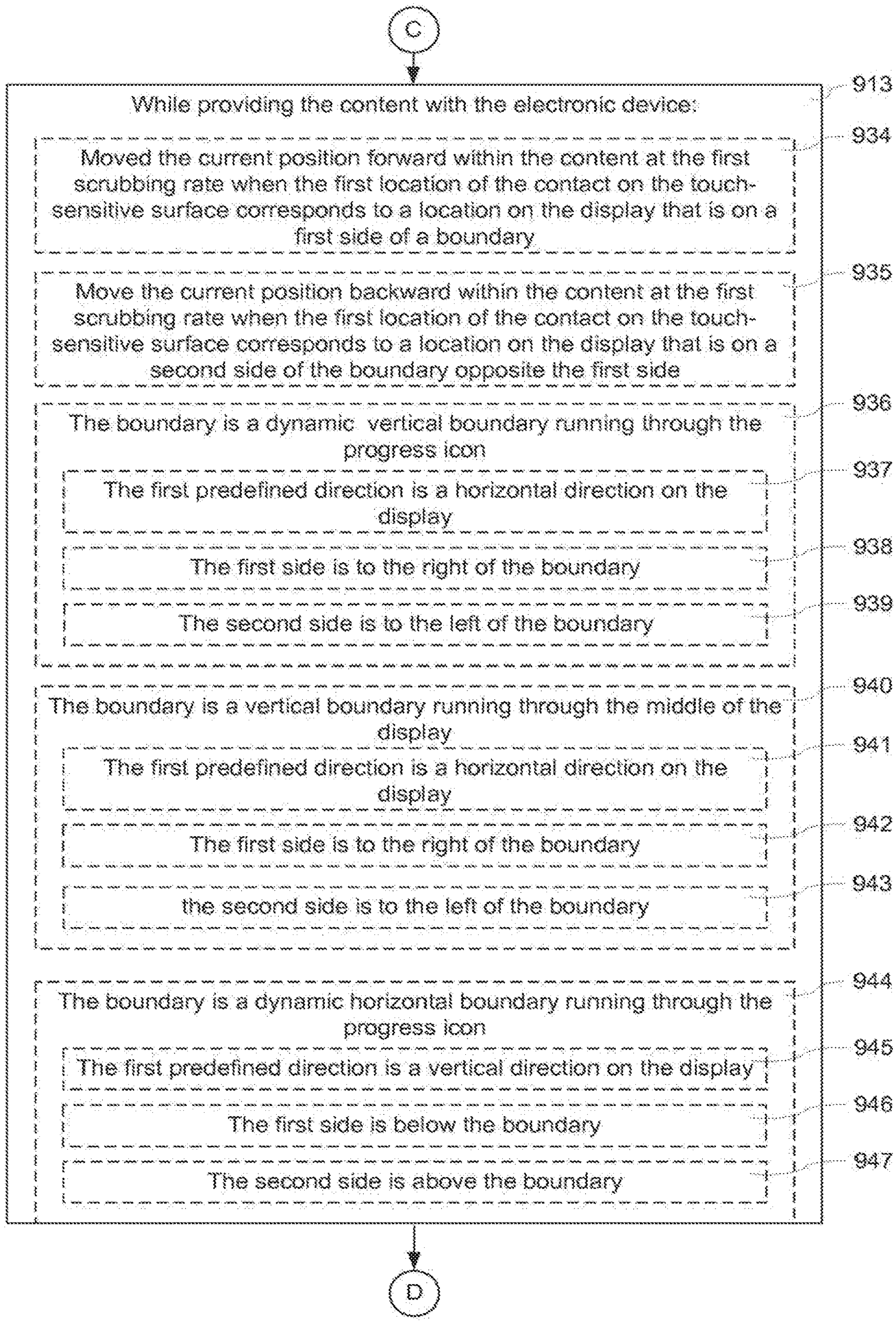
Figure 9E:
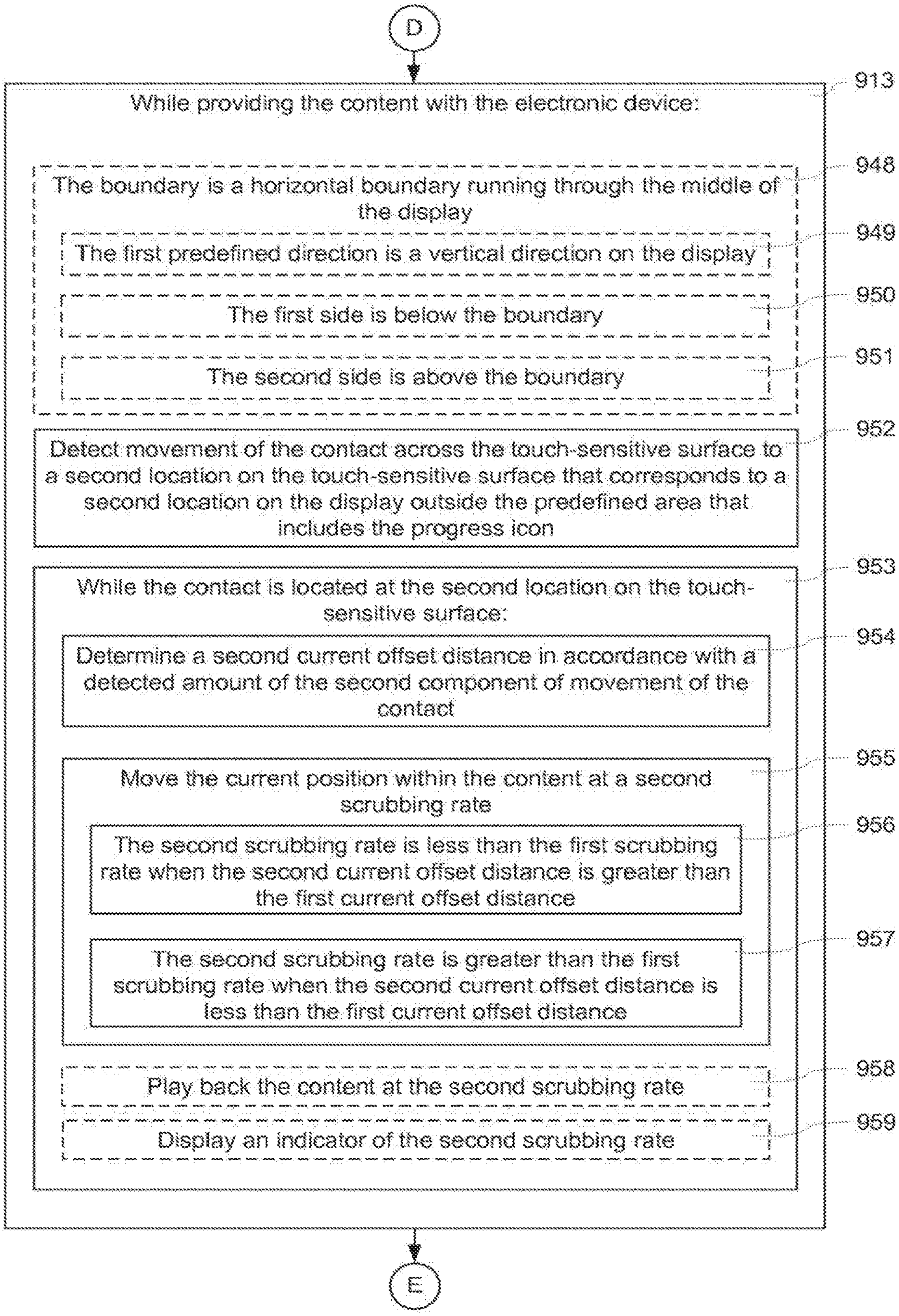
Figure 9F:
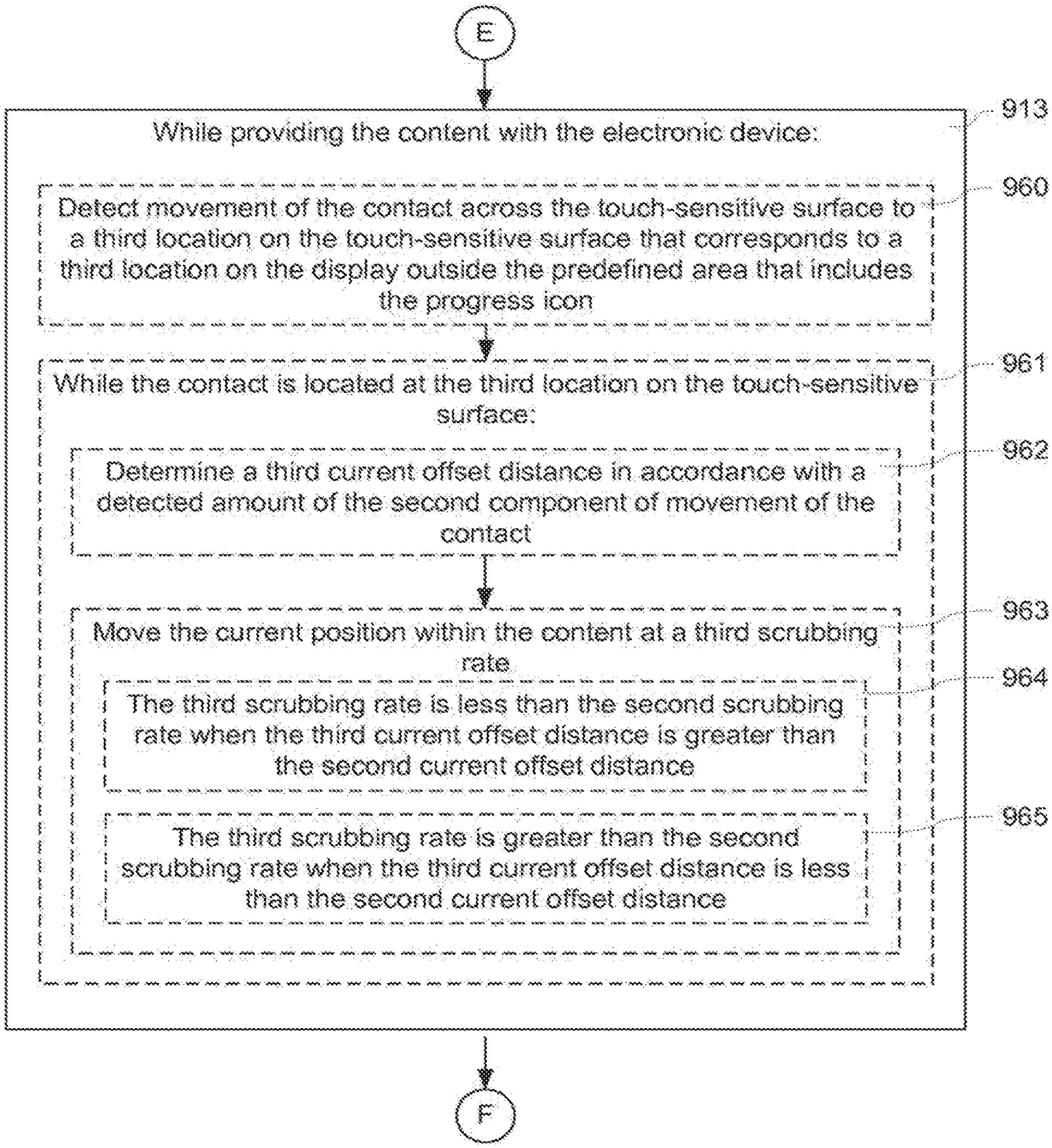
Figure 9G:
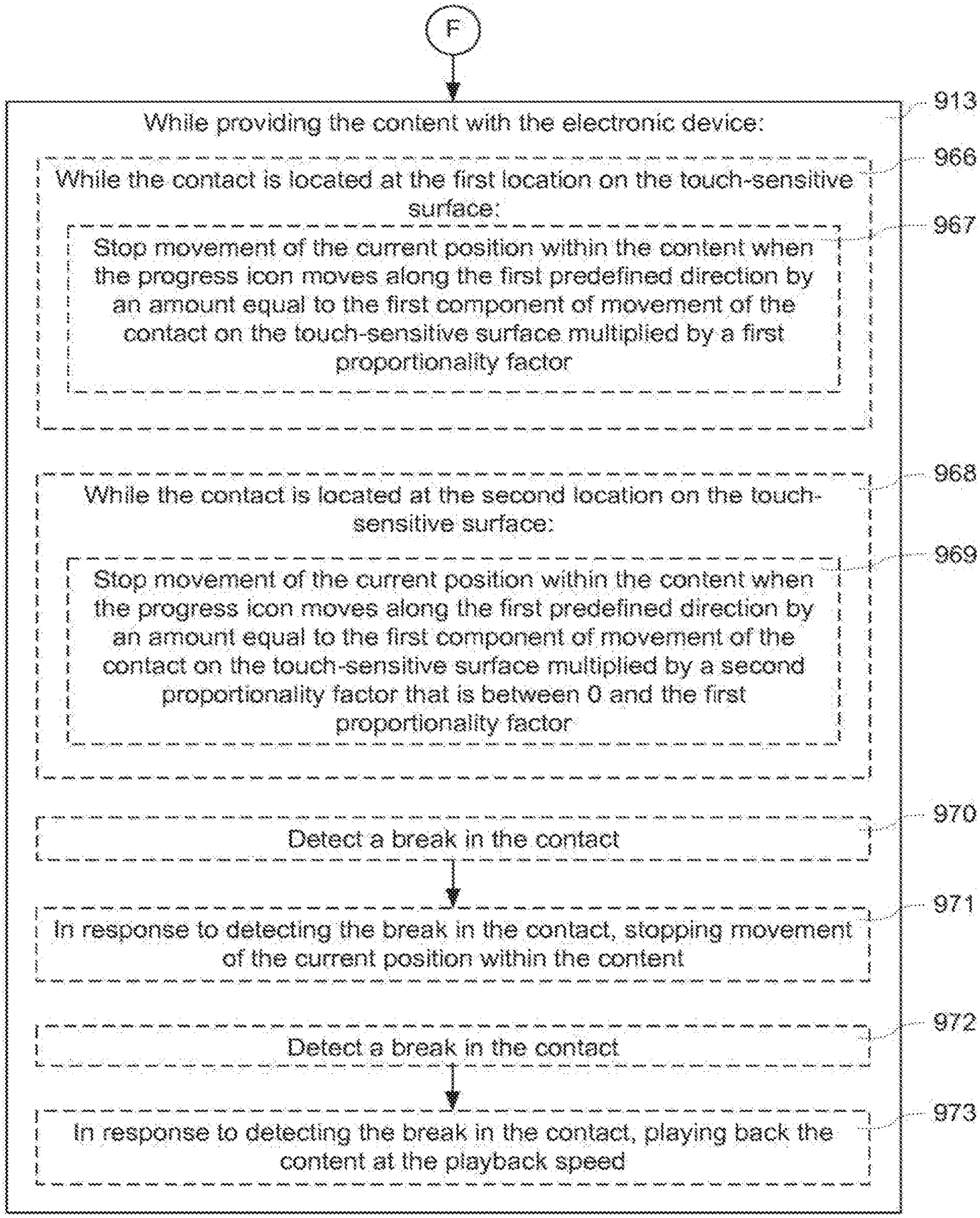
Figure 10A:
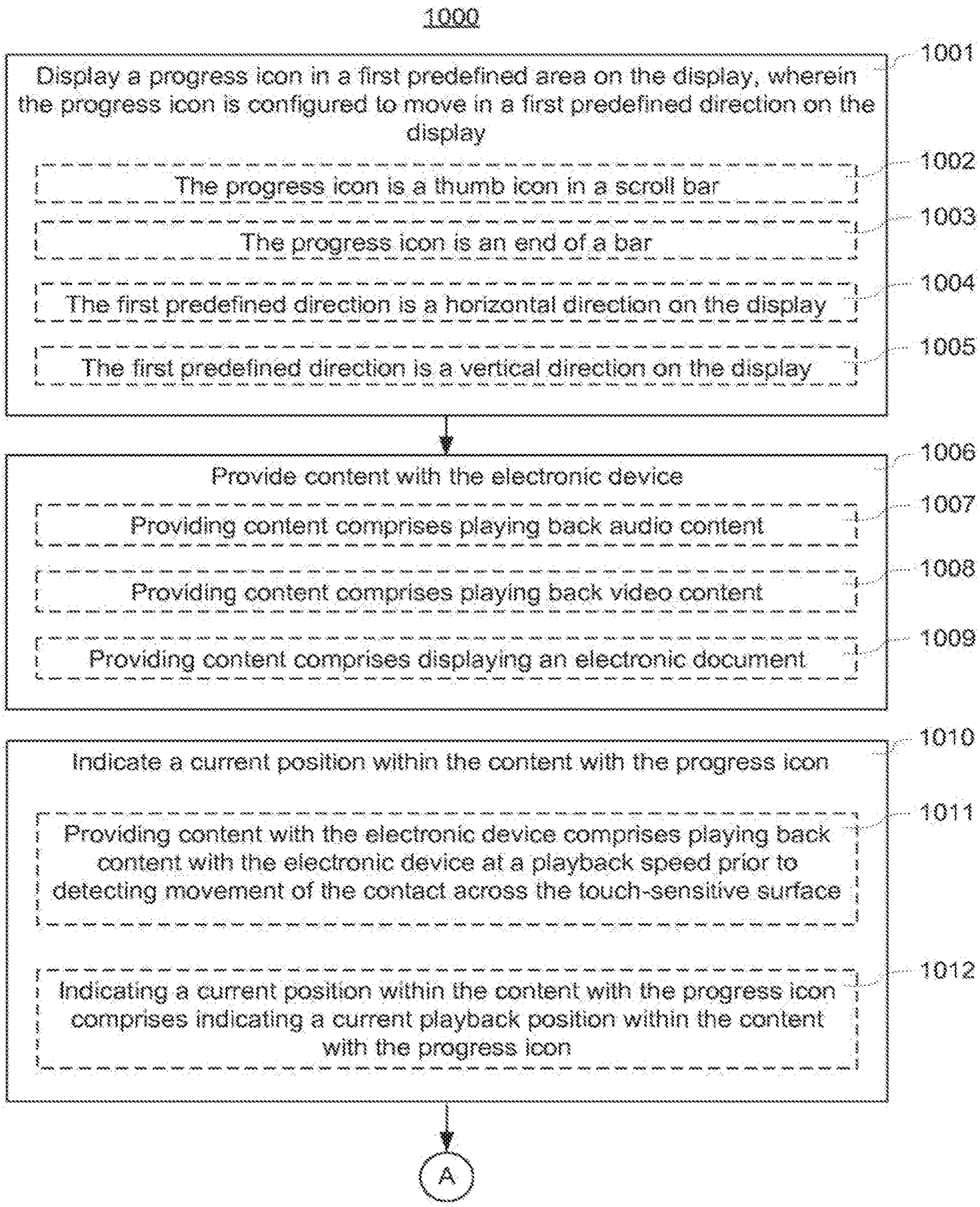
FIGS. 10A-10G are flow diagrams illustrating a method of scrolling in accordance with some embodiments.
Figure 10B:
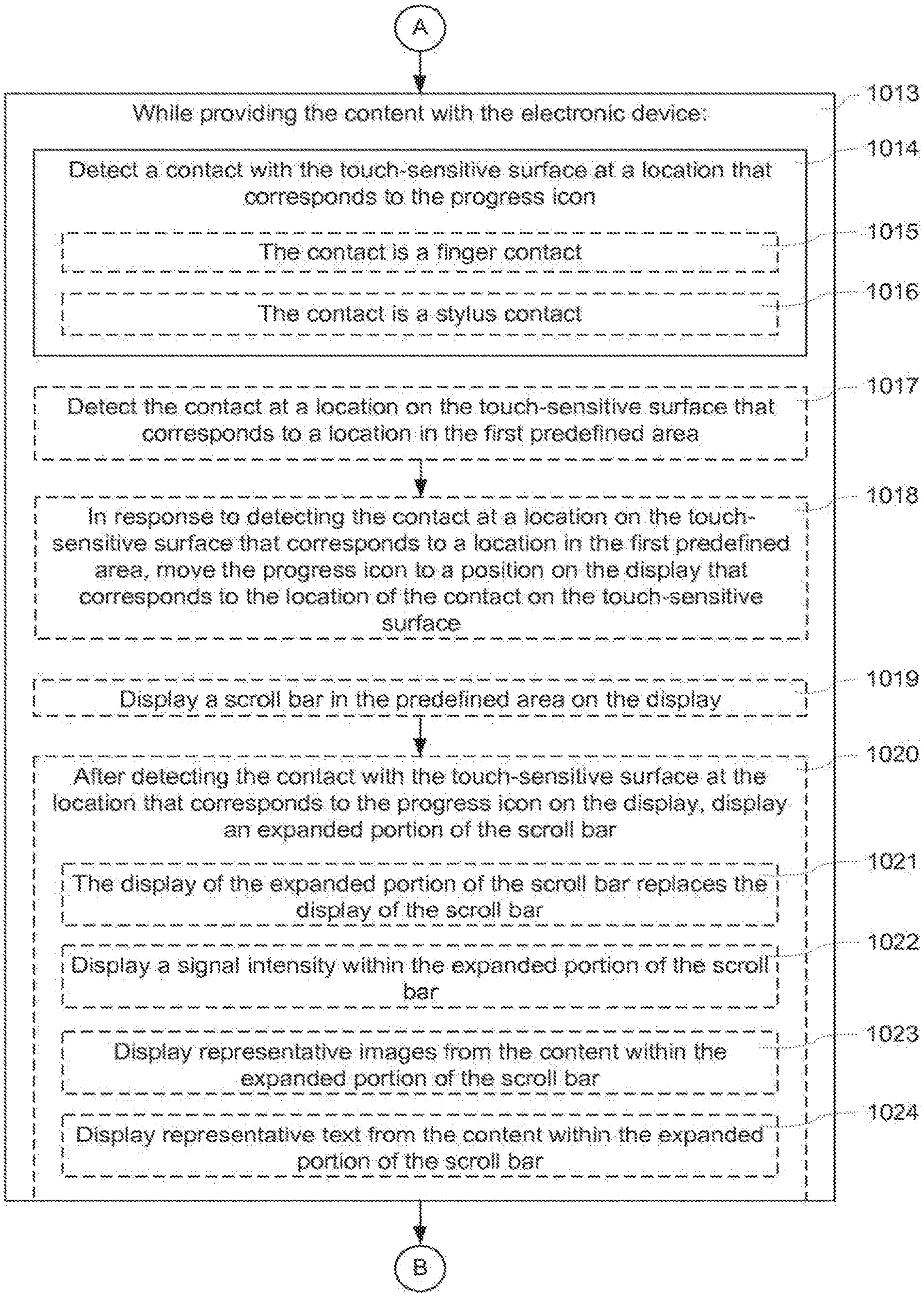
Figure 10C:
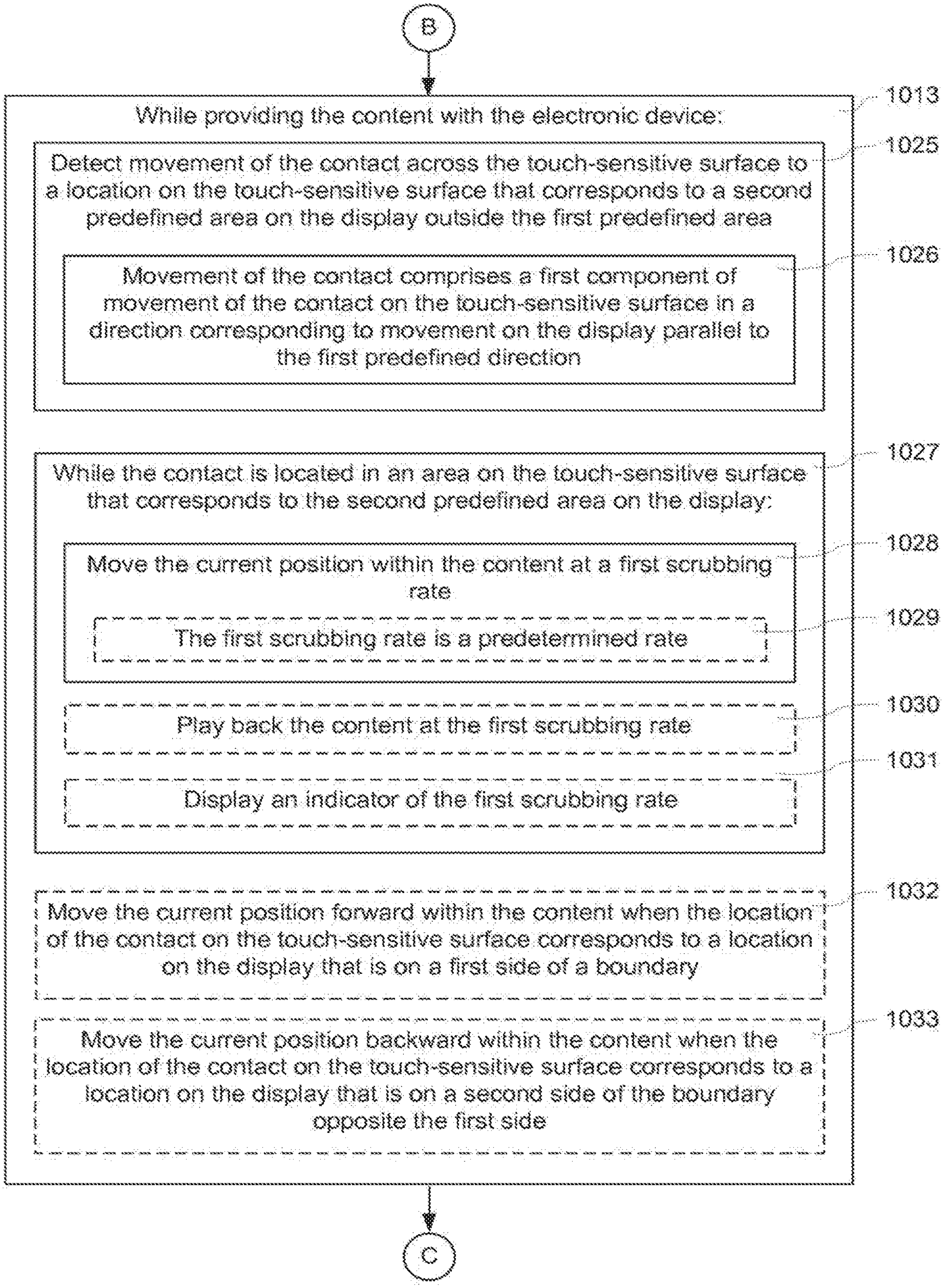
Figure 10D:
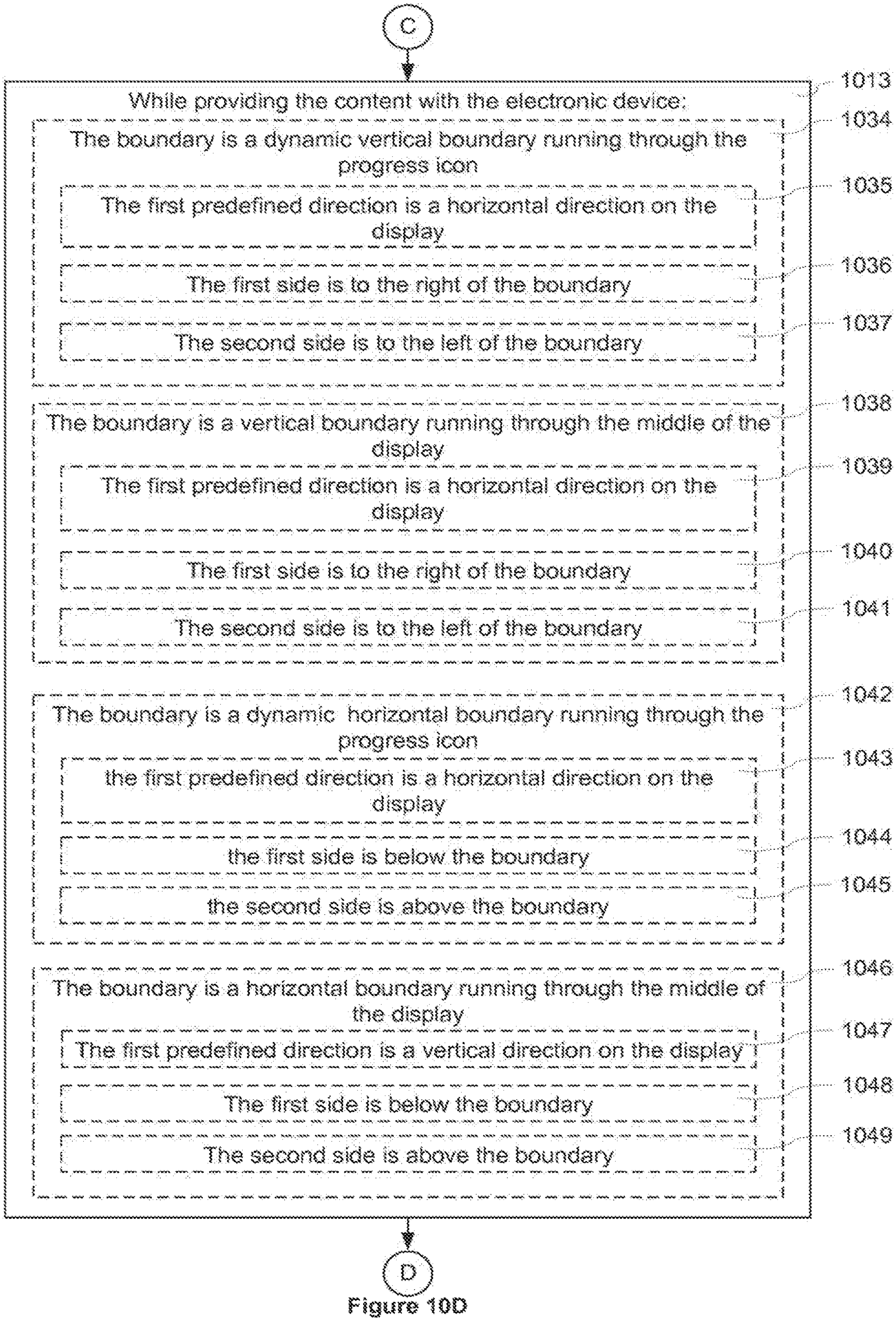
Figure 10E:
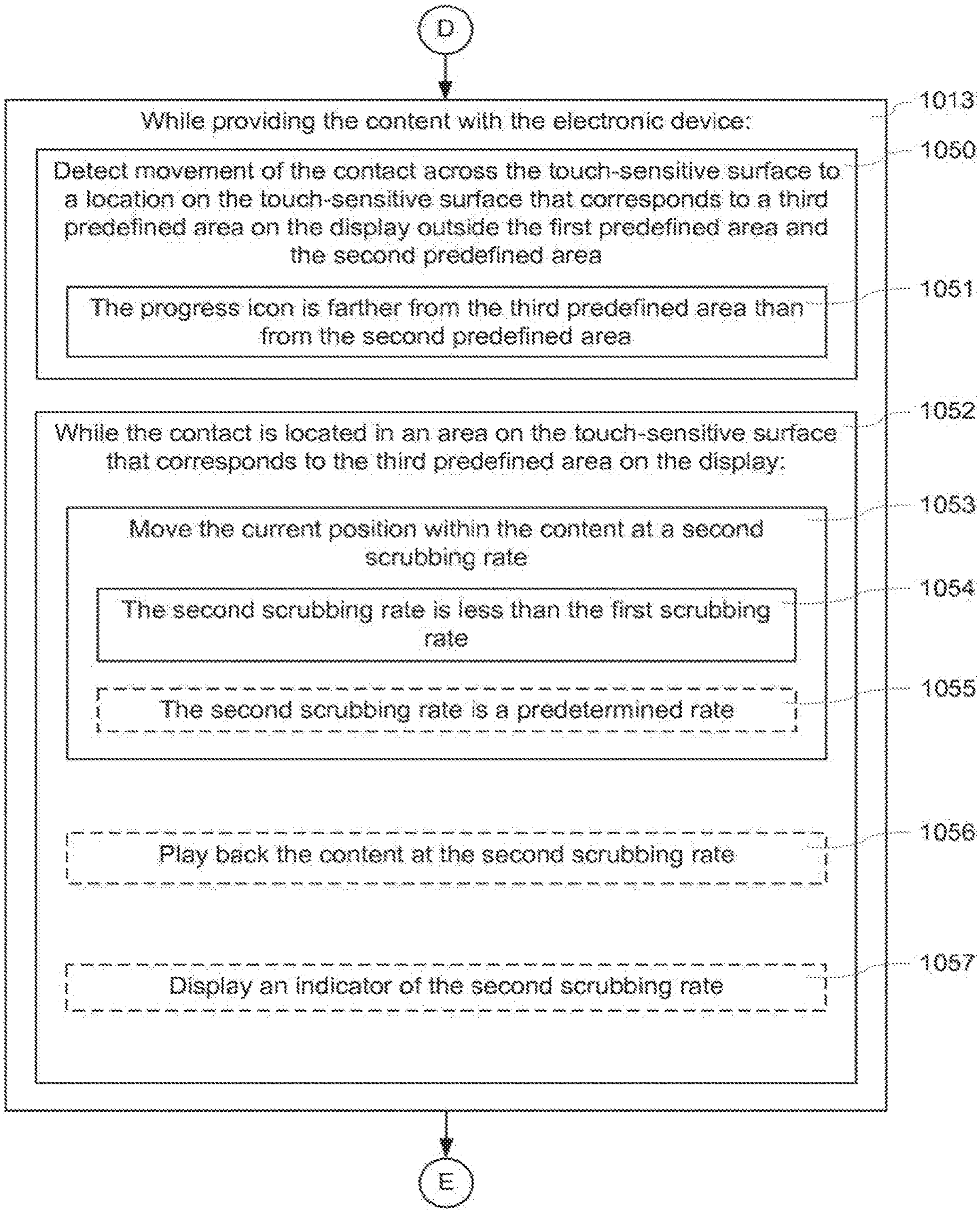
Figure 10F:
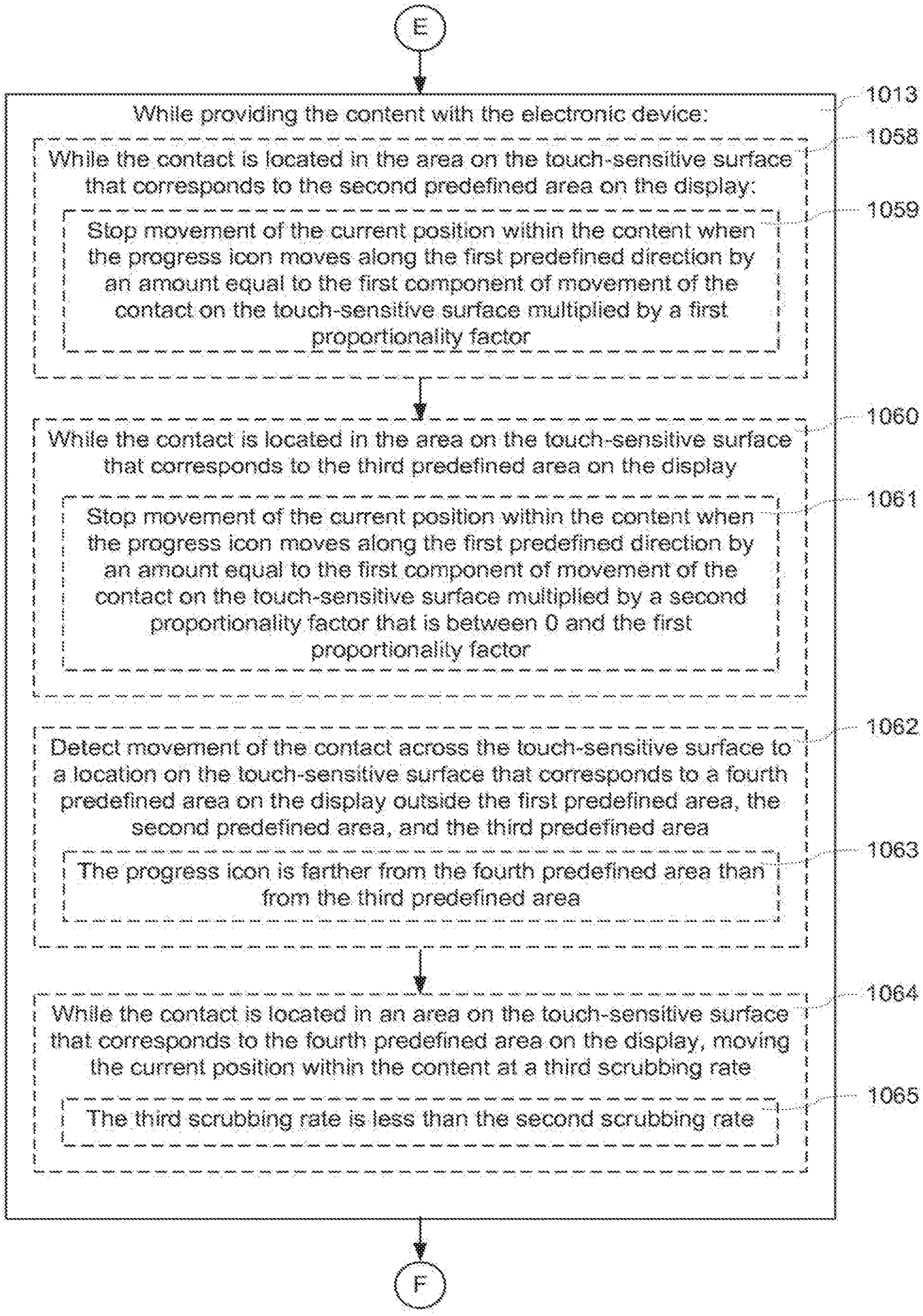
Figure 10G:
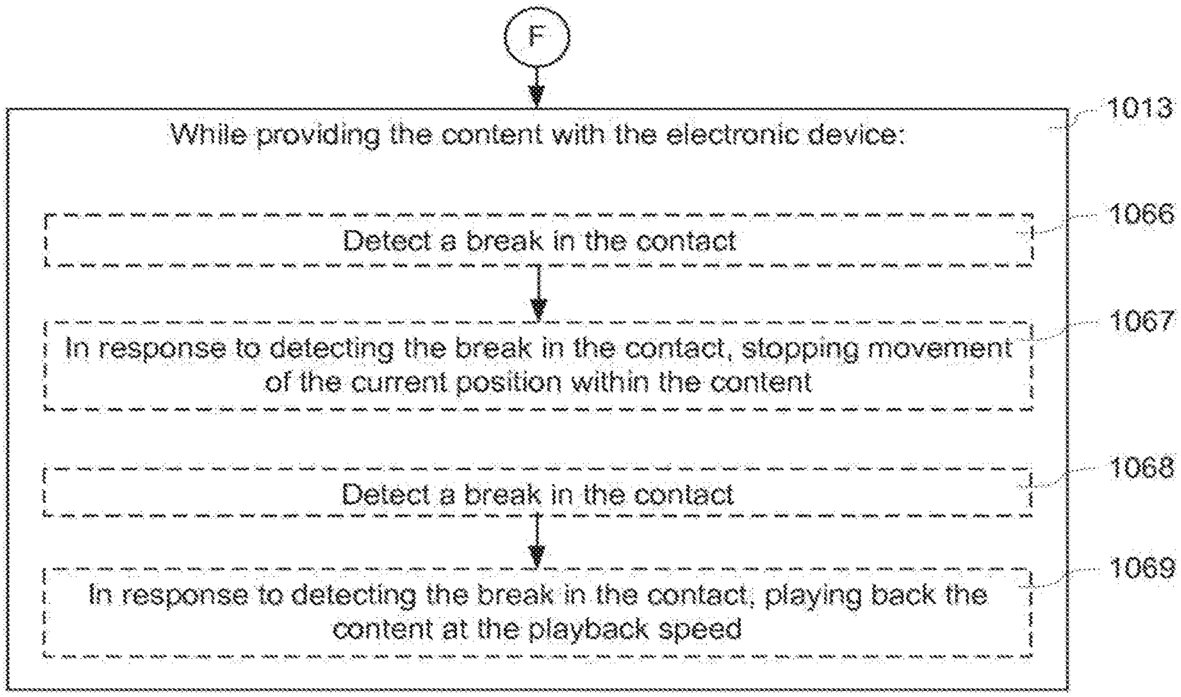
Figure 11A:
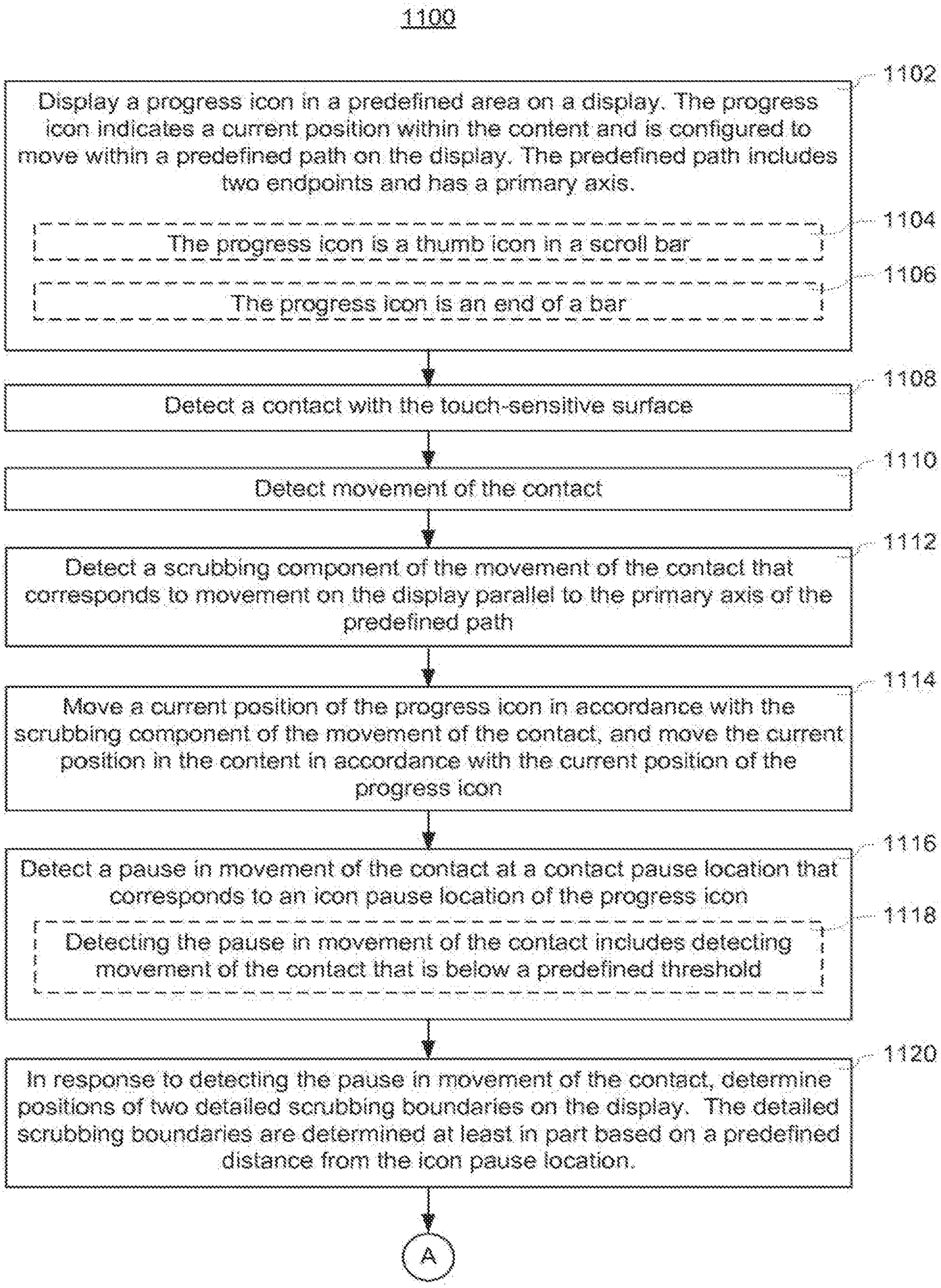
FIGS. 11A-11D are flow diagrams illustrating a method of scrubbing through content at a variable scrubbing rate in accordance with some embodiments.
Figure 11B:
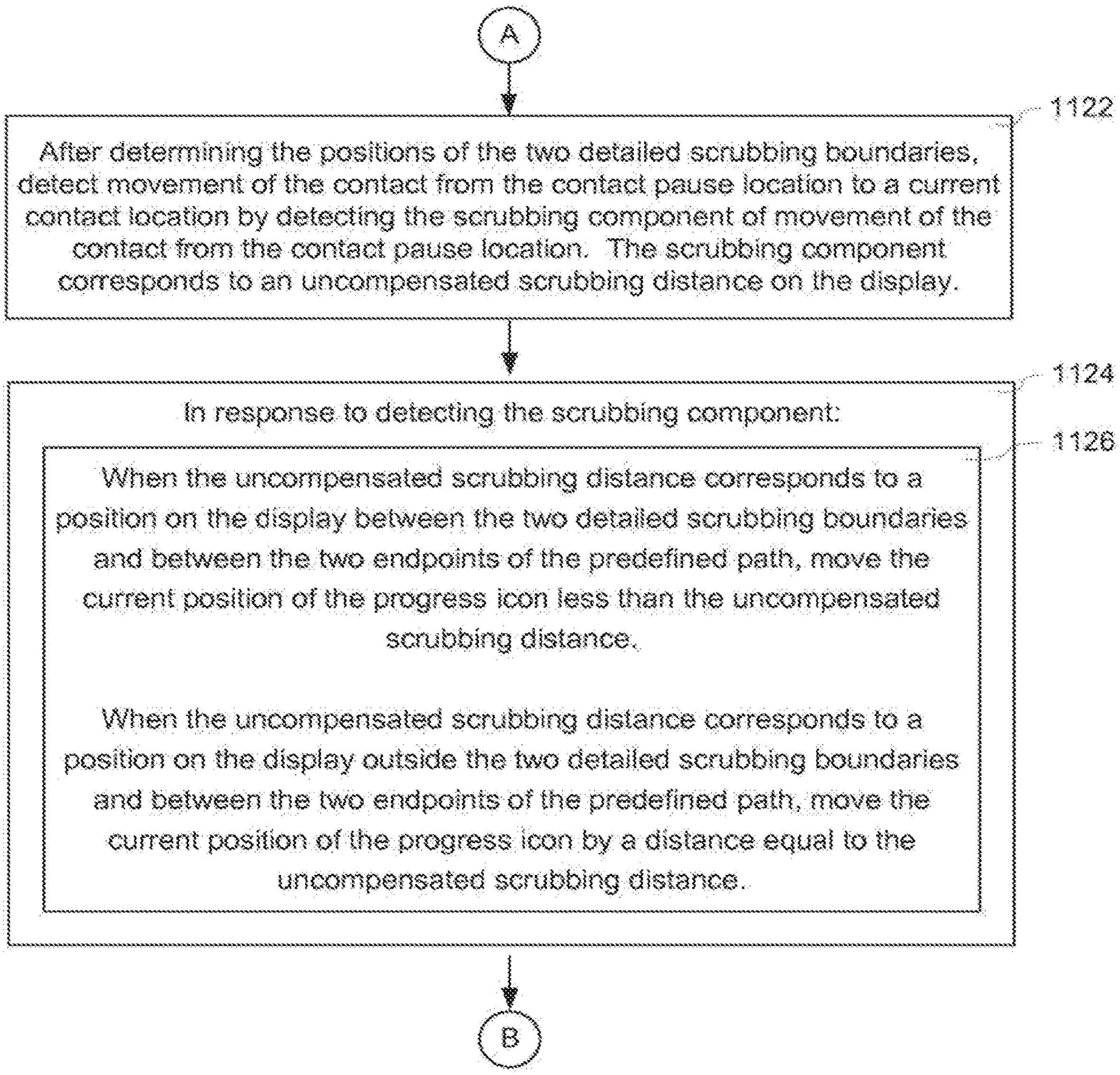
Figure 11C:
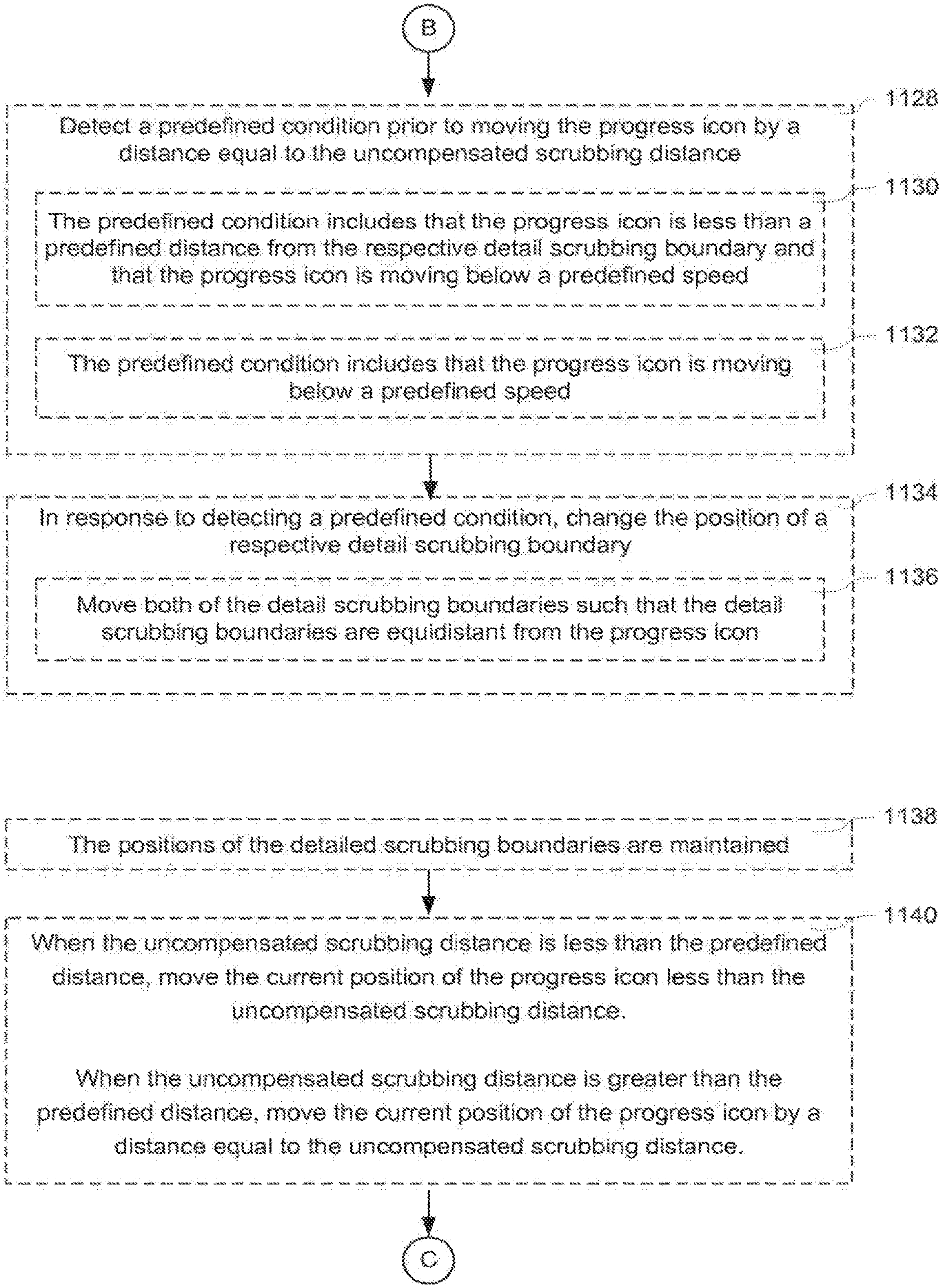
Figure 11D:
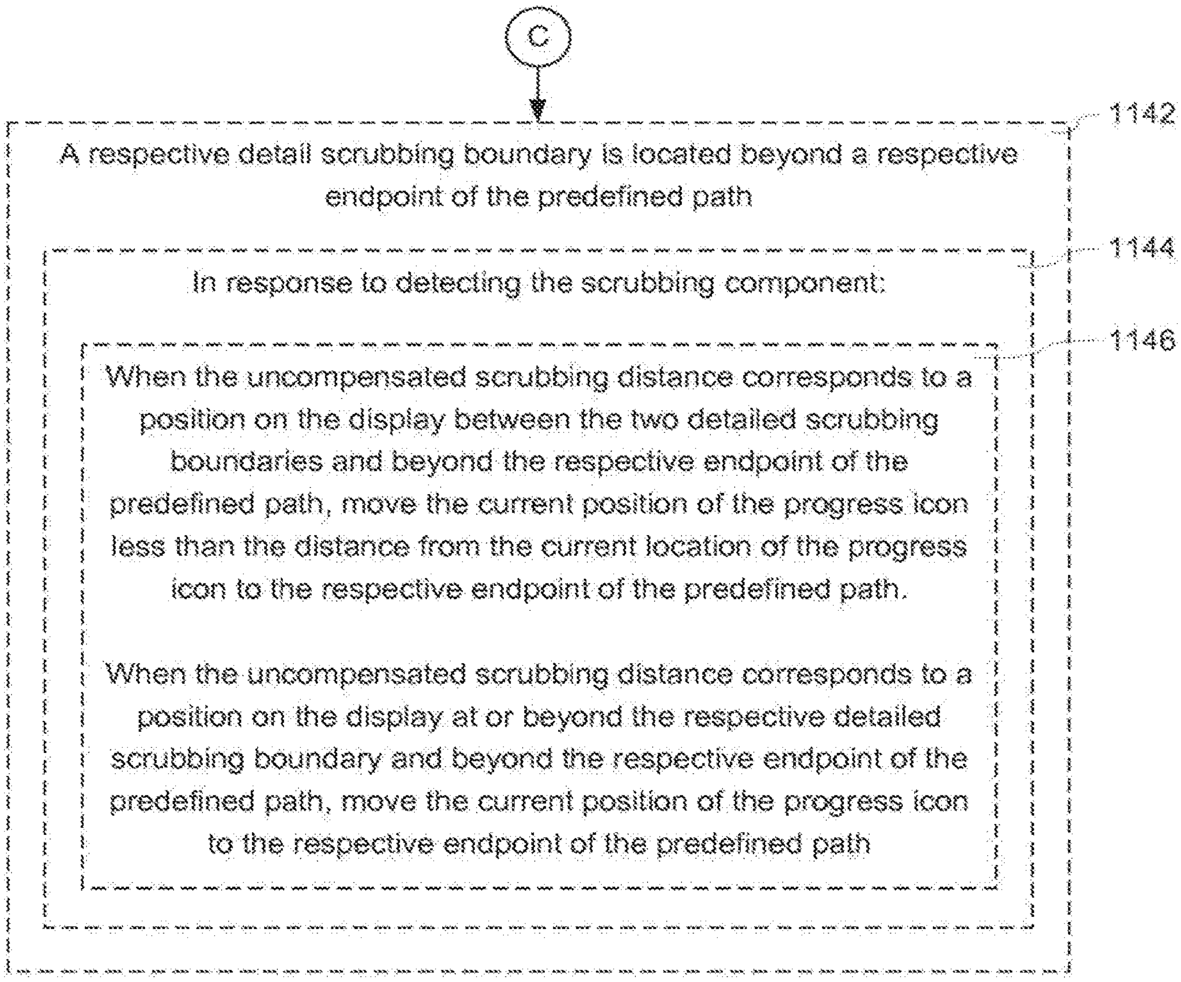
Figure 12A:
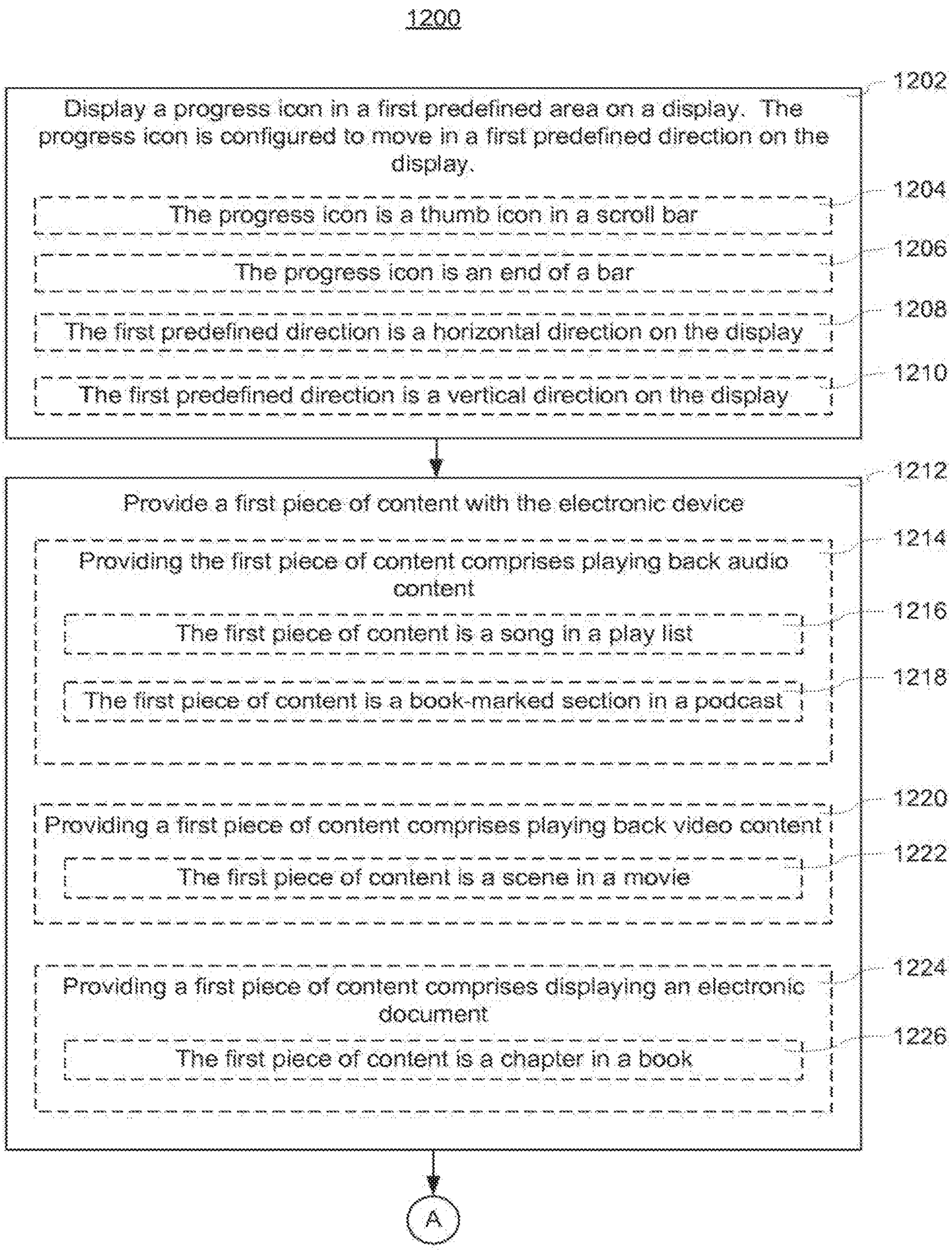
FIGS. 12A-12D are flow diagrams illustrating a method of scrubbing through content at a variable scrubbing rate in accordance with some embodiments.
Figure 12B:
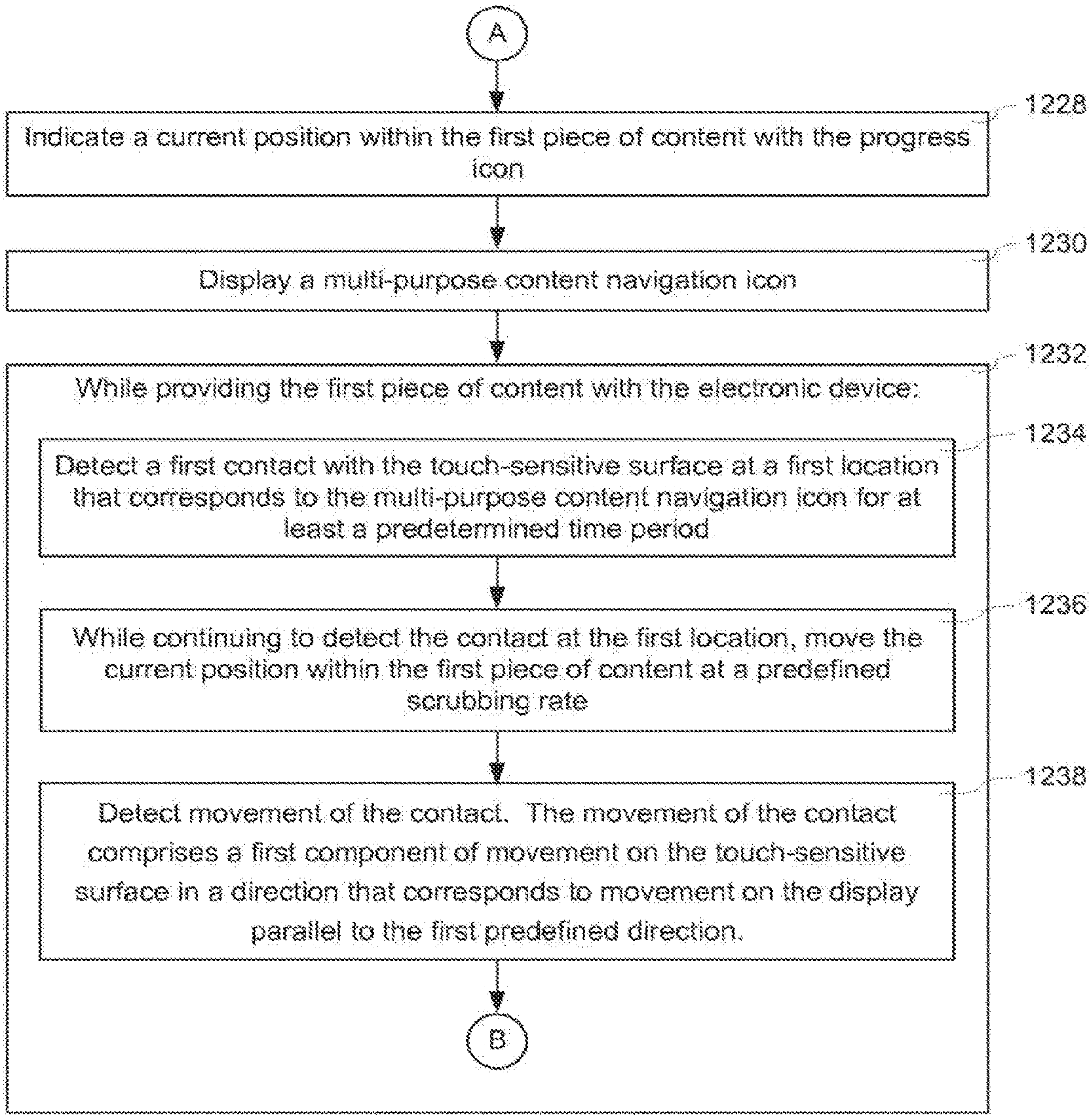
Figure 12C:
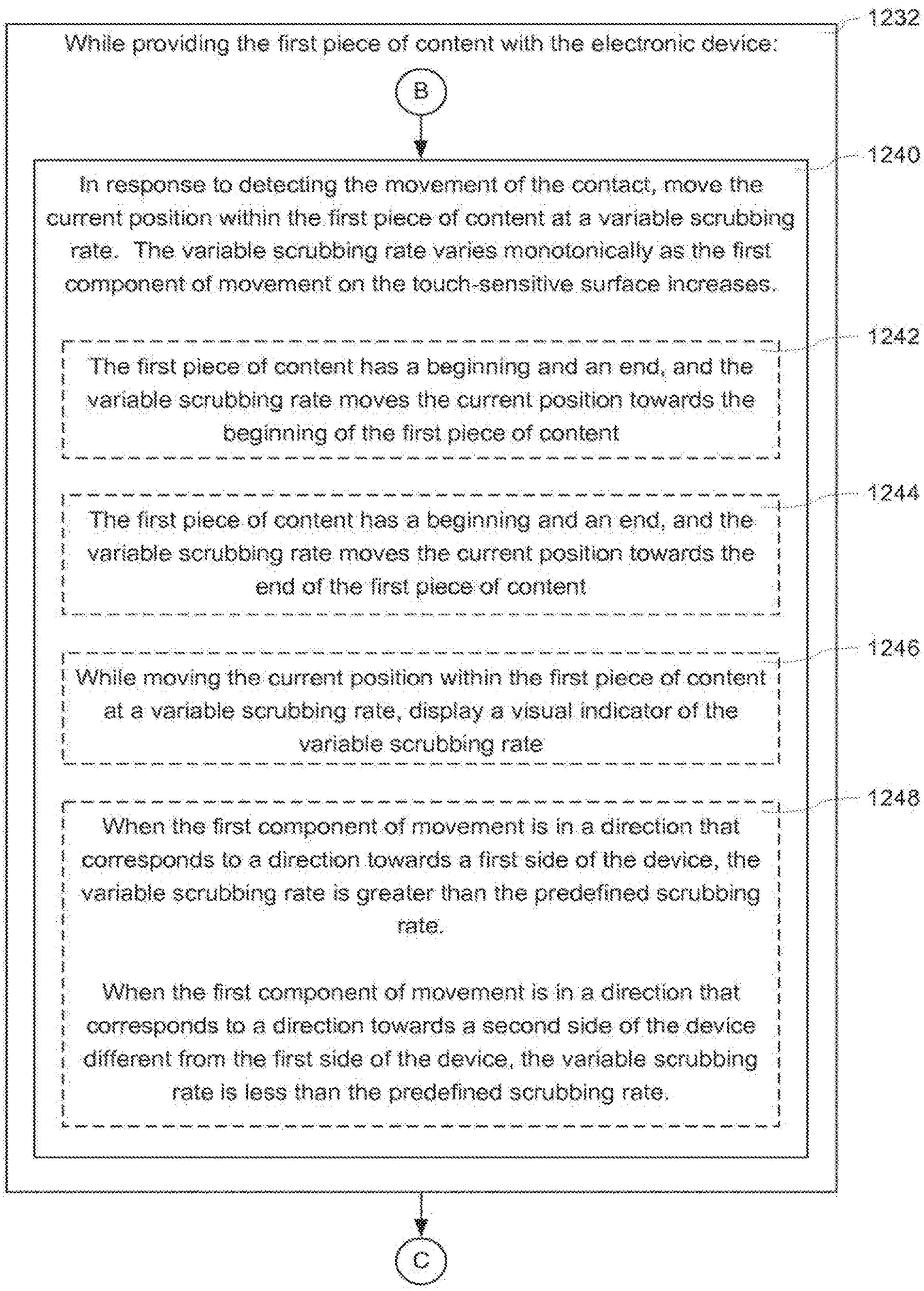
Figure 12D:
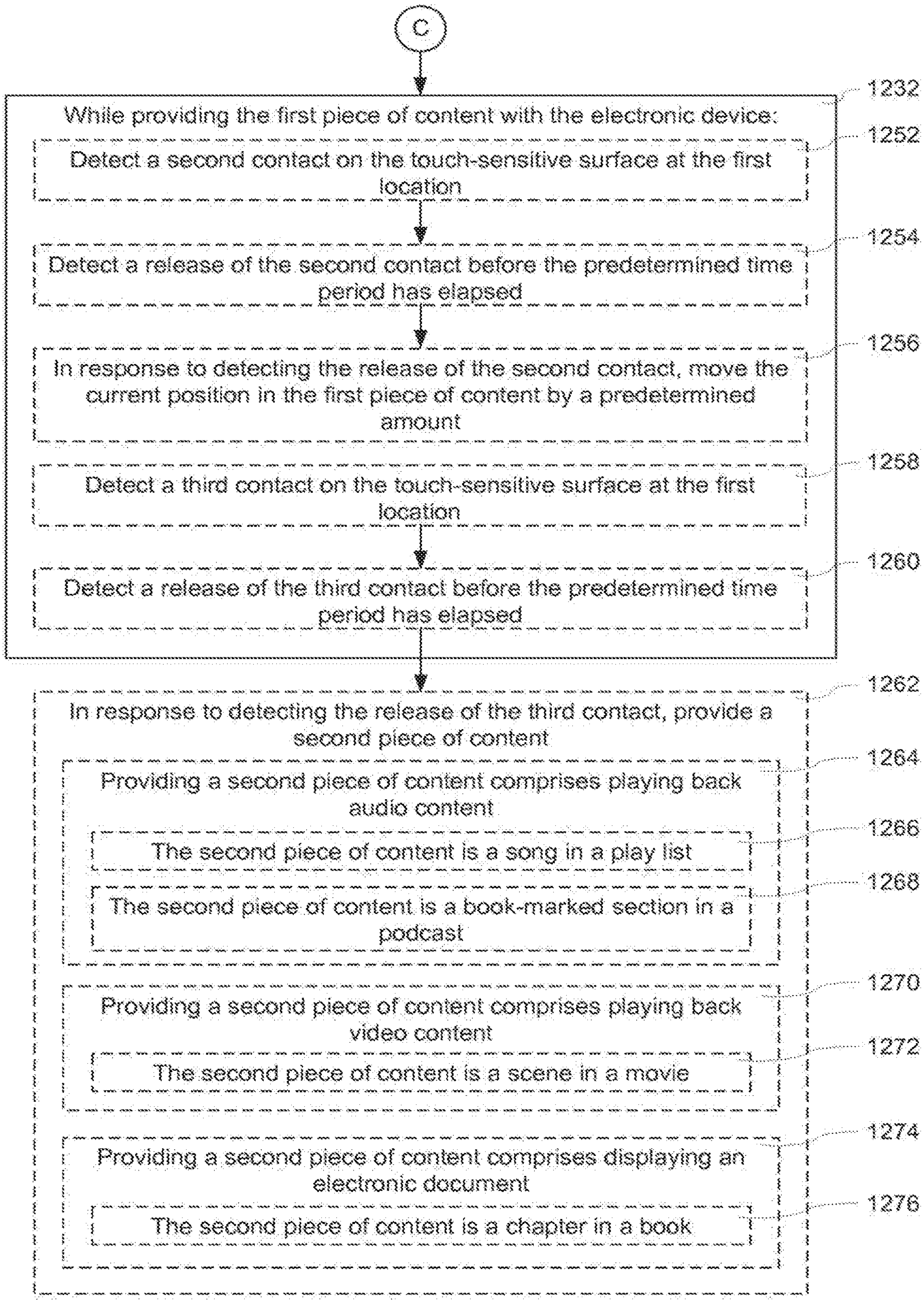

In some embodiments, in response to detecting the current first component of movement of the contact, the device moves (858) the current position within the content at a third scrubbing rate. In some embodiments, the direction of movement of the current position within the content is in accordance (859) with the direction of the current first component of movement of the contact. For example, in FIG. 5Y the direction of the current first component 5096-4 of movement of the contact is to the right 5076, while in FIG. 5Z the direction of the current first component 5096-5 is to the left 5077. In some embodiments, the third scrubbing rate is less (860) than the second scrubbing rate, as discussed above.

In some embodiments, the device detects (861) the contact at a location on the touch-sensitive surface that corresponds to a predetermined region (e.g., 5094-*d* in FIG. 5Z or 5094-*e* in FIG. 5AA) on the display; and, in response to detecting the contact at the location on the touch-sensitive surface that corresponds to the predetermined region on the display, the device moves (862) the current position within the content at a predefined scrubbing rate. For example, continuous scrubbing may occur at the first scrubbing rate (e.g., "half speed scrubbing" 5100-5 in FIG. 5Z) (even if the current first component of movement of the contact stops) if the contact location (e.g., 5092-*c* in FIG. 5*z*) corresponds to an edge of the display (e.g., 5094-*d* in FIG. 5Z) that includes or is adjacent to the second predefined area (e.g., 5094-*a* in FIG. 5Z). Similarly, continuous scrubbing may occur at the second scrubbing rate (e.g., "quarter speed scrubbing" 5100-6 in FIG. 5AA) (even if the current first component of movement of the contact stops) if the contact location (e.g., 5092-*d* in FIG. 5AA) corresponds to an edge of the display (e.g., 5094-*e* in FIG. 5AA) that includes or is adjacent to the third predefined area (e.g., 5094-*b* in FIG. 5AA).

For a touch screen display with a horizontal scroll bar, continuous scrubbing backwards through the content may occur if the contact (e.g., 5092-*c* in FIG. 5Z) is at the left edge of the display and continuous scrubbing forwards through the content may occur if the contact (5092-*d* in FIG. 5AA) is at the right edge of the display. Similarly, for a touch screen display with a vertical scroll bar, as illustrated in FIG. 5BB, continuous scrubbing backwards through the content may occur if the contact (e.g., 5092-*e* in FIG. 5BB) is at the top edge of the display and continuous scrubbing forwards through the content may occur if the contact (e.g., 5092-*f* in FIG. 5BB) is at the bottom edge of the display.

In some embodiments, the device detects (863) a break in the contact. (e.g., detecting lift off of the contact). In some embodiments, in response to detecting the break in the contact, the device stops (864) movement of the current position within the content. For example if a user is scrubbing through a set of images, the scrubbing stops when the user lifts the contact from the touch-sensitive surface. In some embodiments, the device detects (865) a break in the contact (e.g., detecting lift off of the contact). In some embodiments, in response to detecting the break in the contact, the device plays (866) back the content at the playback speed. In some embodiments, playing back the content at the playback speed includes at the adjusted/updated/then current position within the content. For example if the user is scrubbing through a set of images, the scrubbing continues at the current rate when the user lifts the contact (e.g., allowing the user to set a speed for a slideshow). As another example, if a user is scrubbing through an audio file (e.g., song), when the user lifts off the contact, the device beings to play the audio file (e.g., song) at a normal playback speed for the audio content (e.g., the speed at which the song was recorded).

Although the preceding examples have been given with reference to a touch screen display. In some embodiments the display and the touch-sensitive surface are separate, as discussed in greater detail above with reference to FIG. 5P.

FIGS. 9A-9G are flow diagrams illustrating a method 900 of scrolling in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 900 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

The device displays (901) a progress icon (e.g., 5002 in FIG. 5A) in a predefined area (e.g., 5004 in FIG. 5A) on the display (e.g., 112 in FIG. 5A), wherein the progress icon is configured to move in a first predefined direction (e.g., 5006 in FIG. 5A or 5006 in FIG. 5H) on the display. For example, if the first predefined direction is horizontal (e.g., 5006 in FIG. 5A), then the progress icon can only move to the right and to the left. If the first predefined direction is vertical (e.g., 5006 in FIG. 5H), then the progress icon can only move up and down.

In some embodiments, the progress icon is (902) a thumb icon (e.g., 5002 in FIG. 5A) in a scroll bar. In some embodiments, the progress icon is (903) an end of a bar (e.g., 5011 in FIG. 5C). In some embodiments, the end of the bar moves in accordance with the current position in the content.

In some embodiments, the first predefined direction is (904) a horizontal direction on the display (e.g., 5006 in FIG. 5A). In some embodiments, the first predefined direction is a vertical direction (905) on the display (e.g., 5006 in FIG. 5H).

Content is provided (906) with the electronic device. In some embodiments, providing content includes playing back (907) audio content (e.g., a voice mail, music, audio book, podcast, or other audio recording). For example, in FIG. 5A, a podcast is provided with the device. In some embodiments, providing content includes playing back (908) video content (e.g., a movie, television show, web video, slideshow, or animation). For example, in FIG. 5E a movie 5018 is provided with the device. In some embodiments, providing content includes (909) displaying an electronic document (e.g., an electronic book, web page, PDF file, word processing document, presentation, or spreadsheet). For example, in FIG. 5H a play is provided with the device.

The device indicates (910) a current position within the content with the progress icon. In some embodiments, providing content with the electronic device includes playing back (911) content with the electronic device at a playback speed prior to detecting movement of the contact across the touch-sensitive surface, and indicating a current position within the content with the progress icon includes indicating (912) a current playback position within the content with the progress icon.

Operations 914-973, discussed below, are performed while the content is provided (913) with the electronic device.

The device detects (914) a contact with the touch-sensitive surface at a location that corresponds to the progress icon. In some embodiments, detecting contact with a location that corresponds to the predefined area that includes the progress icon is sufficient (e.g., the contact may be anywhere in the predefined region rather than exactly at the location that corresponds to the predefined icon). In some embodiments, the contact is (915) a finger contact (e.g., 202 in FIG. 2). In some embodiments, the contact is (916) a stylus contact (e.g., 203 in FIG. 2).

In some embodiments, in response to detecting (917) the contact at a location on the touch-sensitive surface that corresponds to a location in the predefined area, the device moves (918) the progress icon to a position on the display that corresponds to the location of the contact on the touch-sensitive surface. For example, for a touch screen display, moving the progress icon to a position associated with the contact upon detecting the contact with the predefined area on the touch screen display. For example, in FIG. 5A, a device with a touch screen display detects a contact 5010 with the touch screen display in the predefined area 5004 that contains the progress icon 5002 and then moves the progress icon 5002 to a position in the display that corresponds to the position of the contact 5010, as shown in FIG. 5B.

In some embodiments, the device displays (919) a scroll bar (e.g., 5012 in FIG. 5B) in the predefined area (e.g., 5004 in FIG. 5B) on the display. In some embodiments, after detecting the contact (e.g., 5010 in FIG. 5B) with the touch-sensitive surface at the location that corresponds to the progress icon on the display, the device displays (920) an expanded portion of the scroll bar (e.g., 5014 in FIG. 5C). In some embodiments, detecting contact with the touch sensitive surface at any location that corresponds to a location in the predefined area on the display that includes the progress icon is sufficient. In some embodiments, the display of the expanded portion of the scroll bar replaces (921) the display of the scroll bar In some embodiments, the expanded portion of the scroll bar is displayed in response to detecting the contact with the touch-sensitive surface at the location that corresponds to the progress icon. In some embodiments, the expanded portion of the scroll bar is displayed after contact is detected at the location that corresponds to the progress icon for at least a predetermined time period (e.g., 0.5-1.0 seconds). In some embodiments, the device displays (922) a signal intensity (e.g., 5016 in FIG. 5D) within the expanded portion of the scroll bar (e.g., if the content contains audio, displaying a waveform of the audio intensity that corresponds to the audio content within the expanded portion of the scroll bar).

In some embodiments, the expanded portion of the scroll bar is representative of the full extent of the provided content. In other embodiments, the expanded portion of the scroll bar is representative of only a portion of the provided content. For example, if a user is listening to a ten minute long song on a device with a touch sensitive display, the device initially displays a scroll bar that is representative of the entire ten minute song (e.g., a first end of the bar corresponds to the beginning of the song and a second end of the bar corresponds to the end of the song.) In this example, when the device detects a contact in the predefined area, the device will present the user with an expanded portion of the scroll bar that is representative a two minute segment of the song (e.g., the expanded portion of the scroll bar corresponds to one minute of the content on either side of the current location of the detected contact). In some embodiments the scrolling rate is variable over the length of the scroll bar (e.g., the scrolling rate is slow near the contact and fast near the ends of the scroll bar, which provides the user with fine control over content near the contact while still allowing the user to scrub to an end of the content by moving the contact to the end of the scroll bar). The user may then move the contact along the expanded scroll bar to move the progress icon to a location corresponding to a position in the content, as described in greater detail below.

In some embodiments, the device displays (923) representative images (e.g., 5020-*a*, 5020-*b*, 5020-*c*, 5020-*d*, 5020-*e* in FIG. 5F) from the content within the expanded portion of the scroll bar (e.g., if the content contains video, displaying images that corresponds to the video content within the expanded portion of the scroll bar). For example, a user is watching a movie (e.g., 5018 FIG. 5E), and makes contact 5022-*a* with the progress icon 5002. In this example, in response to the contact, the device displays frames from the video (e.g., 5020-*a*, 5020-*b*, 5020-*c*, 5020-*d*, 5020-*e* in FIG. 5F), and the user slides the contact to 5022-*b*, moving progress icon to a location associated with an image 5020-*d* from the content that is displayed in the expanded portion of the scroll bar. In this example, when the user releases contact, the video content begins playing at the point associated with the progress icon at a normal playback speed.

In some embodiments, the device displays (924) representative text from the content within the expanded portion of the scroll bar. (e.g., displaying chapter or section headings that correspond to the content within the expanded portion of the scroll bar). For example, a user is reading a play (e.g., 5024 FIG. 5H) on a device with a touch sensitive display and makes contact 5026-*a* with a progress icon 5028. In this example, in response to detecting the contact with the progress icon, the device displays text from the content (e.g., "Act I" 5028-*a*, "Act II" 5028-*b*, "Act III" 5028-*c*, "Act IV" 5028-*d* and/or "Act V" 5028-*e* in FIG. 5I) within the expanded portion of the scroll bar. It should be noted in this example, that because the scroll bar is vertical, the first predefined direction 5006 is along the vertical axis of the electronic device (e.g., parallel to the scroll bar). In some embodiments, a user scrubs through the content by moving the contact in a direction along the first predefined direction 5006. For example, to advance to a later act in the play, the user may move the contact 5026-*a* along the touch screen device to a new contact location 5026-*b*.

The device detects (925) movement (e.g., 5106-*b*-1 in FIG. 5CC) of the contact (e.g., 5108-*a*-1 in FIG. 5CC) across the touch-sensitive surface to a first location on the touch-sensitive surface that corresponds to a first location (e.g., contact 5108-*b*-1 in FIG. 5CC) on the display outside the predefined area (e.g., 5004 in FIG. 5CC) that includes the progress icon (e.g., 5110-1 in FIG. 5CC). Movement of the contact includes (926) a first component of movement (e.g., 5112-1 in FIG. 5Q) of the contact on the touch-sensitive surface in a direction corresponding to movement on the display parallel to the first predefined direction (e.g., 5006 in FIG. 5CC) and a second component of movement (e.g., 5114-1 in FIG. 5CC) of the contact on the touch-sensitive surface in a direction corresponding to movement on the display perpendicular to the first predefined direction. In some embodiments, the first component of movement and the second component of movement are perpendicular to each other (927).

Operations 929-933, discussed below, are performed while the contact is located (928) at the first location on the touch-sensitive surface:

The device determines (928) a first current offset distance in accordance with a detected amount of the second component of movement of the contact. It should be understood that there are many different options for determining the offset distance. For example, as illustrated in FIG. 5CC, for a touch screen display, the current offset distance may correspond to the distance perpendicular to the first predefined direction between: (1) the progress icon and the current location of the contact (e.g., 5118 in FIG. 5CC); (2) the top of the predefined area that includes the progress icon and the current location of the contact (e.g., 5120-1 in FIG. 5CC); (3) the bottom of the predefined area that includes the progress icon and the current location of the contact (e.g., 5122 in FIG. 5CC); or (4) some other predetermined point or line on the touch screen display and the current location of the contact.

The device moves (930) the current position within the content at a first scrubbing rate. In some embodiments, the scrubbing rate decreases (931) to a predetermined minimum rate as the second component of movement on the touch-sensitive surface increases. For example, on a touch screen display with a horizontal scroll bar, the farthest vertical distance on screen has a predefined minimum scrubbing rate. In some embodiments, while the contact is located at the first location on the touch-sensitive surface, the device plays back (932) the content at the first scrubbing rate. In some embodiments, while the contact is located at the first location on the touch-sensitive surface, the device displays (933) an indicator of the first scrubbing rate. (e.g., "fine scrubbing" 5116-1 in FIG. 5CC)

In some embodiments, the device moves (934) the current position forward within the content at the first scrubbing rate when the first location of the contact on the touch-sensitive surface corresponds to a location on the display that is on a first side (e.g., 5126-1 in FIG. 5CC) of a boundary (e.g., 5124-1 in FIG. 5CC). In some embodiments, the device moves (935) the current position backward within the content at the first scrubbing rate when the first location of the contact on the touch-sensitive surface corresponds to a location on the display that is on a second side (e.g., 5128-1 in FIG. 5CC) of the boundary (e.g., 5124-1 in FIG. 5CC) opposite the first side. The boundary is typically not displayed on the touch screen display, the dotted line 5124-1 in FIG. 5CC is shown for the purpose of illustration.

In some embodiments, the boundary is a dynamic vertical boundary (e.g., 5124-2 in FIG. 5DD) running through the progress icon (936), and the first predefined direction is a horizontal direction on the display (937); the first side is to the right (e.g., 5126 in FIG. 5DD) of the boundary (938); and the second side is to the left (e.g., 5128 in FIG. 5DD) of the boundary (939). In other words, the boundary moves horizontally as the progress icon moves on the touch screen display.

For example, in FIG. 5DD the device detects a contact 5108-*a*-2 in a first predefined region 5004. The contact moves (e.g., 5106-*b*-2 or 5106-*c*-2) to a new contact location (e.g., 5108-*b*-2 or 5108-*c*-2) that is outside of the predefined region. In response to continuing to detect the contact, the device determines a current offset distance 5120-2 and moves the current position within the content indicated by the progress icon 5110-2 to a new location at a scrubbing rate that is based at least in part on the current offset distance (e.g., a "quarter speed scrubbing" rate 5116-2). The direction of the movement is determined by the location of the contact with respect to the boundary 5124-2 on the touch sensitive surface. For example, if the contact (e.g., 5108-*b*-2) is positioned on the right side 5126-2 of the boundary 5124-2 then the current position within the content moves forward, as indicated by the progress icon moving to the right. Alternatively, if the contact (e.g., 5108-*c*-2) is positioned on the left side 5128-2 of the boundary 5124-2, then the current position within the content moves backward, as indicated by the progress icon moving to the left. It should be understood that, in this example, as the progress icon 5110-2 moves, the vertical boundary 5124-2 moves.

In some embodiments, the boundary is a vertical boundary (e.g., 5124-3 in FIG. 5EE) running through the middle of the display (940) (or other fixed position on the display), the first predefined direction is a horizontal direction (e.g., 5006 in FIG. 5EE) on the display (941), the first side is to the right (e.g., 5126-3 in FIG. 5EE) of the boundary (942); and the second side is to the left (e.g., 5128-3 in FIG. 5EE) of the boundary (943).

For example, in FIG. 5EE the device detects a contact 5108-*a*-3 in a first predefined region 5004. The contact moves (e.g., 5106-*b*-3 or 5106-*c*-3) to a new contact location (e.g., 5108-*b*-3 or 5108-*c*-3) that is outside of the predefined region. In response to continuing to detect the contact, the device determines a current offset distance 5120-3 and moves the current position within the content indicated by the progress icon 5110-3 to a new location at a scrubbing rate that is based at least in part on the current offset distance (e.g., a "quarter speed scrubbing" rate 5116-3). The direction of the movement is determined by the location of the contact with respect to the boundary 5124-3 on the touch sensitive surface. For example, if the contact (e.g., 5108-*b*-3) is positioned on the right side 5126-3 of the boundary 5124-3 then the current position within the content moves forward, as indicated by the progress icon moving to the right. Alternatively, if the contact (e.g., 5108-*c*-3) is positioned on the left side 5128-3 of the boundary 5124-3, then the current position within the content moves backward, as indicated by the progress icon moving to the left. It should be understood that in this example, the boundary 5124-3 is in a fixed location on the display (e.g., the vertical centerline of the display), and does not move as the progress icon moves.

In some embodiments, the boundary is a dynamic horizontal boundary (e.g., 5124-4 in FIG. 5FF) running through the progress icon (944), the first predefined direction is a vertical direction (e.g., 5006 in FIG. 5FF) on the display (945) the first side is below (e.g., 5126-4 in FIG. 5FF) the boundary (946), and the second side is above (e.g., 5128-4 in FIG. 5FF) the boundary (947). In other words, the boundary moves vertically as the progress icon moves on the touch screen display.

For example, in FIG. 5FF the device detects a contact 5108-*a*-4 in a first predefined region 5004. The contact moves (e.g., 5106-*b*-4 or 5106-*c*-4) to a new contact location (e.g., 5108-*b*-4 or 5108-*c*-4) that is outside of the predefined region. In response to continuing to detect the contact, the device determines a current offset distance 5120-4 and moves the current position within the content indicated by the progress icon 5110-4 to a new location at a scrubbing rate that is based at least in part on the current offset distance (e.g., a "quarter speed scrubbing" rate 5116-4). The direction of the movement is determined by the location of the contact with respect to the boundary 5124-4 on the touch sensitive surface. For example, if the contact (e.g., 5108-*b*-4) is positioned below 5126-4 the boundary 5124-4 then the current position within the content moves forward, as indicated by the progress icon moving down. Alternatively, if the contact (e.g., 5108-*c*-4) is positioned above 5128-4 the boundary 5124-4, then the current position within the content moves backward, as indicated by the progress icon moving up. It should be understood that, in this example, as the progress icon 5110-4 moves, the horizontal boundary 5124-4 moves.

In some embodiments, the boundary is a horizontal boundary (e.g., 5124-5 in FIG. 5GG) running through the middle of the display (948) or other fixed position on the display, the first predefined direction (e.g., 5006 in FIG. 5GG) is a vertical direction on the display (949), the first side is below (e.g., 5126-5 in FIG. 5GG) the boundary (950), and the second side is above (e.g., 5128-5 in FIG. 5GG) the boundary (951).

For example, in FIG. 5GG the device detects a contact 5108-*a*-5 in a first predefined region 5004. The contact moves (e.g., 5106-*b*-5 or 5106-*c*-5) to a new contact location (e.g., 5108-*b*-5 or 5108-*c*-5) that is outside of the predefined region. In response to continuing to detect the contact, the device determines a current offset distance 5120-5 and moves the current position within the content indicated by the progress icon 5110-5 to a new location at a scrubbing rate that is based at least in part on the current offset distance (e.g., a "quarter speed scrubbing" rate 5116-5). The direction of the movement is determined by the location of the contact with respect to the boundary 5124-5 on the touch sensitive surface. For example, if the contact (e.g., 5108-*b*-5) is positioned below 5126-5 the boundary 5124-5 then the current position within the content moves forward, as indicated by the progress icon moving down. Alternatively, if the contact (e.g., 5108-*c*-5) is positioned above 5128-5 the boundary 5124-5, then the current position within the content moves backward, as indicated by the progress icon moving up. It should be understood that in this example, the boundary 5124-5 is in a fixed location on the display (e.g., the center of the display), and does not move as the progress icon moves.

As an example of moving the content while detecting contact, in FIG. 5HH the device detects a contact 5108-*a*-6 in a first predefined region 5004. The contact moves 5106-*b*-6 to a new contact location 5108-*b*-6 that is outside of the predefined region. In response to continuing to detect the contact, the device determines a current offset distance 5120-6 and moves the current position within the content indicated by the progress icon 5110-6 to a new location at first scrubbing rate that is based at least in part on the first current offset distance (e.g., a "half speed scrubbing" rate 5116-6). The direction of the movement is determined by the location of the contact with respect to the boundary 5124-6 on the touch sensitive surface. In this example, the boundary is a dynamic vertical boundary and the contact 5108-*b*-6 is positioned on the right side 5126-6 of the boundary. However, it should be understood that this is merely exemplary, and the boundary could be fixed or dynamic; the boundary could also be horizontal or vertical; and the contact could be on the right or the left (for a vertical boundary) or above or below (for a horizontal boundary), as variously described in FIGS. 5DD-5GG.

The device detects (952) movement of the contact across the touch-sensitive surface to a second location on the touch-sensitive surface that corresponds to a second location on the display (e.g., 5018-*b*-7 in FIG. 5II) outside the predefined area that includes the progress icon (e.g., 5116-7 in FIG. 5II).

Operations 954-959, discussed below, are performed while the contact is located (953) at the second location on the touch-sensitive surface.

The device determines (954) a second current offset distance (e.g., 5120-7 in FIG. 5II) in accordance with a detected amount of the second component of movement of the contact. The device moves (955) the current position within the content at a second scrubbing rate.

For example, in FIG. 5II the device detects a contact 5108-*a*-7 in a first predefined region 5004. The contact moves 5106-*b*-7 to a new contact location 5108-*b*-7 that is outside of the predefined region. In response to continuing to detect the contact, the device determines a current offset distance 5120-7 and moves the current position within the content indicated by the progress icon 5110-7 to a new location at second scrubbing rate that is based at least in part on the second current offset distance (e.g., a "fine scrubbing" rate 5116-7). The direction of the movement is determined by the location of the contact with respect to the boundary 5124-7 on the touch sensitive surface. In this example, the boundary is a dynamic vertical boundary and the contact 5108-*b*-7 is positioned on the right side 5126-7 of the boundary. However, it should be understood that this is merely exemplary, and the boundary could be fixed or dynamic; the boundary could also be horizontal or vertical; and the contact could be on the right or the left (for a vertical boundary) or above or below (for a horizontal boundary), as variously described in FIGS. 5DD-5GG.

The second scrubbing rate is less than the first scrubbing rate when the second current offset distance is greater than the first current offset distance (956), as shown in FIGS. 5HH and 5II. For example, if the contact 5108-*b*-6 in FIG.

5HH and the contact 5108-*b*-7 in FIG. 5II are each maintained on the touch screen display for the same amount of time (e.g., thirty seconds), the current position in the content will move further along in the content when the offset distance is the first current offset distance (e.g., 5120-6 in FIG. 5HH) than when the offset distance is the second current offset distance (e.g., 5120-7 in FIG. 5II). The second scrubbing rate is greater than the first scrubbing rate when the second current offset distance is less than the first current offset distance (957). In other words, the scrubbing rate decreases as the current offset distance increases. At any instant in time, a current location of the contact on the touch-sensitive surface corresponds to a current location on the display. The current location on the display will have a corresponding current total distance to the progress icon on the display. In some embodiments, the scrubbing rate decreases as the current total distance to the progress icon increases, rather than having the scrubbing rate decrease as the current offset distance increases.

In some embodiments, while the contact is located at the second location on the touch-sensitive surface, the device plays back (958) the content at the second scrubbing rate. In some embodiments, while the contact is located at the second location on the touch-sensitive surface, the device displays (959) an indicator of the second scrubbing rate. (e.g., "quarter speed scrubbing" 5116-7 in FIG. 5II)

In some embodiments, the device detects (960) movement of the contact across the touch-sensitive surface to a third location on the touch-sensitive surface that corresponds to a third location on the display outside the predefined area that includes the progress icon.

In some embodiments, operations 961-965, discussed below, are performed while the contact is located (961) at the third location on the touch-sensitive surface. In some embodiments, the device determines (962) a third current offset distance in accordance with a detected amount of the second component of movement of the contact. In some embodiments, the device moves (963) the current position within the content at a third scrubbing rate.

For example, in FIG. 5JJ the device detects a contact 5108-*a*-8 in a first predefined region 5004. The contact moves 5106-*b*-8 to a new contact location 5108-*b*-8 that is outside of the predefined region. In response to continuing to detect the contact, the device determines a current offset distance 5120-8 and moves the current position within the content indicated by the progress icon 5110-8 to a new location at a third scrubbing rate that is based at least in part on the third current offset distance (e.g., a "quarter speed scrubbing" rate 5116-8). The direction of the movement is determined by the location of the contact with respect to the boundary 5124-8 on the touch sensitive surface. In this example, the boundary is a dynamic vertical boundary and the contact 5108-*b*-8 is positioned on the right side 5126-8 of the boundary. However, it should be understood that this is merely exemplary, and the boundary could be fixed or dynamic; the boundary could also be horizontal or vertical; and the contact could be on the right or the left (for a vertical boundary) or above or below (for a horizontal boundary), as variously described in FIGS. 5DD-5GG.

In some embodiments, the third scrubbing rate is less than the second scrubbing rate when the third current offset distance is greater than the second current offset distance (964). In some embodiments, the third scrubbing rate is greater than the second scrubbing rate when the third current offset distance is less than the second current offset distance (965), as shown in FIGS. 5II and 5JJ. For example, if the contact 5108-*b*-7 in FIG. 5II and the contact 5108-*b*-8 in FIG. 5JJ are each maintained on the touch screen display for the same amount of time (e.g., thirty seconds), the current position in the content will move further along in the content when the offset distance is the third current offset distance (e.g., 5120-8 in FIG. 5HH) than when the offset distance is the second current offset distance (e.g., 5120-7 in FIG. 5II), because the second current offset distance (e.g., 5120-7 in FIG. 5II) is greater than the third current offset distance (e.g., 5120-8 in FIG. 5HH).

In some embodiments, while the contact is located at the first location on the touch-sensitive surface (966), the device stops (967) movement of the current position within the content when the progress icon moves along the first predefined direction by an amount equal to the first component of movement of the contact on the touch-sensitive surface multiplied by a first proportionality factor. For a touch screen display, the proportionality factor will typically be greater than 0 and less than 1. In some embodiments, while the contact is located at the second location on the touch-sensitive surface (968), the device stops (969) movement of the current position within the content when the progress icon moves along the first predefined direction by an amount equal to the first component of movement of the contact on the touch-sensitive surface multiplied by a second proportionality factor that is greater than 0 and less than the first proportionality factor.

In some embodiments, the device detects (970) a break in the contact (e.g., detecting lift off of the contact), and in response to detecting the break in the contact, the device stops (971) movement of the current position within the content. For example if a user is scrubbing through a set of images, the scrubbing would stop when the user lifted the contact from the touch-sensitive surface. In some embodiments, the device detects a break in the contact (972) (e.g., detecting lift off of the contact), and in response to detecting the break in the contact, the device plays back (973) the content at the playback speed (at the adjusted/updated/then current position within the content). For example if the user is scrubbing through a set of images, the scrubbing continues at the current rate when the user lifts the contact (e.g., allowing the user to set a speed for a slideshow). As another example, if a user is scrubbing through an audio file (e.g., song), when the user lifts off the contact, the device beings to play the audio file (e.g., song) at a normal playback speed for the audio content (e.g., the speed at which the song was recorded).

Although the preceding examples have been given with reference to a touch screen display. In some embodiments the display and the touch-sensitive surface are separate, as discussed in greater detail above with reference to FIG. 5P.

FIGS. 10A-10G are flow diagrams illustrating a method 1000 of scrolling in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 1000 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

The device displays (1001) a progress icon (e.g., 5002 in FIG. 5A) in a first predefined area (e.g., 5004 in FIG. 5A) on the display (e.g., 112 in FIG. 5A), wherein the progress icon is configured to move in a first predefined direction (e.g., 5006 in FIG. 5A or 5006 in FIG. 5H) on the display. For example, if the first predefined direction is horizontal (e.g., 5006 in FIG. 5A), then the progress icon can only move to the right and to the left. If the first predefined direction is vertical (e.g., 5006 in FIG. 5H), then the progress icon can only move up and down.

In some embodiments, the progress icon is (1002) a thumb icon (e.g., 5002 in FIG. 5A) in a scroll bar. In some embodiments, the progress icon is (1003) an end of a bar (e.g., 5011 in FIG. 5C). In some embodiments, the end of the bar moves in accordance with the current position in the content.

In some embodiments, the first predefined direction is (1004) a horizontal direction (e.g., 5006 in FIG. 5A) on the display. In some embodiments, the first predefined direction is (1005) a vertical direction (e.g., 5006 in FIG. 5H) on the display.

Content is provided (1006) with the electronic device.

In some embodiments, providing content includes playing back (1007) audio content (e.g., a voice mail, music, audio book, podcast, or other audio recording). For example, in FIG. 5A, a podcast is provided with the device. In some embodiments, providing content includes playing back (1008) video content (e.g., a movie, television show, web video, slideshow, or animation). For example, in FIG. 5E a movie 5018 is provided with the device. In some embodiments, providing content includes displaying (1009) an electronic document (e.g., an electronic book, web page, PDF file, word processing document, presentation, or spreadsheet). For example, in FIG. 5H a play is provided with the device.

The device indicates (1010) a current position within the content with the progress icon. In some embodiments, providing content with the electronic device includes (1011) playing back content with the electronic device at a playback speed prior to detecting movement of the contact across the touch-sensitive surface. In some embodiments, indicating a current position within the content with the progress icon includes (1012) indicating a current playback position within the content with the progress icon.

Operations 1014-1069, discussed below, are performed while providing (1013) the content with the electronic device:

The device detects (1014) a contact with the touch-sensitive surface at a location that corresponds to the progress icon. In some embodiments, detecting contact with a location that corresponds to the first predefined area that includes the progress icon is sufficient. (e.g., the contact may be anywhere in the predefined region rather than exactly at the location that corresponds to the predefined icon). In some embodiments, the contact is (1015) a finger contact (e.g., 202 in FIG. 2). In some embodiments, the contact is (1016) a stylus contact (e.g., 203 in FIG. 2).

In some embodiments, in response to detecting (1017) the contact at a location on the touch-sensitive surface that corresponds to a location in the first predefined area, the device moves (1018) the progress icon to a position on the display that corresponds to the location of the contact on the touch-sensitive surface. For example, for a touch screen display, moving the progress icon to a position associated with the contact upon detecting the contact with the predefined area. For example, in FIG. 5A, a device with a touch screen display detects a contact 5010 with the touch screen display in the predefined area 5004 that contains the progress icon 5002 and then moves the progress icon 5002 to a position in the display that corresponds to the position of the contact 5010, as shown in FIG. 5B.

In some embodiments, the device displays (1019) a scroll bar (e.g., 5012 in FIG. 5B) in the first predefined area (e.g., 5004 in FIG. 5B) on the display. In some embodiments, after detecting the contact (e.g., 5010 in FIG. 5B) with the touch-sensitive surface at the location that corresponds to the progress icon on the display, the device displays (1020) an expanded portion of the scroll bar (e.g., 5014 in FIG. 5C). In some embodiments, detecting contact with the touch sensitive surface at any location that corresponds to a location in the first predefined area on the display that includes the progress icon is sufficient. In some embodiments, the display of the expanded portion of the scroll bar replaces (1021) the display of the scroll bar (e.g., the expanded portion of the scroll 5014 bar shown in FIG. 5C replaces the scroll bar 5012 shown in FIG. 5B).

In some embodiments, the expanded portion of the scroll bar is displayed in response to detecting the contact with the touch-sensitive surface at the location that corresponds to the progress icon. In some embodiments, the expanded portion of the scroll bar is displayed after contact is detected at the location that corresponds to the progress icon for at least a predetermined time period (e.g., 0.5-1.0 seconds.) In some embodiments, the device displays (1022) a signal intensity (e.g., 5016 in FIG. 5D) within the expanded portion of the scroll bar (e.g., if the content contains audio, displaying a waveform of the audio intensity that corresponds to the audio content within the expanded portion of the scroll bar).

In some embodiments, the expanded portion of the scroll bar is representative of the full extent of the provided content. In other embodiments, the expanded portion of the scroll bar is representative of only a portion of the provided content. For example, if a user is listening to a 10 minute long song on a device with a touch sensitive display, the device initially displays a scroll bar that is representative of the entire ten minute song (e.g., a first end of the bar corresponds to the beginning of the song and a second end of the bar corresponds to the end of the song.) In this example, when the device detects a contact in the predefined area, the device will present the user with an expanded portion of the scroll bar that is representative a two minute segment of the song (e.g., the expanded portion of the scroll bar corresponds to one minute of the content on either side of the current location of the detected contact). In some embodiments the scrolling rate is variable over the length of the scroll bar (e.g., the scrolling rate is slow near the contact and fast near the ends of the scroll bar, which provides the user with fine control over content near the contact while still allowing the user to scrub to an end of the content by moving the contact to the end of the scroll bar). The user may then move the contact along the expanded scroll bar to move the progress icon to a location corresponding to a position in the content, as described in greater detail below.

In some embodiments, the device displays (1023) representative images (e.g., 5020-*a*, 5020-*b*, 5020-*c*, 5020-*d*, 5020-*e* in FIG. 5F) from the content within the expanded portion of the scroll bar (e.g., if the content contains video, displaying images that corresponds to the video content within the expanded portion of the scroll bar). For example, a user is watching a movie (e.g., 5018 FIG. 5E), and makes contact 5022-*a* with the progress icon 5002. In this example, in response to the contact, the device displays frames from the video (e.g., 5020-*a*, 5020-*b*, 5020-*c*, 5020-*d*, 5020-*e* in FIG. 5F), and the user slides the contact to 5022-*b*, moving progress icon to a location associated with an image 5020-*d* from the content that is displayed in the expanded portion of the scroll bar. In this example, when the user releases contact, the video content begins playing at the point associated with the progress icon at a normal playback speed.

In some embodiments, the device displays (1024) representative text from the content within the expanded portion of the scroll bar. (e.g., displaying chapter or section headings that corresponds to the content within the expanded portion of the scroll bar). For example, a user is reading a play (e.g., 5024 FIG. 5H) on a device with a touch sensitive display and makes contact 5026-*a* with a progress icon 5028. In this example, in response to detecting the contact with the progress icon, the device displays text from the content (e.g., "Act I" 5028-*a*, "Act II" 5028-*b*, "Act III" 5028-*c*, "Act IV" 5028-*d* and/or "Act V" 5028-*e* in FIG. 5I) within the expanded portion of the scroll bar. It should be noted in this example, that because the scroll bar is vertical, the first predefined direction 5006 is along the vertical axis of the electronic device (e.g., parallel to the scroll bar). In some embodiments, a user scrubs through the content by moving the contact in a direction along the first predefined direction 5006. For example, to advance to a later act in the play, the user may move the contact 5026-*a* along the touch screen device to a new contact location 5026-*b*.

The device detects (1025) movement (e.g., 5130-*b*-1 in FIG. 5KK) of the contact (e.g., 5132-*b*-1 in FIG. 5KK) across the touch-sensitive surface to a location on the touch-sensitive surface that corresponds to a second predefined area (e.g., 5134-*a* in FIG. 5KK) on the display outside the first predefined area (e.g., 5004 in FIG. 5KK). In some embodiments, movement of the contact includes (1026) a first component (e.g., 5136-1 in FIG. 5KK) of movement of the contact on the touch-sensitive surface in a direction corresponding to movement on the display parallel to the first predefined direction (e.g., 5006 in FIG. 5KK). In some embodiments, the first predefined area contains a progress icon (e.g., 5140-1 in FIG. 5KK).

Operations 1028-1031, discussed below, are performed while the contact is located (1027) in an area on the touch-sensitive surface that corresponds to the second predefined area (e.g., 5134-*a* in FIG. 5KK) on the display. The device moves (1028) the current position within the content at a first scrubbing rate. In some embodiments, the first scrubbing rate is a predetermined rate (1029).

In some embodiments, while the contact is located in the area on the touch-sensitive surface that corresponds to the second predefined area on the display, the device plays back (1030) the content at the first scrubbing rate. In some embodiments, while the contact is located in the area on the touch-sensitive surface that corresponds to the second predefined area on the display, the device displays (1031) an indicator of the first scrubbing rate. (e.g., "half speed scrubbing" 5148-1 in FIG. 5KK).

In some embodiments, the device moves (1032) the current position forward within the content when the location of the contact on the touch-sensitive surface corresponds to a location on the display that is on a first side (e.g., 5144-1 in FIG. 5KK) of a boundary (e.g., 5142-1 in FIG. 5KK). In some embodiments, the device moves (1033) the current position backward within the content when the location of the contact on the touch-sensitive surface corresponds to a location on the display that is on a second side (e.g., 5146-1 in FIG. 5KK) of the boundary opposite the first side. The boundary is typically not displayed on the display (e.g., a touch screen display).

In some embodiments, the boundary is a dynamic vertical boundary (e.g., 5142-2 in FIG. 5LL) running through the progress icon (1034), the first predefined direction is a horizontal direction (e.g., 5006 in FIG. 5LL) on the display (1035), the first side is to the right (e.g., 5144-2 in FIG. 5LL) of the boundary (1036), and the second side is to the left (e.g., 5146-2 in FIG. 5LL) of the boundary (1037). In other words, the boundary moves horizontally as the progress icon moves on the touch screen display.

For example, in FIG. 5LL, the device detects a contact 5132-*a*-2 in a first predefined region 5004. The contact moves (e.g., 5130-*b*-2 or 5130-*c*-2) to a new contact location (e.g., 5132-*b*-2 or 5132-*c*-2) in a second predefined region (e.g., 5134-*a* in FIG. 5LL). In response to continuing to detect the contact, the device moves the current position within the content indicated by the progress icon 5140-2 to a new location at a scrubbing rate associated with the second predefined region (e.g., a "half speed scrubbing" rate 5148-2). The direction of the movement is determined by the location of the contact with respect to the boundary 5142-2 on the touch sensitive surface. For example, if the contact (e.g., 5132-*b*-2) is positioned on the right side 5144-2 of the boundary 5142-2 then the current position within the content moves forward, as indicated by the progress icon moving to the right. Alternatively, if the contact (e.g., 5132-*c*-2) is positioned on the left side 5146-2 of the boundary 5142-2, then the current position within the content moves backward, as indicated by the progress icon moving to the left. It should be understood that, in this example, as the progress icon 5140-2 moves, the vertical boundary 5142-2 moves.

In some embodiments, the boundary is a vertical boundary (e.g., 5142-3 in FIG. 5MM) running through the middle of the display (1038) (or other fixed position on the display), the first predefined direction is a horizontal direction (e.g., 5006 in FIG. 5MM) on the display (1039), the first side is to the right (e.g., 5144-3 in FIG. 5MM) of the boundary (1040), and the second side is to the left (e.g., 5146-3 in FIG. 5MM) of the boundary (1041).

For example, in FIG. 5MM the device detects a contact 5132-*a*-3 in a first predefined region 5004. The contact moves (e.g., 5130-*b*-3 or 5130-*c*-3) to a new contact location (e.g., 5132-*b*-3 or 5132-*c*-3) in a second predefined region (e.g., 5134-*a* in FIG. 5KK). In response to continuing to detect the contact, the device moves the current position within the content indicated by the progress icon 5140-3 to a new location at a scrubbing rate associated with the second predefined region (e.g., a "half speed scrubbing" rate 5148-3). The direction of the movement is determined by the location of the contact with respect to the boundary 5142-3 on the touch sensitive surface. For example, if the contact (e.g., 5132-*b*-3) is positioned on the right side 5144-3 of the boundary 5142-3 then the current position within the content moves forward, as indicated by the progress icon moving to the right. Alternatively, if the contact (e.g., 5132-*c*-3) is positioned on the left side 5146-3 of the boundary 5142-3, then the current position within the content moves backward, as indicated by the progress icon moving to the left. It should be understood that, in this example, the vertical boundary 5142-3 remains in a fixed location (e.g., the center of the display).

In some embodiments, the boundary is a dynamic horizontal boundary (e.g., 5142-4 in FIG. 5NN) running through the progress icon (1042), the first predefined direction is a vertical direction (e.g., 5006 in FIG. 5NN) on the display (1043), the first side is below (e.g., 5144-4 in FIG. 5NN) the boundary (1044), and the second side is above (e.g., 5146-4 in FIG. 5NN) the boundary (1045). In other words, the boundary moves vertically as the progress icon moves on the touch screen display.

For example, in FIG. 5NN, the device detects a contact 5132-*a*-4 in a first predefined region 5004. The contact moves (e.g., 5130-*b*-4 or 5130-*c*-4) to a new contact location (e.g., 5132-*b*-4 or 5132-*c*-4) in a second predefined region (e.g., 5134-*a* in FIG. 5KK). In response to continuing to detect the contact, the device moves the current position within the content indicated by the progress icon 5140-4 to a new location at a scrubbing rate associated with the second predefined region (e.g., a "half speed scrubbing" rate 5148-4). The direction of the movement is determined by the location of the contact with respect to the boundary 5142-4 on the touch sensitive surface. For example, if the contact (e.g., 5132-*b*-4) is positioned below 5144-4 the boundary 5142-4 then the current position within the content moves forward, as indicated by the progress icon moving down. Alternatively, if the contact (e.g., 5132-*c*-4) is positioned above 5146-4 of the boundary 5142-4, then the current position within the content moves backward, as indicated by the progress icon moving up. It should be understood that, in this example, as the progress icon 5140-4 moves, the horizontal boundary 5142-4 moves.

In some embodiments, the boundary is a horizontal boundary (e.g., 5142-5 in FIG. 5OO) running through the middle of the display (1046) (or other fixed position on the display), the first predefined direction is a vertical direction (e.g., 5006 in FIG. 5OO) on the display (1047) the first side is below (e.g., 5144-5 in FIG. 5OO) the boundary (1048), and the second side is above (e.g., 5146-5 in FIG. 5OO) the boundary (1049).

For example, in FIG. 5OO, the device detects a contact 5132-*a*-5 in a first predefined region 5004. The contact moves (e.g., 5130-*b*-5 or 5130-*c*-5) to a new contact location (e.g., 5132-*b*-5 or 5132-*c*-5) in a second predefined region (e.g., 5134-*a* in FIG. 5KK). In response to continuing to detect the contact, the device moves the current position within the content indicated by the progress icon 5140-5 to a new location at a scrubbing rate associated with the second predefined region (e.g., a "half speed scrubbing" rate 5148-5). The direction of the movement is determined by the location of the contact with respect to the boundary 5142-5 on the touch sensitive surface. For example, if the contact (e.g., 5132-*b*-5) is positioned below 5144-5 the boundary 5142-5, then the current position within the content moves forward, as indicated by the progress icon moving down. Alternatively, if the contact (e.g., 5132-*c*-5) is positioned above 5146-5 of the boundary 5142-5, then the current position within the content moves backward, as indicated by the progress icon moving up. It should be understood that, in this example, the horizontal boundary 5142-5 remains in a fixed location (e.g., at the center of the display).

As an example of moving the content while detecting contact, in FIG. 5PP the device detects a contact 5132-*a*-6 in the first predefined region 5004. The contact moves 5130-*b*-6 to a second predefined region 5134-*a*. In response to continuing to detect the contact in the second predefined region 5134-*a*, the device moves the current position within the content (indicated by progress icon 5140-6) to a new position within the content at a first scrubbing rate (e.g., a scrubbing rate associated with the second predefined area such as "half speed scrubbing rate" 5148-2). The direction of the movement is determined by the location of the contact with respect to the boundary 5142-6 on the touch sensitive surface. In this example, the boundary is a dynamic vertical boundary and the contact 5132-*b*-6 is positioned on the right side 5144-6 of the boundary, and thus the current position in the content moves forwards. However, it should be understood that this is merely exemplary, and the boundary could be fixed or dynamic; the boundary could also be horizontal or vertical; and the contact could be on the right or the left (for a vertical boundary) or above or below (for a horizontal boundary), as variously described in FIGS. 5LL-5OO.

The device detects (1050) movement of the contact across the touch-sensitive surface to a location on the touch-sensitive surface that corresponds to a third predefined area (e.g., 5134-*b* in FIG. 5QQ) on the display outside the first predefined (e.g., 5004 in FIG. 5QQ) area and the second predefined area (e.g., 5134-*c* in FIG. 5QQ). In some embodiments, the progress icon is farther from the third predefined area than from the second predefined area (1051).

Operations 1053-1057, discussed below, are performed while the contact is located (1052) in an area on the touch-sensitive surface that corresponds to the third predefined area on the display. The device moves (1053) the current position within the content at a second scrubbing rate.

For example, in FIG. 5QQ, the device detects a contact 5132-*a*-7 in the first predefined region 5004. The contact moves 5130-*b*-7 to a third predefined region 5134-*b*. In response to continuing to detect the contact in the third predefined region 5134-*b*, the device moves the current position within the content (indicated by progress icon 5140-7) to a new position within the content at a second scrubbing rate (e.g., a scrubbing rate associated with the third predefined area such as "quarter speed scrubbing" rate 5148-7). The direction of the movement is determined by the location of the contact with respect to the boundary 5142-7 on the touch sensitive surface. In this example, the boundary is a dynamic vertical boundary and the contact 5132-*b*-7 is positioned on the left side 5146-7 of the boundary, and thus the current position in the content moves backwards. However, it should be understood that this is merely exemplary, and the boundary could be fixed or dynamic; the boundary could also be horizontal or vertical; and the contact could be on the right or the left (for a vertical boundary) or above or below (for a horizontal boundary), as variously described in FIGS. 5LL-5OO.

In some embodiments, the second scrubbing rate is less than the first scrubbing rate (1054). For example, if the contact 5132-*b*-6 in FIG. 5PP and the contact 5132-*b*-7 in FIG. 5QQ are each maintained on the touch screen display for the same amount of time (e.g., thirty seconds), the current position in the content will move further along in the content when the contact is in the second predefined area (e.g., 5134-*a* in FIG. 5PP) than when the contact is in the third predefined area (e.g., 5134-*b* in FIG. 5QQ). In some embodiments, the second scrubbing rate is a predetermined rate (1055).

In some embodiments, while the contact is located in the area on the touch-sensitive surface that corresponds to the third predefined area on the display, the device plays back (1056) the content at the second scrubbing rate. In some embodiments, while the contact is located in the area on the touch-sensitive surface that corresponds to the third predefined area on the display, the device displays (1057) an indicator of the second scrubbing rate. (e.g., "quarter speed scrubbing" 5148-7 in FIG. 5QQ)

In some embodiments, while the contact is located (1058) in the area on the touch-sensitive surface that corresponds to the second predefined area on the display, the device stops (1059) movement of the current position within the content when the progress icon moves along the first predefined direction by an amount equal to the first component of movement of the contact on the touch-sensitive surface multiplied by a first proportionality factor. For a touch screen display, the proportionality factor will typically be greater than 0 and less than 1. In some embodiments, while the contact is located (1060) in the area on the touch-sensitive surface that corresponds to the third predefined area on the display, the device stops (1061) movement of the current position within the content when the progress icon moves along the first predefined direction by an amount equal to the first component of movement of the contact on the touch-sensitive surface multiplied by a second proportionality factor that is greater than 0 and less than the first proportionality factor.

In some embodiments, the device detects (1062) movement of the contact across the touch-sensitive surface to a location on the touch-sensitive surface that corresponds to a fourth predefined area on the display outside the first predefined area, the second predefined area, and the third predefined area. In some embodiments, the progress icon is farther from the fourth predefined area than from the third predefined area (1063). In some embodiments, while the contact is located in an area on the touch-sensitive surface that corresponds to the fourth predefined area on the display, the device moves (1064) the current position within the content at a third scrubbing rate. In some embodiments, the third scrubbing rate is less than the second scrubbing rate (1065).

For example, in FIG. 5RR the device detects a contact 5132-*a*-8 in the first predefined region 5004. The contact moves 5130-*b*-8 to a fourth predefined region 5134-*c*. In response to continuing to detect the contact in the fourth predefined region 5134-*c*, the device moves the current position within the content (indicated by progress icon 5140-8) to a new position within the content at a second scrubbing rate (e.g., a scrubbing rate associated with the fourth predefined area such as "fine scrubbing" rate 5148-8). The direction of the movement is determined by the location of the contact with respect to the boundary 5142-8 on the touch sensitive surface. In this example, the boundary is a dynamic vertical boundary and the contact 5132-*b*-8 is positioned on the right side 5144-8 of the boundary, and thus the current position in the content moves forward. However, it should be understood that this is merely exemplary, and the boundary could be fixed or dynamic; the boundary could also be horizontal or vertical; and the contact could be on the right or the left (for a vertical boundary) or above or below (for a horizontal boundary), as variously described in FIGS. 5LL-5OO.

In some embodiments, the device detects (1066) a break in the contact (e.g., detecting lift off of the contact). In response to detecting the break in the contact, the device stops (1067) movement of the current position within the content. For example if a user is scrubbing through a set of images, the scrubbing stops when the user lifts the contact from the touch-sensitive surface. In some embodiments, the device detects (1068) a break in the contact (e.g., detecting lift off of the contact). In response to detecting the break in the contact, the device plays back the content at the playback speed (e.g., at the adjusted/updated/then current position within the content). For example if the user is scrubbing through a set of images, the scrubbing continues at the current rate when the user lifts the contact (e.g., allowing the user to set a speed for a slideshow). As another example, if a user is scrubbing through an audio file (e.g., song), when the user lifts off the contact, the device begins to play the audio file (e.g., song) at a normal playback speed for the audio content (e.g., the speed at which the song was recorded).

Although the preceding examples have been given with reference to a touch screen display. In some embodiments the display and the touch-sensitive surface are separate, as discussed in greater detail above with reference to FIG. 5P.

FIGS. 11A-11D are flow diagrams illustrating a method 1100 of scrubbing through content at a variable scrubbing rate in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 1100 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

At an electronic device with a display and a touch-sensitive surface, content is provided with the electronic device. Operations 1102 through 1146 are performed while providing the content with the electronic device. The device displays (1102) a progress icon (e.g., 5150-1 in user interface 400S S in FIG. 5SS) in a predefined area (e.g., 5152 in FIG. 5SS) on the display. The progress icon (e.g., 5150-1 in FIG. 5SS) indicates a current position within the content and is configured to move within a predefined path (e.g., the progress icon can only move within the scroll bar 5154 in FIG. 5SS) on the display. The predefined path includes two endpoints (e.g., 5156 and 5158 in FIG. 5SS) and has a primary axis (e.g., 5160 in FIG. 5SS). In some embodiments the progress icon (e.g., 5150-1 in FIG. 5SS) is configured to move along the predefined path in a first predefined direction. If the first predefined direction is horizontal, then the progress icon can only move to the right and to the left. If the first predefined direction is vertical, then the progress icon can only move up and down. In some embodiments the progress icon is (1104) a thumb icon (e.g., 5150-1 in FIG. 5SS) in a scroll bar (e.g., 5154 in FIG. 5SS). In some embodiments, the progress icon is (1106) an end of a bar (e.g., 5011 in FIG. 5C).

The device detects (1108) a contact (e.g., 5162-1 in FIG. 5SS) with the touch-sensitive surface (e.g., touch screen 112). In some embodiments, the device detects a contact with the touch-sensitive surface at a location that corresponds to the progress icon. In some embodiments, detecting contact with a location that corresponds to the predefined area that includes the progress icon is sufficient (e.g., the contact may be anywhere in the predefined region rather than exactly at the location that corresponds to the predefined icon).

The device detects (1110) movement (e.g., 5164 in FIG. 5SS) of the contact. The device detects (1112) a scrubbing component (e.g., 5166 in FIG. 5SS) of the movement of the contact that corresponds to movement on the display parallel to the primary axis (e.g., 5160 in FIG. 5SS) of the predefined path.

The device moves (1114) a current position of the progress icon in accordance with the scrubbing component (e.g., 5166 in FIG. 5SS) of the movement of the contact, and moves the current position in the content in accordance with the current position of the progress icon. For example, in FIGS. 5SS and 5TT, the first contact position (e.g., 5162-1 in FIG. 5SS) is moved to a second position (e.g., 5162-2 in FIG. 5TT), and the progress icon 5150 is moved from a first position (e.g., 5150-1 in FIG. 5SS) to a second position (e.g., 5150-2 in user interface 400TT in FIG. 5TT) in accordance with the scrubbing component of movement (e.g., 5166 in FIG. 5TT). In some embodiments, the movement of the current position of the progress icon is equal to an uncompensated scrubbing distance (e.g., 5167 in FIG. 5TT).

The device detects (1116) a pause in movement of the contact at a contact pause location (e.g., 5162-2 in FIG. 5TT) that corresponds to an icon pause location (e.g., 5150-2 in FIG. 5TT) of the progress icon. In some embodiments, the pause is detected after prior movement of the contact. In some embodiments, the pause is detected after an initial contact with no associated movement. In some embodiments, detecting the pause in movement of the contact includes (1118) detecting movement of the contact that is below a predefined threshold (e.g., movement below a movement speed such as 20-30 pixels per half-second for a touch contact for a predetermined period of time).

In response to detecting the pause in movement of the contact, (e.g., a pause after initial movement or pause after initial contact), the device determines (1120) positions of two detailed scrubbing boundaries (e.g., 5168 and 5170 in FIG. 5TT) on the display. For example, in some embodiments, a user moves a contact on the touch sensitive surface to move the progress icon and then pauses at a contact pause location on the touch sensitive surface to enter a detailed scrubbing mode, as described in greater detail below. In other embodiments, the user places a contact on the touch sensitive surface and does not move the contact for a predetermined period of time (e.g., 2 seconds) and the device enters a detailed scrubbing mode, as described in greater detail below (e.g., the initial location of the contact becomes the contact pause location).

In some embodiments, an indication of the detailed scrubbing boundaries is displayed on the touch screen. However it should be understood that, in some embodiments, no indication of the detailed scrubbing boundaries is displayed and the positions of the detailed scrubbing boundaries are determined for calculating the movement of the progress icon but are not displayed on the display.

The detailed scrubbing boundaries are determined at least in part based on a predefined distance from the icon pause location (e.g., 50 pixels on either side of the icon pause location 5150-2 in FIG. 5TT). In some embodiments, the detailed scrubbing boundaries are two lines (e.g., 5168 and 5170 in FIG. 5TT) that are perpendicular to the first predefined direction and are located a predefined distance away from and on opposite sides of the icon pause location (e.g., 5150-2 in FIG. 5TT). After determining the positions of the two detailed scrubbing boundaries, the device detects (1122) movement (e.g., 5172 in FIG. 5UU) of the contact from the contact pause location (e.g., 5162-2 in FIG. 5TT) to a current contact location (e.g., 5162-3 in FIG. 5UU). The device detects the scrubbing component (e.g., 5174 in FIG. 5UU) of movement of the contact from the contact pause location. The scrubbing component corresponds to an uncompensated scrubbing distance (e.g., 5176 in FIG. 5UU) on the display.

In response (1124) to detecting the scrubbing component: when the uncompensated scrubbing distance (e.g., 5176 in FIG. 5WW) corresponds to a position on the display between the two detailed scrubbing boundaries (e.g., 5168 and 5170 in FIG. 5WW) and between the two endpoints (e.g., 5156 and 5158 in FIG. 5WW) of the predefined path, the device moves (1126) the current position of the progress icon (e.g., 5150-3 in user interface 400WW in FIG. 5WW) by a distance (e.g., 5182 in FIG. 5WW) less than the uncompensated scrubbing distance (e.g., 5176 in FIG. 5WW); and, when the uncompensated scrubbing distance (e.g., 5184 in FIG. 5XX) corresponds to a position on the display outside the two detailed scrubbing boundaries and between the two endpoints (e.g., 5156 and 5158 in FIG. 5XX) of the predefined path, the device moves (1126) the current position of the progress icon (e.g., 5150-4 in user interface 400XX in FIG. 5XX) by a distance equal to the uncompensated scrubbing distance (e.g., 5184 in FIG. 5XX).

As one example of moving (1126) the progress icon less than the uncompensated scrubbing distance, when a respective boundary (e.g., 5170 in FIG. 5TT) is 50 pixels away from the current location of the progress icon (e.g., 5150-2 in FIG. 5TT) horizontally on the display and 50 pixels away from the current location of the contact (e.g., 5162-2 in FIG. 5TT) horizontally on the display, the device detects a horizontal component of movement of the contact from the current location of the contact to the detail scrubbing boundary (e.g., 5170 in FIG. 5SS). In response to detecting the first 10 pixels of the horizontal component of movement of the contact towards the detail scrubbing boundary, the device moves the progress icon 2 pixels on the display in the direction of movement of the contact; in response to detecting the second 10 pixels of the horizontal component of movement of the contact towards the detail scrubbing boundary, the device moves the progress icon 3 pixels on the display in the direction of movement of the contact; in response to detecting the third 10 pixels of the horizontal component of movement of the contact towards the detail scrubbing boundary, the device moves the progress icon 5 pixels on the display in the direction of movement of the contact; and, in response to detecting the last 20 pixels of the horizontal component of movement of the contact towards the detail scrubbing boundary, the device moves the progress icon 40 pixels on the display in the direction of movement of the contact. In other words, in this example, in response to the first 30 pixels of movement of the contact, the device moves the progress icon only 10 pixels (e.g., the progress icon moves more slowly than the contact), while in the last 20 pixels of movement of the contact, the device moves the progress icon 40 pixels (e.g., the progress icon moves more quickly than the contact). Thus, in this example, where the initial contact location and the initial progress icon location are the same location, over the course of the movement from the initial contact position to a position at (or beyond) the detail scrubbing boundary, the progress icon initially lags the contact, but catches up with the contact by the time the contact reaches the detail scrubbing boundary.

In some embodiments, the device detects (1128) a predefined condition prior to moving the progress icon (e.g., 5150-3 in user interface 400UU in FIG. 5UU) by a distance equal to the uncompensated scrubbing distance. In some embodiments the predefined condition includes (1130) that the progress icon is less than a predefined distance from the respective detail scrubbing boundary (e.g., 5170 in FIG.

5UU) and that the progress icon is moving below a predefined speed (e.g., progress icon is slowly approaching a boundary, such as detailed scrubbing boundary 5170 in FIG. 5UU). In some embodiments, the predefined condition includes (1132) that the progress icon is moving below a predefined speed.

In some embodiments, in response to detecting the predefined condition, the device changes (1134) the position of a respective detail scrubbing boundary (e.g., 5170 in FIG. 5VV). In some embodiments, changing the position of the respective detail scrubbing boundary includes (1136) moving both of the detail scrubbing boundaries (e.g., 5168 and 5170 in FIG. 5VV) such that the detail scrubbing boundaries (e.g., 5178 and 5180 respectively in FIG. 5VV) are equidistant from the progress icon (e.g., 5150-3 in user interface 400VV in FIG. 5VV). For example, in some embodiments, when the user pauses moving the progress icon, the detail scrubbing area (e.g., the area between the two detailed scrubbing boundaries 5178 and 5180 in FIG. 5VV) is recentered (e.g., shifted such that the boundaries are equidistant from the progress icon) around the current location of the progress icon (e.g., 5150-3 in user interface 400VV in FIG. 5VV). In other words, as the contact begins to approach one of the detailed scrubbing boundaries, if the device determines that the user wants to remain in detailed scrubbing mode (e.g., by detecting that the contact is still moving slowly), then the device moves the scrubbing boundary so that the device remains in detailed scrubbing mode.

In some embodiments, the positions of the detailed scrubbing boundaries are maintained (1138), and the device moves the current position of the progress icon as follows: when the uncompensated scrubbing distance is less than the predefined distance, the device moves (1140) the current position of the progress icon by a distance (e.g., 5182 in FIG. 5WW) that is less than the uncompensated scrubbing distance (e.g., 5176 in FIG. 5WW); and, when the uncompensated scrubbing distance (e.g., 5184 in FIG. 5XX) is greater than the predefined distance, the device moves (1140) the current position of the progress icon by a distance (e.g., 5184 in FIG. 5XX) that is equal to the uncompensated scrubbing distance.

In some embodiments, a respective detail scrubbing boundary of the detail scrubbing boundaries is located (1142) beyond a respective endpoint of the predefined path. For example, the boundary 5186 is located beyond an endpoint 5158 of the progress bar 5154 in FIG. 5YY. In such embodiments, in response (1144) to detecting the scrubbing component of movement (e.g., detecting contact 5189 in the predefined region 5152 and movement 5190 of the contact 5189-1, as illustrated in FIG. 5YY), the device moves the current position of the progress icon such that: when (1146) the uncompensated scrubbing distance (e.g., 5192 in FIG. 5YY resulting from movement of the contact from an initial contact location 5189-1 in FIG. 5YY to a current contact location 5189-2 in FIG. 5ZZ) corresponds to a position on the display between the two detailed scrubbing boundaries (e.g., 5186 and 5188 in FIG. 5YY) and beyond the respective endpoint (e.g., 5158 in FIG. 5YY) of the predefined path, the device moves (e.g., from 5150-5 in FIG. 5YY to 5150-6 in user interface 400ZZ in FIG. 5ZZ) the current position of the progress icon a distance (e.g., 5194 in FIG. 5ZZ) less than the distance from the current location of the progress icon (e.g., 5150-5 in FIG. 5YY) to the respective endpoint (e.g., 5158 in FIG. 5YY) of the predefined path.

On the other hand, in response (1144) to detecting the scrubbing component of movement when the uncompensated scrubbing distance (e.g., 5196 in FIG. 5AAA resulting from movement of the contact from an initial contact location 5189-1 in FIG. 5YY to a current contact location 5189-3 in FIG. 5AAA) corresponds to a position on the display at or beyond the respective detailed scrubbing boundary (e.g., 5186 in FIG. 5AAA) and beyond the respective endpoint (e.g., 5158 in FIG. 5AAA) of the predefined path, the device moves (e.g., from 5150-5 in FIG. 5YY to 5150-7 in FIG. 5AAA) the current position of the progress icon (e.g., 5150-7 in user interface 400AAA in FIG. 5AAA) to the respective endpoint (e.g., 5158 in FIG. 5AAA) of the predefined path. In other words, in this embodiment, when the contact is dragged past a respective end of the progress bar, detailed scrubbing through the content continues, instead of automatically moving to the respective end of the content. In this embodiment, the respective end of the content is reached when the contact reaches the detailed scrubbing boundary (e.g., 5186 in FIG. 5AAA).

Although the preceding examples have been given with reference to a touch screen display. In some embodiments the display and the touch-sensitive surface are separate, as discussed in greater detail above with reference to FIG. 5P.

FIGS. 12A-12D are flow diagrams illustrating a method 1200 of scrubbing through content at a variable scrubbing rate in accordance with some embodiments. The method is performed at an electronic device with a display and a touch-sensitive surface. In some embodiments, the touch-sensitive surface is on the display. In other words, the display is a touch screen display (e.g., 112, FIG. 2). In some embodiments the touch-sensitive surface is separate from the display (e.g., display 5042 and touch-sensitive surface 5044 in FIG. 5P). In some embodiments, the method is performed at a portable multifunction device with a touch screen display (e.g., portable multifunction device 100). Some operations in the method may be combined and/or the order of some operations may be changed.

As described below, the method 1200 provides an intuitive way to change the current position within content at a variable scrubbing rate using a display and a touch-sensitive surface. The method reduces the cognitive burden on a user when scrubbing through content, thereby creating a more efficient human-machine interface. For battery-operated computing devices, enabling a user to change the current position within content faster and more efficiently conserves power and increases the time between battery charges.

At an electronic device with a display and a touch-sensitive surface (e.g., touch screen 112 in FIG. 5BBB), the device displays (1202) a progress icon (e.g., 5202 in user interface 400BBB in FIG. 5BBB) in a predefined area (e.g., 5204 in FIG. 5BBB) on the display. The progress icon is configured to move in a first predefined direction (e.g., 5206 in FIG. 5BBB) on the display (e.g., touch screen 112 in FIG. 5BBB). In some embodiments the progress icon is (1204) a thumb icon (e.g., 5202 in FIG. 5BBB) in a scroll bar. In some embodiments the progress icon is (1206) an end of a bar (e.g., 5011 in FIG. 5C). In some embodiments the first predefined direction is (1208) a horizontal direction on the display (e.g., 5206 in FIG. 5BBB). In some embodiments the first predefined direction is (1210) a vertical direction on the display. If the first predefined direction is horizontal, then the progress icon can only move to the right and to the left. If the first predefined direction is vertical, then the progress icon can only move up and down.

A first piece of content is provided (1212) with the electronic device. In some embodiments, providing the first piece of content includes playing back (1214) audio content. In some embodiments, the audio content is (1216) a song in a play list. In some embodiments, the first piece of content is (1218) a book-marked section in a podcast. In some embodiments, providing the first piece of content includes playing back (1220) video content. In some embodiments, the video content is (1222) a scene in a movie. In some embodiments, providing a first piece of content includes displaying (1224) an electronic document. In some embodiments, the electronic document is (1226) a chapter in a book.

The device indicates (1228) a current position within the first piece of content with the progress icon (e.g., 5202 in FIG. 5BBB). The device displays (1230) a multi-purpose content navigation icon (e.g., 5208 in FIG. 5BBB). While providing (1232) the first piece of content with the electronic device, the device detects (1234) a first contact (e.g., 5210-1 in FIG. 5BBB) with the touch-sensitive surface at a first location that corresponds to the multi-purpose content navigation icon (e.g., 5208 in FIG. 5BBB) for at least predetermined time period. While continuing to detect the contact at the first location (e.g., within a predefined radius of the first location), the device moves (1236) the current position within the first piece of content at a predefined scrubbing rate (e.g., as illustrated by the arrow 5212 in FIG. 5BBB, which typically is not displayed on the display). The device detects (1238) movement of the contact, wherein movement of the contact comprises a first component of movement (e.g., 5214 in FIG. 51313B) on the touch-sensitive surface in a direction that corresponds to movement on the display parallel to the first predefined direction (e.g., 5206 in FIG. 5BBB). In some embodiments, while moving the current position within the first piece of content at a predefined scrubbing rate, the device displays (1246) a visual indicator (e.g., a symbol such as "2×" 5216 in FIG. 5BBB)

In response to detecting the movement of the contact, the device moves (1240) the current position within the first piece of content at a variable scrubbing rate. The variable scrubbing rate varies monotonically as the first component of movement on the touch-sensitive surface increases (e.g., as the first component of movement increases, the variable scrubbing rate either increases or decreases). In other words, when the first component of movement is in a first direction from the multi purpose content navigation icon (e.g., displaced to the right of a fast forward button), the variable scrubbing rate increases monotonically (e.g., the variable scrubbing rate increases as the contact moves farther to the right of the fast forward button); and, when the first component of the movement is in a second direction (e.g., displaced to the left of the fast forward button) from the multi-purpose content navigation icon, the variable scrubbing rate decreases monotonically (e.g., the variable scrubbing rate decreases as the contact moves farther to the left of the fast forward button). In some embodiments, the first piece of content has a beginning and an end, and the variable scrubbing rate moves (1242) the current position towards the beginning of the first piece of content (e.g., the multi-purpose content navigation icon is a rewind button). In some embodiments the first piece of content has a beginning and an end, and the variable scrubbing rate moves (1244) the current position towards the end of the first piece of content (e.g. the multi-purpose content navigation icon is a fast forward button).

It should be understood that monotonically decreasing the variable scrubbing rate from a respective positive scrubbing rate may include either (A) decreasing to a positive scrubbing rate that is slower than the respective positive scrubbing rate (e.g., moving the current position in the content forwards through the content, but at a slower scrubbing rate than the respective positive scrubbing rate); or (B) decreasing to a negative scrubbing rate (e.g., moving the current position in the content backwards through the content). For example, decreasing a scrubbing rate below a normal playback speed (e.g., +1.0×) includes scrubbing rates that are less than the normal playback speed. Such scrubbing rates include either: (A) a slower positive scrubbing rate at a "slow motion" rate such as moving the current position in the content forwards at half of normal playback speed (e.g., +0.5×); or (B) a negative scrubbing rate such as moving the current position in the content backwards at half of normal playback speed (e.g., −0.5×). Additionally, monotonically increasing the variable scrubbing rate from a respective positive scrubbing rate includes increasing the variable scrubbing rate to a positive scrubbing rate that is faster than the respective positive scrubbing rate (e.g., increasing from +1.0× to +2.0×).

Similarly, it should be understood that monotonically increasing the variable scrubbing rate from a respective negative scrubbing rate may include either (A) increasing to a negative scrubbing rate that is slower than the respective negative scrubbing rate (e.g., moving the current position in the content backwards through the content, at −0.5× rather than −1.0×); or (B) increasing to a positive scrubbing rate (e.g., moving the current position in the content forwards through the content). For example, increasing a scrubbing rate above a normal rewind speed (e.g., −1.0×) includes scrubbing rates that are greater than the normal rewind speed. Such scrubbing rates include either: (A) a slower negative scrubbing rate at a "slow motion" rewind rate such as moving the current position in the content backwards at half of normal rewind rate (e.g., −0.5×); or (B) a positive scrubbing rate such as moving the current position in the content forwards at half of normal rewind speed (e.g., 0.5×). Additionally, monotonically decreasing the variable scrubbing rate from a respective negative scrubbing rate includes decreasing the variable scrubbing rate to a negative scrubbing rate that is faster than the respective negative scrubbing rate (e.g., decreasing from −1.0× to −2.0×). In some embodiments, while moving the current position within the first piece of content at a variable scrubbing rate, the device displays (1246) a visual indicator (e.g., a symbol such as "4×" 5218 in user interface 400CCC in FIG. 5CCC) of the variable scrubbing rate. In some embodiments, when the first component of movement is in a direction that corresponds to a direction towards a first side of the device, the variable scrubbing rate is (1248) greater than the predefined scrubbing rate. For example, when the contact with the multi-purpose content navigation icon moves to the right (e.g., the initial contact 5210-1 in FIG. 5BBB moves 5214 to a current location of the contact 5210-2 in FIG. 5CCC that is to the right of the initial contact), the variable scrubbing rate is greater than the predefined scrubbing rate. In this example, as illustrated in FIGS. 5BBB and 5CCC, the scrubbing rate in FIG. 5CCC is twice as fast as the scrubbing rate in FIG. 5BBB. In particular, the arrow 5212 (FIG. 5BBB) that indicates the predefined scrubbing rate is shorter than the arrow 5220 (FIG. 5CCC) that indicates the variable scrubbing rate. It should be understood that typically these arrows are not displayed on the display, but are shown in the Figures to indicate the distance which the progress icon 5202 will move in a fixed amount of time at the current scrubbing rate. Additionally, the visual indicator 5216 in FIG. 5BBB indicates that the scrubbing rate in FIG. 5BBB is "2×" (e.g., twice as fast as normal playback speed), while the visual indicator 5218 in FIG. 5CCC indicates that the scrubbing rate in FIG. 5CCC is "4×" (e.g., four times as fast as normal playback speed). It should be understood that, in accordance with some embodiments, the increase in the scrubbing rate is determined based on the distance between the initial location of the contact 5210 and the current location of the contact, so that if the contact is moved further to the right, the device will further increase the variable scrubbing rate.

In some embodiments, when the first component of movement is in a direction that corresponds to a direction towards a second side of the device that is opposite the first side of the device (e.g., opposite from the direction in which the contact moved in FIG. 5CCC), the variable scrubbing rate is (1248) less than the predefined scrubbing rate. For example, when the contact with the multi-purpose content navigation icon moves to the right (e.g., the initial contact 5210-1 in FIG. 5BBB moves 5222 to a current location of the contact 5210-3 5DDD that is to the left of the initial contact), the variable scrubbing rate is less than the predefined scrubbing rate. In this example, as illustrated in FIGS. 5BBB and 5DDD, the scrubbing rate in FIG. 5DDD is one quarter as fast as the scrubbing rate in FIG. 5BBB. In particular, the arrow 5212 (FIG. 5BBB) that indicates the predefined scrubbing rate is longer than the arrow 5224 (FIG. 5DDD) that indicates the variable scrubbing rate. It should be understood that typically these arrows are not displayed on the display, but are shown in the Figures to indicate the distance which the progress icon will move in a fixed amount of time at the current scrubbing rate. Additionally, the visual indicator 5216 in FIG. 5BBB indicates that the scrubbing rate in FIG. 5BBB is “2×” (e.g., twice as fast as normal playback speed), while the visual indicator 5226 in user interface 400DDD in FIG. 5DDD indicates that the scrubbing rate in FIG. 5CCC is “0.5×” (e.g., one half as fast as normal playback speed). It should be understood that, in accordance with some embodiments, the decrease in the scrubbing rate is determined based on the distance between the initial location of the contact and the current location of the contact, so that if the contact is moved further to the left, the device will further decrease the variable scrubbing rate. In other words, in some embodiments, where the multi-purpose content navigation icon (e.g., 5208 in FIG. 5BBB) is a fast forward button and the predefined scrubbing rate is twice a normal playback rate of the content (e.g., the normal speed for watching a movie, playing a song or watching a slideshow), if the device detects a contact with the fast forward button, the scrubbing rate will increase to twice the normal playback rate, if the device detects movement of the contact to the right, the scrubbing rate will increase to a scrubbing rate greater than twice the normal playback rate, and if the device detects movement of the contact to the left, the scrubbing rate will decrease to a scrubbing rate less than the twice the normal playback rate.

In some embodiments the decrease in the scrubbing rate is determined based at least in part on the distance between the current location of the contact and a fixed location on the display. For example, in FIG. 5DDD, while the contact remains on the right side of the pause button 5228 (or the right side of the touch screen display) the minimum scrubbing rate is 1× (e.g., normal playback speed). In this example, when the contact moves to the left of the pause button 5228 (or to the left side of the touch screen display) the scrubbing rate decreases to a scrubbing rate that is less than the normal playback speed.

In some embodiments, when the first component of movement is in a direction that corresponds to a direction towards a first side of the device (e.g., the right side), the variable scrubbing rate is greater than the predefined scrubbing rate, wherein the predefined scrubbing rate moves the current position in the content towards a first end of the content (e.g., towards the end of the content); and when the first component of movement is in a direction that corresponds to a direction towards a second side of the device (e.g., the left side) that is opposite the first side of the device, the variable scrubbing rate moves the current position towards a second end of the content that is opposite the first end of the content (e.g., towards the beginning of the content). In other words, in some embodiments, the device switches between a positive scrubbing rate (e.g., moving the current position towards the end of the content) and a negative scrubbing rate (e.g., moving the current position in the content towards the beginning of the content) based on the position of the contact on a touch screen relative to the position of a multi-purpose content navigation icon on the touch screen. For example, when the contact is on the right side of the “play” button, the scrubbing rate is positive (e.g., “forwards”), and when the contact is on the left side of the “play” button, the scrubbing rate is negative (e.g., “backwards”).

In some embodiments, while providing (1232) the first piece of content with the electronic device, the device detects (1252) a second contact on the touch-sensitive surface at the first location. The device detects (1254) a release of the second contact before the predetermined time period has elapsed. In response to detecting the release of the second contact, the device moves (1256) the current position in the first piece of content by a predetermined amount. For example, in accordance with some embodiments, a tap (e.g., a contact followed by a liftoff of the contact) on a fast forward button will advance the content by 30 seconds, one chapter, or one page etc.

In some embodiments, while providing (1232) the first piece of content, the device detects (1258) a third contact on the touch-sensitive surface at the first location. The device detects (1260) a release of the third contact before the predetermined time period has elapsed. In response to detecting the release of the third contact, the device provides (1264) a second piece of content with the electronic device. For example, in accordance with some embodiments, a tap (e.g., a contact followed by a liftoff of the contact) on a fast forward button will advance the content to the next song in a play list, the next episode of a television show in a season of television shows, or the next e-book in a list of e-books.

In some embodiments, providing the second piece of content includes playing back (1264) audio content. In some embodiments, the audio content is (1266) a song in a play list, or the second piece of content is (1268) a book-marked section in a podcast. In some embodiments, providing the second piece of content includes playing back (1270) video content. In some embodiments, the video content is (1272) a scene in a movie. In some embodiments, providing a second piece of content includes displaying (1274) an electronic document. In some embodiments, the electronic document is (1276) a chapter in a book.

The preceding examples have been given with reference to a fast forward button. The fast forward button is a multi-purpose content navigation icon because it may be used to scrub content at a fixed rate, scrub content at a variable rate, skip ahead within a piece of content, or skip to the next piece of content, depending on which user interaction with the button is detected. It should be understood, however, that the other multi-purpose content navigation icons may be used in a similar fashion. For example, when the device detects a contact with a rewind button, the device moves content backwards at a normal rewind rate. When the device detects a contact with a rewind button and the contact moves to the right, the device moves content backwards a rate faster than the normal rewind rate; and, when the device detects a contact with a rewind button and the contact moves to the left, the device moves content backwards at a rate slower than the normal rewind rate (or vice versa). As another example, when the device detects a contact with a play button, the device moves content forwards at the normal playback rate. When the device detects a contact with a play button and the contact moves to the right, the device moves content forwards at a rate faster than the normal playback rate. When the device detects a contact with the play button and the contact moves to the left, the device moves content forwards at a rate slower than the normal playback rate. Alternatively, when the device detects a contact with the play button and the contact moves to the left, the device moves content backwards (e.g., at a negative scrubbing rate).

Although the preceding examples have been given with reference to a touch screen display. In some embodiments the display and the touch-sensitive surface are separate, as discussed in greater detail above with reference to FIG. 5P.

Attention is now directed towards FIG. 5EEE, which illustrates a scroll bar in accordance with some embodiments. In some embodiments, the expanded portion 5244 of the scroll bar includes a visual indication that the scrubbing rate in the expanded portion of the scroll bar is different from the scrubbing rate in the non-expanded portion of the scroll bar (e.g., the expanded portion of the scroll bar is vertically expanded and/or a wave form displayed in the scroll bar is expanded). In some embodiments the expanded portion of the scroll bar is displayed in response to detecting a pause in movement of a contact with the scroll bar (e.g., movement followed by a pause, movement below a predefined threshold or a contact with a portion of the scroll bar and no subsequent movement). In some embodiments the location of the expanded portion of the scroll bar is determined based on the location of the paused contact 5248 (e.g., the center of the expanded portion of the scroll bar is located proximate to the location of the paused contact).

In some embodiments the scrubbing rate in the expanded portion of the scroll bar is a variable scrubbing rate, which varies depending on the location of the contact 5248 within the expanded portion 5244 of the scroll bar 5246. In some embodiments, the scroll bar has an uncompensated scrubbing rate (e.g., a scrubbing rate at which the current position within the content changes for a given movement of the contact in a first predefined direction on the touch screen display). In some embodiments, in first region 5250 of the scroll bar, near the paused location of the contact, the scrubbing rate is a fine scrubbing rate (e.g., the current position in the content moves at one eighth of the uncompensated scrubbing rate while the contact is in the first region); in a second region (e.g., region 5252-*a* or 5252-*b*) adjacent to the first region the scrubbing rate is a quarter speed scrubbing rate (e.g., the current position in the content moves at one quarter of the uncompensated scrubbing rate while the contact is within the second region); in a third region (e.g., region 5254-*a* or 5254-*b*) adjacent to the second region the scrubbing rate is a half speed scrubbing rate (e.g., the current position in the content moves at one half of the uncompensated scrubbing rate while the contact is within the third region); in a fourth region (e.g., region 5256-*a* or 5256-*b*) adjacent to the third region the scrubbing rate is a hi-speed scrubbing rate (e.g., the current position in the content moves at the uncompensated scrubbing rate while the contact is within the fourth region).

In some embodiments the expanded portion of the scroll bar is fixed. For example, when the expanded portion of the scroll bar is displayed, if the device detects movement of the contact to the fourth region (e.g., 5256-*a* or 5256-*b*) where the current position in the content moves at an uncompensated scrubbing rate, the device ceases to display the expanded portion of the scroll bar and instead displays the scroll bar without an expanded portion of the scroll bar. If the device then detects movement of the contact back to a location corresponding to the location (e.g., 5250, 5252-*a*, 5252-*b*, 5254-*a*, or 5254-*b*) that used to include the expanded portion of the scroll bar, the current position in the content moves at the uncompensated scrubbing rate. It should be understood that, in some embodiments, a new expanded portion of the scroll bar is displayed when the device detects another pause in the movement of the contact, as described in greater detail above. Additionally, it should be understood that while the preceding embodiments have been discussed with reference to four regions, this number of regions is merely exemplary, and any number of regions could be used in a similar fashion to achieve similar results.

Although the preceding examples have been given with reference to a touch screen display. In some embodiments the display and the touch-sensitive surface are separate, as discussed in greater detail above with reference to FIG. 5P.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:

a display;

a touch-sensitive surface;

one or more processors;

memory; and one or more programs, wherein the one or more programs are stored in the memory and configured to be executed by the one or more processors, the one or more programs including instructions for:

while providing content with the electronic device:

detecting a contact on the display at a first location that corresponds to a progress icon indicating a current position within the content, wherein the progress icon is configured to move in a first predefined direction;

detecting movement of the contact across the display, wherein movement of the contact comprises a first component of movement of the contact in a direction parallel to the first predefined direction and a second component of movement of the contact in a direction perpendicular to the first predefined direction; and in response to detecting movement of the contact across the display:

in accordance with a determination that the movement of the contact is from the first location to a second location and while the contact is located at the second location:
moving the current position within the content at a first scrubbing rate, wherein the first scrubbing rate is at least partially based on the second component of movement of the contact; and
in accordance with a determination that the movement of the contact is from the first location to a third location, wherein the third location is different from the second location, and while the contact is located at the third location:
moving the current position within the content at a second scrubbing rate different from the first scrubbing rate, wherein the second scrubbing rate is at least partially based on the second component of movement of the contact.

2. The electronic device of claim 1, the one or more programs further including instructions for:
while the contact is located at the second location, detecting a current first component of movement of the contact, wherein direction of moving the current position within the content at the first scrubbing rate is in accordance with direction of the current first component of movement while the contact is located at the second location; and
while the contact is located at the third location, detecting a current first component of movement of the contact, wherein direction of moving the current position within the content at the second scrubbing rate is in accordance with direction of the current first component of movement while the contact is located at the third location.

3. The electronic device of claim 1, wherein providing content comprises at least one of the following:
playing back audio content;
playing back video content; and
displaying an electronic document.

4. The electronic device of claim 1, wherein the first component of movement and the second component of movement are perpendicular to each other.

5. The electronic device of claim 1, wherein the second scrubbing rate decreases to a predetermined minimum rate as the second component of movement increases.

6. The electronic device of claim 1, wherein:
providing content with the electronic device comprises playing back content with the electronic device at a playback speed prior to detecting movement of the contact across the display, and
indicating a current position within the content with the progress icon comprises indicating a current playback position within the content with the progress icon.

7. The electronic device of claim 6, wherein while the contact is located at the second location on the display, playing back the content at the first scrubbing rate, and wherein while the contact is located at the third location on the display, playing back the content at the second scrubbing rate.

8. The electronic device of claim 6, the one or more programs further including instructions for:
detecting a break in the contact; and,
in response to detecting the break in the contact, playing back the content at the playback speed.

9. The electronic device of claim 1, wherein while the contact is located at the second location on the display, displaying an indicator of the first scrubbing rate, and wherein while the contact is located at the third location on the display, displaying an indicator of the second scrubbing rate.

10. The electronic device of claim 1, wherein:
the current position is moved forward within the content at the first scrubbing rate when the second location of the contact on the display corresponds to a location on the display that is on a first side of a predetermined boundary, and
the current position is moved backward within the content at the first scrubbing rate when the second location of the contact on the display corresponds to a location on the display that is on a second side of the predetermined boundary opposite to the first side.

11. The electronic device of claim 1, the one or more programs further including instructions for:
while the contact is located at the second location on the display:
stopping movement of the current position within the content when the progress icon moves along the first predefined direction by an amount equal to the first component of movement of the contact on the display multiplied by a first proportionality factor; and,
while the contact is located at the third location on the display:
stopping movement of the current position within the content when the progress icon moves along the first predefined direction by an amount equal to the first component of movement of the contact on the display multiplied by a second proportionality factor that is greater than 0 and less than the first proportionality factor.

12. The electronic device of claim 1, the one or more programs further including instructions for:
detecting a break in the contact; and,
in response to detecting the break in the contact, stopping movement of the current position within the content.

13. The electronic device of claim 1, the one or more programs further including instructions for:
detecting movement of the contact across the display from the first location to a fourth location; and
while the contact is located at the fourth location on the display:
determining a third current offset distance in accordance with a detected amount of the second component of movement of the contact; and
moving the current position within the content at a third scrubbing rate different from the second scrubbing rate and the first scrubbing rate.

14. A computer-implemented method, comprising:
at an electronic device with a display that includes a touch-sensitive surface:
while providing content with the electronic device:
detecting a contact on the display at a first location that corresponds to a progress icon indicating a current position within the content, wherein the progress icon is configured to move in a first predefined direction;
detecting movement of the contact across the display, wherein movement of the contact comprises a first component of movement of the contact in a direction parallel to the first predefined direction and a second component of movement of the contact in a direction perpendicular to the first predefined direction; and
in response to detecting movement of the contact across the display:

in accordance with a determination that the movement of the contact is from the first location to a second location and while the contact is located at the second location:

moving the current position within the content at a first scrubbing rate, wherein the first scrubbing rate is at least partially based on the second component of movement of the contact; and in accordance with a determination that the movement of the contact is from the first location to a third location, wherein the third location is different from the second location, and while the contact is located at the third location:

moving the current position within the content at a second scrubbing rate different from the first scrubbing rate, wherein the second scrubbing rate is at least partially based on the second component of movement of the contact.

15. The method of claim 14, further comprising:

while the contact is located at the second location, detecting a current first component of movement of the contact, wherein direction of moving the current position within the content at the first scrubbing rate is in accordance with direction of the current first component of movement while the contact is located at the second location; and while the contact is located at the third location, detecting a current first component of movement of the contact, wherein direction of moving the current position within the content at the second scrubbing rate is in accordance with direction of the current first component of movement while the contact is located at the third location.

16. The method of claim 14, wherein providing content comprises at least one of the following:

playing back audio content;

playing back video content; and displaying an electronic document.

17. The method of claim 14, wherein the first component of movement and the second component of movement are perpendicular to each other.

18. The method of claim 14, wherein the second scrubbing rate decreases to a predetermined minimum rate as the second component of movement increases.

19. The method of claim 14, wherein:

providing content with the electronic device comprises playing back content with the electronic device at a playback speed prior to detecting movement of the contact across the display, and indicating a current position within the content with the progress icon comprises indicating a current playback position within the content with the progress icon.

20. The method of claim 19, wherein while the contact is located at the second location on the display, playing back the content at the first scrubbing rate, and wherein while the contact is located at the third location on the display, playing back the content at the second scrubbing rate.

21. The method of claim 19, further comprising:

detecting a break in the contact; and, in response to detecting the break in the contact, playing back the content at the playback speed.

22. The method of claim 14, wherein while the contact is located at the second location on the display, displaying an indicator of the first scrubbing rate, and wherein while the contact is located at the third location on the display, displaying an indicator of the second scrubbing rate.

23. The method of claim 14, wherein:

the current position is moved forward within the content at the first scrubbing rate when the second location of the contact on the display corresponds to a location on the display that is on a first side of a predetermined boundary, and the current position is moved backward within the content at the first scrubbing rate when the second location of the contact on the display corresponds to a location on the display that is on a second side of the predetermined boundary opposite to the first side.

24. The method of claim 14, further comprising:

while the contact is located at the second location on the display:

stopping movement of the current position within the content when the progress icon moves along the first predefined direction by an amount equal to the first component of movement of the contact on the display multiplied by a first proportionality factor; and, while the contact is located at the third location on the display:

stopping movement of the current position within the content when the progress icon moves along the first predefined direction by an amount equal to the first component of movement of the contact on the display multiplied by a second proportionality factor that is greater than 0 and less than the first proportionality factor.

25. The method of claim 14, further comprising:

detecting a break in the contact; and, in response to detecting the break in the contact, stopping movement of the current position within the content.

26. The method of claim 14, further comprising:

detecting movement of the contact across the display from the first location to a fourth location; and while the contact is located at the fourth location on the display:

determining a third current offset distance in accordance with a detected amount of the second component of movement of the contact; and moving the current position within the content at a third scrubbing rate different from the second scrubbing rate and the first scrubbing rate.

27. A non-transitory computer-readable storage medium storing one or more programs configured to be executed by one or more processors of an electronic device with a display that includes a touch-sensitive surface, the one or more programs including instructions for:

while providing content with the electronic device:

detecting a contact on the display at a first location that corresponds to a progress icon indicating a current position within the content, wherein the progress icon is configured to move in a first predefined direction;

detecting movement of the contact across the display, wherein movement of the contact comprises a first component of movement of the contact in a direction parallel to the first predefined direction and a second component of movement of the contact in a direction perpendicular to the first predefined direction; and in response to detecting movement of the contact across the display:

in accordance with a determination that the movement of the contact is from the first location to a second location and while the contact is located at the second location:

moving the current position within the content at a first scrubbing rate, wherein the first scrubbing rate is at least partially based on the second component of movement of the contact; and in accordance with a determination that the movement of the contact is from the first location to a third location, wherein the third location is different from the second location, and while the contact is located at the third location:

moving the current position within the content at a second scrubbing rate different from the first scrubbing rate, wherein the second scrubbing rate is at least partially based on the second component of movement of the contact.

28. The non-transitory computer-readable storage medium of claim 27, the one or more programs further including instructions for:

while the contact is located at the second location, detecting a current first component of movement of the contact, wherein direction of moving the current position within the content at the first scrubbing rate is in accordance with direction of the current first component of movement while the contact is located at the second location; and while the contact is located at the third location, detecting a current first component of movement of the contact, wherein direction of moving the current position within the content at the second scrubbing rate is in accordance with direction of the current first component of movement while the contact is located at the third location.

29. The non-transitory computer-readable storage medium of claim 27, wherein providing content comprises at least one of the following:

playing back audio content;

playing back video content; and displaying an electronic document.

30. The non-transitory computer-readable storage medium of claim 27, wherein the first component of movement and the second component of movement are perpendicular to each other.

31. The non-transitory computer-readable storage medium of claim 27, wherein the second scrubbing rate decreases to a predetermined minimum rate as the second component of movement increases.

32. The non-transitory computer-readable storage medium of claim 27, wherein:

providing content with the electronic device comprises playing back content with the electronic device at a playback speed prior to detecting movement of the contact across the display, and indicating a current position within the content with the progress icon comprises indicating a current playback position within the content with the progress icon.

33. The non-transitory computer-readable storage medium of claim 32, wherein while the contact is located at the second location on the display, playing back the content at the first scrubbing rate, and wherein while the contact is located at the third location on the display, playing back the content at the second scrubbing rate.

34. The non-transitory computer-readable storage medium of claim 32, the one or more programs further including instructions for:

detecting a break in the contact; and, in response to detecting the break in the contact, playing back the content at the playback speed.

35. The non-transitory computer-readable storage medium of claim 27, wherein while the contact is located at the second location on the display, displaying an indicator of the first scrubbing rate, and wherein while the contact is located at the third location on the display, displaying an indicator of the second scrubbing rate.

36. The non-transitory computer-readable storage medium of claim 27, wherein:

the current position is moved forward within the content at the first scrubbing rate when the second location of the contact on the display corresponds to a location on the display that is on a first side of a predetermined boundary, and the current position is moved backward within the content at the first scrubbing rate when the second location of the contact on the display corresponds to a location on the display that is on a second side of the predetermined boundary opposite to the first side.

37. The non-transitory computer-readable storage medium of claim 27, the one or more programs further including instructions for:

while the contact is located at the second location on the display:

stopping movement of the current position within the content when the progress icon moves along the first predefined direction by an amount equal to the first component of movement of the contact on the display multiplied by a first proportionality factor; and, while the contact is located at the third location on the display:

stopping movement of the current position within the content when the progress icon moves along the first predefined direction by an amount equal to the first component of movement of the contact on the display multiplied by a second proportionality factor that is greater than 0 and less than the first proportionality factor.

38. The non-transitory computer-readable storage medium of claim 27, the one or more programs further including instructions for:

detecting a break in the contact; and, in response to detecting the break in the contact, stopping movement of the current position within the content.

39. The non-transitory computer-readable storage medium of claim 27, the one or more programs further including instructions for:

detecting movement of the contact across the display from the first location to a fourth location; and while the contact is located at the fourth location on the display:

determining a third current offset distance in accordance with a detected amount of the second component of movement of the contact; and moving the current position within the content at a third scrubbing rate different from the second scrubbing rate and the first scrubbing rate.

* * * * *